United States Patent
Ogata et al.

(10) Patent No.: US 11,989,760 B2
(45) Date of Patent: May 21, 2024

(54) COST ACCOUNTING PROGRAM, COST ACCOUNTING DEVICE, AND COST ACCOUNTING METHOD

(71) Applicant: Isamu Ogata, Nishinomiya (JP)

(72) Inventors: Isamu Ogata, Hyogo (JP); Toru Shirakawa, Osaka (JP)

(73) Assignee: Isamu Ogata, Hyogo (JP)

( * ) Notice: Subject to any disclaimer, the term of this patent is extended or adjusted under 35 U.S.C. 154(b) by 135 days.

(21) Appl. No.: 17/628,473

(22) PCT Filed: Jul. 20, 2020

(86) PCT No.: PCT/JP2020/028774
§ 371 (c)(1),
(2) Date: Jan. 19, 2022

(87) PCT Pub. No.: WO2021/015295
PCT Pub. Date: Jan. 28, 2021

(65) Prior Publication Data
US 2022/0292554 A1 Sep. 15, 2022

(30) Foreign Application Priority Data

Jul. 23, 2019 (JP) ................. 2019-149504

(51) Int. Cl.
*G06Q 30/0283* (2023.01)
*G05B 19/418* (2006.01)
*G06Q 50/04* (2012.01)

(52) U.S. Cl.
CPC ..... *G06Q 30/0283* (2013.01); *G05B 19/4183* (2013.01); *G06Q 50/04* (2013.01)

(58) Field of Classification Search
CPC ............ G06Q 30/0283; G06Q 10/087; G06Q 40/125; G06Q 10/04; G06Q 10/063118;
(Continued)

(56) References Cited

U.S. PATENT DOCUMENTS

2004/0139035 A1* 7/2004 Wang ............... G06Q 50/04
705/400

FOREIGN PATENT DOCUMENTS

JP 2006-085734 3/2006
JP 2008-250368 10/2008
(Continued)

OTHER PUBLICATIONS

"Manufacturing Cost Modeling for Product Design" Published by The International Journal of Flexible Manufacturing Systems (Year: 2000).*
(Continued)

*Primary Examiner* — Zeina Elchanti
(74) *Attorney, Agent, or Firm* — HSML P.C.

(57) ABSTRACT

The "arrow cost accounting" proposed in this application is constructed so that an accounting system for job costing can be applied to more general production data. Based on collected production data and cost data, a cost accounting result precisely corresponding to a procedure of a processing work is obtained. A product manufacturing cost accounting program causes a computer to perform product manufacturing cost accounting. The computer is caused to: refer to: 1) cost accounting space data defined by a coordinate space comprising a degree of processing progress axis; 2) processing work introduction amount function data as an introduction condition for the processing work; 3) present term production data as a production situation within a cost accounting target period; and 4) present term actual cost data as a cost generation situation within the given cost accounting target period stored in a memory; read the cost accounting space data and the present term production data; perform a step of calculating an arrow that connects an input node and an output node based on an inputted matching and a material amount on an arrow path as a material amount on (Continued)

a path of the arrow; read the processing work introduction amount function data and material amount data on the arrow path to calculate a processing work conversion amount and a material introduction conversion amount if a solution matching is found in the step of calculating the material amount on the arrow path; and perform a step of reading the present term actual cost data, the processing work conversion amount, and the material introduction conversion amount, distributing costs to the arrows, and outputting the costs distributed to the arrows.

26 Claims, 62 Drawing Sheets

(58) Field of Classification Search
CPC ........... G06Q 10/1053; G06Q 10/1091; G06Q 20/34; G06Q 40/025; G06Q 50/12; G06Q 10/06311; G05B 19/4183; G06N 20/00; G06N 5/04

USPC ........................................................ 705/400
See application file for complete search history.

(56) References Cited

FOREIGN PATENT DOCUMENTS

| JP | 2013-045430 | 3/2013 |
| JP | 2016-051223 | 4/2016 |
| JP | 2016-184407 | 10/2016 |

OTHER PUBLICATIONS

International Search Report issued in International Application No. PCT/JP2020/028774, dated Oct. 20, 2020, 5 pages with translation.
Written Opinion issued in International Application No. PCT/JP2020/028774, dated Oct. 20, 2020, 3 pages.

* cited by examiner

Fig. 20

(Variance Analysis regarding Material A)

| | |
|---|---|
| $p_A^{(s)} \mid \zeta_{total^A} \begin{pmatrix} \theta(s) \\ \psi(s) \\ path(s) \end{pmatrix} = 2{,}000 \text{ Yen} * 75\text{kg}$<br>$= 150{,}000 \text{ Yen}$ | |
| ↑<br>↓ | Impairment θ Variance<br>20,000 Yen (Unfavorable) |
| $p_A^{(s)} \mid \zeta_{total^A} \begin{pmatrix} \theta(a) \\ \psi(s) \\ path(s) \end{pmatrix} = 2{,}000 \text{ Yen} * 85\text{kg}$<br>$= 170{,}000 \text{ Yen}$ | |
| ↑<br>↓ | Material Amount Ratio ψ Variance at Starting Point Introduction<br>34,000 Yen (Unfavorable) |
| $p_A^{(s)} \mid \zeta_{total^A} \begin{pmatrix} \theta(a) \\ \psi(a) \\ path(s) \end{pmatrix} = 2{,}000 \text{ Yen} * 102\text{kg}$<br>$= 204{,}000 \text{ Yen}$ | |
| ↑<br>↓ | Arrow Path "path "Variance<br>36,000 Yen (Unfavorable) |
| $p_A^{(s)} \mid \zeta_{total^A} \begin{pmatrix} \theta(a) \\ \psi(a) \\ path(a) \end{pmatrix} = 2{,}000 \text{ Yen} * 120\text{kg}$<br>$= 240{,}000 \text{ Yen}$ | |
| ↑<br>↓ | Price p Variance<br>40,000 Yen (Favorable) |
| $p_A^{(a)} \mid \zeta_{total^A} \begin{pmatrix} \theta(a) \\ \psi(a) \\ path(a) \end{pmatrix} = 200{,}000 \text{ Yen}$<br>(From Actual Data) | |

Fig. 21

(Variance Analysis regarding Material B)

| | |
|---|---|
| $p_B^{(s)} \mid \zeta_{total}{}_B \begin{pmatrix} \theta(s) \\ \psi(s) \\ path(s) \end{pmatrix} = 3{,}000 \text{ Yen} * 75\text{kg}$ $= 225{,}000 \text{ Yen}$ | |
| ↑ ↓ | Impairment θ Variance 30,000 Yen (Unfavorable) |
| $p_B^{(s)} \mid \zeta_{total}{}_B \begin{pmatrix} \theta(a) \\ \psi(s) \\ path(s) \end{pmatrix} = 3{,}000 \text{ Yen} * 85\text{kg}$ $= 255{,}000 \text{ Yen}$ | |
| ↑ ↓ | Material Amount Ratio ψ Variance at Starting Point Introduction 51,000 Yen (Favorable) |
| $p_B^{(s)} \mid \zeta_{total}{}_B \begin{pmatrix} \theta(a) \\ \psi(a) \\ path(s) \end{pmatrix} = 3{,}000 \text{ Yen} * 68\text{kg}$ $= 204{,}000 \text{ Yen}$ | |
| ↑ ↓ | Arrow Path "path" Variance 36,000 Yen (Unfavorable) |
| $p_B^{(s)} \mid \zeta_{total}{}_B \begin{pmatrix} \theta(a) \\ \psi(a) \\ path(a) \end{pmatrix} = 3{,}000 \text{ Yen} * 80\text{kg}$ $= 240{,}000 \text{ Yen}$ | |
| ↑ ↓ | Price p Variance 60,000 Yen (Favorable) |
| $p_B^{(a)} \mid \zeta_{total}{}_B \begin{pmatrix} \theta(a) \\ \psi(a) \\ path(a) \end{pmatrix} = 180{,}000 \text{ Yen}$ (From Actual Data) | |

Fig. 22A (Variance Analysis regarding Variable Processing Cost)

| | |
|---|---|
| $p_V^{(s)} \lvert q^{(s)} \rvert \eta^{\begin{pmatrix} \theta(s) \\ \psi(s) \\ path(s) \end{pmatrix}}$ = 2,000 Yen * 3h * 145kg <br> = 870,000 Yen | |
| ↑↓ | Impairment θ Variance <br> 60,000 Yen (Unfavorable) |
| $p_V^{(s)} \lvert q^{(s)} \rvert \eta^{\begin{pmatrix} \theta(a) \\ \psi(s) \\ path(s) \end{pmatrix}}$ = 2,000 Yen * 3h * 155kg <br> = 930,000 Yen | |
| ↑↓ | Material Amount Ratio ψ Variance at Starting Point Introduction <br> 0 Yen |
| $p_V^{(s)} \lvert q^{(s)} \rvert \eta^{\begin{pmatrix} \theta(a) \\ \psi(a) \\ path(s) \end{pmatrix}}$ = 2,000 Yen * 3h * 155kg <br> = 930,000 Yen | |
| ↑↓ | Arrow Path "path" Variance <br> 90,000 Yen (Unfavorable) |
| $p_V^{(s)} \lvert q^{(s)} \rvert \eta^{\begin{pmatrix} \theta(a) \\ \psi(a) \\ path(a) \end{pmatrix}}$ = 2,000 Yen * 3h * 170kg <br> = 1,020,000 Yen | |
| ↑↓ | Resource Consumption Amount q Variance <br> 80,000 Yen (Unfavorable) |
| $p_V^{(s)} \lvert q^{(a)} \rvert \eta^{\begin{pmatrix} \theta(a) \\ \psi(a) \\ path(a) \end{pmatrix}}$ = 2,000 Yen * 550h <br> = 1,100,000 Yen | |
| ↑↓ | Price p Variance <br> 100,000 Yen (Favorable) |
| $p_V^{(a)} \lvert q^{(a)} \rvert \eta^{\begin{pmatrix} \theta(a) \\ \psi(a) \\ path(a) \end{pmatrix}}$ = 1,000,000 Yen <br> (From Actual Data) | |

Fig. 22B (Variance Analysis regarding Fixed Processing Cost)

| | |
|---|---|
| $p_F^{(s)} \mid q^{(s)} \mid \eta^{\begin{pmatrix} \theta(s) \\ \psi(s) \\ path(s) \end{pmatrix}} = 1{,}000 \text{ Yen} * 3h * 145kg$ <br> $= 435{,}000 \text{ Yen}$ | |
| ↑↓ | Impairment θ Variance <br> 30,000 Yen (Unfavorable) |
| $p_F^{(s)} \mid q^{(s)} \mid \eta^{\begin{pmatrix} \theta(a) \\ \psi(s) \\ path(s) \end{pmatrix}} = 1{,}000 \text{ Yen} * 3h * 155kg$ <br> $= 465{,}000 \text{ Yen}$ | |
| ↑↓ | Material Amount Ratio ψ Variance at Starting Point Introduction <br> 0 Yen |
| $p_F^{(s)} \mid q^{(s)} \mid \eta^{\begin{pmatrix} \theta(a) \\ \psi(a) \\ path(s) \end{pmatrix}} = 1{,}000 \text{ Yen} * 3h * 155kg$ <br> $= 465{,}000 \text{ Yen}$ | |
| ↑↓ | Arrow Path "path" Variance <br> 45,000 Yen (Unfavorable) |
| $p_F^{(s)} \mid q^{(s)} \mid \eta^{\begin{pmatrix} \theta(a) \\ \psi(a) \\ path(a) \end{pmatrix}} = 1{,}000 \text{ Yen} * 3h * 170kg$ <br> $= 510{,}000 \text{ Yen}$ | |
| ↑↓ | Resource Consumption Amount q Variance <br> 40,000 Yen (Unfavorable) |
| $p_F^{(s)} \mid q^{(a)} \mid \eta^{\begin{pmatrix} \theta(a) \\ \psi(a) \\ path(a) \end{pmatrix}} = 1{,}000 \text{ Yen} * 550h$ <br> $= 550{,}000 \text{ Yen}$ | |
| ↑↓ | capacity Variance <br> 50,000 Yen (Unfavorable) |
| $p_F^{(s)} \mid q^{(cap)} = 1{,}000 \text{ Yen} * 600h = 600{,}000 \text{ Yen}$ | |
| ↑↓ | Price p Variance <br> 100,000 Yen (Unfavorable) |
| $p_F^{(a)} \mid q^{(cap)} = 700{,}000 \text{ Yen (From Actual Data)}$ | |

Fig. 23

[Variance Analysis regarding Material A]

Unit Price (a)
Approximately
at 1,666.7 Yen

Unit Price (s)
At 2,000 Yen

Material A 200,000 Yen

| Price Variance |
| 40,000 Yen (Favorable) |

| Yield Variance | Combination Variance |
| 50,000 Yen | 40,000 Yen |
| (Unfavorable) | (Unfavorable) |

Standard Consumption Amount 75kg — 100kg — Actual Consumption Amount 120kg

Total Introduction Amount: (s) 150kg | (a) 200kg | (a) 200kg

×  ×  ×

Combination Proportion: (s) 50% | (s) 50% | (a) 60%

Fig. 24

[Variance Analysis regarding Material B]

| | | Material B 180,000 Yen | |
|---|---|---|---|
| Unit Price (a) At 2,250 Yen | | Price Variance 60,000 Yen (Favorable) | |
| Unit Price (s) At 3,000 Yen | | Yield Variance 75,000 Yen (Unfavorable) | Combination Variance 60,000 Yen (Favorable) |

Standard Consumption Amount 75kg ‖     100kg ‖     Actual Consumption Amount 80kg ‖

| Total Introduction Amount | (s) 150kg | (a) 200kg | (a) 200kg |
| --- | --- | --- | --- |
| | × | × | × |
| Combination Proportion | (s) 50% | (s) 50% | (a) 40% |

Fig. 25

[Variance Analysis regarding Variable Processing Cost]

Variable Cost Ratio (a)　　　Variable Processing Cost 1,000,000 Yen
Approximately
at 1,818.2 Yen

| | Budget Variance 100,000 Yen (Favorable) | |
|---|---|---|
| | Yield Variance 290,000 Yen (Unfavorable) | Efficiency Variance 60,000 Yen (Favorable) |

Variable Cost Ratio (s)
At 2,000 Yen

| | Standard Operation Period 435h ‖ | 580h ‖ | Actual Operation Period 550h ‖ |
|---|---|---|---|
| Total Introduction Amount | (s) 150kg | (a) 200kg | (a) 200kg |
| | × | × | × |
| Operation Period/ Introduction Amount | (s) 145kg*3h/150kg =2.9h/kg | (s) =2.9h/kg | (a) 550h/200kg =2.75h/kg |

Fig. 26

[Variance Analysis regarding Variable Processing Cost] (Different Approach)

| | Variable Processing Cost 1,000,000 Yen | | | |
|---|---|---|---|---|
| Variable Cost Ratio (a) Approximately at 1,818.2 Yen | Budget Variance 100,000 Yen (Favorable) | | | |
| Variable Cost Ratio (s) At 2,000 Yen | Yield Variance 290,000 Yen (Unfavorable) | η/Introduction Variance 140,000 Yen (Favorable) | Efficiency Variance 80,000 Yen (Unfavorable) | |
| | Standard Operation Period 435h ‖ | 580h ‖ | 510h ‖ | Actual Operation Period 550h ‖ |
| Total Introduction Amount | (s) 150kg | (a) 200kg | (a) 200kg | (a) 200kg |
| | × | × | × | × |
| Processing Conversion Amount η/Introduction Amount | (s) 145kg /150kg | (s) 145kg /150kg | (a) 170kg /200kg | (a) 170kg /200kg |
| | × | × | × | × |
| Operation Period /Processing Conversion Amount η | (s) 3.0h/kg | (s) 3.0h/kg | (s) 3.0h/kg | (a) 550h /170kg |

COST ACCOUNTING PROGRAM, COST ACCOUNTING DEVICE, AND COST ACCOUNTING METHOD

TECHNICAL FIELD

The present invention relates to a cost accounting technique by, for example, a computer.

BACKGROUND ART

Up to the present, a method for product cost accounting that is roughly divided into two, job costing and process costing, has been proposed.

For example, in the following Patent Literature 1, a cost management device to manage a cost in business including a control unit has been disclosed. In accordance with an execution phase master in which a plurality of processes related to cost accounting are set together with their execution orders, the control unit performs the actual cost accounting following an evaluation method of an inventory preset according to the business.

In the following Patent Literature 2, a cost accounting method based on a lead time has been proposed.

CITATION LIST

Patent Literature

Patent Literature 1: JP 2016-184407 A
Patent Literature 2: JP 2016-51223 A

SUMMARY OF INVENTION

This Description encompasses content disclosed in Japanese Patent Application No. 2019-149504 forming the basis for priority of this application.

The job costing measures a resource amount introduced to a material to provide an accurate cost accounting result. However, to perform it, for example, it is necessary to individually grasp the material from the introduction until completion for each lot or each production order and to measure the introduced resource amount for each material. Thus, conditions of data to be collected are strict, and therefore data to perform the cost accounting often cannot be obtained in a factory.

A product cost can be calculated with simpler data in the process costing, but the calculation method does not correspond to an actual processing work procedure, and therefore an inaccurate cost accounting result is given excluding an extremely simple production situation.

Standard cost accounting as a representative method of cost management compares a target standard cost with an actual cost and analyzes where and how much waste occurred (this is referred to as "variance analysis").

For example, regarding a material cost, a specific process of the variance analysis divides a variance between a standard cost and an actual cost of the material cost into a price variance and a quantity variance to clarify the occurrence cause.

The variance analysis has been widely performed on various cost elements, such as labor cost and an indirect manufacturing cost, as well as the material cost. Although the variance analysis by the conventional standard cost accounting gives an appropriate calculation result under a simple production situation, the variance analysis cannot handle a complicated production situation in which elements, such as impairment of a material, additional introduction of a material, and introduction of a plurality of kinds of materials, are involved, failing to give an appropriate calculation result.

Further, a factor of a lead time (an elapsed time) from the introduction of the material until the completion is not considered. Patent Literature 2 and the like propose a method that performs cost accounting based on a lead time, but they cannot appropriately handle increase and decrease of a material amount during manufacturing processing, such as impairment of a material and additional introduction, and the calculation becomes inaccurate in the case. Additionally, measurement of the lead time for each lot or each production order from the material introduction until the completion is required, and therefore labor of the execution is taken.

For example, a product produced using a volatile material that is impaired as the time passes is considered. It is assumed that, in a case where a rough processing work is performed on the product overquickly to avoid volatilization of the material, defective products increase this time and after all, this results in impairment. The impairment amount of the volatile material is related to the following three factors.

1) The amount of volatilization of the material per unit time
2) The lead time (the elapsed time) from the material introduction until the completion
3) Carefulness of the processing work Since these three factors are respectively different, necessary countermeasures are also different. For example, in the case where 2) the excessively long lead time (elapsed time) is the main factor of the impairment, a countermeasure is to perform the processing work in a hurry even when the carefulness of the processing work is sacrificed more or less.

However, the conventional standard cost accounting has no concept of elapsed time, and therefore the three factors cannot be distinguished, and 3) the carefulness of the processing work is determined to be the factor of the impairment. Under such circumstances, even when the excessively long lead time (elapsed time) is the main factor of the impairment, only a countermeasure that brings an absolutely adverse effect, performing the processing work more carefully taking longer time, can be proposed.

An object of the present invention is to obtain accurate product cost accounting result and variance analysis result by standard cost accounting even in a complicated production situation in which elements, such as impairment of a material, additional introduction, and introduction of a plurality of kinds of materials, are involved, even with insufficient production data in which the production data is not collected for each lot or each production order, and further in a situation in which a lead time should be considered.

An object of the present invention is to perform cost accounting and standard cost accounting precisely corresponding to a procedure of a physical processing work.

The conventional method is roughly divided into two methods, that is, process costing and job costing, but these methods are not precise calculation methods in a physical sense.

When limited to a limited situation not considering a time axis, physically precise calculation results can be obtained by job costing and individual standard cost accounting. However, when considering the time axis, the conventional job costing cannot correspond to it after all.

The present invention can include a model that does not consider the time axis (but considers only a degree of processing progress axis).

Especially, one example of a situation in which calculation results significantly differ between the conventional method and arrow cost accounting is a case where the standard cost accounting is attempted to be performed in a situation where an impairment amount and an additional introduction amount significantly changes depending on a length of a lead time (a processing time). While the standard cost accounting performs the variance analysis that analyzes a cause of a difference between a standard cost set in advance, namely, a target cost, and the actual cost, only arrow cost accounting can appropriately perform the variance analysis (corresponds to the eighth chapter in the Interpretation Section).

While the corresponding parts in the Interpretation Section are described as the references in the following solution means, the examples are not intended to limit the present invention.

In the following, the time axis need not be considered (calculation examples not considering the time axis correspond to Example 1 to Example 7 in Interpretation Section 2).

For example, an invention is a product manufacturing cost accounting program for causing a computer to perform product manufacturing cost accounting. The computer is caused to:
refer to:
1) cost accounting space data defined by a coordinate space comprising a degree of processing progress axis;
2) processing work introduction amount function data as an introduction condition for a processing work;
3) present term production data as a production situation within a cost accounting target period; and
4) present term actual cost data as a cost generation situation within the given cost accounting target period stored in a memory;
read the cost accounting space data and the present term production data;
perform a step of calculating an arrow that connects an input node and an output node based on an inputted matching and a material amount on an arrow path as a material amount on a path of the arrow;
read the processing work introduction amount function data and material amount data on the arrow path to calculate a processing work conversion amount and a material introduction conversion amount if a solution matching is found in the step of calculating the material amount on the arrow path; and
perform a step of reading the present term actual cost data, the processing work conversion amount, and the material introduction conversion amount, distributing costs to the arrows, and outputting the costs distributed to the arrows. (calculation examples of a series of the procedure correspond to Examples 1 to 3 in Interpretation Section 2).

Additionally, inventions considering a time axis include the following (all chapters (from the first chapter to the ninth chapter) in the Interpretation Section are interpretations for the inventions considering the time axis and correspond to Examples 8, 9a, 9b, and 11 in Interpretation Section 2).

An invention is a product manufacturing cost accounting program for causing a computer to perform product manufacturing cost accounting, the computer being caused to:
refer to:
1) cost accounting space data defined by a coordinate space comprising a degree of processing progress axis;
2) processing work introduction amount function data as an introduction condition for a processing work;
3) present term production data as a production situation within a cost accounting target period; and
4) present term actual cost data as a cost generation situation within the given cost accounting target period stored in a memory;
read the cost accounting space data and the present term production data and define an arrow that connects an input node and an output node based on inputted matching as including all of the following elements in a cost accounting space:
a) the input node as a starting point of the arrow;
b) the output node as an ending point of the arrow;
c) an arrow path as a path of the arrow; and
d) a material amount on the arrow path as a material amount on the path of the arrow;
perform a step of calculating the material amount on the arrow path that calculates on condition that the material amount at any given point on any coordinate on the arrow path is same as the material amount on the arrow path at a coordinate of the input node;
reproduce a specific product processing situation based on the given production data with the arrow, read the processing work introduction amount function data and material amount data on the arrow path to calculate a processing work conversion amount and a material introduction conversion amount if each material amount of all input nodes and all output nodes matches a total of the material amounts on the arrow paths of all arrows related to the node at the coordinate of the node, and if a solution matching defined as a combination of the arrows is found; and
perform a step of reading the present term actual cost data, the processing work conversion amount, and the material introduction conversion amount, proportionally distributing costs to the arrows at ratios of the processing work conversion amount and the material introduction conversion amount, and outputting the costs distributed to the arrows.

Also, an invention is a product manufacturing cost accounting program for causing a computer to perform product manufacturing cost accounting, the computer being caused to:
refer to:
1) cost accounting space data defined by a coordinate space comprising a degree of processing progress axis; and
2) present term production data as a production situation within a cost accounting target period
stored in a memory;
read the cost accounting space data and the present term production data and define an arrow that connects an input node and an output node based on an inputted matching as including all of the following elements in a cost accounting space:
a) the input node as a starting point of the arrow;
b) the output node as an ending point of the arrow;
c) an arrow path as a path of the arrow; and
d) a material amount on the arrow path as a material amount on the path of the arrow,
further refer to 3) impairment function data stored in the memory as an impairment condition of a material if there is impairment;
further refer to 4) additional introduction function data stored in the memory as an additional introduction condition of the material if there is additional introduction;
perform a step of calculating the material amount on the arrow path that calculates the material amount in a step of calculating the material amount at any given point on the arrow path based on the material amount on the arrow path at a coordinate of the input node by:
  subtracting an impairment amount from the input node to the point if there is the impairment; and
  adding an additional introduction amount from the input node to the point if there is the additional introduction; and
display an arrow diagram that includes:
  i) a coordinate axis to arrange the input node;
  ii) a coordinate axis to arrange the output node;
  iii) a point indicative of the input node;
  iv) a point indicative of the output node; and
  as necessary, v) a line indicating an arrow or an arrow symbol.

Also, an invention is a product manufacturing cost accounting device for causing product manufacturing cost accounting to be performed, the product manufacturing cost accounting device:
  refers to:
    1) cost accounting space data defined by a coordinate space comprising a degree of processing progress axis;
    2) processing work introduction amount function data as an introduction condition for a processing work;
    3) present term production data as a production situation within a cost accounting target period; and
    4) present term actual cost data as a cost generation situation within the given cost accounting target period stored in a memory; and
  reads the cost accounting space data and the present term production data and defines an arrow that connects an input node and an output node based on an inputted matching as including all of the following elements in a cost accounting space:
    a) the input node as a starting point of the arrow;
    b) the output node as an ending point of the arrow;
    c) an arrow path as a path of the arrow; and
    d) a material amount on the arrow path as a material amount on the path of the arrow; wherein
  the product manufacturing cost accounting device comprises:
    a first arithmetic unit that calculates a material amount on the arrow path, wherein the first arithmetic unit calculates the material amount at any given point on the arrow path based on the material amount on the arrow path at a coordinate of the input node by:
      subtracting an impairment amount from the input node to the point if there is impairment; and
      adding an additional introduction amount from the input node to the point if there is additional introduction;
    a second arithmetic unit that reproduces a specific product processing situation based on the given production data with the arrow, the second arithmetic unit reading the processing work introduction amount function data and material amount data on the arrow path to calculate a processing work conversion amount and a material introduction conversion amount if each material amount of all input nodes and all output nodes matches a total of the material amounts on the arrow paths of all arrows related to the node at the coordinate of the node, and if a solution matching defined as a combination of the arrows is found;
    a third arithmetic unit that reads the present term actual cost data, the processing work conversion amount, and the material introduction conversion amount and proportionally distributes costs to the arrows at ratios of the processing work conversion amount and the material introduction conversion amount; and
    a fourth arithmetic unit that outputs the costs distributed to the arrows.

Also, an invention is a product manufacturing cost accounting method for causing a computer to perform product manufacturing cost accounting, the computer being caused to;
  refer to:
    1) cost accounting space data defined by a coordinate space comprising a degree of processing progress axis;
    2) processing work introduction amount function data as an introduction condition for a processing work;
    3) present term production data as a production situation within a cost accounting target period; and
    4) present term actual cost data as a cost generation situation within the given cost accounting target period stored in a memory;
  read the cost accounting space data and the present term production data and define an arrow that connects an input node and an output node based on an inputted matching as including all of the following elements in a cost accounting space:
    a) the input node as a starting point of the arrow;
    b) the output node as an ending point of the arrow;
    c) an arrow path as a path of the arrow; and
    d) a material amount on the arrow path as a material amount on the path of the arrow;
  perform a step of calculating the material amount on the arrow path that calculates the material amount at any given point on the arrow path based on the material amount on the arrow path at a coordinate of the input node by:
    subtracting an impairment amount from the input node to the point if there is impairment; and
    adding an additional introduction amount from the input node to the point if there is additional introduction;
  reproduce a specific product processing situation based on the given production data with the arrow, and read the processing work introduction amount function data and material amount data on the arrow path to calculate a processing work conversion amount and a material introduction conversion amount if each material amount of all input nodes and all output nodes matches a total of the material amounts on the arrow paths of all arrows related to the node at the coordinate of the node, and if a solution matching defined as a combination of the arrows is found; and
  perform a step of reading the present term actual cost data, the processing work conversion amount, and the material introduction conversion amount, proportionally distributing costs to the arrows at ratios of the processing work conversion amount and the material introduction conversion amount, and outputting the costs distributed to the arrows.

Also, an invention is a product manufacturing cost accounting program for causing a computer to perform product manufacturing cost accounting, the computer being caused to:
  refer to:
    1) cost accounting space data defined by a coordinate space comprising a time axis and a degree of processing progress axis;
    2) processing work introduction amount function data as an introduction condition for a processing work;
    3) present term production data as a production situation within a cost accounting target period; and 4) present term actual cost data as a cost generation situation within the given cost accounting target period stored in a memory;

read the cost accounting space data and the present term production data and define an arrow that connects an input node and an output node based on an inputted matching as including all of the following elements in a cost accounting space:
   a) the input node as a starting point of the arrow;
   b) the output node as an ending point of the arrow;
   c) an arrow path as a path of the arrow; and
   d) a material amount on the arrow path as a material amount on the path of the arrow, perform a step of calculating the material amount on the arrow path that calculates on condition that the material amount at any given point on any coordinates on the arrow path is same as the material amount on the arrow path at a coordinate of the input node;

reproduce a specific product processing situation based on the given production data with the arrow, read the processing work introduction amount function data and material amount data on the arrow path to calculate a processing work conversion amount and a material introduction conversion amount if each material amount of all input nodes and all output nodes matches a total of the material amounts on the arrow paths of all arrows related to the node at the coordinate of the node, and if a solution matching defined as a combination of the arrows is found; and perform a step of reading the present term actual cost data, the processing work conversion amount, and the material introduction conversion amount, proportionally distributing costs to the arrows at ratios of the processing work conversion amount and the material introduction conversion amount, and outputting the costs distributed to the arrows.

A product manufacturing cost accounting program for causing a computer to perform product manufacturing cost accounting, the computer being caused to:

refer to:
1) cost accounting space data defined by a coordinate space comprising a time axis and a degree of processing progress axis; and
2) present term production data as a production situation within a cost accounting target period
stored in a memory;

read the cost accounting space data and the present term production data and define an arrow that connects an input node and an output node based on an inputted matching as including all of the following elements in a cost accounting space:
   a) the input node as a starting point of the arrow;
   b) the output node as an ending point of the arrow;
   c) an arrow path as a path of the arrow; and
   d) a material amount on the arrow path as a material amount on the path of the arrow, further refer to 3) impairment function data stored in the memory as an impairment condition of a material if there is impairment;

further refer to 4) additional introduction function data stored in the memory as an additional introduction condition of the material if there is additional introduction;

perform a step of calculating the material amount on the arrow path that calculates the material amount in a step of calculating the material amount at any given point on the arrow path based on the material amount on the arrow path at a coordinate of the input node by:
   subtracting an impairment amount from the input node to the point if there is the impairment; and
   adding an additional introduction amount from the input node to the point if there is the additional introduction; and display an arrow diagram that includes:
   i) a time axis;
   ii) a degree of processing progress axis;
   iii) a point indicative of the input node;
   iv) a point indicative of the output node; and
   as necessary, v) a line indicating an arrow or an arrow symbol.

Also, an invention is a product manufacturing cost accounting device for causing product manufacturing cost accounting to be performed, the product manufacturing cost accounting device:

refers to:
1) cost accounting space data defined by a coordinate space comprising a time axis and a degree of processing progress axis;
2) processing work introduction amount function data as an introduction condition for a processing work;
3) present term production data as a production situation within a cost accounting target period; and
4) present term actual cost data as a cost generation situation within the given cost accounting target period stored in a memory; and reads the cost accounting space data and the present term production data and defines an arrow that connects an input node and an output node based on an inputted matching as including all of the following elements in a cost accounting space:
   a) the input node as a starting point of the arrow;
   b) the output node as an ending point of the arrow;
   c) an arrow path as a path of the arrow; and
   d) a material amount on the arrow path as a material amount on the path of the arrow; and wherein the product manufacturing cost accounting device comprises:
   a first arithmetic unit that calculates a material amount on the arrow path, wherein the first arithmetic unit calculates the material amount at any given point on the arrow path based on the material amount on the arrow path at a coordinate of the input node by:
      subtracting an impairment amount from the input node to the point if there is impairment; and
      adding an additional introduction amount from the input node to the point if there is additional introduction;
   a second arithmetic unit that reproduces a specific product processing situation based on the given production data with the arrow, the second arithmetic unit reading the processing work introduction amount function data and material amount data on the arrow path to calculate a processing work conversion amount and a material introduction conversion amount if each material amount of all input nodes and all output nodes matches a total of the material amounts on the arrow paths of all arrows related to the node at the coordinate of the node, and if a solution matching defined as a combination of the arrows is found;
   a third arithmetic unit that reads the present term actual cost data, the processing work conversion amount, and the material introduction conversion amount and proportionally distributes costs to the arrows at ratios of the processing work conversion amount and the material introduction conversion amount; and
   a fourth arithmetic unit that outputs the costs distributed to the arrows.

Also, an invention is a product manufacturing cost accounting method for causing a computer to perform product manufacturing cost accounting, the computer being caused to;

refer to:
1) cost accounting space data defined by a coordinate space comprising a time axis and a degree of processing progress axis;
2) processing work introduction amount function data as an introduction condition for a processing work;
3) present term production data as a production situation within a cost accounting target period; and
4) present term actual cost data as a cost generation situation within the given cost accounting target period stored in a memory;

read the cost accounting space data and the present term production data, and define an arrow that connects an input node and an output node based on an inputted matching as including all of the following elements in a cost accounting space:
a) the input node as a starting point of the arrow;
b) the output node as an ending point of the arrow;
c) an arrow path as a path of the arrow; and
d) a material amount on the arrow path as a material amount on the path of the arrow;

perform a step of calculating the material amount on the arrow path that calculates the material amount at any given point on the arrow path based on the material amount on the arrow path at a coordinate of the input node by:
subtracting an impairment amount from the input node to the point if there is impairment; and
adding an additional introduction amount from the input node to the point if there is additional introduction;

reproduce a specific product processing situation based on the given production data with the arrow, and read the processing work introduction amount function data and material amount data on the arrow path to calculate a processing work conversion amount and a material introduction conversion amount if each material amount of all input nodes and all output nodes matches a total of the material amounts on the arrow paths of all arrows related to the node at the coordinate of the node, and if a solution matching defined as a combination of the arrows is found; and perform a step of reading the present term actual cost data, the processing work conversion amount, and the material introduction conversion amount, proportionally distributing costs to the arrows at ratios of the processing work conversion amount and the material introduction conversion amount, and outputting the costs distributed to the arrows.

According to one aspect of the present invention, there is provided a product manufacturing cost accounting program for causing a computer to perform product manufacturing cost accounting. The computer is caused to:

refer to:
1) cost accounting space data defined by a coordinate space comprising a time axis and a degree of processing progress axis (see the first chapter in the Interpretation Section);
2) processing work introduction amount function data as an introduction condition for a processing work (see the third chapter in the Interpretation Section);
3) present term production data as a production situation within a cost accounting target period (see the first chapter in the Interpretation Section); and
4) present term actual cost data as a cost generation situation within the given cost accounting target period (see the eighth chapter in the Interpretation Section) stored in a memory;

read the cost accounting space data and the present term production data;

perform a step of calculating an arrow that connects an input node and an output node based on an inputted matching and a material amount on an arrow path as a material amount on a path of the arrow (see the second chapter in the Interpretation Section);

perform a step of obtaining a solution matching;

read the processing work introduction amount function data and material amount data on the arrow path to calculate a processing work conversion amount and a material introduction conversion amount (see the third chapter in the Interpretation Section, one example of the definition is in Formula (3.1)), the material introduction conversion amount (see the third chapter in the Interpretation Section) if the solution matching is found in the step of calculating the material amount on the arrow path (see the second chapter in the Interpretation Section); and perform a step of reading the present term actual cost data, the processing work conversion amount, and the material introduction conversion amount, distributing costs to the arrows (see the fourth chapter in the Interpretation Section), and outputting the costs distributed to the arrows.

Further, 5) impairment function data stored in the memory (see the second chapter in the Interpretation Section) as an impairment condition of a material may be referred to, and the step of calculating the material amount on the arrow path may further read the impairment function data to calculate the material amount.

Further, 6) additional introduction function data stored in the memory (see the second chapter in the Interpretation Section) as an additional introduction condition of a material preliminarily may be referred to, and the step of calculating the material amount on the arrow path may further read the additional introduction function data to calculate the material amount.

Note that the present term actual cost data merely refers to, for example, an "actual material cost 200,000 yen" and an "actual variable processing cost 1,000,000 yen." How the amount of money is obtained is one point of contention in the conventional cost accounting.

However, in the present invention, the actual cost data is assumed to be completely datum, that is, arbitrarily given.

The present invention relates to a part regarding how the product cost or an ending in-process product cost can be obtained using the production data and the actual cost data after they were given.

The step of calculating the material amount on the arrow path may further include:
a step of generating an arrow diagram in which the input node and the output node are displayed; and
a step of displaying the arrow and a calculation result of the material amount on the arrow path on the arrow diagram (for the work here, see the second chapter in the Interpretation Section).

In the present invention, in addition to the cost accounting described above, in order to further perform standard cost accounting (for the standard cost accounting, see the fifth chapter to the eighth chapter in the Interpretation Section and Examples 6a, 6b, 7, 9a, and 9b in Interpretation Section 2), the memory stores:

7) standard parameter value data as a standard parameter value (see the fifth chapter in the Interpretation Section);
8) standard resource consumption amount function data (q(s); see the sixth chapter in the Interpretation Section) as a standard resource consumption amount condition;
9) standard cost function data (p(s); see the sixth chapter in the Interpretation Section) in which a standard cost generation condition is recorded;
10) sequence data of variance analysis in which an order of variance analysis is recorded (see the sixth chapter in the Interpretation Section; a user configures an order of parameters); and
11) actual resource consumption amount data in which an actual resource consumption amount situation within a cost accounting target period is recorded (see the eighth chapter in the Interpretation Section; as one example, an actual direct operation period is 550 hours); and
the product manufacturing cost accounting program causes the computer to perform:
a step of reading the standard parameter value data, the standard resource consumption amount function data, the standard cost function data, the sequence data of variance analysis, and the actual resource consumption amount data from the memory and performing variance analysis (see the eighth chapter in the Interpretation Section for a specific example of the variance analysis; as one example, the actual direct operation period is 550 hours); and
a step of outputting a variance analysis result.

Among the above-described data, only the data described in 7) and 10) may be treated. Further, the other pieces of data 8), 9), and 11) may also be considered and the calculation can be performed. The same applies to the following means.

Respective standard values of various parameters in the fifth chapter in the Interpretation Section, that is, an additional material introduction parameter (φ: phi), an impairment parameter (θ), an arrow path ("path"), and the like are defined by a user. If a plurality of kinds of materials are introduced, an introduction ratio (ψ (vector): psi) at starting point introduction is added.

Besides, there are standards for a resource price (p) and a resource consumption amount (q) and they correspond to the above-described 6) and 7).

A calculation that compares the "actual value in the present term" with the "standard value" of the parameters to clarify a specific ineffective point in the production of the present term is referred to as standard cost accounting.

In the present invention, in a coordinate space comprising a time axis and a degree of processing progress axis, the arrow diagram of the product manufacturing cost accounting program preferably includes:
1) points indicative of an input node and an output node;
2) an arrow path directed toward the output node from the input node; and
3) a material amount on the arrow path.

In the case of introducing a plurality of materials, a vector value is used for the material amounts (a material amount of a first material, a material amount of a second material, . . . , a material amount of an N-th material) to perform product manufacturing cost accounting if a plurality of N materials are introduced (for the plurality of materials, see the seventh chapter and the eighth chapter in the Interpretation Section).

The present invention is a product manufacturing cost accounting device for causing product manufacturing cost accounting to be performed, wherein the product manufacturing cost accounting device:
refers to:
1) cost accounting space data of X-Y coordinate axes (a time axis and a degree of processing progress axis) of a cost accounting space defined by a coordinate space comprising the time axis and the degree of processing progress axis;
2) processing work introduction amount function data as an introduction condition for a processing work;
3) present term production data as a production situation within a cost accounting target period; and
4) present term actual cost data as a cost generation situation within the given cost accounting target period stored in a memory;
wherein the product manufacturing cost accounting device comprises:
a first arithmetic unit that reads the cost accounting space data and the present term production data, and calculates an arrow path that connects an input node and an output node based on an inputted matching and a material amount on the arrow path;
a second arithmetic unit that reads the processing work introduction amount function data and material amount data on the arrow path to calculate a processing work conversion amount and a material introduction conversion amount if a solution matching is found in a step of calculating the material amount on the arrow path;
a third arithmetic unit that reads the present term actual cost data, the processing work conversion amount, and the material introduction conversion amount and distributes costs to the arrows; and
a fourth arithmetic unit that outputs the costs distributed to the arrows.

The present invention is a product manufacturing cost accounting method for causing a computer to perform product manufacturing cost accounting, the computer being caused to;
refer to:
1) cost accounting space data of X-Y coordinate axes (a time axis and a degree of processing progress axis) of a cost accounting space defined by a coordinate space comprising the time axis and the degree of processing progress axis;
2) processing work introduction amount function data as an introduction condition for a processing work;
3) present term production data as a production situation within a cost accounting target period; and
4) present term actual cost data as a cost generation situation within the given cost accounting target period stored in a memory;
perform a step of reading the cost accounting space data and the present term production data, and calculating an arrow path that connects an input node and an output node based on an inputted matching and a material amount on the arrow path;
read the processing work introduction amount function data and material amount data on the arrow path to calculate a processing work conversion amount and a material introduction conversion amount if a solution matching is found in a step of calculating the material amount on the arrow path; and
read the present term actual cost data, the processing work conversion amount, and the material introduction conversion amount, distribute costs to the arrows, and output the costs distributed to the arrows.

Effects of Invention

According to the present invention, an accurate cost accounting result corresponding to the procedure of the material processing can be obtained in any situation. That is, the present invention can obtain the accurate product cost accounting result and variance analysis result by the standard cost accounting even in a complicated production situation in which various elements, such as impairment of a material, additional introduction, and introduction of a plurality of kinds of materials, are involved, even with insufficient production data in which the production data is not collected for each lot or each production order, and further in a situation in which a lead time should be considered.

BRIEF DESCRIPTION OF DRAWINGS

FIG. 20 is a drawing illustrating an example of the variance analysis regarding a material A.

FIG. 21 is a drawing illustrating an example of the variance analysis regarding a material B.

FIG. 22A is a drawing illustrating an example of the variance analysis regarding a variable processing cost.

FIG. 22B is a drawing illustrating an example of the variance analysis regarding a fixed processing cost.

FIG. 23 is a drawing illustrating an example of the variance analysis regarding the material A.

FIG. 24 is a drawing illustrating an example of the variance analysis regarding the material B.

FIG. 25 is a drawing illustrating an example of the variance analysis regarding the variable processing cost.

FIG. 26 is a drawing illustrating an example of the variance analysis regarding the variable processing cost.

FIG. 39 is an arrow diagram illustrating a solution matching for Example 6a.

FIG. 40 is a drawing illustrating calculation examples of $\eta^{(a)}$ and $\eta^{(s)}$ in Example 6a.

FIG. 46 is an arrow diagram illustrating solution matching for Example 9a.

DESCRIPTION OF EMBODIMENTS

The following describes a cost accounting technique according to a first embodiment of the present invention in detail with reference to drawings and the like illustrating basic configuration examples. The Interpretation Section described at the end of the present specification describes further detailed description of calculation methods, and Interpretation Section 2 describes calculation examples therefor. The following gives the description while appropriately referring to the Interpretation Sections.

First Embodiment

Figure 1:
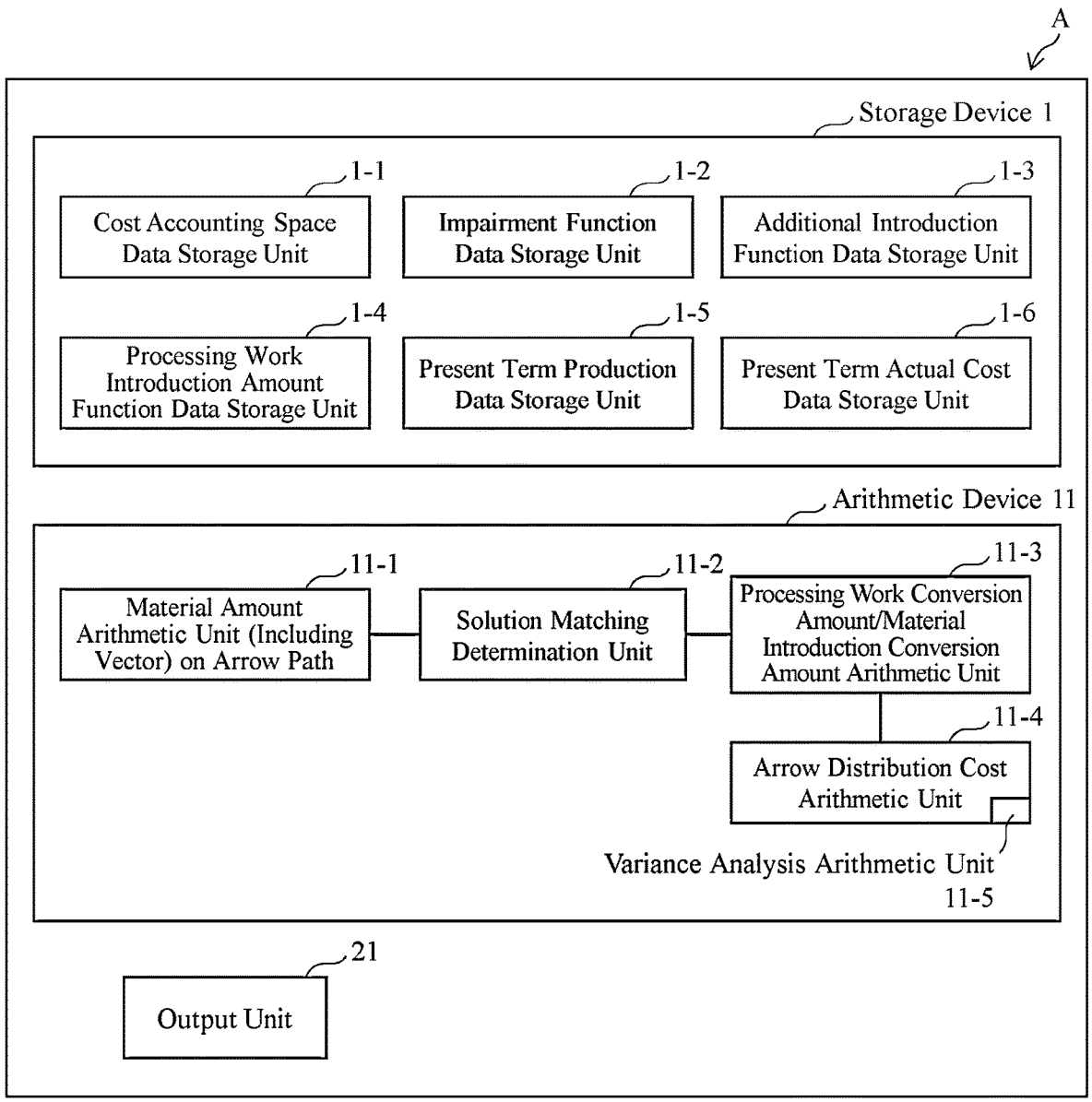
FIG. 1 is a function block diagram illustrating one configuration example of a cost arithmetic device (a calculation device) applicable to a cost accounting technique according to an embodiment of the present invention.
Figure 2A:
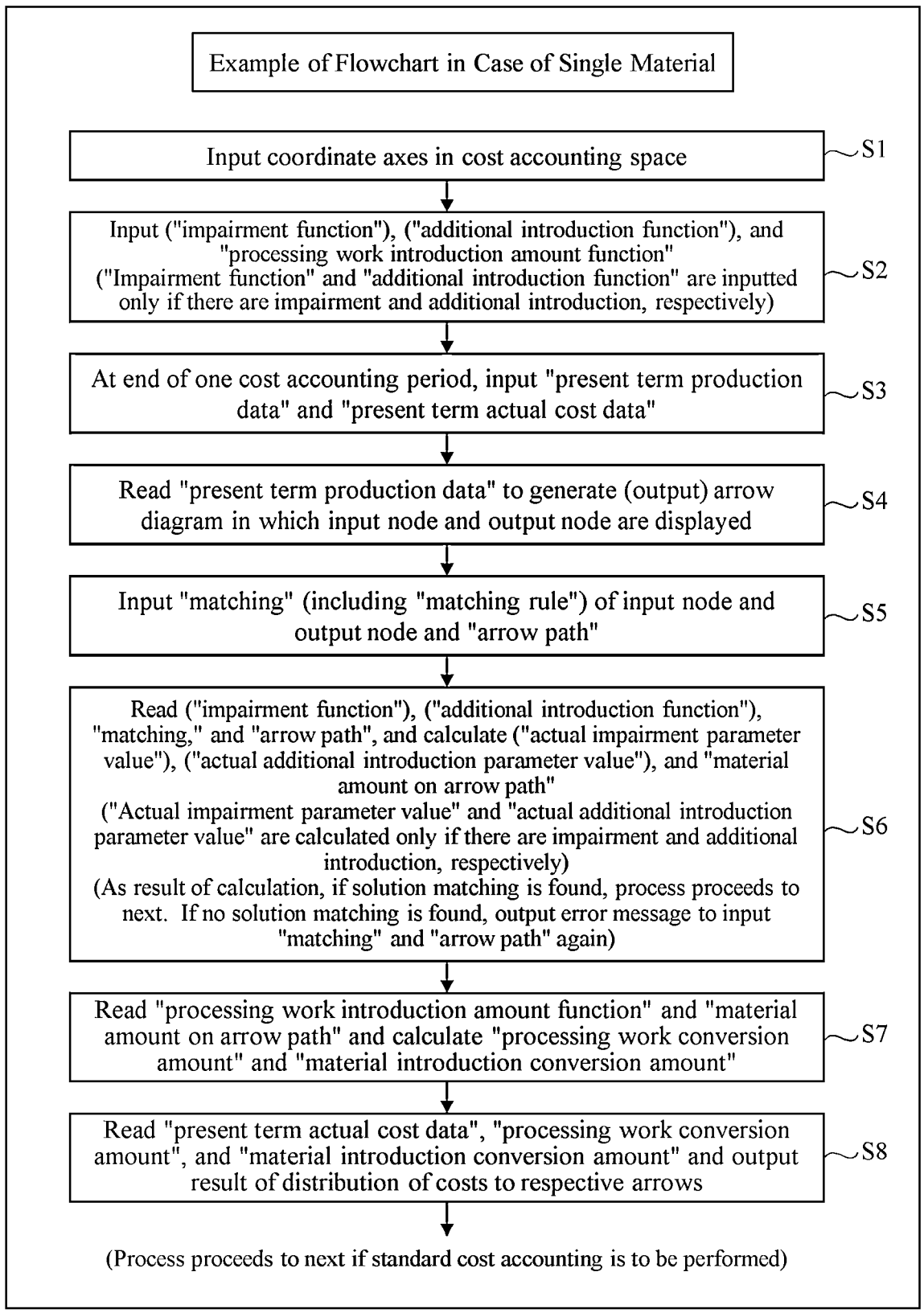
FIG. 2A is a flowchart diagram depicting an example of a procedure of a cost accounting process in the case of a single material in the cost accounting technique according to the embodiment.

FIG. 1 is a function block diagram illustrating one configuration example of a cost arithmetic device (a calculation device) applicable to a cost accounting technique according to an embodiment of the present invention. FIG. 2A is a flowchart diagram depicting an example of a procedure of a cost accounting process in the case of a single material in the cost accounting technique according to the embodiment. The arithmetic device may be a hardware configuration or may be a software configuration.

As illustrated in FIG. 1, a cost arithmetic system (device) A according to the embodiment includes a storage device 1, an arithmetic device 11, and an output unit 21 (such as a display unit). The cost arithmetic system (device) A may further include an input device (such as a mouse and a keyboard).

For example, the storage device 1 includes a cost accounting space data storage unit 1-1 that stores cost accounting space data, an impairment function data storage unit 1-2 that stores impairment function data, an additional introduction function data storage unit 1-3 that stores additional introduction function data, a processing work introduction amount function data storage unit 1-4 that stores processing work introduction amount function data, a present term production data storage unit 1-5 that stores present term production data, and a present term actual cost data storage unit 1-6 that stores present term actual cost data.

The arithmetic device 11 includes a material amount arithmetic unit (including a vector) 11-1 on an arrow path that operates a material amount on the arrow path described later, a solution matching determination unit 11-2, a processing work conversion amount/material introduction conversion amount arithmetic unit 11-3, and an arrow distribution cost arithmetic unit 11-4. The arrow distribution cost arithmetic unit 11-4 includes a variance analysis arithmetic unit 11-5.

Figure 3:
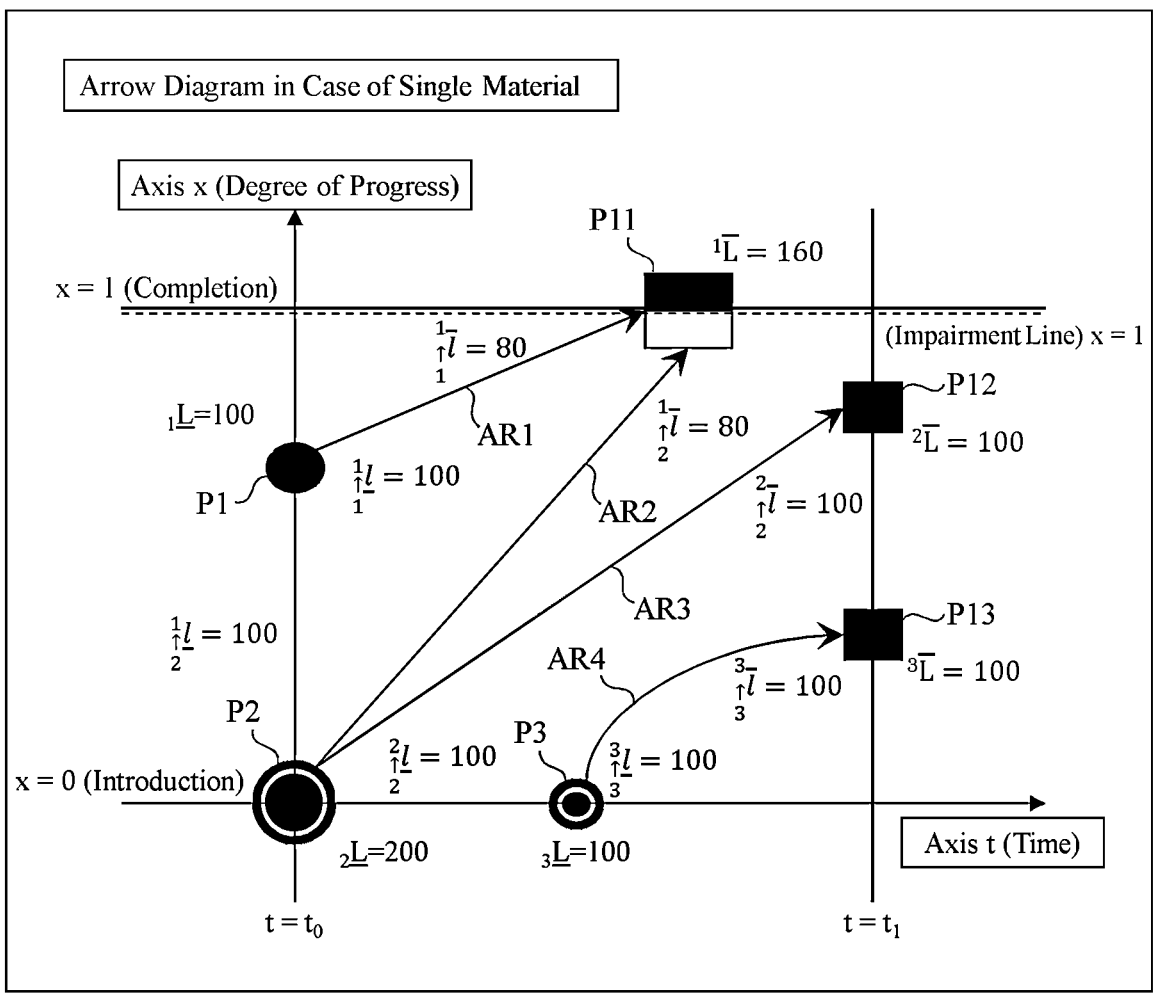
FIG. 3 is a drawing illustrating an example of an arrow diagram in the case of a single material.

In order to perform cost accounting according to the embodiment of the present invention, processing progress situations of a material and an in-process product need to be expressed on a cost accounting space. FIG. 3 illustrates an arrow diagram as one example of a visualized diagram of it. FIG. 3 is a drawing illustrating an example of an arrow diagram in the case of a single material. As illustrated in FIG. 3, the arrow diagram is a coordinate space comprising a time axis t (the horizontal axis in FIG. 3) and a degree of processing progress axis x (the vertical axis in FIG. 3), for example, a diagram defined in an orthogonal coordinate plane as in FIG. 3, and includes the following elements in FIG. 3. Note that each of the time axis t and the degree of processing progress axis x only need to be any one of the vertical axis and the horizontal axis, and variables and the axes can be interchanged. Also, the coordinate space is not limited to an orthogonal coordinate plane as in FIG. 3.

1) Points indicative of input nodes (P1 to P3) and output nodes (from P11 to P13) are referred to as nodes.

2) Paths directed from the input nodes toward the output nodes are referred to as arrow paths (indicated by arrow symbols AR1 to AR4).

3) Regarding Material Amount on Arrow Path

Here, L denotes a material amount of the node, and l denotes a material amount consumed in the arrow path.

$x=0$ corresponds to a process starting point, $x=1$ corresponds to an ending point of the process, $t=T0$ corresponds to the beginning of the present term, and $t=T1$ corresponds to the end of the present term.

Use of the arrow diagram in FIG. 3 facilitates visual understanding of the processing progress situations of the material and the in-process product. That is, it clarifies how fast (a progress of a degree of processing progress per hour) the processing of a material introduced at a certain time point proceeded or how the material amount changed during the processing.

Note that the arrow cost accounting process according to the embodiment is performed by, for example, computer processing, and therefore generation/display of the arrow diagram are not essential configurations. It is possible to perform calculation inside the computer or the like and show only the calculation result even without generating/displaying the arrow diagram. However, in a case where a user attempts to understand the content of calculation, generating/displaying the arrow diagram are preferred.

As illustrated in the arrow diagram in FIG. 3, for example, using different notations, e.g. a ● sign for an input node and a ■ sign for an output node facilitates easier visual understanding.

Also, for example, sizes of the nodes can be changed according to magnitudes of material amounts. This allows easier visual understanding of magnitudes of material amounts in the nodes. Similarly, for example, thicknesses of the arrow symbols of the arrow paths can be changed to facilitate easier visual understanding of the magnitudes of the material amounts.

In calculation of a product manufacturing cost, cost accounting and standard cost accounting corresponding to procedures of physical processing works of a material and an in-process product are performed as long as possible from collected production data and cost data. In particular, the cost accounting and the standard cost accounting including an elapsed time taken for the product manufacturing as an analysis target are performed.

As illustrated in FIG. 2A, the cost accounting process according to the embodiment in the case of the single material is, for example, performed in the following procedure by the arithmetic device (including software processing and hardware processing) of the computer.

Here, it is assumed that the following data 1) to 6), for example, are stored in the storage device 1 such as a memory, as illustrated in FIG. 1 in advance. Alternatively, the data 1) to 6) may be acquirable via a network.

1) The cost accounting space data of X-Y coordinate axes (the time axis and the degree of processing progress axis) of the cost accounting space defined by a coordinate space comprising the time axis t and the degree of processing progress axis x stored in the cost accounting space data storage unit 1-1 (see the first chapter in the Interpretation Section)

2) The impairment function data as an impairment condition of the material stored in the impairment function data storage unit 1-2 (see the second chapter in the Interpretation Section)

3) The additional introduction function data as an additional introduction condition of the material stored in the additional introduction function data storage unit 1-3 (see the second chapter in the Interpretation Section)

4) The processing work introduction amount function data as the introduction condition of the processing work stored in the processing work introduction amount function data storage unit 1-4 (see the third chapter in the Interpretation Section)

5) The present term production data as the production situation within a cost accounting target period stored in the present term production data storage unit 1-5 (see the first chapter in the Interpretation Section)

6) The present term actual cost data as the cost generation situation within the given cost accounting target period stored in the present term actual cost data storage unit 1-6 (see the eighth chapter in the Interpretation Section)

The arithmetic device 11 illustrated in FIG. 1 performs the following processes referring to the data as needed:

A step (1) in which the arithmetic device 11 reads the cost accounting space data and the present term production data to generate the arrow diagram (the work here is in the first chapter and the second chapter in the Interpretation Section) in which the input nodes and the output nodes are displayed;

A step (2) in which the material amount arithmetic unit 11-1 on the arrow path reads an inputted matching (including a matching rule, such as a "first-in first-out method"), the arrow path (see the second chapter in the Interpretation Section), the impairment function data, and the additional introduction function data to calculate the material amount on the arrow path (see the second chapter in the Interpretation Section for the calculation method of the material amount on the arrow path);

(2-1) In the step (2) in which the solution matching determination unit 11-2 calculates the material amount on the arrow path, if a solution matching (see the second chapter in the Interpretation Section) is found, the processing work conversion amount/material introduction conversion amount arithmetic unit 11-3 reads the processing work introduction amount function data and material amount data on the arrow path to calculate a processing work conversion amount (see the third chapter in the Interpretation Section; an example of the definition is Formula (3.1)) and a material introduction conversion amount (see the third chapter in the Interpretation Section); and A step (2-2) in which the arrow distribution cost arithmetic unit 11-4 reads the present term actual cost data, the processing work conversion amount, and the material introduction conversion amount and distributes the costs to the arrows (see the fourth chapter in the Interpretation Section), and the output unit 21 outputs the costs distributed to the arrows.

In further detail, as illustrated in FIG. 2A, (S1)
The coordinate axes in the cost accounting space are inputted to the arithmetic device 11.

(S2)
(The "impairment function"), (the "additional introduction function"), and the "processing work introduction amount function" are inputted to the arithmetic device 11. However, the "impairment function" and the "additional introduction function" are inputted to the arithmetic device 11 only if there are impairment and additional introduction, respectively. The impairment function and the additional introduction function are selective items that are inputted only if the impairment and the additional introduction occur, and therefore they are optionally provided processes.

(S3)
At the end of one cost accounting period, the "present term production data" and the "present term actual cost data" are inputted to the arithmetic device 11.

(S4)
The "present term production data" is read and the arrow diagram is generated in which the input nodes and the output nodes are displayed. An output, such as the display, is performed as necessary. In the arrow cost accounting, the generation of the arrow diagram is not essential. It is possible to perform calculation inside the computer and show only the calculation result even without displaying the arrow diagram. However, in a case where the user attempts to understand the content of calculation, displaying the arrow diagram is useful.

(S5)
The "matching" of the input node and the output node and the "arrow path" are inputted to the arithmetic device. The matching means a process that considers which input node corresponds to which output node (matching). The matching may be directly designated or only the matching rule (for example, the first-in first-out method) may be designated (they are collectively referred to as "matching").

(S6)
(The "impairment function"), (the "additional introduction function"), the "matching", and the "arrow path" are read from the storage device 1, and the arithmetic device 11 calculates (an "actual impairment parameter value"), (an "actual additional introduction parameter value"), and the "material amount on the arrow path".

However, the "actual impairment parameter value" and the "actual additional introduction parameter value" are calculated only if there are impairment and additional introduction, respectively.

As a result of the calculation by the arithmetic device 11, if the solution matching is found by the solution matching determination unit 11-2, the process proceeds to the next. If there is no solution matching, for example, an error message is outputted to prompt re-inputting the "matching" and the "arrow path".

(S7)
The "processing work introduction amount function" and the "material amount on the arrow path" are read from the storage device 1, and the arithmetic device 11 calculates the "processing work conversion amount" and the "material introduction conversion amount."

(S8)
The "present term actual cost data," the "processing work conversion amount," and the "material introduction conversion amount" are read from the storage device 1, and the arrow distribution cost arithmetic unit 11-4 outputs a result of distribution of the costs to the arrows to the output unit 21.

Through the above-described processes, the cost accounting and the standard cost accounting precisely corresponding to the procedure of the physical processing work can be performed.

Then, after the production data and the actual cost data are given, it can be understood as to how the product cost and an ending in-process product cost can be obtained using the data.

The generation of the arrow diagram is optional (the same applies to the following).

Next, a process that performs the standard cost accounting with a single material is described.

The storage device 1, such as the memory, stores the following:

7) Standard parameter value data as a standard parameter value (see the fifth chapter in the Interpretation Section; the standard parameter value data is paired with an actual parameter value, and specific examples of which include a standard impairment parameter value, a standard additional introduction parameter value, a standard arrow path, and the like);

8) Standard resource consumption amount function data (q(s); see the sixth chapter in the Interpretation Section) as a standard resource consumption amount condition;

9) Standard cost function data (p(s); see the sixth chapter in the Interpretation Section) in which a standard cost generation condition is recorded;

10) Sequence data of variance analysis in which an order of the variance analysis is recorded (see the sixth chapter in the Interpretation Section; the user configures an order of parameters); and 11) Actual resource consumption amount data in which an actual resource consumption amount situation within the cost accounting target period is recorded (see the sixth chapter in the Interpretation Section)

Figure 2B:
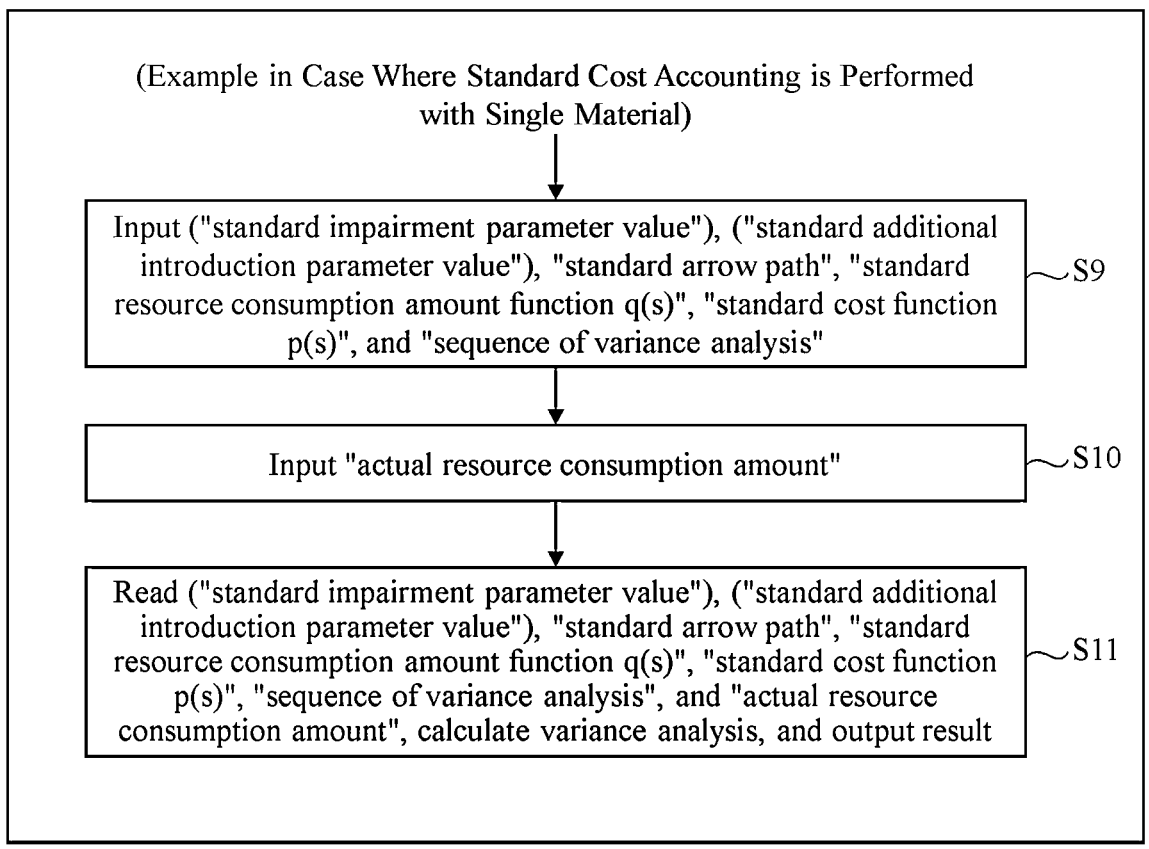
FIG. 2B is a flowchart diagram depicting a process example that performs standard cost accounting with the single material and is a drawing depicting processes subsequent to Step S8 in FIG. 2A.

FIG. 2B is a flowchart diagram depicting a process example that performs the standard cost accounting with the single material and is a drawing depicting processes subsequent to Step S8 in FIG. 2A.

In addition to the process illustrated in FIG. 2A, the following steps are further provided:

A step (3-1) that reads the standard parameter value data, the standard resource consumption amount function data, the standard cost function data, the sequence data of variance analysis, and the actual resource consumption amount data from the memory to perform the variance analysis (see the eighth chapter in the Interpretation Section for a specific example of the variance analysis); and A step that outputs a variance analysis result (3-2).

For example, as illustrated in FIG. 2B, the following processes are performed.

(S9)

(The "standard impairment parameter value"), (the "standard additional introduction parameter value"), the "standard arrow path", the "standard resource consumption amount function q(s)", the "standard cost function p(s)", and the "sequence of variance analysis" are inputted to the arithmetic device 11.

(S10)

The "actual resource consumption amount" is inputted to the arithmetic device 11.

(S11)

(The "standard impairment parameter value"), (the "standard additional introduction parameter value"), the "standard arrow path", the "standard resource consumption amount function q(s)", the "standard cost function p(s)", the "sequence of variance analysis", and the "actual resource consumption amount" are read and the arithmetic device 11 calculates the variance analysis and outputs the result to the output unit 21.

As described above, according to the embodiment, the standard cost accounting corresponding to the procedure of the physical processing works of the material with the single material and the in-process product can be performed as much as possible from the collected production data and cost data.

In the first embodiment, the description has been given considering the time axis. However, the present invention may include an example wherein the time axis is not considered. Each configuration is similar to the configuration corresponding to the description in the first embodiment.

For example, a product manufacturing cost accounting method in the case of not considering the time axis has the following configuration.

Basic Configuration Example

1. A product manufacturing cost accounting program for causing a computer to perform product manufacturing cost accounting. The computer is caused to:

refer to:
1) cost accounting space data defined by a coordinate space comprising a degree of processing progress axis;
2) processing work introduction amount function data as an introduction condition for a processing work;
3) present term production data as a production situation within a cost accounting target period; and
4) present term actual cost data as a cost generation situation within the given cost accounting target period stored in a memory in advance;

read the cost accounting space data and the present term production data;

perform a step of calculating an arrow that connects an input node and an output node based on an inputted matching and a material amount on an arrow path as a material amount on a path of the arrow; read the processing work introduction amount function data and material amount data on the arrow path to calculate a processing work conversion amount and a material introduction conversion amount if a solution matching is found in the step of calculating the material amount on the arrow path; and perform a step of reading the present term actual cost data, the processing work conversion amount, and the material introduction conversion amount, distributing costs to the arrows, and outputting the costs distributed to the arrows.

(If there is Impairment)

2. In the product manufacturing cost accounting program according to 1, further, 5) impairment function data stored in the memory in advance as an impairment condition of a material is referred to, and the step of calculating the material amount on the arrow path further reads the impairment function data.

(If there is Additional Introduction)

3. In the product manufacturing cost accounting program according to 1, further, 6) additional introduction function data stored in the memory in advance as an additional introduction condition of a material is referred to, and the step of calculating the material amount on the arrow path further reads the additional introduction function data.

(If there are Impairment and Additional Introduction)

4. In the product manufacturing cost accounting program according to 1, further, 5) impairment function data as an impairment condition of a material; and 6) additional introduction function data as an additional introduction condition of the material stored in the memory in advance are referred to, and the step of calculating the material amount on the arrow path further reads the impairment function data and the additional introduction function data.

(Addition of Arrow Diagram to 1)

5. In the product manufacturing cost accounting program according to any one of 1 to 4, the step of calculating the material amount on the arrow path further includes:

a step of generating an arrow diagram in which the input node and the output node are displayed; and a step of displaying the arrow and a calculation result of the material amount on the arrow path on the arrow diagram.

Second Embodiment

Next, the following describes the second embodiment of the present invention in detail with reference to drawings illustrating basic configuration examples and the like.

While the cost accounting technique in the case of the single material has been described in the first embodiment, the cost accounting technique in a case of introducing a plurality of kinds of materials is described in this embodiment. The following description can be better understood with reference to the seventh chapter in the Interpretation Section.

The various parameters in the case of the single material include the impairment parameter (θ), the additional introduction parameter (φ: phi), and the arrow path ("path") (the arrow path is required only if the time axis is considered), but in the case of introducing the plurality of kinds of materials, an introduction ratio (ψ: psi) (a vector value) at the starting point introduction is added.

In the case of introducing the plurality of kinds of materials, material amounts are indicated by a vector value (a material amount of a first material, a material amount of a second material, . . . and a material amount of the N-th material). The material amount is a scalar value in the case of the single material.

Figure 4:
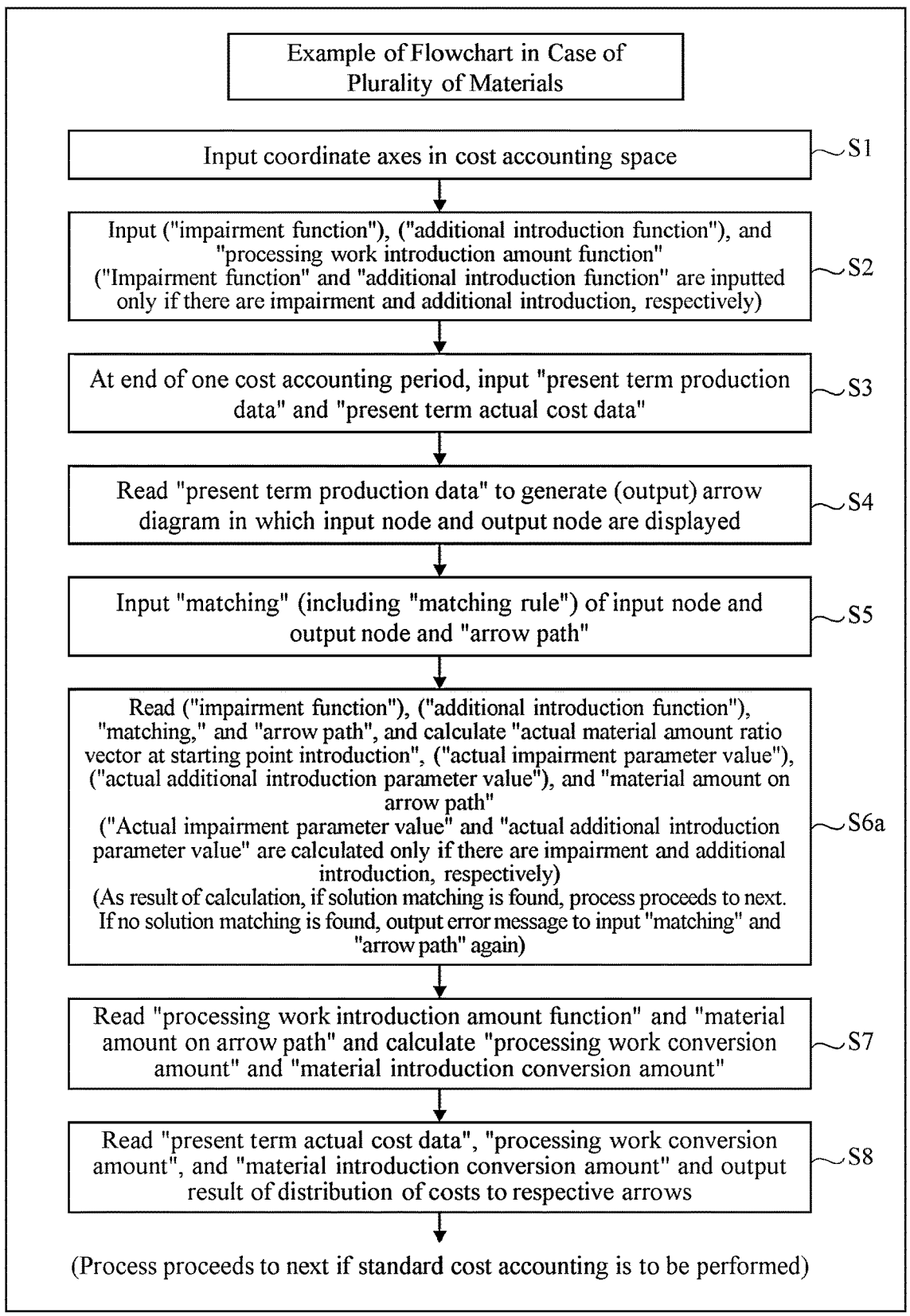
FIG. 4 is a flowchart diagram corresponding to FIG. 2A that depicts a procedure of arithmetic processing when a plurality of kinds of materials are introduced.

FIG. 4 is a flowchart diagram that depicts an example of a procedure of arithmetic processing in a case where the plurality of kinds of materials are introduced. Only the process different from FIGS. 2A and 2B (Step S6a) is described below.

In Step S6a, (the "impairment function"), (the "additional introduction function"), the "matching", and the "arrow path" are read from the memory to calculate an "actual material amount ratio vector at starting point introduction" (an "actual impairment parameter value"), (an "actual additional introduction parameter value"), and a "material amount on arrow path". The arithmetic device 11 calculates the "actual impairment parameter value" and the "actual additional introduction parameter value" only if there are the impairment and the additional introduction, respectively.

If a solution matching is found as a result of the calculation, the process proceeds to the next, and if no solution matching if found, an error message is outputted to prompt re-input of the "matching" and the "arrow path" to the arithmetic device 11.

Figure 5:
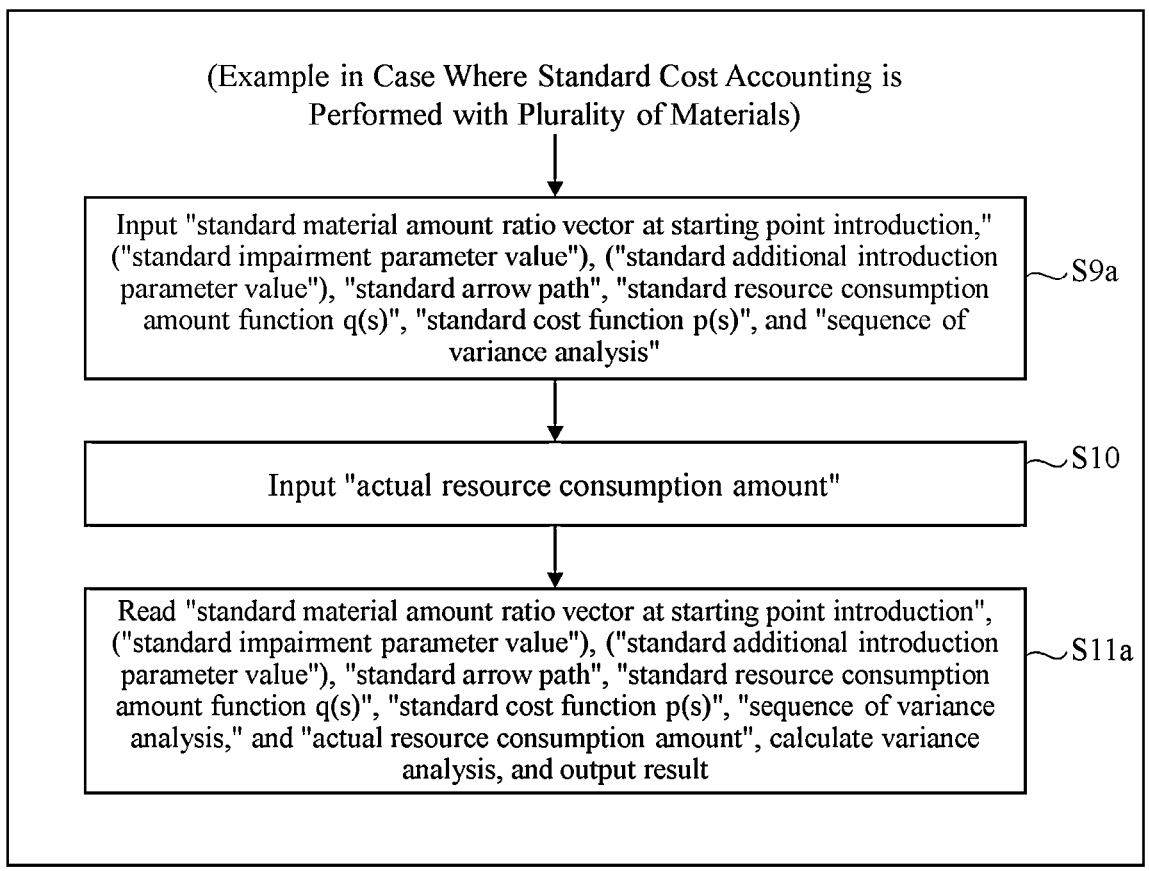
FIG. 5 is a drawing depicting a process example of performing the standard cost accounting with a plurality of materials.

Next, a process of performing the standard cost accounting for the plurality of materials is described with reference to FIG. 5. Since differences with FIG. 2B are Steps S9a and S11a, S9a to S11a are described.

(S9a)

A "standard material amount ratio vector at starting point introduction," (a "standard impairment parameter value"), (a "standard additional introduction parameter value"), a "standard arrow path", a "standard resource consumption amount function q(s)", a "standard cost function p(s)", and a "sequence of variance analysis" are inputted to the arithmetic device 11.

(S10)

An "actual resource consumption amount" is inputted to the arithmetic device 11.

(S11a)

The "standard material amount ratio vector at starting point introduction", (the "standard impairment parameter value"), (the "standard additional introduction parameter value"), the "standard arrow path", the "standard resource consumption amount function q(s)", the "standard cost function p(s)", the "sequence of variance analysis", and the "actual resource consumption amount" are read from the memory, and the arithmetic device 11 calculates the variance analysis and outputs the result to the output unit 21.

Thus, the present embodiment allows handling the cost accounting in the case of the plurality of materials.

As described above, in the calculation of the product manufacturing cost, the cost accounting and the standard cost accounting corresponding to the physical procedures of the material and the in-process product are performed as much as possible from the collected production data and cost data. In particular, by performing the cost accounting and the standard cost accounting including the time taken for production manufacturing as the analysis target, accurate cost accounting can be performed.

The following is further detailed Interpretation Section related to the cost accounting technique according to the embodiments. The above-described embodiments and the following claims allow better understanding of the cost accounting technique according to the embodiments by referring to the description of the following Interpretation Section.

(Interpretation Section)

The description of the above-described embodiments can be understood in further detail with reference to the following Interpretation Section (the zero-th chapter to the ninth chapter).

Zero-Th Chapter: Basic Policy of Arrow Cost Accounting

The arrow cost accounting performs the cost accounting corresponding precisely to the procedure of the physical processing work as much as possible. The procedure is generally as follows.

1) For example, a coordinate space plotting an elapsed time t on the horizontal axis and a degree of processing progress x on the vertical axis (exchangeable) is defined. This is referred to as a "cost accounting space." On the cost accounting space, a production situation of the present term is expressed by a node (a point) and an arrow (an arrow symbol), and a cost of the present term is distributed to completed products and the ending in-process products based on them.

2) On the cost accounting space, a point representing the production data of the present term is plotted. The point is referred to as a "node". There are two kinds of nodes, which are an input node representing, for example, a beginning in-process product and a present term introduction, and an output node representing, for example, the present term completion and the ending in-process product.

3) Which input node corresponds to which output node (matching) is considered, and they are connected with an arrow symbol. The arrow symbol is referred to as the "arrow." Additionally, a "path" that represents how the arrow proceeds inside the cost accounting space is considered.

4) The costs generated in the present term are distributed to the nodes and the arrows while paying attention to the cost generating mechanism. Specifically, the cost of the material introduced at the process starting point is distributed to a present term introduction node and the cost of a material introduced in the middle of the process or processing work are distributed to the arrow.

5) The costs are totalized to the output node toward which the input node and the arrow are directed. The total sum represents the cost of the output node. In a case where the node is a present term completion node, the cost is a completed product cost. In a case where the node is the ending in-process product node, the cost is an ending in-process product cost and becomes a beginning in-process product cost of the next term.

A target of the present invention interpreted here is to position the cost accounting as one application field of mathematical analysis. This is because when considering a cost accounting method precisely corresponding to the procedure of the physical processing work, the cost accounting must be treated as the mathematical analysis naturally.

First Chapter: Cost Accounting Space, Production Data and Arrow Diagram (Production Data Example 1) (Assume that the Present Term is One Month from June 1 to June 30.)

TABLE 1

| In-Process Product at the Beginning of the Month | | 100 kg | (Degree of Progress: 2/3) |
|---|---|---|---|
| Introduction in this Month | Introduced on June 1 | 200 kg | |
| | Introduced on June 16 | 100 kg | |
| Completed Product | Completed on June 20 | 160 kg | |
| In-Process Product at the End of the Month | | 100 kg | (Degree of Progress: 1/3) |
| | | 100 kg | (Degree of Progress: 4/5) |

Although the model can omit the t-axis and include only the x-axis in the present invention, hereinafter, an interpretation is given by a model with the t-axis. The elimination of the t-axis allows easily rewriting the model to the model only with the x-axis.

Figure 6:
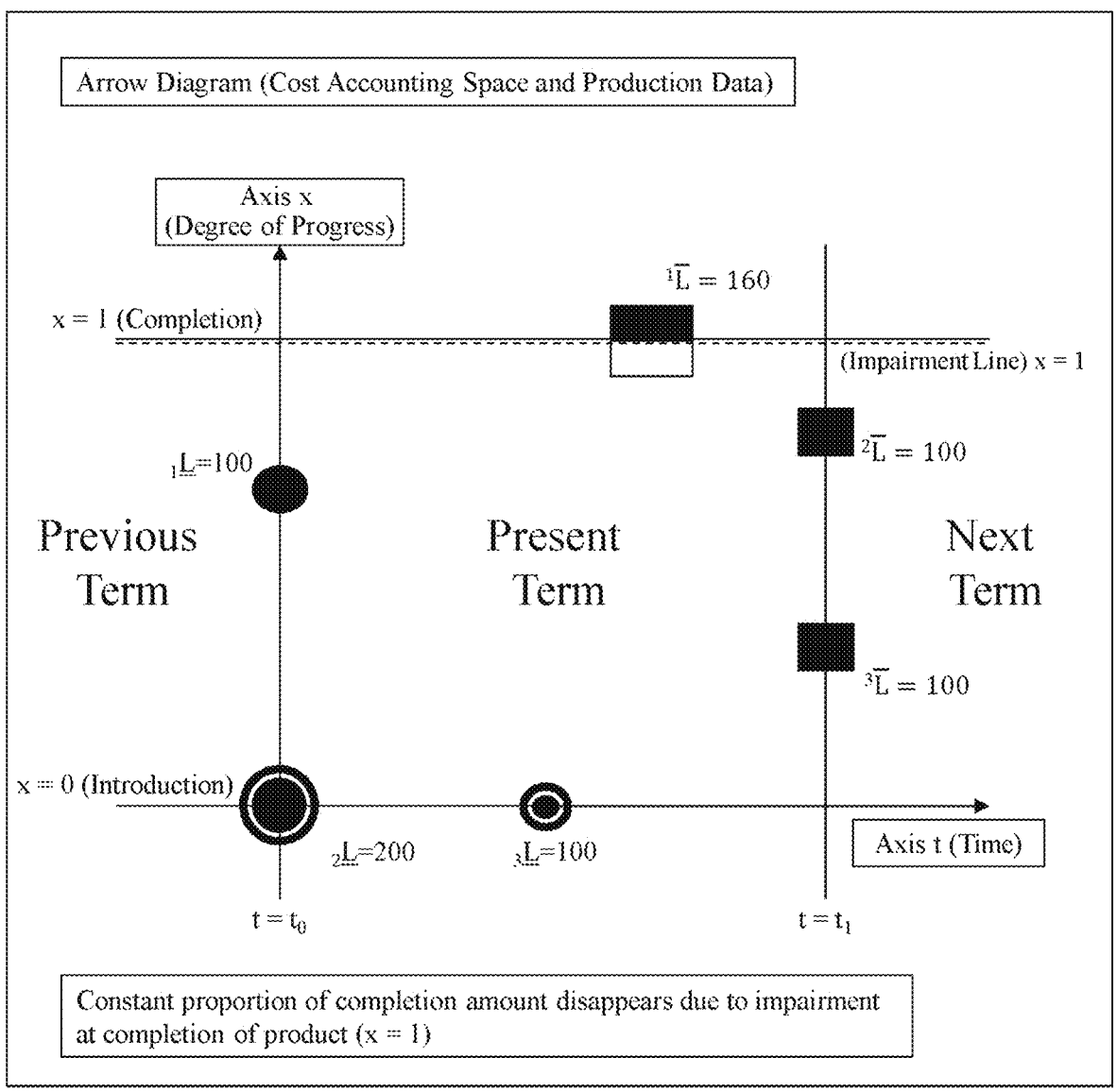
FIG. 6 is an arrow diagram illustrating a cost accounting space and production data.

The diagram as in FIG. 6 is referred to as the arrow diagram. Table 1 is a production data example 1, and the present term is assumed to be one month from June 1 to June 30.

First, as illustrated in FIG. 6, an example of an orthogonal coordinate system plotting t (the elapsed time) on the horizontal axis and x (the degree of progress) on the vertical axis is considered. In the orthogonal coordinate system, an area surrounded by ranges of the following formulae:

$$t_0 \leq t \leq t_1, 0 \leq x \leq 1$$

is defined as a cost accounting space of the "present term."

$t_0, t_1, t_2, \ldots$ indicate separators of a cost accounting period. An operation start period of a factory is defined as $t_0 \leq t \leq t_1$, and afterward the period is updated to $t_1 \leq t \leq t_2$, and $t_2 \leq t \leq t_3$. While the separators of the period are generally per month practically, the separators of the period may be at any given units. The separation intervals need not be constant. Actually, since the numbers of days in months are not constant, from 28 days to 31 days, the separation intervals do not become constant practically in the separation intervals per month.

To simplify indexes, in the arrow diagram of FIG. 6 and other figures, the present term is indicated by $t_0 \leq t \leq t_1$. In this case, the previous term is indicated by $t_{-1} \leq t \leq t_0$. In the following interpretation, the indexes are further simplified, and the present term is indicated as $0 \leq t \leq 1$ in some cases.

The x-axis indicates the degree of processing progress. x=0 indicates the material introduction and x=1 indicates the completion of the product. The area of x<0 is not defined. The area of 1<x might be necessary to consider, for example, additional processing of the product, but is not defined in this interpretation.

The production data of the present term is indicated by nodes (points) on the cost accounting space. There are two kinds of nodes.

1) An input node: is indicated by ○● types nodes and indicates the beginning in-process amount (a node on the line of $t=t_0$) and the present term introduction amount (a node on the line of x=0). Note that the starting point introduction is indicated by a double circle in some cases.

2) An output node: is indicated by ■ type nodes and indicates the present term completion amount (a node on a line of x=1) and the ending in-process amount (a node on the line of $t=t_1$).

Besides, there is an input node (a midstream introduction input node) in a case where an in-process product is purchased from outside and is then introduced in the middle of the production process and an output node (a half-product output node) in a case where the product is in the middle of processing but is sold outside. These nodes do not exist on the line of x=0, x=1, $t=t_0$, or $t=t_1$.

In a case where the point of the node is slightly displaced to either side of the axis line, in order to express that, a way of filling the node may be changed. For example, the examples illustrated in FIG. 6 and other figures indicate that the first output node slightly exceeds over the line of x=1. This is because, as the example assumes that a certain proportion of the completion amount disappears due to the impairment at the completion of the product (x=1), it is not clear as to whether the first output node indicates a material amount before or after the impairment. By changing the way of filling, the example indicates that the black area is the material amount after impairment.

Based on the production data of the present term, material amounts L of all nodes are inputted. In FIG. 6, the above-described Table 1 (the production data example 1) is inputted.

Although the specific (t, x) coordinate of the node is not indicated in FIG. 6, the coordinates of the respective nodes are as follows.

1) A first input node(t, x)=(0, ⅔) corresponds to 100 kg of the in-process product at the beginning of the month 2) A second input node (t, x)=(0, 0) corresponds to introduction in this month (the introduction amount at June 1: 200 kg)

3) A third input node (t, x)=(½, 0) corresponds to introduction in this month (the introduction amount at June 16: 100 kg)

4) A first output node (t, x)=(⅔, 1) corresponds to 160 kg of completed product
5) A second output node (t, x)=(1, ⅘) corresponds to 100 kg of in-process product at the end of month (the degree of progress: ⅘)
6) A third output node (t, x)=(1, ⅓) corresponds to 100 kg of in-process product at the end of month (the degree of progress: ⅓)

However, for the sake of simplification, the range of the t-axis in the present term is 0≤t≤1. The in-process product at the beginning of the month means t=0, the in-process product at the end of month means t=1, the introduction in this month means x=0, and the completed product in this month means x=1.

Table 1 (the production data example 1) does not include information about which input node matches which output node. Therefore, to obtain the solution matching described later, a matching rule, such as the first-in first-out method, needs to be designated separately.

In a case where, for example, the processing progress situation is grasped in the units of lots, the processing progress situations are as follows.

Table 2 is a table showing an example of production data 2.

TABLE 2

(Production Data Example 2) (Assume that the present term is one month from June 1 to June 30.)

| First Lot (Introduction Amount in Last Month or Earlier) | At the Beginning of Month, Degree of Progress of 2/3, 100 kg | → | Completed by 80 kg on June 20 |
|---|---|---|---|
| Second Lot (Introduction Amount in this Month) | Introduced by 200 kg on June 1 | → | Completed by 80 kg on June 20 |
| | | → | At the End of Month, Degree of Progress of 4/5, 100 kg |
| Third Lot (Introduction Amount in this Month) | Introduced by 100 kg on June 16 | → | At the End of Month, Degree of Progress of 1/3, 100 kg |

Note that the second lot is separated into two due to the situation of subsequent processing progress.

Since Table 2 (the production data example 2) also includes the information about which input node matches which output node, designation of the matching rule is unnecessary. However, (the production data example 2) includes the information on matching but does not include information on arrow path. Therefore, some designation of the arrow path, such as a "straight line," is necessary.

Besides, in a case where the progress situation of each lot is grasped per day, the production data also includes the information on arrow path.

Table 3 is a table showing an example of production data 3.

TABLE 3

(Production Data Example 3 (First Lot Only)) (Assume that the present term is one month from June 1 to June 30.)

| Date | Degree of Progress | Material Amount |
|---|---|---|
| At the Beginning of Month (at the Start of Operation on June 1) | 120/180 | 100 kg |
| June 1 At the End of Operation | 123/180 | 100 kg |
| June 2 At the End of Operation | 126/180 | 100 kg |
| June 3 At the End of Operation | 129/180 | 100 kg |
| June 19 At the End of Operation | 177/180 | 100 kg |
| June 20 At the End of Operation | 180/180 | 80 kg |

However, Table 3 (the production data example 3) displays only the first lot.

(The production data example 3) also includes information on the arrow path. In this case, the arrow path is actually measured.

The "number of pieces (in terms of the completed product)" and "kg (the mass)" are mainly used as the measurement unit of the material amount. Besides, various units, such as "l (a liter) (a volume)," are used.

Depending on the unit, a conservation law (1 unit+1 unit=2 units) is not always met between different kinds of materials. With the use of the units where the conservation law is not met, adjustment is required appropriately.

For example, the unit of the "number of pieces (in terms of the completed product)" is a typical unit where the conservation law is not met. For example, in an automobile factory, when four tires are mounted to one chassis, the number of vehicles does not increase to five but is still one. Thus, in the unit of the "number of pieces," additional material introduction, a plurality of kinds of materials, and the like are evaluated based on the starting point introduction material.

With the unit of the "number of pieces," only a considerably simple adjustment work is sufficient, but depending on the kind of the unit, complicated adjustment is required in some cases.

For example, in a case where a unit is other than the "number of pieces (in terms of the completed product)" and a plurality of kinds of materials are present, the material amount needs to be inputted for each kind of the material.

In this case, the material amount L is indicated by a vector. The matter is interpreted in the seventh chapter. In this chapter, for the meantime, the measurement is performed using the "kg" unit and the material is of only one kind.

Here, an underscore is attached to the material amount L of the input node and an overscore is attached to the material amount L of the output node in some cases. Numbers are attached to the respective input nodes and output nodes. For example, numbers (i=1, 2, . . . , I) are attached to the lower lefts of the input nodes and (j=1, 2, . . . , J) are attached to the upper lefts of the output nodes.

The order of attaching the number is not specifically limited, but is generally in the order of the coordinates of $(t_0, 1) \to (t_0, 0) \to (t_1, 0)$ for the input nodes and in the order of the coordinates of $(t_0, 1) \to (t_1, 1) \to (t_1, 0)$ for the output nodes in the coordinates. Alternatively, if there is complete one-to-one matching through all periods, fixed serial numbers may be given at the introduction and consistently maintained after that.

In the arrow diagram, to simply indicate the magnitude of the material amount L, the sizes of ● and ■ are changed in some cases.

The coordinates need to be inputted to all of the nodes as well, but are omitted in the example. For example, the coordinate of the second input node is clearly $(t_0, 0)$. The coordinate is clarified as necessary.

If there are no impairment and additional material introduction, the sum of the material amounts L of the input nodes matches the sum of the material amounts L of the output nodes. In the arrow diagram illustrated in FIG. 6, it is supposed that a certain proportion of the completion amount disappears due to the impairment at the completion $(x=1)$, and therefore the sum of the material amounts L of the input nodes does not match the sum of the material amounts L of the output nodes. Note that in the example of FIG. 6, it can be easily calculated that the impairment proportion is 20 percent of the material amount when reaching $x=1$. For details, see the interpretation in the second chapter.

Second Chapter: Matching, Arrow Path, and Material Amount on Arrow Path

Figure 7:
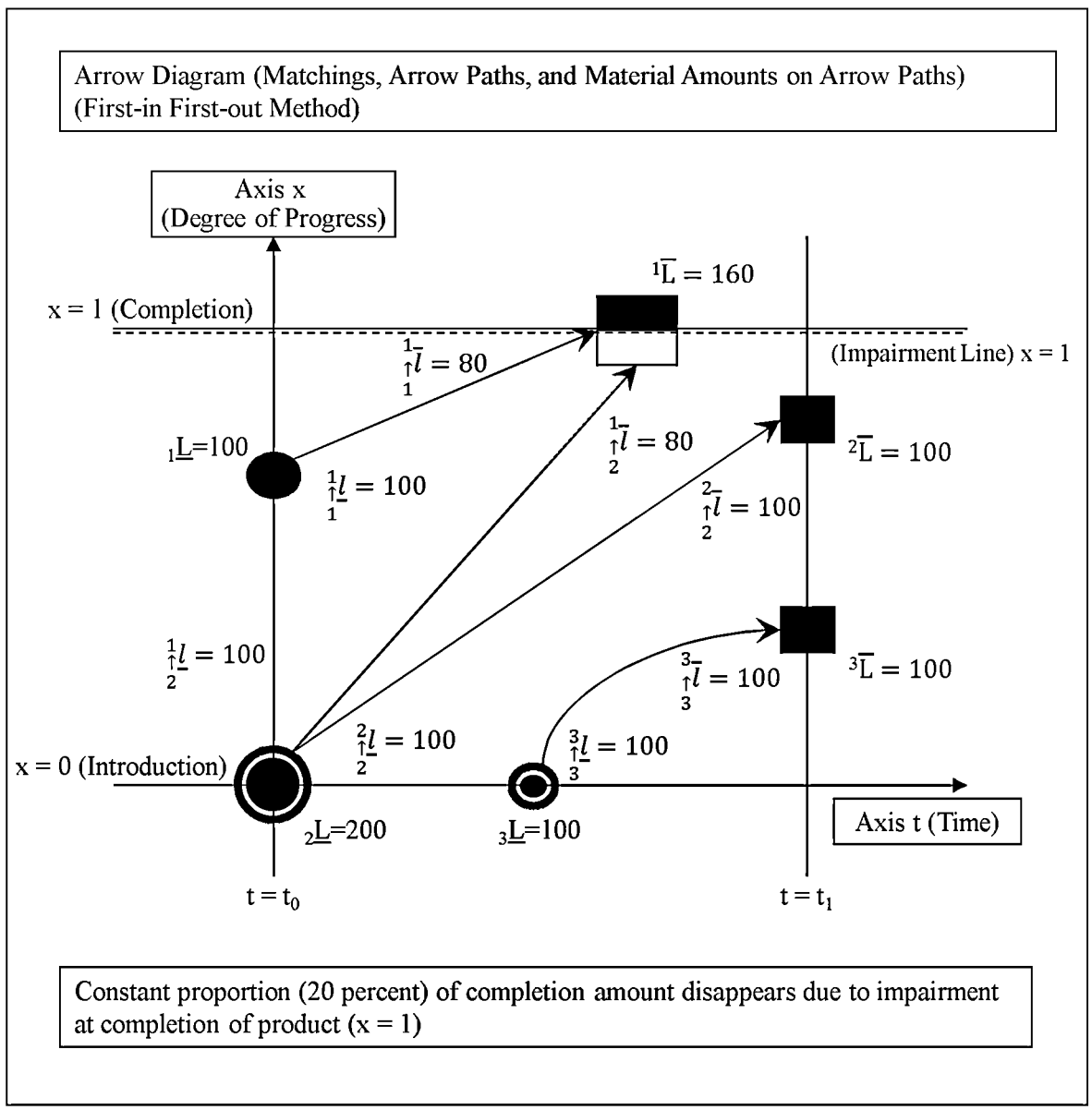
FIG. 7 is an arrow diagram illustrating matchings, arrow paths, and material amounts on the arrow paths.

FIG. 7 is an arrow diagram corresponding to FIG. 6, and illustrates the matching, the arrow path, and the material amount on the path, in addition to FIG. 6.

After the input of the production data (the coordinates and the material amounts of the input nodes and the output nodes) to the arrow diagram illustrated in FIG. 6, the following three are usually determined simultaneously.

1) Matching
2) Arrow path
3) Material amount on the arrow path

They are described below in the order from 1).

1): Matching

Matching is determined as to which input node corresponds to which output node. An arrow symbol indicating the matching is referred to as an "arrow". The matching has three reality levels depending on the correspondence with the actual data.

1-1) Reality level 1 (actually measured matching): The matching is actually measured.
1-2) Reality level 2 (possible matching): The matching is estimated and is realistically possible.
1-3) Reality level 3 (impossible matching): The matching is estimated and is realistically impossible. If t or x proceeds in an opposite direction, this corresponds to the reality level 3. For example, in the above-described production data, suppose that a path of the 1→3 arrow is considered, since x (the degree of progress) is in the opposite direction, resulting in impossible matching.

However, for example, in a case where an error is discovered during a processing work and therefore the processing work is started all over again, x possibly proceeds in the opposite direction. If such matching occurs, whether the matching is valid should be determined through individual examination.

In a case where a plurality of the arrows are present for one node, it also needs to be determined as to how much material amount is outputted to (inputted from) which arrow. Obviously, the following formulae have to be met.

Formula 1 (Matching Condition)

$$\sum_{j=1}^{J} {}_i^j \uparrow\underline{L} = {}_i\underline{L}, \quad (2.0a)$$

Formula 2

$$\sum_{i=1}^{I} {}_i^j \uparrow\overline{L} = {}^j\overline{L}. \quad (2.0b)$$

Formula (2.0a) and Formula (2.0b) are referred to as matching conditions. That is, the matching conditions are that: 1) Formula (2.0a) is met at all input nodes; and 2) Formula (2.0b) is met at all output nodes.

A solution that meets the matching conditions is referred to as the "solution matching." Since the material amount on the arrow path is influenced by the arrow path and the impairment parameter, the solution matching includes, not only the values of:

$${}_i^j \uparrow\underline{L} \text{ and } {}_i^j \uparrow\overline{L} \text{ (all } i \text{ and } j\text{),}$$

but also information, such as the arrow path and the impairment parameter value.

Generally, the solution matchings are countlessly present in one piece of the production data. To select one from the solution matchings that are present countlessly, matching rule needs to be determined. Examples of the matching rule include the "first-in first-out method," an "average method," and a "last-in first-out method." Specific procedures are described later.

Depending on the production data, even after the matching rule is determined, a plurality of solution matchings are present in some cases. In the case, with reference $t_0$, for example, a reality level, the solution matching that is realistically appropriate is selected.

When only a single input node independently matches a single output node, this is referred to as one-to-one matching. In the example of FIG. 7, only the 3→3 arrow corresponds to this.

The matchings other than that are referred to as, for example, one-to-many, many-to-one, and many-to-many matchings.

When a plurality of kinds of materials are introduced, the matching conditions (Formula (2.0a) and Formula (2.0b)) are checked for each kind of the material. A case in which the matching conditions are met in all kinds of materials is determined to be a solution matching.

2): Arrow Path

The path of each arrow is inputted. The path indicates a processing rate (speed) of each in-process product. In a case where the in-process product is left unprocessed and the processing work does not proceed at all (the elapsed time: long), the path becomes horizontal, and in a case where the processing work proceeds in an extremely short period (the elapsed time: short), the path becomes close to be vertical. The arrow path in the solution matching should not be outside a range of the cost accounting space of the "present term." The arrow path also has the following three reality levels.

2-1) Reality level 1 (the actually measured path): The path is actually measured. For example, with the cost accounting period of one month, the progress situation needs to be grasped per day. Further, the progress situation needs to be grasped per hour, or ultimately per second, but this is extremely difficult in reality. Furthermore, as long as the path is actually measured, the matching is regarded to be actually measured.

2-2) Reality level 2 (a possible path): The path is estimated and is realistically possible. In any section in the arrow path, t or x never proceeds in the negative direction. In the above-described example, all arrows are in the reality level 2.

2-3) Reality level 3 (an impossible path): The path is estimated and is actually impossible. There is a section in which t or x proceeds in the negative direction in the arrow path. In the case of the impossible matching, the arrow path always becomes impossible. Additionally, even in the possible matching, the path becomes impossible in some cases.

In the tx model, basically, various required calculations are performed by line integral along the arrow path. In view of this, how the arrow path is formed is extremely important. The simplest method is to configure it as a straight line. In short, it is supposed that "the processing rate per hour is constant in the arrow."

Note that there is a problem that how should the arrow path be configured in an operation stop period during which the factory does not operate, such as Saturday, Sunday, a holiday, and nighttime. In the cost accounting space, since the horizontal axis (the t-axis) is the time, it is unrelated to whether the factory operates. Therefore, since the time elapses but the processing work does not proceed during the period not in operation, the arrow path proceeds horizontally (parallel to the t-axis). In a case where the cost accounting period is, for example, one month, if the arrow path becomes horizontal every Saturday, Sunday, holiday and nighttime, the arrow path (a line integral path) including many horizontal sections appears. An arrow path including many horizontal sections may be a little difficult to see when displayed in the arrow diagram. In such a case, there is a method in which the horizontal axis (the t-axis) is not set as an absolute time, that is, a time following a timepiece or a calendar, but is set as a relative time, that is, a time during which the factory operates.

For example, in this method, the horizontal axis is set such that the operation starts at 9:00 on the next day at the moment of ending the operation at 19:00 on a certain day and Monday is set as the next day of Friday. Thus, the horizontal axis (t-axis) is set such that a period during which the factory does not originally operate, such as Saturday, Sunday, a holiday, and a nighttime, does not exist, thus ensuring solving a problem of including the many horizontal sections in the arrow path.

However, this solution changes the meaning of the horizontal axis (the t-axis), and therefore, under a specific situation (for example, a situation in which the impairment is generated due to the elapsed time), a problem, such as a possibility of failing to appropriately describe the change in the material amount, is possibly caused.

There is another, simpler solution in which calculation is performed while the factory is regarded to be operated for 24 hours and 365 days.

3): Material Amount on Arrow Path

The material amount on the path is obtained in each arrow. Although the material amounts at both end points of the arrow have already been obtained at the phase of determining the matching, the change in the material amount along the arrow path needs to be obtained.

Obviously, in a case where the material amount does not change at all on the path (neither the impairment nor the additional material introduction exist), the calculation is extremely simple.

In the example, for example, in the 1→1 arrow, with (t*, x*) as the points on the arrow path, the following formula is established.

Formula 3

$$\uparrow_1^1 l(t^*, x^*) = \begin{cases} 100 & (x^* < 1) \\ 80 & (x^* = 1) \end{cases}$$

Note that the material amount is not defined in the coordinates other than that on arrow paths.

If there is impairment (supposing that there is no additional material introduction), in the calculation of the material amount on the arrow path, the impairment parameter needs to be obtained. This is because that, in the example, although it has been found that the impairment occurs at the line of x=1, the specific percentages of the in-process products disappearing due to the impairment depends on a production management situation in the factory, and therefore a specific value of the impairment parameter is not found in advance. Note that since the above example is a considerably simple model, the impairment proportion being 20 percent is intuitively obtained, but needs to be precisely calculated under a complicated situation.

To accurately obtain the material amount on the arrow path by calculation, the following formulae may be used. First, the material amount $$\uparrow_i^j l(t^*, x^*)$$

on the i→j arrow path is defined by the following formulae (supposing that there is no additional material introduction).

Formula 4

$$\uparrow_i^j l(t^*, x^*) = \uparrow_i^j l(_iL, _i\underline{x}) - \int_{_iL_i\underline{x}}^{(t^*, x^*)} \uparrow_i^j g'(t, x; \theta) \cdot dr. \quad (2.1)$$

Note

Formula 5

$$\uparrow_i^j l(_iL, _i\underline{x}) = \uparrow_i^j L,$$

Formula 6

$$\uparrow_i^j l(^j\overline{t}, ^j\overline{x}) = \uparrow_i^j \overline{l},$$

The line integral path is the arrow path, and g' is an impairment function representing the instantaneous impairment amount. Since the impairment functions may have different shapes for different arrows, the index is attached as $$\uparrow_i^j g',$$

but is omitted when unnecessary in some cases. The prime sign "'" does not have any particular meaning. "'" is attached just to indicate the instantaneous change.

θ indicates the impairment parameter. There may be a plurality of the impairment parameters. In this case, the impairment parameter becomes a vector θ, and in many cases, the parameter needs to be uniquely identified.

In the above example, the impairment function is the following formula.

Formula 7

$$\overset{j}{\underset{i}{\uparrow}} g'(t, x; \theta) = \overset{j}{\underset{i}{\uparrow}} l(t, x) * 0 * i + \overset{j}{\underset{i}{\uparrow}} l(t, x) * \theta * \delta(x - 1) * j. \quad (2.2)$$

Note that i indicates a unit vector in the t direction, j indicates a unit vector in the x direction, and δ(x) indicates a Dirac delta function.

The impairment pattern in Formula (2.2) is a pattern that "the remaining amount is impaired by a constant proportion at the moment of passing through the impairment line of x=1."

Regarding the impairment amount, in addition to this example, for example, a pattern of "the impairment by a constant amount" and a pattern of "the impairment by a constant proportion of the introduction amount" exist. As a timing of the impairment, for example, a pattern of "the impairment occurs as the time passes (t proceeds)" and a pattern of "the impairment occurs as the processing work proceeds (x proceeds)" exist. Several examples are shown below.

Example 1

As the time passes, the remaining amount is impaired by the constant proportion ($\theta_1$), and at the moment the degree of processing progress exceeds a, the remaining amount is impaired by a constant proportion ($\theta_2$).

Formula 8

$$\overset{j}{\underset{i}{\uparrow}} g'(t, x; \theta) = \overset{j}{\underset{i}{\uparrow}} l(t, x) * \theta_1 * i + \overset{j}{\underset{i}{\uparrow}} l(t, x) * \theta_2 * \delta(x - a) * j.$$

At this time, Formula (2.1) is obtained to be the following formula. Strictly, the formula is not Formula (2.1) starting from the input node, but is Formula (5.1) starting from the starting point introduction node. However, the formula is described here for ease of understanding of the description.

Formula 9

$$\overset{j}{\underset{i}{\uparrow}} l(t^*, x^*) = \overset{j}{\underset{i\, in}{\uparrow}} l * e^{\left[-\theta_1 * \left(t^* - \frac{t}{i^{in}}\right) - \theta_2 * u(x^* - a)\right]}.$$

Note that $$\overset{j}{\underset{i\, in}{\uparrow}} l$$

indicates the introduction amount at the starting point introduction, and $$\underset{i^{in}}{t}$$

indicates the t coordinate at the starting point introduction node (for details, see the fifth chapter).

u(x−a) indicates a step function and the following formula is established.

Formula 10

$$u(x^* - a) = \begin{cases} 1 & (x^* \geq a) \\ 0 & (x^* < a) \end{cases}.$$

Note that, in Formula (2.2), calculation of Formula (2.1) establishes the following formula.

Formula 11

$$\overset{j}{\underset{i}{\uparrow}} l(t^*, x^*) = \overset{j}{\underset{i\, in}{\uparrow}} l * e^{[-\theta * u(x^* - 1)]} = \begin{cases} \overset{j}{\underset{i\, in}{\uparrow}} l * e^{[-\theta]} & (x^* = 1) \\ \overset{j}{\underset{i\, in}{\uparrow}} l & (x^* < 1) \end{cases}.$$

Here, it is found from FIG. 7 that the impairment proportion (=1−remaining proportion) is 20 percent (0.2), and therefore the remaining proportion=0.8. Here, obtaining the impairment parameter θ finds the remaining proportion=$e^{[-\theta]}$ and $$e^{[-\theta]} = 0.8$$

θ=−ln 0.8      Formula 12 is found, but such an impairment parameter is considerably difficult to understand.

In the example, placing the impairment proportion as Θ, resetting Formula 13

θ=1−$e^{[-\theta]}$ as the new impairment parameter Θ is easier to understand. Alternatively, resetting the remaining proportion ($e^{[-\theta]}$) as the new impairment parameter is easier to understand.

Example 2

As the time passes, the constant proportion ($\theta_1$) of the introduction amount $$\left(\overset{j}{\underset{i\, in}{\uparrow}} l\right)$$

is impaired, and at the moment when the degree of processing progress exceeds a, the constant proportion ($\theta_2$) of the introduction amount is impaired.

Formula 14

$$\overset{j}{\underset{i}{\uparrow}} g'(t, x; \theta) = \overset{j}{\underset{i\, in}{\uparrow}} l * \theta_1 * i + \overset{j}{\underset{i\, in}{\uparrow}} l * \theta_2 * \delta(x - a) * j.$$

At this time, obtaining Formula (2.1) establishes the following formula. Strictly, this is also Formula (5.1).

Formula 15

$$\overset{j}{\underset{i}{\uparrow}} l(t^*, x^*) = \overset{j}{\underset{i\, in}{\uparrow}} l * \left[1 - \theta_1 * \left(t^* - \underset{i^{in}}{t}\right) - \theta_2 * u(x^* - a)\right].$$

Example 3

As the time passes, the constant amount ($\theta_1$) is impaired, and at the moment when the degree of processing progress exceeds a, the constant amount ($\theta_2$) is impaired.

Formula 16

$$\overset{j}{\underset{i}{\uparrow}} g'(t, x; \theta) = \theta_1 * i + \theta_2 * \delta(x - a) * j.$$

At this time, obtaining Formula (2.1) establishes the following formula. Strictly, this is also Formula (5.1).

Formula 17

$$\overset{j}{\underset{i}{\uparrow}} l(t^*, x^*) = \overset{j}{\underset{i\,in}{\uparrow}} l - \theta_1 * \left(t^* - t_{\,in}\right) - \theta_2 * u(x^* - a).$$

Example 4

The impairment does not occur.

Formula 18

$$\overset{j}{\underset{i}{\uparrow}} g'(t, x; \theta) = 0 * i + 0 * j.$$

Although it is obvious, this example is also explained. At this time, obtaining Formula (2.1) establishes the following formula. Strictly, this is also Formula (5.1).

Formula 19

$$\overset{j}{\underset{i}{\uparrow}} l(t^*, x^*) = \overset{j}{\underset{i\,in}{\uparrow}} l.$$

Obviously, a more complicated impairment function can be considered, but then the calculation would become more difficult accordingly.

Note that the material amount on the arrow path also has the reality levels.

1) Reality level 1 (the material amount actually measured): The material amount on the arrow path is actually measured. Although the actual measurement is possible in an extremely simple production situation, such as no impairment, it is significantly difficult. Obviously, for the actual measurement of the material amount, at least the matching also needs to be actually measured.

2) Reality level 2 (a possible material amount): The material amount on the path is estimated, and it is realistically possible. For estimation, Formula (2.1) is used. The reality level 2 corresponds to a case where the material amount does not become negative in any section on the path.

3) Reality level 3 (an impossible material amount): The material amount on the path is estimated, and it is realistically impossible. The reality level 3 corresponds to a case where the material amount becomes negative in any of the sections on the path.

If the material is additionally introduced in the unit of "kg", Formula (2.1) is rewritten by the following formula.

Formula 20

$$\overset{j}{\underset{i}{\uparrow}} l(t^*, x^*) = \overset{j}{\underset{i}{\uparrow}} l(_iL, _ix) - \int_{(_iL,_ix)}^{(t^*,x^*)} \overset{j}{\underset{i}{\uparrow}} g'(t, x; \theta, \phi) \cdot dr + \int_{(_iL,_ix)}^{(t^*,x^*)} \overset{j}{\underset{i}{\uparrow}} h'(t, x; \theta, \phi) \cdot dr. \quad (2.3)$$

Note that h' is an additional material introduction function representing an instantaneous additional material introduction amount. Here, it is supposed that the material is of a single kind, and therefore this means that the material same as the material introduced at the process starting point (x=0) is additionally introduced. A parameter φ indicates an additional material introduction parameter. Obviously, θ and φ need to be uniquely identified.

Generally, since g' and h' affect each other, h' is included in the formula of g' and g' is included in the formula of h'. In that case, the equations need to be solved in advance.

Since the matching, the arrow path, and the material amount on the path generally affect each other, all of the three need to be collectively determined. However, if the impairment function meets a specific condition, the impairment parameter is always determined to be a same value for any solution matching. In this case, the impairment parameter can be obtained independently of the matching and the arrow path. This is referred to as "separation theorem of the impairment parameter θ from the solution matching" or simply referred to as "θ separation theorem" or "separation theorem" and a condition thereof is referred to as a separation condition.

When the separation condition is met, the impairment parameter may be obtained first and then the matching and the arrow path may be considered. Therefore, the matching, the arrow path, and the material amount on the arrow path can be determined very easily. Compared with this, if the separation condition is not met, changing the matching also changes the value of the impairment parameter, and therefore determination of the three is difficult.

An example of the impairment function meeting the separation condition is shown in the following formula.

Formula 21

$$\overset{j}{\underset{i}{\uparrow}} g'(t, x; \theta) = \overset{j}{\underset{i}{\uparrow}} l(t, x) * \theta_1 * m(t) * i + \overset{j}{\underset{i}{\uparrow}} l(t, x) * \theta_2 * n(x) * j. \quad (2.4)$$

Note that Formula (2.4) has the two impairment parameters θ that need to be uniquely identified.

Since Formula (2.2) has the format of Formula (2.4), the separation condition is met. That is, regardless of the matching, the impairment proportion is 20 percent. To speak further, since Formula (2.4) has a potential, the line integral of Formula (2.1) is determined regardless of an integration path (the arrow path).

If there is additional material introduction, there exist a separation theorem and a separation condition regarding the additional material introduction parameter φ. Since they are similar to the case of the impairment parameter, the specific content is omitted.

FIG. 8A to FIG. 14 are drawings illustrating examples wherein the impairment parameter changes.

Figure 8A:
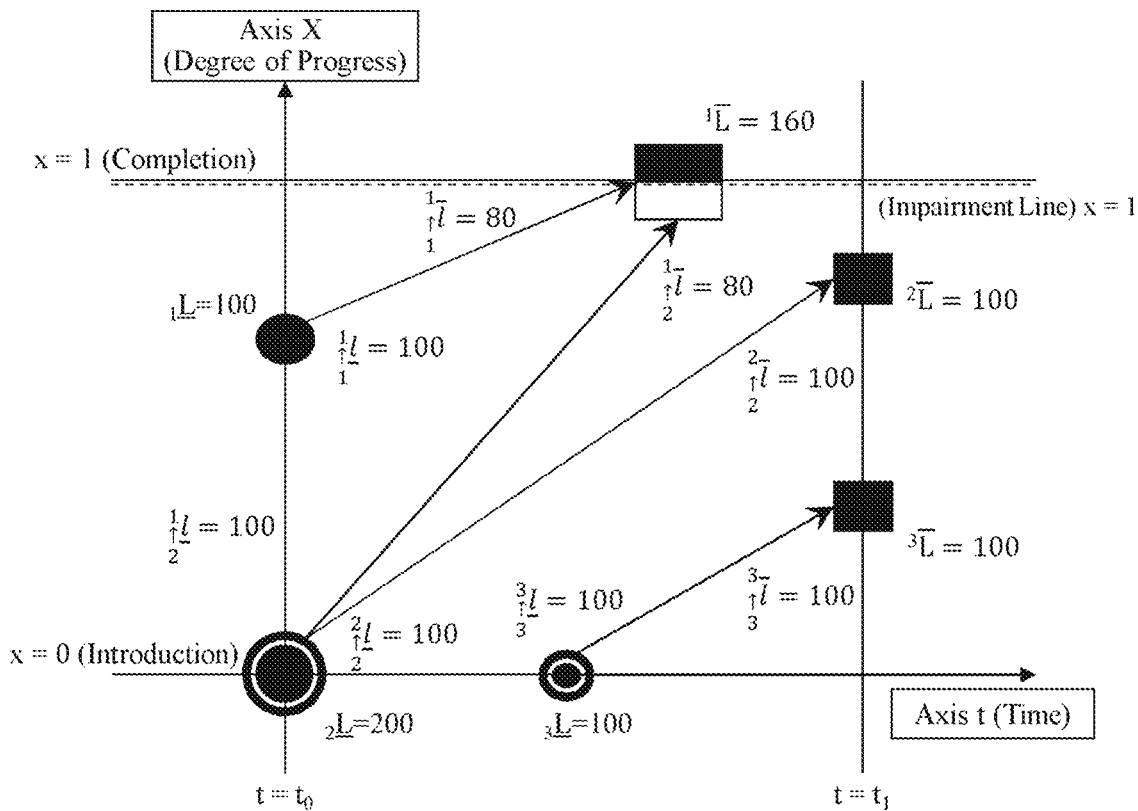
FIG. 8A is an arrow diagram illustrating an example (a first-in first-out method) wherein an impairment parameter changes by matching (pattern 1).
Figure 8B:
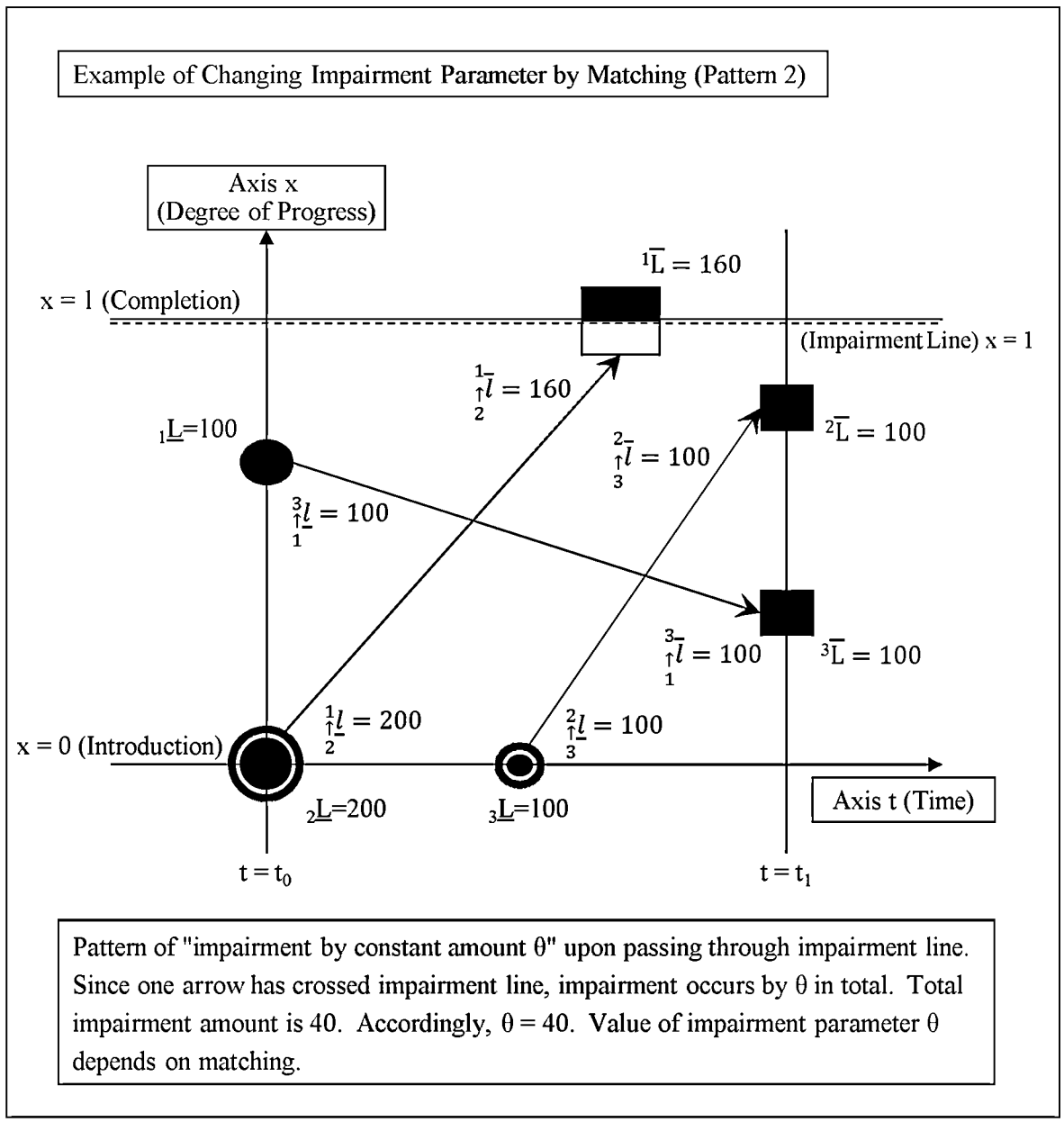
FIG. 8B is an arrow diagram illustrating an example wherein the impairment parameter changes by matching (pattern 2).
Figure 9:
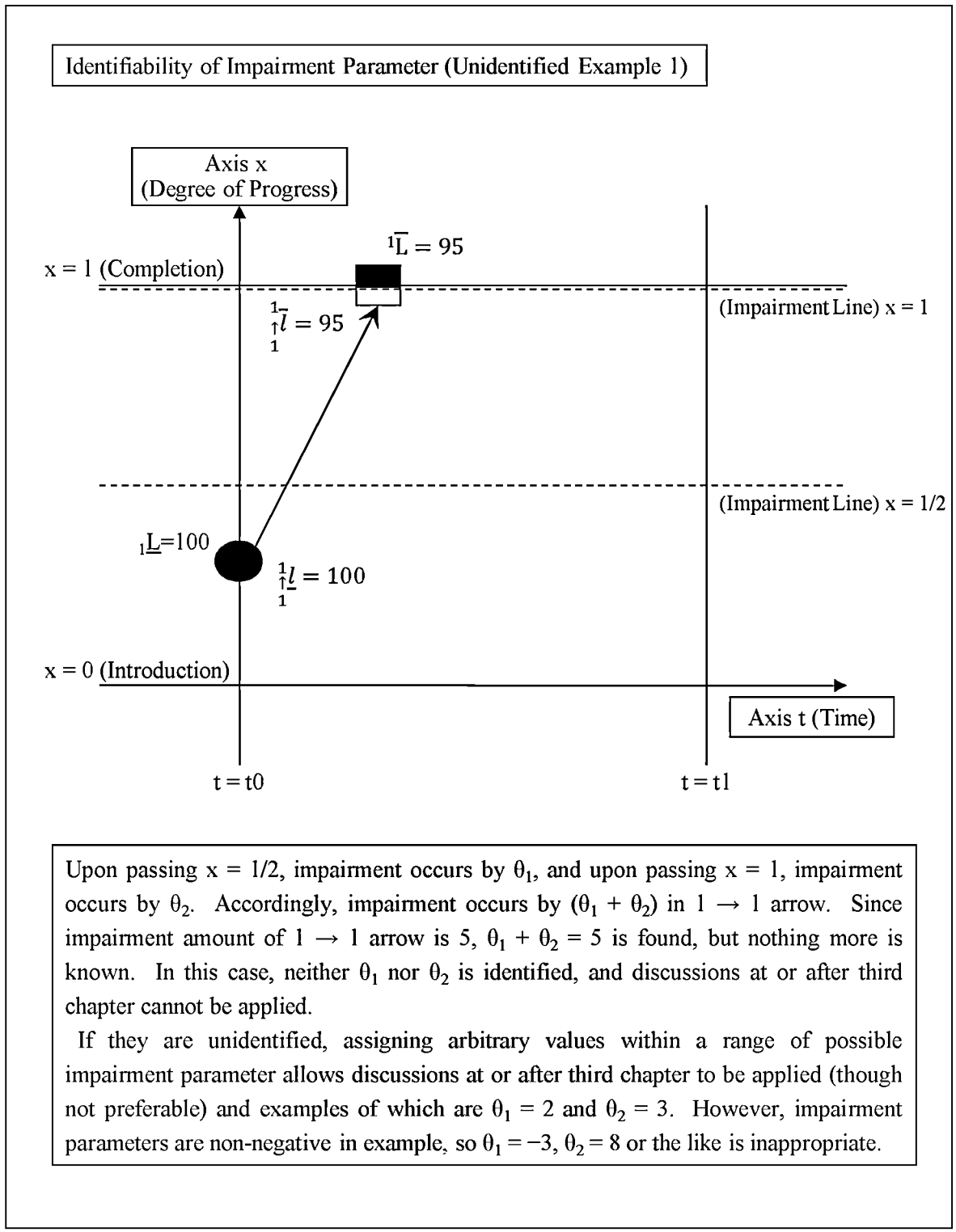
FIG. 9 is an arrow diagram illustrating identifiability of the impairment parameter (unidentified example 1).
Figure 10:
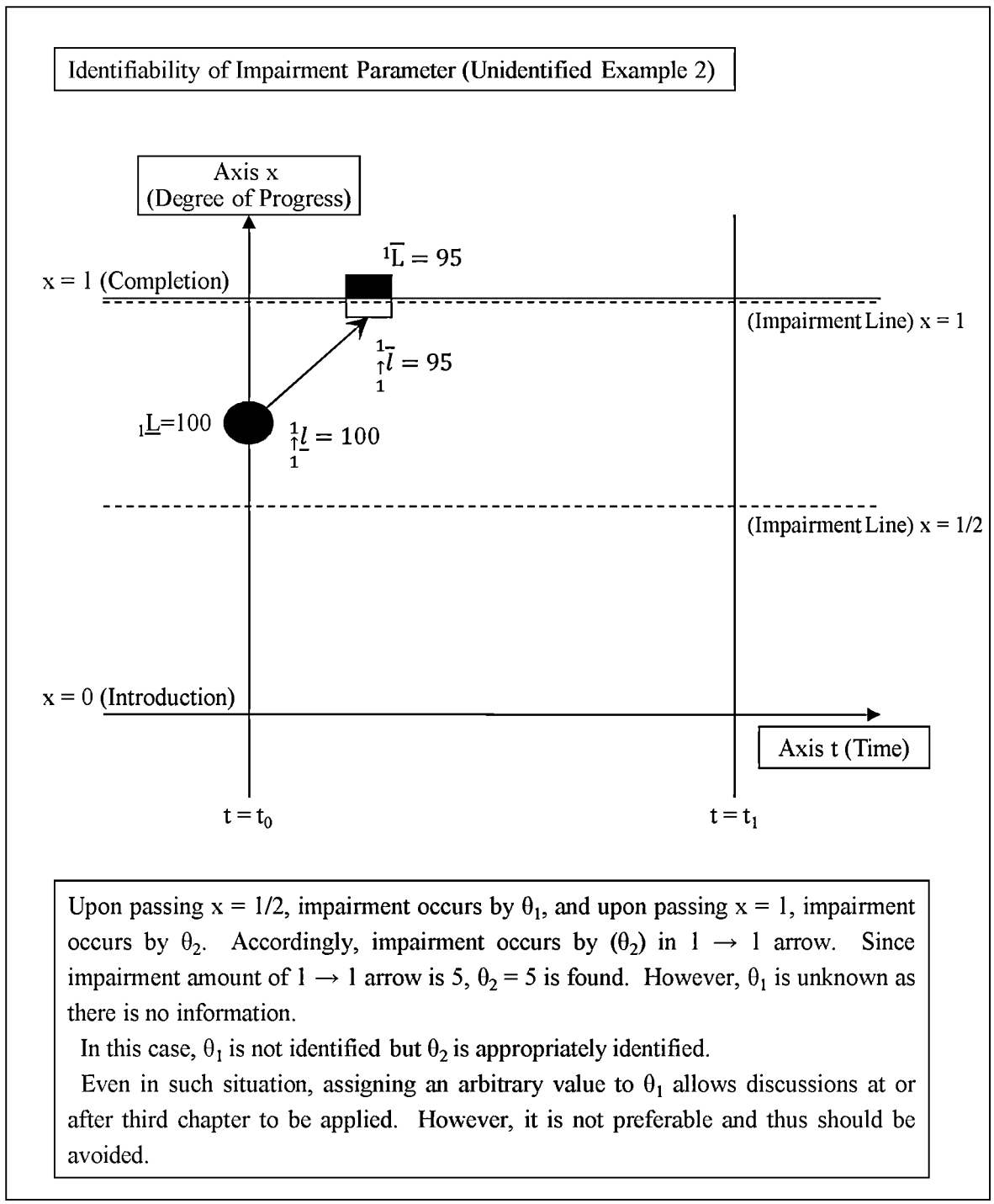
FIG. 10 is an arrow diagram illustrating identifiability of the impairment parameter (unidentified example 2).
Figure 11:
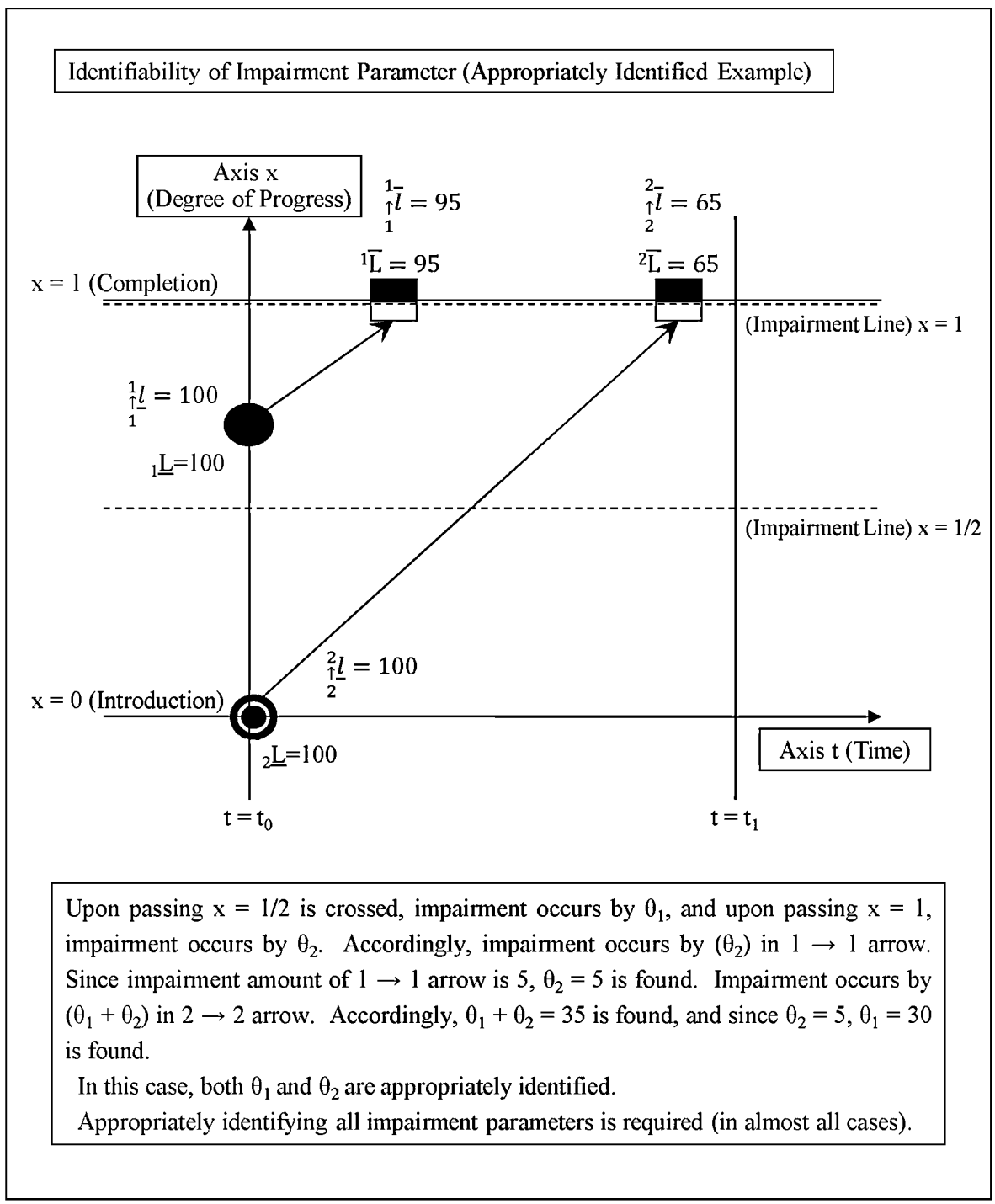
FIG. 11 is an arrow diagram illustrating identifiability of the impairment parameter (an appropriately identified example).
Figure 12:
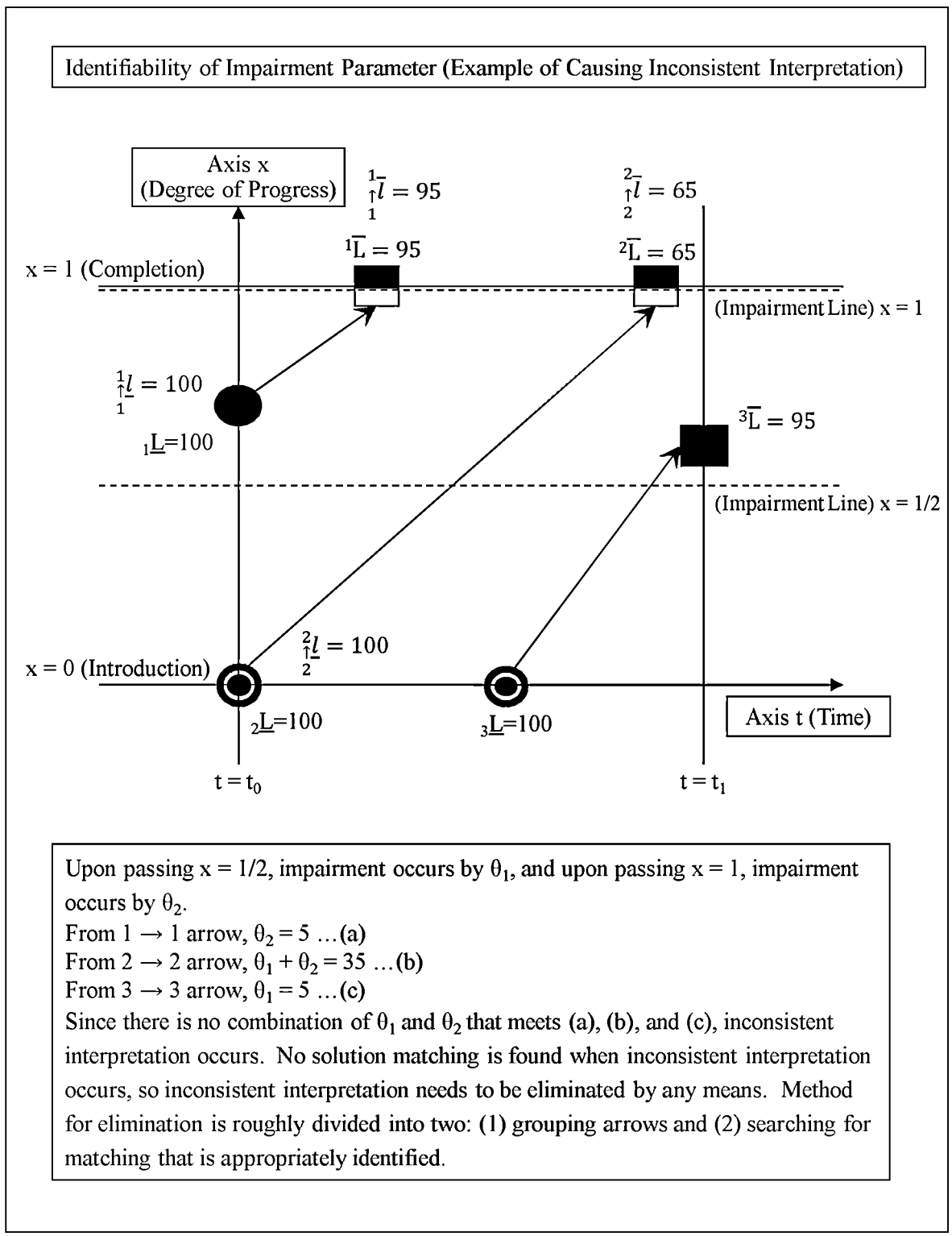
FIG. 12 is an arrow diagram illustrating identifiability of the impairment parameter (an example of causing inconsistent interpretation).
Figure 13:
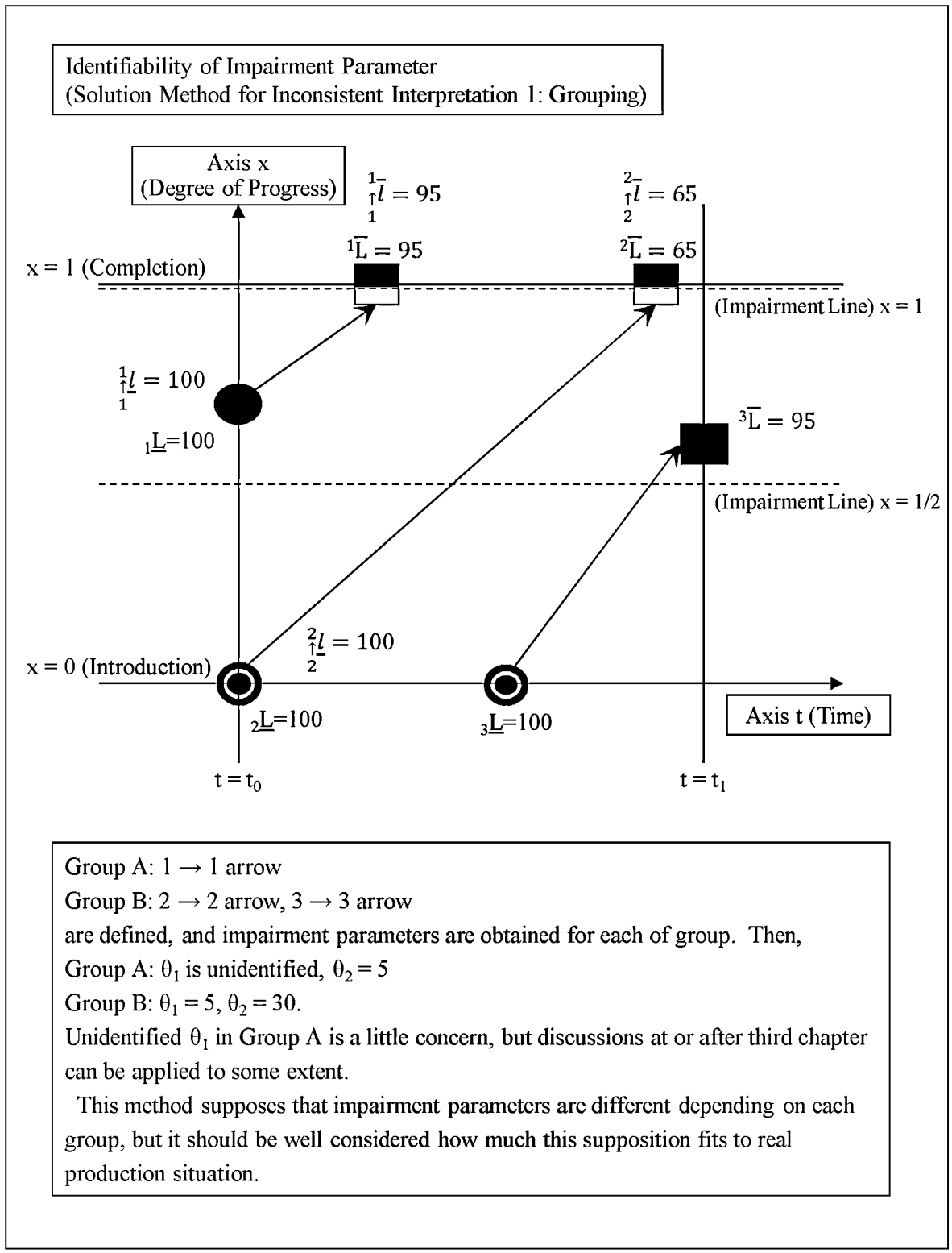
FIG. 13 is an arrow diagram illustrating identifiability of the impairment parameter (solution for inconsistent interpretation 1: grouping).
Figure 14:
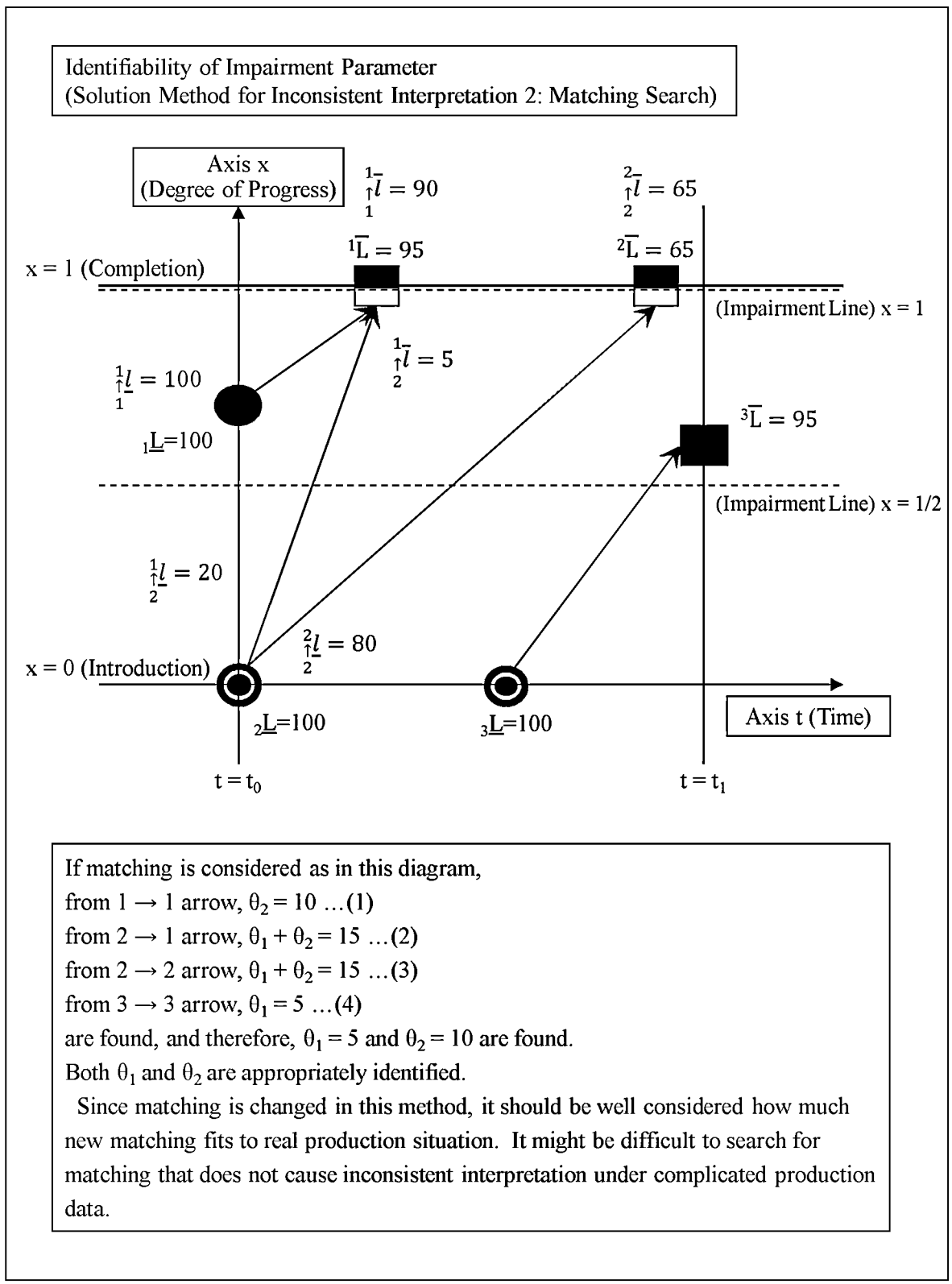
FIG. 14 is an arrow diagram illustrating identifiability of the impairment parameter (solution for inconsistent interpretation 2: matching search).

FIG. 8A is an arrow diagram illustrating an example (the first-in first-out method) wherein the impairment parameter changes by matching (pattern 1). FIG. 8B is an arrow diagram illustrating an example wherein the impairment parameter changes by matching (pattern 2). FIG. 9 is an arrow diagram illustrating identifiability of the impairment parameter (unidentified example 1). FIG. 10 is an arrow diagram illustrating identifiability of the impairment parameter (unidentified example 2). FIG. 11 is an arrow diagram illustrating identifiability of the impairment parameter (an appropriately identified example). FIG. 12 is an arrow diagram illustrating identifiability of the impairment parameter (an example of causing inconsistent interpretation). FIG. 13 is an arrow diagram illustrating identifiability of the impairment parameter (solution for inconsistent interpretation 1: grouping). FIG. 14 is an arrow diagram illustrating identifiability of the impairment parameter (solution for inconsistent interpretation 2: matching search).

Example where Impairment Parameter Changes by Matching

Next, in the example, as illustrated in FIG. 8A and FIG. 8B, how the impairment parameter changes by matching is described in a case where the impairment occurs in "the pattern of impairment by the constant amount" after the impairment line is exceeded.

Example of Identifiability of Impairment Parameter

For reference, examples will be described in which the impairment parameter is "FIG. 9 and FIG. 10: unidentified (not uniquely obtained)," "FIG. 11: appropriately identified (uniquely obtained)," and "FIG. 12: inconsistent interpretation occurs".

The impairment function is the following formula.

Formula 22

$$\uparrow_i^j g'(t, x; \theta) = 0 * i + \left[\theta_1 * \delta\left(x - \frac{1}{2}\right) + \theta_2 * \delta(x - 1)\right] * j.$$

That is, at the moment when the degree of processing progress exceeds ½, the impairment occurs by the constant amount ($\theta_1$), and also at the moment when the degree of processing progress exceeds 1, the impairment occurs by the constant amount ($\theta_2$). The impairment does not occur for the elapse of time.

(Midstream Introduction Input Node and Half-Product Output Node)

Regrading the t-axis, with 0≤t≤1 set as the range of the present term, the nodes are present on the lines as follows. The beginning in-process product input node is on the line t=0, the ending in-process product output node is on the line t=1, the present term introduction input node is on the line x=0, and the present term completed product output node is on the line x=1. The nodes are basically these four kinds, but there may be nodes at other positions.

For example, if in-process product with the degree of progress of x=0.2 is purchased from outside at the timing of t=½, is introduced as is at the 20% point of the process, and the remaining processing work is performed, the coordinate of the midstream introduction input node is (t, x)=(½, 0.2).

Similarly, there may be a case where the in-process product can be sold outside even when the in-process product is in the middle of the processing work (this is referred to as a "half-finished product"). For example, if the in-process product with the degree of progress x=0.8 is sold to the outside at the timing of t=⅓, the coordinate of the half-product output node is (t, x)=(⅓, 0.8).

In a case where there is such a node, the matching becomes difficult, and therefore the matching of the node is preferably actually measured if possible.

(Matching Rule)

The matching rule is described at the end of this chapter. First, if there is an actually measured matching, naturally the matching should be performed accordingly. In a case where two or more input nodes and two or more output nodes remain after performing the actually measured matching, the matching is performed based on the matching rule determined in advance.

Representative matching rules in terms of accounting include "first-in first-out method", "average method" and "last-in first-out method". Obviously, other matching rules are acceptable as long as the rules can be strictly defined.

As a numerical example, the example in FIG. 6 is used again and supposing that the impairment is "the impairment occurs by the constant proportion of the completion amount at the completion." Since the impairment function meets the separation condition, the impairment proportion is 20 percent of the completion amount (regardless of the matching and the arrow path). Using the information of the 20 percent of the impairment proportion, the matching rule will be specifically described.

Note that the numbers of the input nodes and the output nodes are assumed to be assigned as in FIG. 6.

1) First-In First-Out Method

In this method, it is considered that the material introduced earlier is processed in priority like a belt conveyor production. Matchings of the input nodes and the output nodes (assume that the numbers are assigned in the order in FIG. 6) are determined in the order from the smallest number.

Since the arrow diagram in FIG. 7 illustrates the solution matching by the first-in first-out method, FIG. 7 is referred to.

(Work Procedure)

1-1) The material amount as much as possible is flowed on the 1→1 arrow (100→80 by the material amount).

Then, after flowing from the first input node by 100, the first input node becomes empty (at this time, 100×0.8=80 is flowed in the first output node). Since the material amount cannot be flowed from the first input node any further, the node is switched to the next second input node.

1-2) The material amount as much as possible is flowed on the 2→1 arrow (100→80 by the material amount).

Then, after flowing to the first output node by 80, the material amount of the first output node becomes 80+80=160, the first output node becomes full, and the material amount cannot be flowed to the first output node any further (at the time, the material amount is flowed from the second input node by 100). Since the material amount cannot be flowed to the first output node any further, the node is switched to the next second output node.

1-3) The material amount as much as possible is flowed on the 2→2 arrow (100→100 by the material amount).

Then, after flowing the material amount by 100→100, the second input node becomes empty and the second output node becomes full. Accordingly, both of the input node and the output node are switched to the next nodes.

1-4) The material amount as much as possible is flowed on the 3→3 arrow (100→100 by the material amount).

Then, after flowing the material amount by 100→100, the third input node becomes empty and the third output node becomes full. Since there is no next input node or next output node, the matching ends.

1-5) Whether the matching condition is met is checked.

With the first-in first-out method, in the arrow having the maximum numbers (an I→J arrow; the 3→3 arrow in the example), if the input node becomes empty and the output node becomes full at the same time, the matching condition is met.

The following is the summary.

(Solution Matching by First-In First-Out Method)

1-a) Matching Rule: First-In First-Out Method 1-b) Arrow path: any given path (Note in this case as well, there is a possibility that the path needs to be identified in the calculation at or after the third chapter. In the case, some sort of identification, for example, a "straight line" is required. Obviously, the arrow may be curved like the 3→3 arrow in FIG. 7, or may be appropriately determined one by one (at least in terms of mathematical calculation).

1-c) Impairment parameter: the 20 percent of the completion amount is impaired.

Table 4 is a table showing the values in this case.

TABLE 4

| Arrow Name (Arranged in the Order of Determining Matching) | Material Amount to be Flowed out → Material Amount to be Flowed in |
|---|---|
| 1 → 1 Arrow | 100 → 80 |
| 2 → 1 Arrow | 100 → 80 |
| 2 → 2 Arrow | 100 → 100 |
| 3 → 3 Arrow | 100 → 100 |

2) Last-In First-Out Method

In this method, it is considered that the material introduced later is processed in priority. In almost all cases, matching different from the real production method is performed. Assume that the numbers are assigned in the order in FIG. 6, the matching is determined in the order from the smallest number for the input nodes and in the order from the largest number for the output nodes. Since the specific work procedure is similar to that of the first-in first-out method, it is omitted.

(Solution Matching by Last-In First-Out Method)

2-1) Matching rule: last-in first-out method 2-2) Arrow path: any given path 2-3) Impairment parameter: 20 percent of the completion amount is impaired.

Table 5 is a table showing an example in this case.

TABLE 5

| Arrow Name (Arranged in the Order of Determining Matching) | Material Amount to be Flowed out → Material Amount to be Flowed in |
|---|---|
| 1 → 3 Arrow | 100 → 100 |
| 2 → 2 Arrow | 100 → 100 |
| 2 → 1 Arrow | 100 → 80 |
| 3 → 1 Arrow | 100 → 80 |

3) Average Method

The method is a method in which the material amounts are flowed to the respective output nodes at the same ratio from all input nodes. In the example of this time, the material amounts are flowed with the ratio of 2:1:1 to the first output node: the second output node: the third output node.

(Solution Matching by Average Method)

1) Matching rule: average method

2) Arrow path: any given path

3) Impairment parameter: 20 percent of the completion amount is impaired.

Table 6 is a table showing an example in this case.

TABLE 6

| Arrow Name (In the average method, the material amounts of all arrows are simultaneously determined.) | Material Amount to be Flowed out → Material Amount to be Flowed in |
|---|---|
| 1 → 1 Arrow | 50 → 40 |
| 1 → 2 Arrow | 25 → 25 |
| 1 → 3 Arrow | 25 → 25 |
| 2 → 1 Arrow | 100 → 80 |
| 2 → 2 Arrow | 50 → 50 |
| 2 → 3 Arrow | 50 → 50 |
| 3 → 1 Arrow | 50 → 40 |
| 3 → 2 Arrow | 25 → 25 |
| 3 → 3 Arrow | 25 → 25 |

Thus, if the impairment function meets the separation condition, the impairment parameter is uniquely determined regardless of the matching, and therefore the solution matching by each matching rule can be easily obtained.

However, in a case where the impairment function does not meet the separation condition, since the impairment parameter changes by matching, obtaining the solution matching is difficult. For example, in the above-described example of the first-in first-out method, the reason why the first input node being empty can be calculated at the time of flowing 100→80 in the 1→1 arrow is that it has been known that the impairment parameter is 20 percent, and if the value of the impairment parameter is unknown, like 100→?, it cannot be determined as to how many percents of the material amount flow into the first output node. In this case, the timing for switching nodes cannot be determined because the timing the input node becomes empty and the timing the output node becomes full cannot be determined.

This makes the work procedure by the first-in first-out method almost impossible. The same problem occurs also in the last-in first-out method.

To perform the first-in first-out method and the last-in first-out method under the condition of not meeting the separation condition, the work procedure becomes as follows.

1) The smallest value of the impairment parameter is used for substitution within a range of a domain that the impairment parameter can take in theory. In the example of FIG. 6, the impairment parameter is the constant proportion ($\Theta$) of the completion amount, and therefore the domain is $0 \leq \Theta \leq 1$. Accordingly, $\Theta=0$ (the impairment proportion is 0 percent, that is, the impairment does not occur at all).

2) The matching is performed in accordance with the designated matching rule (for example, the first-in first-out method).

3) Whether the produced matching meets the matching condition is determined. If the matching condition is met, it is a solution matching, and if the matching condition is not met, it is not a solution matching.

4) The value of the impairment parameter $\Theta$ is slightly increased (for example, $\Theta=0.1$, the impairment proportion is 10 percent), the matching is performed again and whether the matching condition is met is determined. Hereinafter, the process is repeated.

In short, the work procedure determines whether the values of all possible impairment parameters θ meet the matching condition one by one.

If there are plurality of solution matchings, the solution matching considered to fit to the real production situation most is selected with reference to information such as the reality level or the value of the impairment parameter.

Figure 15:
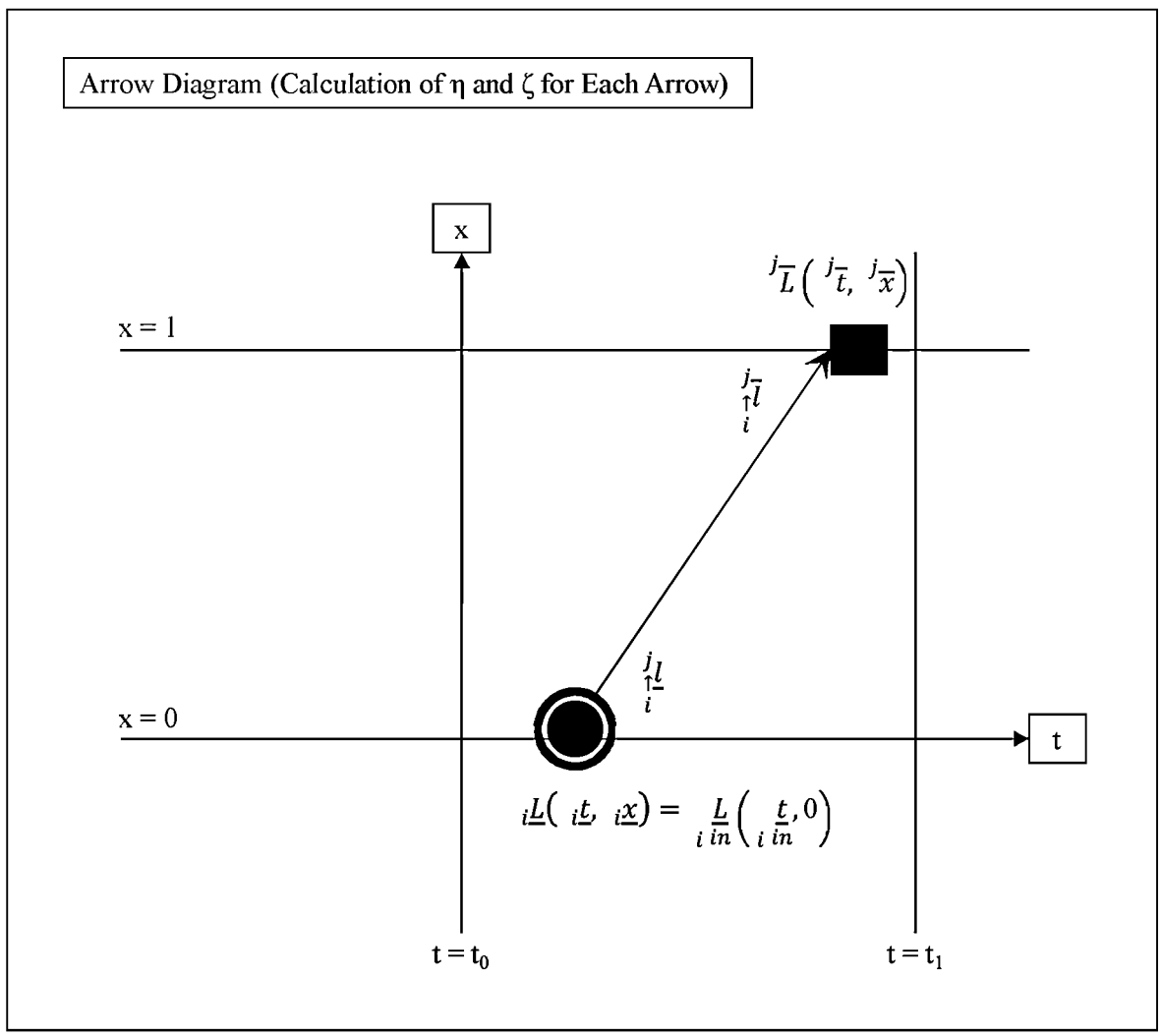
FIG. 15 is an arrow diagram when a processing work conversion amount $\eta$ and a material introduction conversion amount $\zeta$ of each of arrows are calculated.

Third Chapter: Calculation of Processing Work Conversion Amount η and Material Introduction Conversion Amount ζ for Each Arrow FIG. 15 is an arrow diagram of calculating a processing work conversion amount η and a material introduction conversion amount ζ for each arrow.

After the solution matching is obtained, next, in accordance with the solution matching, the processing work conversion amount η and the material introduction conversion amount ζ are calculated for each arrow.

In the arrow diagram illustrated in FIG. 15, the input node (the input node on the line of x=0) representing the starting point introduction is denoted by a double circle in some cases, and further denoted by "in" at the below of the character in some cases.

The starting point introduction node and the present term introduction node have different concepts. While the starting point introduction node means the node on the line of x=0, the present term introduction node means the node at which the introduction is performed at the starting point in the present term, that is, only the node on x=0 and $t_0 \leq t \leq t_1$. That is, the node where the introduction is performed at the starting point in the previous term is the starting point introduction node but is not the present term introduction node.

The processing work conversion amount η and the material introduction conversion amount ζ, which are distribution references of a cost generated in the present term, are calculated. This calculation is a calculation for each arrow or for each input node (the present term introduction node), and therefore for ease of seeing the diagram, FIG. 15 illustrates only an i→j arrow.

The processing work includes various kind of works, such as a machine work and a manual work, and there are variety of patterns of costs generated by the processing works. Here, the k-th processing work conversion amount introduced in the i→j arrow is defined by the following formula.

Formula 23

$$\overset{j}{\underset{i}{\uparrow}} \eta_k = \int_{(_iL,_ix)}^{(^jt,^jx)} \overset{j}{\underset{i}{\uparrow}} l(t,x) * f'_k(t,x) \cdot dr. \tag{3.1}$$

Note that $f'_k$ indicates a processing work introduction amount function representing the instantaneous processing work introduction amount of the k-th work. $f'_k$ does not include any unknown parameter.

Simple examples of $f'_k$ are shown below.

Formula 24

$$f'_k = 0*i + 1*j, \tag{3.2}$$

$$f'_k = 0*i + \delta(x-a)*j, \tag{3.3}$$

$$f'_k = 1*i + 0*j. \tag{3.4}$$

Formula (3.2) is a work introduced as the degree of progress x proceeds, and the most general processing works have this pattern. Formula (3.3) is a work introduced only at a specific degree of progress, corresponding to, for example, an inspection performed at a specific degree of progress.

The pattern in which a work is introduced as the time t passes is Formula (3.4) corresponding to, for example, a fixed cost, such as depreciation. However, for the purpose of cost management, even in the case of the fixed cost, there is a possibility that the calculation with the format of Formula (3.2), not Formula (3.4), is better, and therefore it depends on business decision of a company as to how it should proceed.

In terms of mathematical calculation, even $f'_k$ in which t and x are more complicatedly involved can be calculated, but interpretation of the meaning of such $f'_k$ would be difficult.

In detail, as the definition of $$\overset{j}{\underset{i}{\uparrow}} \eta_k,$$

a definition other than Formula (3.1) is possible. For example, in a case where $$\overset{j}{\underset{i}{\uparrow}} \eta_k$$

is not related to the magnitude of the material amount, there may be a case where:

Formula 25

$$\overset{j}{\underset{i}{\uparrow}} \eta_k = \int_{(_iL,_ix)}^{(^jt,^jx)} f'_k(t,x) \cdot dr \tag{3.5}$$

is better to be used.

For example, at a restaurant, a work of washing a frying pan used for cooking is considered. It is assumed that the frying pan is big, and the frying pans having the same size are used regardless of how many orders are placed. Additionally, it is assumed that the frying pan is always washed each time that the cooking ends. At this time, labor for the work of washing the frying pan does not change regardless of how many dishes are cooked (labor for washing after cooking for one person and labor for washing after cooking for three persons do not differ. In the case, Formula (3.5) unrelated to the amount of foodstuffs to be introduced is more appropriate.

To speak further regarding washing the frying pan, a factor that directly affects the labor is what is introduced as the foodstuff. In a case of a foodstuff with a lot of fat, labor for the washing increases, and in a case of a foodstuff that is almost free from fat, the labor for washing is considerably reduced. In this case, calculating $$\overset{j}{\underset{i}{\uparrow}} \eta_k$$

with different weights given to different introduced foodstuffs is appropriate. However, since only the single material model is considered in this chapter, the argument is omitted. The point will be discussed in details in the seventh chapter.

The material introduction conversion amount is calculated as follows. The material introduction has two patterns: 1) introduction at the process starting point and 2) additional introduction in the middle of the process.

1) In the case of the material introduced at the process starting point, the introduction conversion amount during the cost accounting period is the material amount of the present term introduction input node itself. That is, $\zeta$ regarding the present term introduction input node is actually measured with the production data.

Since $$_i\underline{\zeta}_{in}$$

assigned to the i-th present term introduction input node is actually measured directly, it is distributed to each arrow at a ratio of $$_i\underline{L}_{in}$$

Thus, $$_i^j\underline{\zeta}_{in}$$

is calculated (to speak more straightly, in the case of the present term introduction input node, $$_i^j\underline{\zeta}_{in} = {}_i^j\underline{L}_{in}$$

is met).

In the case of the beginning in-process product node, since the starting point introduction is performed in a period earlier than the present term, the material is not introduced at the starting point of the present term. Accordingly, in the case of the beginning in-process product input node, $$_i^j\underline{\zeta}_{in} = 0$$

is established. The summary is as follows.

Formula 26

$$_i^j\underline{\zeta}_{in} = \begin{cases} 0 & \text{(the beginning in-process product input node)} \\ _i^j\underline{L}_{in} & \text{(the present term introduction input node)} \end{cases}$$

When the material is additionally introduced, the introduction conversion amount for the amount of the additional introduction needs to be further obtained. This is calculated with the following formula.

Formula 27

$$_i^j\underline{\zeta}_{arrow} = \int_{(jL,jx)}^{(j\tau,jx)} {}_i^j h'(t, x) \cdot dr. \qquad (3.6)$$

The notation "arrow" is added in order to clearly indicate that it is traced to the arrows.

$$_i^j\underline{\zeta}_{total}$$

of the i→j arrow is the sum of it.

Formula 28

$$_i^j\underline{\zeta}_{total} = {}_i^j\underline{\zeta}_{in} + {}_i^j\underline{\zeta}_{arrow}. \qquad (3.7)$$

The underscore attached to and indexes such as "in", "arrow", and "total" are omitted in some cases where it is obvious.

To describe it in detail, the reality level can be considered for $\eta$ and $\zeta$. $\eta$ and $\zeta$ obtained by calculation using, for example, Formula (3.1) and Formula (3.6) are determined to be reality level 2. If $\eta$ and $\zeta$ are actually measured, they are determined to be the reality level 1. Obviously, regarding $\zeta$, at least $\zeta$ for the amount of present term introduction is actually measured, and therefore it may be said that $\zeta$ is probably actually measured if the material is not additionally introduced.

Regarding $\eta$, for example, a case is considered in which a part of the products is sampled from a lot and product inspection is performed. At this time, if the inspection quantity is indicated by $\eta$, this can be actually measured for each arrow, and in that case, it is determined to be the reality level 1. In this case, deviations between inspection quantities of respective arrows can also be recognized.

In contrast to this, for example, if $\eta$ is obtained through the calculation with Formula (3.1), it is determined to be reality level 2.

In a general assembly factory, such as an automobile factory, various components are mounted to the starting point introduction material as the base to complete the product. In this case, if the material amount of the starting point introduction material as the basis is measured in units of "number of pieces," $\eta$ $\zeta$ and are determined as follows.

Components Mounted during Manufacturing: Mounting a component does not mean the increase in the number of completed products (even if four tires are mounted to one chassis, the number of vehicles does not increase to five but is still one). Therefore, the additional introduction component does not change the material amount (the number of vehicles), the calculation is performed not as $\zeta$ but $\eta$, that is, the calculation is performed while regarding it as the processing work introduced at the degree of processing progress which is at the timing of mounting the component.

However, assume that, in the manufacturing process, some processing work B is performed on a "component A mounted during manufacturing." Assume that a cost generated in the work B is not same in all chassis but is in proportion to a mass (kg) of the component A. In this case, since the material amount (kg) information of the component A is required to calculate an introduction amount ηB in the processing work B, as interpreted in the seventh chapter, the material amount of the material needs to be separately grasped in the chassis (the number of pieces) and the component A (kg). Since the introduction of the component A changes the material amount (kg) of the component A, it cannot be calculated as η but is calculated as ζA.

Starting point introduction material as a basis: This is calculated as ζ. However, in an assembly factory, one cannot assume any situation in which the starting point introduction material as the basis is additionally introduced in the middle of the process. That is, Formula (3.6) is found as follows.

Formula 29

$$\uparrow_{i\ arrow}^{j} \zeta = 0$$

After all, only $$\left(\uparrow_{i\ in}^{j} \zeta\right)$$

or the starting point introduction material needs to be considered, and moreover this has been already calculated at the time of obtaining the solution matching of the production data, and therefore additional calculation is not required.

Processing Work: Obviously Calculated as η

Thus, the calculation of ζ is not required for all materials. The calculation of ζ using Formula (3.6) is required only in a case wherein 1) the material amount is measured with a unit other than "number of pieces" (for example in the unit of "kg"), and 2) the material is additionally introduced.

Even in the case where the material amount is evaluated with the unit of "kg", if the material is introduced only at the starting point and is not additionally introduced, the required $$\left(\uparrow_{i\ in}^{j} \zeta\right)$$

value has been obtained at the time of obtaining the solution matching.

Under certain conditions, η and ζ are uniquely determined with respect to any given solution matching. That is, the separation theorem and the separation condition are present for η and ζ.

Since η relates to the form of Formula (3.1), even if the separation theorem is met in the impairment parameter, it does not mean that the separation theorem of η is met. Details of the separation condition for η is omitted.

With the case of ζ, since the present term introduction node $$\left(\uparrow_{i\ in}^{j} \zeta\right)$$

has been already actually measured with the production data, ζ is originally unrelated to the matching, and the additional introduction $$\left(\uparrow_{i\ arrrow}^{j} \zeta\right)$$

relates to only the impairment parameter θ and the additional introduction parameter φ from Formula (3.6). Details of the separation condition for θ and φ and the separation condition for ζ are omitted.

Fourth Chapter: Distribution of Cost Based on η and ζ

The costs generated in the present term are distributed to respective arrows (in the case of the present term introduction material, the cost is also distributed to the present term introduction node). For the distribution, η and ζ are usually used. In relation to this, efficiency is also considered.

Efficiency of material introduction and processing work in the model of "η(ζ)→cost" can be defined with the following formula. Note that "η(ζ)" means "η and ζ."

Formula 30

$$\uparrow_{i\ p/\eta}^{j} pro^{k} = \frac{\uparrow_{i\ pro}^{j} p_k}{\uparrow_{i}^{j} \eta_k}, \quad (4.1)$$

$$\uparrow_{i\ p/\zeta}^{j} mat = \frac{\uparrow_{i\ mat}^{j} p}{\uparrow_{i\ total}^{j} \zeta}. \quad (4.2)$$

Note that "p" at the center of $$\uparrow_{i\ pro}^{j} p_k$$

indicates "cost", "pro" indicates "processing," and "mat" indicates "material."

While Formula (4.1) and Formula (4.2) show efficiency of the arrows, if the efficiency need not be evaluated for each arrow, only an evaluation for an entire set of the arrows in the present term may be sufficient. In this case, the following formula is established.

Formula 31

$$\pi_{pro^k/\eta} = \frac{\sum_k \sum_j \uparrow_{i\ pro}^{j} p_k}{\sum_k \sum_j \uparrow_{i}^{j} \eta_k}, \quad (4.3)$$

$$\pi_{mat/p/\zeta} = \frac{\sum_k \sum_j \uparrow_{i\ mat}^{j} p}{\sum_k \sum_j \uparrow_{i\ total}^{j} \zeta}. \quad (4.4)$$

To describe the notation method, the double sigma in the denominator of Formula (4.3) or Formula (4.4) means "all arrows". Although written as "$\Sigma_i \Sigma_j$," it does not always mean that I×J pieces of arrows exist. Depending on cases, it is described as "$\Sigma\Sigma_{all\ arrows}$".

(Distribution Method of Beginning In-Process Product Node Cost)

The cost of the i-th beginning in-process product node is distributed to the i→j arrow at the ratio of $$j$$
$$\uparrow L.$$
$$i$$

Note that all of the costs of the beginning in-process product node are costs generated in periods earlier than the present term.
(Distribution Method of Material Cost and Processing Cost Introduced in Present Term)

The costs generated in the present term are traced to the present term introduction nodes and the arrows, and the costs also have reality levels.

1) Reality level 1 (an actually measured cost): The cost generated in the present term introduction node or generated in respective arrows is actually measured. In this case, since the costs are directly and actually measured, there is no necessity of calculating the costs again.

Therefore, none of the concepts such as the arrow diagram, the cost accounting space, and η and ζ, are unnecessary. However, in this case as well, obtaining η and ζ allows evaluating efficiency for each present term introduction node or each arrow.

Such a case rarely happens, excepting cases where an amount of money per order is large, such as a custom home, or job-order production is performed. To speak further, in this case as well, a problem of distribution remains in some costs because costs such as general and administrative expenses do not occur per arrow.

2) Reality level 2 (Cost Averaged and Distributed): The processing work cost generated in the present term is distributed at the ratio of η and the material introduced in the present term is distributed at the ratio of ζ to each of the present term introduction nodes and the arrows.

In this case, the same efficiency is assumed in all present term introduction nodes and all arrows. That is, only the efficiency of merely the entire factory in the present term is found, not for each present term introduction node or each arrow.

After the costs are distributed to the respective arrows (note that the costs of the input nodes are appropriately distributed to the respective arrows), the costs are totalized at the output node toward which the arrows are directed. The cost totalized at the output node is the cost of the output node.

If the output node is a completed product node, the cost is the completed product cost. In the case of an ending in-process product node, the totalized amount will be the cost of a beginning in-process product node in the next term.
(Model of η(ζ)→Resource Consumption Amount (q)→Cost (p))

In order to evaluate the operation efficiency more precisely, the model of "η(ζ)→resource consumption amount→cost" needs to be considered. An example of the resource consumption amount is a processing work period when $\eta_k$ is a processing work conversion amount and a material consumption amount when it is ζ, and so on. Actual measurement of the consumption amount of the resource corresponding to $\eta_k$ and ζ allows for more appropriate and efficient evaluation.

Specifically, if the efficiency is poor, it can be determined whether the cause is a substantial rise in the resource price or an increase in the resource consumption amount. The "η(ζ)→cost" model cannot identify it.

Specific calculation methods slightly vary depending on whether the resource consumption amount (q) is 1) measured for each arrow or 2) measured only for an entire set of the arrows.

In the case of 1), η(ζ) for each arrow and q for each arrow have been obtained. The cost (p) is distributed to each of the arrows based on the ratio q for each arrow. In this case, the cost distribution does not require information of η(ζ) for each arrow. However, for evaluation of efficiency, the information of η(ζ) is used, and therefore the calculation of η(ζ) is not meaningless.

In the case of 2), q for each arrow needs to be estimated. This simply distributes q of the entire present term to each of the arrows based on the ratio of η(ζ) for each arrow. After that, the costs p are distributed based on the ratios of q for each arrow.

Fifth Chapter: First Part for Evaluation for Efficiency (Standard Cost Accounting) (η and ζ)

To evaluate the efficiency of production, it is effective to determine a target cost (this is referred to as a standard cost) in a production cost of products and compare the target cost with the actual cost for analysis. Methods for comparison and analysis are considered below.

Although the target cost and actual cost can be compared for each arrow, if this is not necessary, they may be compared by for the entire set of the arrows. In this time, analysis for each arrow, which is basic, is performed.

Figure 16:
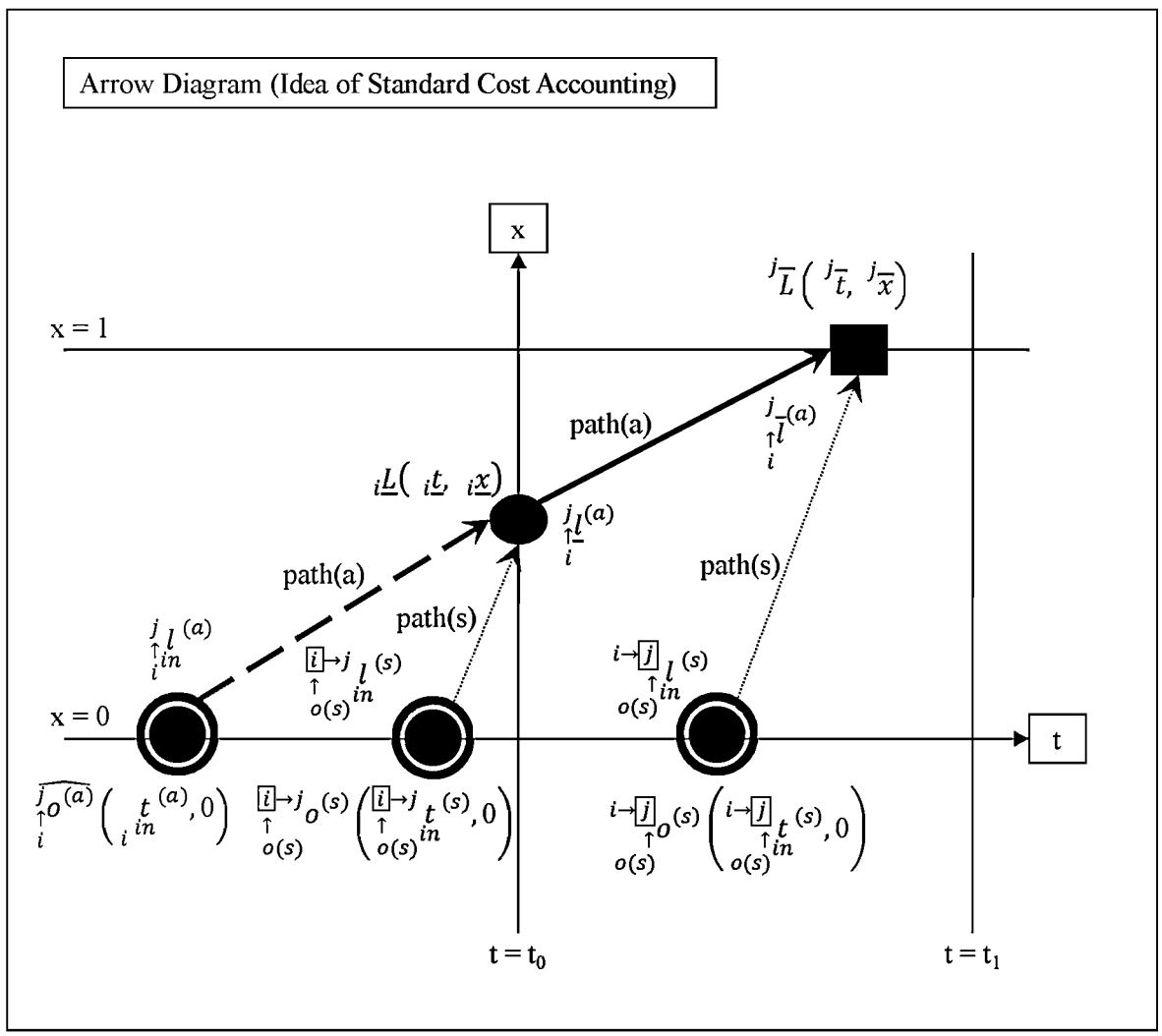
FIG. 16 is an arrow diagram illustrating an idea of standard cost accounting.

FIG. 16 is a most basic arrow diagram for standard cost accounting. The beginning in-process product input node corresponds to the present term completed product node.

The arrow indicated by the thick solid line is the i→j arrow as the analysis target. This is referred to as an "actual i→j arrow." Since it is an actual arrow, the notation (a: actual) is attached to the path.

The arrow indicated by the thick dashed line represents the (estimated) actual arrow before the beginning in-process product node is generated. This is referred to as, for example, an "(estimated) actual o→i arrow" or an "(estimated) actual arrow to input node." This is drawn by the dashed line because the arrow is an estimated arrow. The hat "^" attached to the starting point introduction node $$\hat{i}$$

of the arrow represents that the arrow is estimated.

The reason why the arrow is estimated is that the cost accounting is basically assumed to be performed only with "data obtainable in the present term." However, the "(estimated) actual o→i arrow" is an arrow regarding the past period, and therefore is not the present term data. Therefore, the "(estimated) actual o→i arrow" is merely recognized to be an arrow estimated from the present term data.

Obviously, as long as the data is accurately maintained every term, the data of the past period is obtainable, and in that case, the "actual o→i arrow" can be actually measured instead of being estimated. In this case, it is considered that the "o→i arrow" can be recognized as the actual arrow, not the estimated arrow, but in that case, it is considered that all other elements, such as the impairment parameter, probably need to be replaced by the past actual data.

Note that when the beginning in-process product node is a node generated by joining a plurality of arrows in the past term, the "actual o→i arrow" itself does not exist (tracking the arrow back leads to two or more starting point introduction nodes). In this case as well, the "(estimated) actual o→i arrow" can be obtained.

The arrows indicated by the thin dotted lines represent standard arrows generated when the nodes (the i-th input node or the j-th output node) are manufactured at standard operation efficiency.

They are referred to as a "standard o→input i arrow of i→j arrow" and a "standard o→output j arrow of i→j arrow." However, naming for the sake of precise identification would hinder understanding, so there may be a case where names are appropriately given each time, for example, a "standard arrow to input node" and a "standard arrow to output node."

Since the arrow is a standard arrow, the notation (s: standard) is attached to the path. A level of the standard operation efficiency is set as a target value by the company and is therefore determined in advance. Therefore,

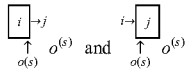

of the starting point introduction nodes are not estimated values but are nodes determined as the targets. Accordingly, the hat is not attached.

(Change in Definitions of η(a) and ζ(a))

The introduction of the starting point introduction node in a past term allows Formula (2.3), which represents the material amount on the i→j arrow, to be rewritten as follows. Note that in the following discussion, for clarification between the actual target and the standard target, (a) and (s) are attached for distinction.

Formula 32

$$\uparrow_i^j I^{(a)}(t^*, x^*) = \uparrow_i^j I^{(a)}(_iL, _ix) - \tag{2.3}$$

$$\int_{(_iL,_ix)}^{(t^*,x^*)} \uparrow_i^j g'(t, x; \theta^{(a)}, \phi^{(a)}) \cdot dr + \int_{(_iL,_ix)}^{(t^*,x^*)} \uparrow_i^j h'(t, x; \theta^{(a)}, \phi^{(a)}) \cdot dr,$$

$$= \tag{5.1}$$

$$\uparrow_{i\,in}^j I^{(a)} - \int_{(t_{j\,in}^{(a)},0)}^{(t^*,x^*)} \uparrow_i^j g'(t, x; \theta^{(a)}, \phi^{(a)}) \cdot dr + \int_{(t_{j\,in}^{(a)},0)}^{(t^*,x^*)} \uparrow_i^j h'(t, x; \theta^{(a)}, \phi^{(a)}) \cdot dr.$$

However, the coordinate (t*, x*) is a point on the o(a)→i→j arrow. Formula (2.3) is the formula starting from the i-th input node and Formula (5.1) is the formula starting from the starting point introduction node of the i-th input node. Obviously, the material amount on the o(a)→i arrow is merely imaginary.

Additionally, the calculation formula (3.1) for η is rewritten as follows.

Formula 33

$$\uparrow_i^j \eta_k^{(a)} = \uparrow_i^j \overline{\eta}_k^{(a)} - \uparrow_i^j \underline{\eta}_k^{(a)}. \tag{5.2}$$

Note that:

$$\uparrow_i^j \underline{\eta}_k^{(a)} :$$

Total processing work conversion amount introduced to generate the input node of the i→j arrow $$\uparrow_i^j \overline{\eta}_k^{(a)} :$$

Total processing work conversion amount introduced to generate the output node of the i→j arrow Their specific equations are as follows.

Formula 34

$$\uparrow_i^j \underline{\eta}_k^{(a)} = \int_{\left(t_{j\,in}^{(a)},0\right)}^{(_iL,_ix)} \uparrow_i^j I^{(a)}(t, x) * f_k'(t, x) \cdot dr, \tag{5.3}$$

$$\uparrow_i^j \overline{\eta}_k^{(a)} = \int_{\left(t_{j\,in}^{(a)},0\right)}^{(^jt,^jx)} \uparrow_i^j I^{(a)}(t, x) * f_k'(t, x) \cdot dr. \tag{5.4}$$

Similarly, the calculation formula for is rewritten, but is distinguished between the present term introduction node amount and the additional introduction amount to the arrow. The target to be rewritten like Formula (5.2) is only the additional introduction amount to the arrow. That is, Formula (3.6) representing the additional introduction amount to the arrow is rewritten as follows.

Formula 35

$$\uparrow_i^j \zeta^{(a)}_{arrow} = \uparrow_i^j \overline{\zeta}^{(a)} - \uparrow_i^j \underline{\zeta}^{(a)}. \tag{5.5}$$

Note that:

$$\uparrow_i^j \underline{\zeta}^{(a)} :$$

Sum material introduction conversion amount introduced to generate the input node of the i→j arrow $$\uparrow_i^j \overline{\zeta}^{(a)} :$$

Sum material introduction conversion amount introduced to generate the output node of the i→j arrow Each of them includes the starting point introduction material. Their specific equations are as follows.

Formula 36

$$\overset{j}{\underset{i}{\uparrow}}\underline{\zeta}^{(a)} = \overset{j}{\underset{i\ in}{\uparrow}}\zeta^{(a)} + \int_{\left(\underset{i\ in}{t}^{(a)},0\right)}^{(jt_{,j}x)}\overset{j}{\underset{i}{\uparrow}}h'(t, x; \theta^{(a)}, \phi^{(a)}) \cdot dr, \quad (5.6)$$

path(a)

Formula 37

$$\overset{j}{\underset{i}{\uparrow}}\overline{\zeta}^{(a)} = \overset{j}{\underset{i\ in}{\uparrow}}\zeta^{(a)} + \int_{\left(\underset{i\ in}{t}^{(a)},0\right)}^{(jt_{,j}x)}\overset{j}{\underset{i}{\uparrow}}h'(t, x; \theta^{(a)}, \phi^{(a)}) \cdot dr. \quad (5.7)$$

path(a)

Note that $$\overset{j}{\underset{i\ in}{\uparrow}}\zeta^{(a)}$$

does not change. Therefore, a formula for $$\overset{j}{\underset{i\ total}{\uparrow}}\zeta^{(a)}$$

is as follows (in the case of the present term introduction input node).

First, in a case where the i-th input node of the i→j arrow is the beginning in-process product node, while paying attention that $$\overset{j}{\underset{i\ in}{\uparrow}}\zeta^{(a)} = 0,$$

Formula 38

$$\overset{j}{\underset{i\ total}{\uparrow}}\zeta^{(a)} = \overset{j}{\underset{i\ \overline{in}}{\uparrow}}\zeta^{(a)} + \overset{j}{\underset{i\ arrow}{\uparrow}}\zeta^{(a)} = 0 + (\overset{j}{\underset{i}{\uparrow}}\overline{\zeta}^{(a)} - \overset{j}{\underset{i}{\uparrow}}\underline{\zeta}^{(a)}) = \overset{j}{\underset{i}{\uparrow}}\overline{\zeta}^{(a)} - \overset{j}{\underset{i}{\uparrow}}\underline{\zeta}^{(a)}$$

is established.

Next, in a case where the i-th input node of the i→j arrow is the present term introduction node, while paying attention that $$\overset{j}{\underset{i\ \overline{in}}{\uparrow}}\zeta^{(a)} = \overset{j}{\underset{i}{\uparrow}}\underline{\zeta}^{(a)},$$

Formula 39

$$\overset{j}{\underset{i\ total}{\uparrow}}\zeta^{(a)} = \overset{j}{\underset{i\ \overline{in}}{\uparrow}}\zeta^{(a)} + \overset{j}{\underset{i\ arrow}{\uparrow}}\zeta^{(a)} = \overset{j}{\underset{i\ \overline{in}}{\uparrow}}\zeta^{(a)} + (\overset{j}{\underset{i}{\uparrow}}\overline{\zeta}^{(a)} - \overset{j}{\underset{i}{\uparrow}}\underline{\zeta}^{(a)}) = \overset{j}{\underset{i}{\uparrow}}\overline{\zeta}^{(a)}$$

is established. The following formula is the summary.

Formula 40

$$\overset{j}{\underset{i\ total}{\uparrow}}\zeta^{(a)}\begin{cases}\overset{j}{\underset{i}{\uparrow}}\overline{\zeta}^{(a)} - \overset{j}{\underset{i}{\uparrow}}\underline{\zeta}^{(a)} & \text{(the beginning in-} \\ & \text{process product input node),} \\ \overset{j}{\underset{i}{\uparrow}}\overline{\zeta}^{(a)} & \text{(the present term} \\ & \text{introduction input node).}\end{cases} \quad (5.8)$$

(Definitions of η(s) and ζ(s))

Next, with reference to Formulae (5.1)-(5.8), the definition of the standard (s) is considered. Targets include η and ζ, but first, (s) of η is considered. With reference to Formula (5.2), $$\overset{j}{\underset{i}{\uparrow}}\eta_k^{(s)}$$

is defined as follows.

Formula 41

$$\overset{j}{\underset{i}{\uparrow}}\eta_k^{(s)} = \overset{j}{\underset{i}{\uparrow}}\overline{\eta}_k^{(s)} - \overset{j}{\underset{i}{\uparrow}}\underline{\eta}_k^{(s)}. \quad (5.9)$$

Note:

$$\overset{j}{\underset{i}{\uparrow}}\underline{\eta}_k^{(s)}:$$

Total processing work conversion amount that needs to be introduced when the input node of the i→j arrow is generated under a standard efficiency; and $$\overset{j}{\underset{i}{\uparrow}}\overline{\eta}_k^{(s)}:$$

Total processing work conversion amount that needs to be introduced when the output node of the i→j arrow is generated under a standard efficiency.

Note that the standard efficiency here means that the impairment parameter (θ), the additional material introduction parameter (φ: phi), and the arrow path ("path") are standards (Besides, the resource price (p), the resource consumption amount (q), and in a case where a plurality of kinds of materials are introduced, for example, the material amount ratio (ψ: psi) at the starting point introduction becomes the target for standard efficiency, but this is omitted here).

The standard arrow paths are present corresponding to respective ones of input node and output node of the i→j arrow (see FIG. 16). Obviously, the material amount on the path is considered in each of the $$\boxed{i}\to j$$
$$\underset{o(s)}{\uparrow}$$

arrow and the

arrow.
Here, $${}^{j}_{i}\eta^{(s)}_{k}$$

is specifically calculated with the following formula.

Formula 42

$$\underset{i}{\overset{j}{\uparrow}}\eta^{(s)}_{k} = \int_{\left(\underset{o(s)}{\overset{i}{\uparrow}} \to j_{t}(s),0 \atop in\right)path(s)}^{(t^{\#},x^{\#})} \underset{o(s)}{\overset{i}{\uparrow}} \to^{j} l^{(s)}(t,x) * f'_{k}(t,x) \cdot dr. \quad (5.10)$$

Note that $$\underset{o(s)}{\overset{i}{\uparrow}} \to^{j} l^{(s)}(t,x)$$

is a standard material amount on the $$\underset{o(s)}{\overset{i}{\uparrow}} \to j$$

arrow path and is specifically calculated with the following formula.

Formula 43

$$\underset{o(s)}{\overset{i}{\uparrow}} \to^{j} l^{(s)}(t^{*},x^{*}) = \underset{o(s)}{\overset{i}{\uparrow}} \to^{j} l^{(s)}_{in} - \int_{\left(\underset{o(s)}{\overset{i}{\uparrow}} \to j_{t}(s),0 \atop in\right)path(s)}^{(t^{*},x^{*})} \underset{o(s)}{\overset{i}{\uparrow}} \to^{j} \quad (5.11)$$

$$g'(t,x;\theta^{(s)},\phi^{(s)}) \cdot dr + \int_{\left(\underset{o(s)}{\overset{i}{\uparrow}} \to j_{t}(s),0 \atop in\right)path(s)}^{(t^{*},x^{*})} \underset{o(s)}{\overset{i}{\uparrow}} \to^{j} h'(t,x;\theta^{(s)},\phi^{(s)}) \cdot dr,$$

$$\underset{o(s)}{\overset{i}{\uparrow}} \to^{j} l^{(s)}({}^{j}\overline{t},{}^{j}\overline{x}) = \underset{i}{\overset{j}{\uparrow}} l^{(a)}({}^{j}\overline{t},{}^{j}\overline{x}) = \underset{i}{\overset{j}{\uparrow}} \overline{l}^{(a)}. \quad (5.12)$$

Formula (5.11) includes

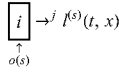

as an unknown variable that can be obtained with Formula (5.11) and Formula (5.12).

Formula 44

$$\underset{i}{\overset{j}{\uparrow}}\eta^{(s)}_{k} = \int_{\left(\underset{o(s)}{\overset{i \to j}{\uparrow}} t(s),0 \atop in\right)path(s)}^{({}^{j}\overline{t},{}^{j}\overline{x})} \underset{o(s)}{\overset{i \to j}{\uparrow}} l^{(s)}(t,x) * f'_{(k)}(t,x) \cdot dr, \quad (5.13)$$

$$\underset{o(s)}{\overset{i \to j}{\uparrow}} l^{(s)}(t^{*},x^{*}) = \underset{o(s)}{\overset{i \to j}{\uparrow}} l^{(s)}_{in} - \int_{\left(\underset{o(s)}{\overset{i \to j}{\uparrow}} t(s),0 \atop in\right)path(s)}^{(t^{*},x^{*})} \underset{o(s)}{\overset{i \to j}{\uparrow}} g'(t,x;\theta^{(s)},\phi^{(s)}) \cdot dr + \quad (5.14)$$

$$\int_{\left(\underset{o(s)}{\overset{i \to j}{\uparrow}} t(s),0 \atop in\right)path(s)}^{(t^{*},x^{*})} \underset{o(s)}{\overset{i \to j}{\uparrow}} h'(t,x;\theta^{(s)},\phi^{(s)}) \cdot dr,$$

$$\underset{o(s)}{\overset{i \to j}{\uparrow}} l^{(s)}({}^{j}\overline{t},{}^{j}\overline{x}) = \underset{i}{\overset{j}{\uparrow}} l^{(a)}({}^{j}\overline{t},{}^{j}\overline{x}) = \underset{i}{\overset{j}{\uparrow}} \overline{l}^{(a)}. \quad (5.15)$$

Similarly, $${}^{j}_{i}\eta^{(s)}_{k}$$

is also obtained.

Formula 45

$$\underset{i}{\overset{j}{\uparrow}} \zeta^{(s)}_{total} = \quad (5.16)$$

$$\begin{cases} \underset{i}{\overset{j}{\uparrow}} \overline{\zeta}^{(s)} - \underset{i}{\overset{j}{\uparrow}} \underline{\zeta}^{(s)} & \text{(the beginning in-process product input node),} \\ \underset{i}{\overset{j}{\uparrow}} \overline{\zeta}^{(s)} & \text{(the present term introduction input node).} \end{cases}$$

Next, (s) of $\zeta$ is considered. With reference to Formula (5.8), $$\underset{i}{\overset{j}{\uparrow}} \zeta^{(s)}_{total}$$

is defined as follows.

total material introduction conversion amount that needs to be introduced when the input node of the i→j arrow is generated under standard efficiency $${}_i^j \overline{\zeta}^{(s)}:$$

Total material introduction conversion amount that needs to be introduced when the output node of the i→j arrow is generated under the standard efficiency Here, $${}_i^j \underline{\zeta}^{(s)}$$

is specifically calculated with the following formula.

Formula 46

$$_i^j \underline{\zeta}^{(s)} = {}_{o(s)}^{\boxed{i \rightarrow j}} l^{(s)}_{in} + \int_{\left( {}_{o(s)}^{\boxed{i \rightarrow j}} t^{(s),0}_{in} \right)_{path(s)}}^{(iL_i x)} {}_{o(s)}^{\boxed{i \rightarrow j}} h'(t, x; \theta^{(s)}, \phi^{(s)}) \cdot dr \quad (5.17)$$

Although $${}_{o(s)}^{\boxed{i \rightarrow j}} l^{(s)}_{in}$$

is required for calculation of Formula (5.17), it has already been calculated with Formula (5.11) and Formula (5.12).

Similarly, $${}_i^j \overline{\zeta}^{(s)}$$

is also obtained.

Formula 47

$$_i^j \overline{\zeta}^{(s)} = {}_{o(s)}^{i \rightarrow \boxed{j}} l^{(s)}_{in} + \int_{\left( {}_{o(s)}^{i \rightarrow \boxed{j}} t^{(s),0}_{in} \right)_{path(s)}}^{(j\overline{\tau}, j\overline{x})} {}_{o(s)}^{i \rightarrow \boxed{j}} h'(t, x; \theta^{(s)}, \phi^{(s)}) \cdot dr \quad (5.18)$$

Although $${}_{o(s)}^{i \rightarrow \boxed{j}} l^{(s)}_{in}$$

is required for calculation of Formula (5.18), it has already been calculated with Formula (5.14) and Formula (5.15).

To clarify that all parameters including the path are (s), $${}_i^j \eta_k^{(s)}$$

and $${}_i^j \zeta^{(s)}_{total}$$

thus defined are denoted as $${}_i^j \eta_k^{(s)} = {}_i^j \eta_k \begin{pmatrix} \theta(s) \\ \phi(s) \\ path(s) \end{pmatrix} \text{ and } {}_i^j \zeta^{(s)}_{total} = {}_i^j \zeta \begin{pmatrix} \theta(s) \\ \phi(s) \\ path(s) \end{pmatrix}$$

in some cases. Similarly, $${}_i^j \eta_k^{(a)} = {}_i^j \eta_k \begin{pmatrix} \theta(a) \\ \phi(a) \\ path(a) \end{pmatrix} \text{ and } {}_i^j \zeta^{(a)}_{total} = {}_i^j \zeta \begin{pmatrix} \theta(a) \\ \phi(a) \\ path(a) \end{pmatrix}.$$

Further, similarly, the material amount is denoted as $l^{(s)} =$ $$l^{\begin{pmatrix} \theta(s) \\ \phi(s) \\ path(s) \end{pmatrix}} \text{ and } l^{(a)} = l^{\begin{pmatrix} \theta(a) \\ \phi(a) \\ path(a) \end{pmatrix}}$$

in some cases.

η in which (a) and (s) are mixed, such as $${}_i^j \eta_k \begin{pmatrix} \theta(a) \\ \phi(a) \\ path(s) \end{pmatrix} \text{ and } {}_i^j \eta_k \begin{pmatrix} \theta(s) \\ \phi(s) \\ path(a) \end{pmatrix},$$

can also be considered.

η in which (a) and (s) are thus mixed is used for variance analysis.

As the specific calculation, with reference to Formula (5.10) to Formula (5.15), it is only necessary to replace the parameter from (s) to (a) appropriately. Note that replacement of the path means changing the integration path. Under the path(a), since the arrow o(a)→the i arrow in the past term is basically involved as the integration path, an odd calculation may be resulted unless $${}_i^j \overline{\zeta}^{(s)}$$

is accurately estimated.

A specific calculation method is as follows. First, it is hard to keep writing the combinations of (a) and (s) of the various parameters on the upper rights of all signs, and therefore are substituted by some sign, for example, $$\begin{pmatrix} \theta(a) \\ \phi(s) \\ path(s) \end{pmatrix} = (\#).$$

Next, under the combination of (#), a material amount function $1^{(\#)}(t^*, x^*)$ of each arrow is obtained. In the case of the path(s), the number of arrows is two, but in the case of the path(a), the arrow is substantially one. After that, based on the material amount function $1^{(\#)}(t^*, x^*)$ of each arrow, $$\uparrow_i^j \eta_k^{(\#)} \text{ and } \uparrow_i^j \zeta_{total}^{(\#)}$$

are calculated.

Sixth Chapter: Second Part for Evaluation for Efficiency (Standard Cost Accounting) (Resource q, Cost p, and Variance Analysis) ($\eta(\zeta) \to$ (a) and (s) of Resource (q))

For accurate evaluation for efficiency, a resource consumption amount qk corresponding to a processing work k also needs to be measured. Regarding $\zeta$ of the material introduction, $\zeta$ may have already represented the resource consumption amount q, and in that case, $\zeta = q$, and q is omitted.

At this time, the evaluation for efficiency is defined by the following formula with reference to Formula (4.1) and Formula (4.2).

Formula 48

$$\uparrow_i^j {}_{q/\eta} \pi_{pro^k} = \frac{\uparrow_i^j q_{i\,pro^k}}{\uparrow_i^j \eta_k}, \quad (6.1)$$

$$\uparrow_i^j {}_{q/\zeta} \pi_{mat} = \frac{\uparrow_i^j q_{i\,mat}}{\uparrow_i^j \zeta_{total}}. \quad (6.2)$$

Note $$\uparrow_i^j q_{i\,pro^k} :$$

Resource consumption amount consumed by the k-th processing work introduced in the i→j arrow $$\uparrow_i^j q_{i\,mat} :$$

Resource Consumption Amount of the Consumed Material Introduced in the i→j Arrow While Formula (6.1) and Formula (6.2) show the efficiency of the arrow, if evaluation for efficiency for each arrow is unnecessary, only an entire set of the arrows in the present term is evaluated. In the case, Formula (6.1) and Formula (6.2) are configured similarly to Formula (4.3) and Formula (4.4).

In a case where the total resource consumption amounts $$q_{k\,pro}^{(a)} \text{ and } q_{mat}^{(a)}$$

in the present term (they are always actually measured) need to be distributed to the respective arrows, the distribution is performed as follows. This also has reality levels.

1) Reality level 1 (actually measured resource consumption amount): The resource consumption amounts $$\uparrow_i^j q_{k\,pro}^{(a)} \text{ and } \uparrow_i^j q_{k\,mat}^{(a)}$$

of the respective arrows are actually measured (in this time, obviously, $$\sum_i \sum_j \uparrow_i^j q_{k\,pro}^{(a)} = q_{k\,pro}^{(a)} \text{ and } \sum_i \sum_j \uparrow_i^j q_{k\,mat}^{(a)} = q_{mat}^{(a)} \text{ are met}).$$

In this case, as a matter of fact, $\eta$ and $\zeta$ need not be calculated only for calculation of the cost. However, $\eta$ and $\zeta$ are required for evaluation for efficiency of the processing work.

2) Reality level 2 (resource consumption amount averaged and distributed): The total resource consumption amounts $$q_{k\,pro}^{(a)} \text{ and } q_{mat}^{(a)}$$

of the present term are distributed at the ratios of $\eta$ and $\zeta$ of the respective arrows.

That is, the following formulae are established.

Formula 49

$$\uparrow_i^j q_{pro_k}^{(a)} = q_{pro_k}^{(a)} \times \frac{\uparrow_i^j \eta_k}{\sum_i \sum_j \uparrow_i^j \eta_k}, \quad (6.3)$$

$$\uparrow_i^j q_{mat}^{(a)} = q_{mat}^{(a)} \times \frac{\uparrow_i^j \zeta_{total}}{\sum_i \sum_j \uparrow_i^j \zeta_{total}}. \quad (6.4)$$

From Formula (6.1) to Formula (6.4), by the distribution at the reality level 2, the efficiency is clearly the same in all arrows.

Note that both of (a) and (s) are possibly applied to $\eta$ and $\zeta$ in this time, and therefore, (a), (s), and the like are not attached to the upper rights of $\eta$ and $\zeta$ in Formula (6.3) and Formula (6.4). Which is to be used depends on content of analysis.

Next, the definition of q(s) is considered. This is as the following formula.

Formula 50

$$\overset{j}{\underset{i\ pro_k}{\uparrow}} q^{(s)} = \overset{j}{\underset{i\ pro_k}{\uparrow}} q^{(s)} \left( \overset{j}{\underset{i}{\uparrow}} \eta_k \right), \quad (6.5)$$

$$\overset{j}{\underset{i\ mat}{\uparrow}} q^{(s)} = \overset{j}{\underset{i\ mat}{\uparrow}} q^{(s)} \left( \overset{j}{\underset{i\ total}{\uparrow}} \zeta \right). \quad (6.6)$$

While Formula (6.5) and Formula (6.6) obtain q(s) for each arrow, if the calculation for each arrow is unnecessary, it is only necessary to obtain q(s) of an entire set of the arrows.
In the case, it is only necessary to establish:

Formula 51

$$q^{(s)}_{pro_k} = q^{(s)}_{pro_k} \left( \sum_i \sum_j \overset{j}{\underset{i}{\uparrow}} \eta_k \right), \quad (6.7)$$

$$q^{(s)}_{mat} = q^{(s)}_{mat} \left( \sum_i \sum_j \overset{j}{\underset{i\ total}{\uparrow}} \zeta \right), \quad (6.8)$$

At this time, $$q^{(s)}_{pro_k} \text{ and } q^{(s)}_{mat}$$

represent q of the entire set of the arrows.

Thus, q(s) is calculation of q in accordance with functions, such as q=q(η) and q=q(ζ), determined in advance. Considerably simple cases of specific forms of Formula (6.5) and Formula (6.6) are as follows.

Formula 52

$$\overset{j}{\underset{i\ pro_k}{\uparrow}} q^{(s)} = a * \overset{j}{\underset{i}{\uparrow}} \eta_k + b, \quad (6.9)$$

$$\overset{j}{\underset{i\ mat}{\uparrow}} q^{(s)} = \alpha * \overset{j}{\underset{i\ total}{\uparrow}} \zeta + \beta. \quad (6.10)$$

Here, further, with a fixed consumption amount b or β is zero, q is completely proportionate to η or ζ, and in this case, from Formula (6.1) and Formula (6.2), efficiency of all arrows becomes constant (a and α).

Obviously, unless the actual efficiency matches the standard efficiency, $$\sum_i \sum_j \overset{j}{\underset{i\ pro_k}{\uparrow}} q^{(s)} = q^{(s)}_{pro_k} \text{ or } \sum_i \sum_j \overset{j}{\underset{i\ mat}{\uparrow}} q^{(s)} = q^{(a)}_{mat}$$

is not met. The variance is used as an index to evaluate a degree of efficiency.
((a) and (s) of Resource (q)→Cost (p))
Completely similarly to the case of η(ζ)→the resource (q), efficiency of the resource (q)→cost (p) is evaluated next. The specific formulae are to only replace q with p and η and ζ with the corresponding q in Formulae (6.1)-(6.10). Only the formulae are arranged below.

Formula 53

$$\overset{j}{\underset{i\ pro}{\uparrow}} \pi_{p/q_k} = \frac{\overset{j}{\underset{i\ pro_k}{\uparrow}} p}{\overset{j}{\underset{i\ pro_k}{\uparrow}} q}, \quad (6.1a)$$

$$\overset{j}{\underset{i\ mat}{\uparrow}} \pi_{p/q} = \frac{\overset{j}{\underset{i\ mat}{\uparrow}} p}{\overset{j}{\underset{i\ mat}{\uparrow}} q}, \quad (6.2a)$$

$$\overset{j}{\underset{i\ pro_k}{\uparrow}} p^{(a)} = p^{(a)}_{pro_k} \times \frac{\overset{j}{\underset{i\ pro_k}{\uparrow}} q}{\sum_i \sum_j \overset{j}{\underset{i\ pro_k}{\uparrow}} q}, \quad (6.3a)$$

$$\overset{j}{\underset{i\ mat}{\uparrow}} p^{(a)} = p^{(a)}_{mat} \times \frac{\overset{j}{\underset{i\ mat}{\uparrow}} q}{\sum_i \sum_j \overset{j}{\underset{i\ mat}{\uparrow}} q}, \quad (6.4a)$$

$$\overset{j}{\underset{i\ pro_k}{\uparrow}} p^{(s)} = \overset{j}{\underset{i\ pro_k}{\uparrow}} p^{(s)} \left( \overset{j}{\underset{i\ pro_k}{\uparrow}} q \right), \quad (6.5a)$$

$$\overset{j}{\underset{i\ mat}{\uparrow}} p^{(s)} = \overset{j}{\underset{i\ mat}{\uparrow}} p^{(s)} \left( \overset{j}{\underset{i\ mat}{\uparrow}} q \right), \quad (6.6a)$$

$$p^{(s)}_{pro_k} = p^{(s)}_{pro_k} \left( \sum_i \sum_j \overset{j}{\underset{i\ pro_k}{\uparrow}} q \right), \quad (6.7a)$$

$$p^{(s)}_{mat} = p^{(s)}_{mat} \left( \sum_i \sum_j \overset{j}{\underset{i\ mat}{\uparrow}} q \right), \quad (6.8a)$$

$$\overset{j}{\underset{i\ pro_k}{\uparrow}} p^{(s)} = a * \overset{j}{\underset{i\ pro_k}{\uparrow}} q + b, \quad (6.9a)$$

$$\overset{j}{\underset{i\ mat}{\uparrow}} p^{(s)} = \alpha * \overset{j}{\underset{i\ mat}{\uparrow}} q + \beta. \quad (6.10a)$$

Note that, in Formula (6.7a) and Formula (6.8a), if q for each arrow, namely, $$\overset{j}{\underset{i\ pro_k}{\uparrow}} q \text{ and } \overset{j}{\underset{i\ mat}{\uparrow}} q$$

cannot be obtained, q for the entire set of the arrows, namely, $$q_{pro_k} \text{ and } q_{mat}$$

are used to calculate:

Formula 54

$$p^{(s)}_{pro_k} = p^{(s)}_{pro_k} \left( q_{pro_k} \right), \quad (6.7b)$$

$$p^{(s)}_{mat} = p^{(s)}_{mat} \left( q_{mat} \right), \quad (6.8b)$$

Example of Variance Analysis

Thus, the variance between (s) and (a) represents the variance between the standard and the actual in the present term. The cause of the variance has various elements. Specifically, they include the resource price (p), the resource consumption amount (q), the impairment amount (θ), the additional material introduction amount (φ), the arrow path ("path"), and the like, and it is difficult to determine where resides inefficiency unless there is quantitative evaluation regarding which element contributes to what extent.

Obviously, when (s) and (a) of each of the parameters are known, (s) and (a) of the parameter are directly compared, and the parameter in which (s) and (a) are significantly different can be determined as poor efficiency (or good efficiency). However, evaluation in terms of the amount of money is easy to understand intuitively, and the following describes an example of such a method.

As long as required data can be obtained, the variance analysis between (s) and (a) can be performed for each arrow or can be performed for an entire set of the arrows. In this example the entire set of the arrows is assumed, but in the case of per arrow basis, the i→j arrows are given to all elements.

Figure 17:
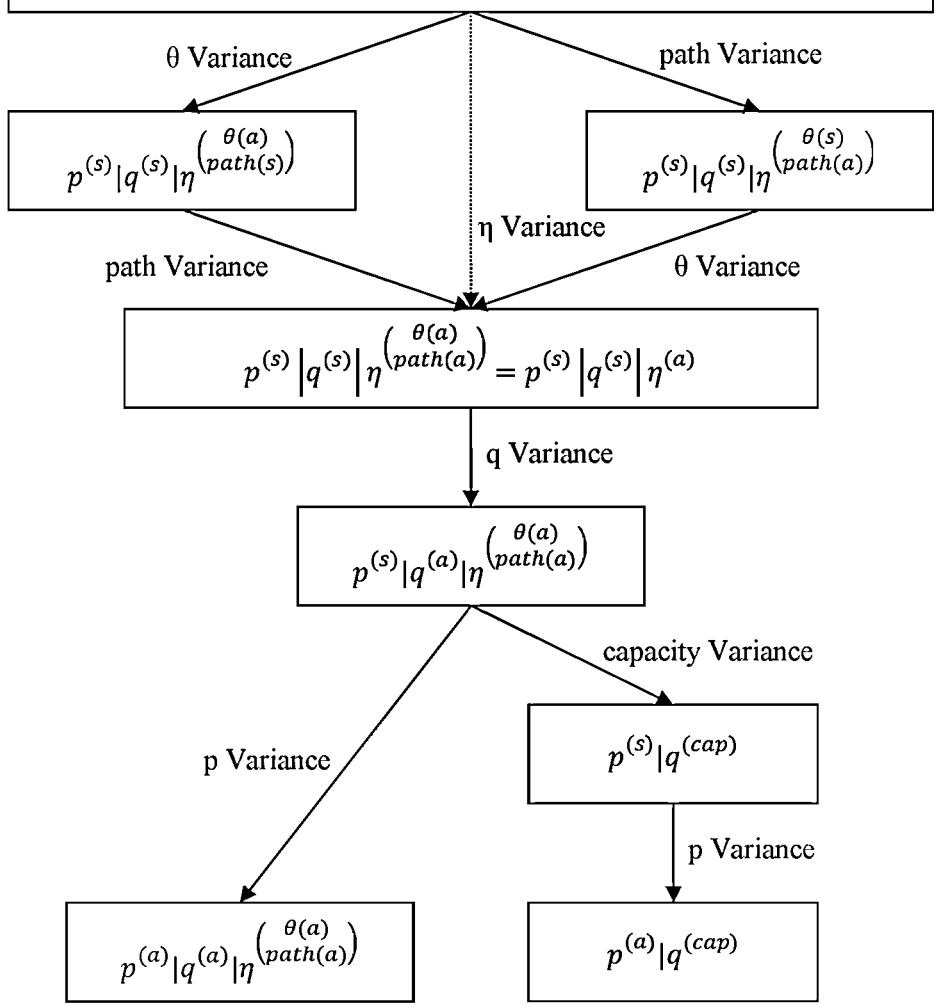
FIG. 17 is a flowchart diagram depicting an example of variance analysis.

As illustrated in FIG. 17, the variance analysis is basically performed by changing the parameters one by one from (s) to (a).

Regarding "path", the integration path itself is changed. Especially, changing only the path to (a) first while the other parameters of η(ζ) are (s), an odd result may be resulted unless the path in the past term is accurately estimated, and therefore attention should be taken.

The η(ζ) variance can be divided into a path variance and a θ variance, and there are two patterns depending on the orders, and when there is the additional material introduction parameter φ or a material amount ratio parameter ψ at the starting point introduction when a plurality of kinds of materials are introduced, the patterns further increase. The preferred order of changing the parameters depends on the situation. There may be a case where the result is odd (for example, in spite of the parameter (a) having a value worse than that of (s), favorable variance is calculated) by calculation in any order. In this case, the plurality of parameters regarding η(ζ) can be collectively changed from (s) to (a) at once.

A capacity variance corresponds to what is called variance in rate of operation and is calculated for fixed cost in some cases.

Seventh Chapter: Case of a Plurality of Materials

Figure 18:
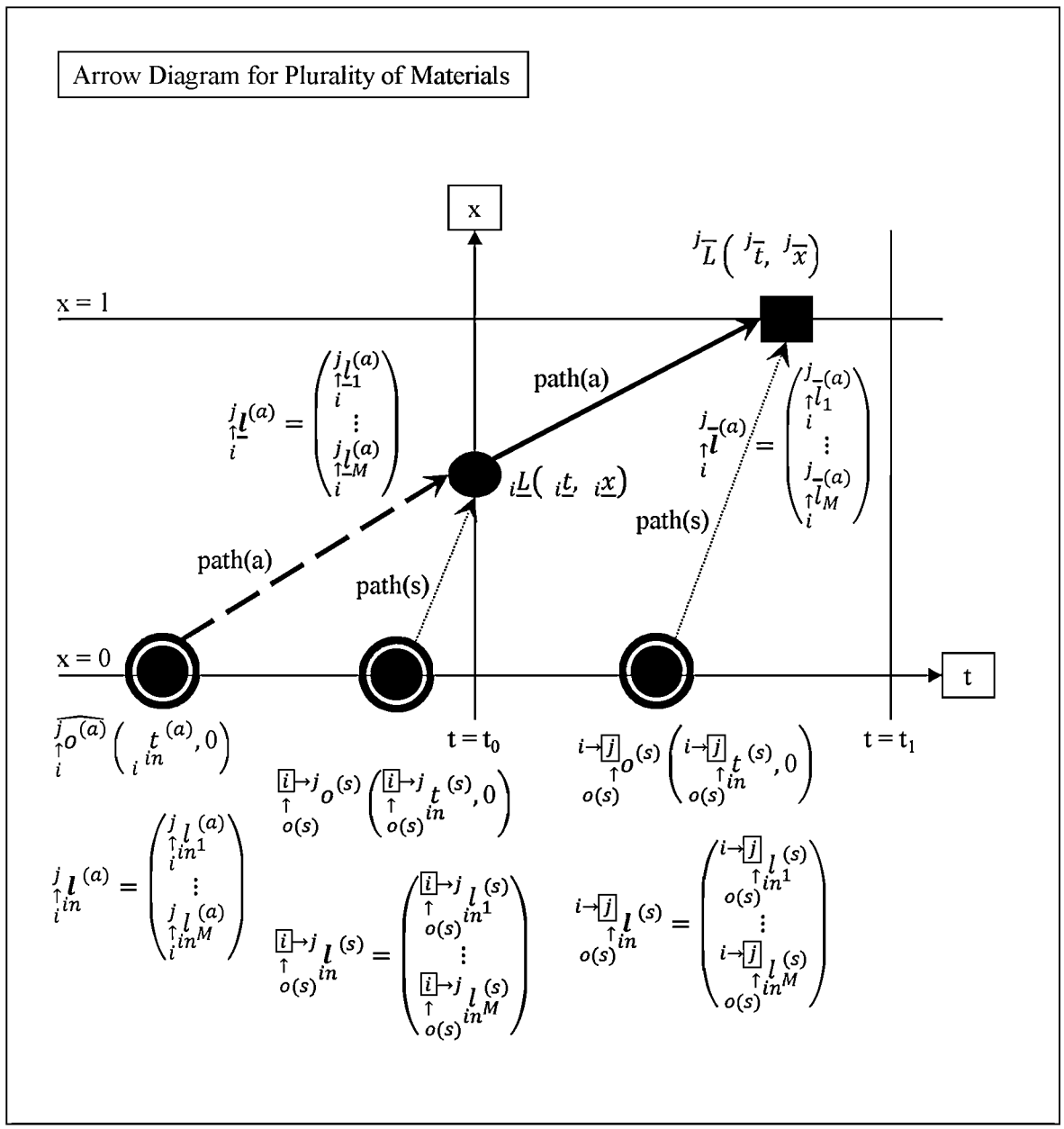
FIG. 18 is an arrow diagram in a case of a plurality of materials.

In the discussions so far, the material to be introduced has been supposed to be only one kind, but in this chapter, as illustrated in FIG. 18, a case of introducing a plurality of kinds of materials is considered.

A material amount of the m-th material at the (t, x) coordinate of the i→j arrow is defined to be $$\uparrow_i^j l_m(t, x).$$

A vector:

Formula 55

$$\uparrow_i^j l(t, x) = \begin{pmatrix} \uparrow_i^j l_1(t, x) \\ \vdots \\ \uparrow_i^j l_M(t, x) \end{pmatrix} \quad (7.1)$$

in which $$\uparrow_i^j l_m(t, x)$$

is arranged in one row is referred to as a material amount vector or a material amount vector function. FIG. 18 illustrates notations of the material amount vectors at the respective nodes in the basic arrow diagram.

Here, if the unit of the material amounts of all materials is the same, for example kg, then, by establishing Formula 56

$$\uparrow_i^j l(t, x) = \sum_{m=1}^{M} \uparrow_i^j l_m(t, x) \quad (7.2)$$

Formula (7.1) can be deformed as follows.

Formula 57

$$\uparrow_i^j l(t, x) = \uparrow_i^j l(t, x) * \begin{pmatrix} \uparrow_i^j l_1(t, x) / \uparrow_i^j l(t, x) \\ \vdots \\ \uparrow_i^j l_M(t, x) / \uparrow_i^j l(t, x) \end{pmatrix} \quad (7.3)$$

$$= \uparrow_i^j l(t, x) * \uparrow_i^j l(t, x).$$

Here, $$\uparrow_i^j l(t, x):$$

Total material amount (a scalar), the total material amount of the materials at the (t, x) coordinate $$\uparrow_i^j l(t, x):$$

Material amount ratio vector (a vector), an abundance ratio of the material at the (t, x) coordinate. At this time, clearly, the sum of all elements in the material amount ratio vector becomes 1. Other than kg, any unit can be used as the unit of the material amount as long as the material amounts of the plurality of kinds of materials can be summed in that unit. However, in some cases, modification is required as necessary.

Formula (7.1) is expressed again by line integral format. The material amount vector also has (a) and (s), and first (a) is considered.

Formula 58

$$\overset{j}{\underset{i}{\uparrow}} I^{(a)}(t^*, x^*) = \begin{pmatrix} \overset{j}{\underset{i}{\uparrow}} I_1^{(a)}(t^*, x^*) \\ \vdots \\ \overset{j}{\underset{i}{\uparrow}} I_M^{(a)}(t^*, x^*) \end{pmatrix} \quad (7.1)(a)$$

$$= \begin{pmatrix} \overset{j}{\underset{i}{\uparrow}} I_1^{(a)}(_iL, _ix) \\ \vdots \\ \overset{j}{\underset{i}{\uparrow}} I_M^{(a)}(_iL, _ix) \end{pmatrix} - \begin{pmatrix} \int_{(_iL,_ix)}^{(t^*,x^*)} \overset{j}{\underset{i}{\uparrow}} g_1'^{(a)}(t, x; \theta^{(a)}, \phi^{(a)}) \cdot dr \\ \vdots \\ \int_{(_iL,_ix)}^{(t^*,x^*)} \overset{j}{\underset{i}{\uparrow}} g_M'^{(a)}(t, x; \theta^{(a)}, \phi^{(a)}) \cdot dr \end{pmatrix} +$$

$$\begin{pmatrix} \int_{(_iL,_ix)}^{(t^*,x^*)} \overset{j}{\underset{i}{\uparrow}} h_1'^{(a)}(t, x; \theta^{(a)}, \phi^{(a)}) \cdot dr \\ \vdots \\ \int_{(_iL,_ix)}^{(t^*,x^*)} \overset{j}{\underset{i}{\uparrow}} h_M'^{(a)}(t, x; \theta^{(a)}, \phi^{(a)}) \cdot dr \end{pmatrix}$$

$$= \overset{j}{\underset{i}{\uparrow}} \underline{I}^{(a)} - \int_{(_iL,_ix)}^{(t^*,x^*)} \overset{j}{\underset{i}{\uparrow}} G'^{(a)}(t, x; \theta^{(a)}, \phi^{(a)}) \cdot dr + \quad (7.4)$$

$$\int_{(_iL,_ix)}^{(t^*,x^*)} \overset{j}{\underset{i}{\uparrow}} H'^{(a)}(t, x; \theta^{(a)}, \phi^{(a)}) \cdot dr$$

$$= \overset{j}{\underset{i\,in}{\uparrow}} I^{(a)} - \int_{(_{j\,in}t^{(a)},0)}^{(t^*,x^*)} \overset{j}{\underset{i}{\uparrow}} G'^{(a)}(t, x; \theta^{(a)}, \phi^{(a)}) \cdot dr + \quad (7.5)$$

$$\int_{(_{j\,in}t^{(a)},0)}^{(t^*,x^*)} \overset{j}{\underset{i}{\uparrow}} H'^{(a)}(t, x; \theta^{(a)}, \phi^{(a)}) \cdot dr.$$

Note that $$\overset{j}{\underset{i}{\uparrow}} g'^{(a)}(t, x; \theta^{(a)}, \phi^{(a)}) = \overset{j}{\underset{i}{\uparrow}} g'(t, x; \theta^{(a)}, \phi^{(a)}).$$

(a) on the upper right of $$\overset{j}{\underset{i}{\uparrow}} g'$$

indicates that all parameters included in $$\overset{j}{\underset{i}{\uparrow}} g'$$

($\theta$ and $\phi$; and in most cases $\psi$ (a material amount ratio vector parameter at starting point introduction) is included but is not indicated here) are (a). Therefore, the expression of $$\overset{j}{\underset{i}{\uparrow}} g'^{(a)}(t, x; \theta^{(a)}, \phi^{(a)})$$

is slightly redundant. The expression of $$\overset{j}{\underset{i}{\uparrow}} g'^{(a)}(t, x)$$

is sophisticated. Obviously, the same applies to $$\overset{j}{\underset{i}{\uparrow}} h'.$$

Although $$\overset{j}{\underset{i}{\uparrow}} G'^{(a)} \text{ and } \overset{j}{\underset{i}{\uparrow}} H'^{(a)}$$

are denoted as if they were matrices, they are merely introduced for collective notation because, as is apparent from the actual formula, it is simply troublesome to vertically arrange and write the impairment functions $$\overset{j}{\underset{i}{\uparrow}} g_m'^{(a)}$$

and the additional material introduction functions $$\overset{j}{\underset{i}{\uparrow}} h_m'^{(a)}$$

by the amounts of M kinds of materials.

The prime "'" sign also does not have any special meaning. "'" is merely attached to indicate an instantaneous change.

When the plurality of materials are introduced, in most cases, the plurality of impairment parameters $\theta$ and the plurality of additional material introduction parameters $\phi$ are considered to appear. Therefore, $\theta$ and $\phi$ are denoted by vectors. Obviously, these parameters need to be basically identifiable.

Usually, there is a close relationship between the impairment amount and the additional introduction amount of each material. Examples of which include that an additional material A introduction amount is proportionate to an additional material B introduction amount, an additional introduction amount of a D material is increased instead of reducing an additional introduction amount of a C material, an E material impairment amount is proportionate to an F material impairment amount, or an H material is additionally introduced by the amount same as a G material impairment amount.

In this case, formulae of $$\overset{j}{\underset{i}{\uparrow}} g_m'^{(a)} \text{ and } \overset{j}{\underset{i}{\uparrow}} h_m'^{(a)}$$

are present for each material, and the formulae are present by the M kinds of the materials, and therefore an equation formed of 2 M pieces of formulae at the maximum is established. The equation needs to be solved in advance basically.

Next, $$\overset{j}{\underset{i}{\uparrow}} \eta_k^{(a)}$$

(a scalar value) in case of the introduction of a plurality of materials is defined. In most cases, the definition is made as follows.

Formula 59

$$\overset{j}{\underset{i}{\uparrow}} \eta_k^{(a)} = \int_{(iL,i\underline{x})}^{(jT,j\overline{x})} \mathcal{L}_k\left(\overset{j}{\underset{i}{\uparrow}} l^{(a)}(t,x)\right) * f_k'(t,x) \cdot dr. \qquad (7.6)$$
$$\text{path}(a)$$

Note that $\mathcal{L}_k(\ )$ is a function that returns a scalar value when the material amount vector $$\overset{j}{\underset{i}{\uparrow}} l^{(a)}(t,x)$$

at the (t, x) coordinate is inputted. Although the specific function form differs depending on the content of the processing work k, a simple example is in the following function form.

Formula 60

$$\mathcal{L}_k\left(\overset{j}{\underset{i}{\uparrow}} l^{(a)}(t,x)\right) = \lambda_{k,1} * \overset{j}{\underset{i}{\uparrow}} l_1^{(a)}(t,x) + \ldots + \lambda_{k,M} * \overset{j}{\underset{i}{\uparrow}} l_M^{(a)}(t,x). \qquad (7.7)$$

That is, a different weight is given to each material and the sum of the material amounts is obtained.

For example, a processing work of putting a plurality of materials in a container and heating the container is considered. At this time, a conversion amount of the introduced heat amount is denoted as η. The heat amount introduced to heat the materials differs depending on a specific heat of the material. Therefore, a small weight needs to be given to a material that is easily warmed and a large weight needs to be given to a material that is less likely to be warmed.

Here, when $$\lambda_{k,1} = \ldots = \lambda_{k,M} = 1 \qquad \text{Formula 61}$$

is met, Formula (7.7) becomes same as Formula (7.2).

Formula 62

$$\mathcal{L}_k\left(\overset{j}{\underset{i}{\uparrow}} l^{(a)}(t,x)\right) = \overset{j}{\underset{i}{\uparrow}} l^{(a)}(t,x) \qquad (7.8)$$

Thus, the total material amount of the materials is expressed. Next, $$\overset{j}{\underset{i\,total}{\uparrow}} \zeta^{(a)}$$

(a vector value) in the case where a plurality of materials are introduced is calculated. Formula (3.7) is vertically arranged by the kinds of materials.

Formula 63

$$\begin{pmatrix} \overset{j}{\underset{i\,total}{\uparrow}} \zeta_1^{(a)} \\ \vdots \\ \overset{j}{\underset{i\,total}{\uparrow}} \zeta_M^{(a)} \end{pmatrix} = \begin{pmatrix} \overset{j}{\underset{i\,in}{\uparrow}} \underline{\zeta}1^{(a)} \\ \vdots \\ \overset{j}{\underset{i\,in}{\uparrow}} \underline{\zeta}_M^{(a)} \end{pmatrix} + \begin{pmatrix} \overset{j}{\underset{i\,arrow}{\uparrow}} \zeta_1^{(a)} \\ \vdots \\ \overset{j}{\underset{i\,arrow}{\uparrow}} \zeta_M^{(a)} \end{pmatrix},$$

This is rewritten as follows.

Formula 64

$$\overset{j}{\underset{i\,total}{\uparrow}} \zeta^{(a)} = \overset{j}{\underset{i\,in}{\uparrow}} \underline{\zeta}^{(a)} + \overset{j}{\underset{i\,arrow}{\uparrow}} \zeta^{(a)}. \qquad (7.9)$$

Note

Formula 65

$$\overset{j}{\underset{i\,in}{\uparrow}} \underline{\zeta}^{(a)} = \begin{cases} 0 \text{ (the beginning in} - \\ \quad \text{process product input node)} \\ \overset{j}{\underset{i\,in}{\uparrow}} \underline{l}^{(a)} \text{ (the present term introduction input node)} \end{cases}, \qquad (7.10)$$

$$\overset{j}{\underset{i\,arrow}{\uparrow}} \zeta^{(a)} = \int_{(iL,i\underline{x})}^{(jT,j\overline{x})} \overset{j}{\underset{i}{\uparrow}} H'^{(a)}(t,x;\theta^{(a)},\phi^{(a)}) \cdot dr, \qquad (7.11)$$
$$\text{path}(a)$$

where 0 denotes a vector whose elements are all zero.

While all materials are collectively denoted as $$\overset{j}{\underset{i\,total}{\uparrow}} \zeta^{(a)}$$

by vector, the actual cost is individually distributed for each material m. Therefore, the vector notation does not have a calculational advantage so much and simply has meaning of ease of viewing.

(Calculation of Standard (s))

Next, a method for standard cost accounting is considered. If a plurality of materials are introduced to manufacture products, two patterns of a recognition method of a material amount of a node are available.

For example, consider an arrow of the present term introduction input node→a present term completion output node. It is assumed that only the one arrow is present in the present term. It is assumed that there are two kinds of materials, which are material A and material B.

Here, assume that a material breakdown of the present term completion output node (total: 100 kg) is (A, B)=(80 kg, 20 kg). At this time, whether: 1) η(ζ) required to manufacture a completed product with the material breakdown (A: 80 kg, B: 20 kg) under standard efficiency is considered to be (s); or 2) η(ζ) required to manufacture a completed product of 100 kg in total under standard efficiency and material introduction ratio is considered to be standard (s), needs to be selected.

In the case of the pattern 1), it is only necessary to individually consider the material amount for each kind of material and then calculate (a) and (s) of ηk and ζm a manner similar to the discussions so far. In this case, standard starting point introduction amounts of the material A and the material B in the arrow are each individually calculated. Since the pattern 1) is basically a repetition of the discussions so far, it is not described here any further.

In the case of the pattern 2), the standard starting point introduction amount of the material A or the material B is not individually calculated. In this case, the material amount ratio vector at the starting point introduction needs to be introduced as a new parameter (ψ). The method of the pattern 2) will be described below.

First, definitions of (a) of η(ζ) is rewritten for standard cost accounting. With reference to Formulae (5.2)-(5.4), Formula 66

$$\overset{j}{\underset{i}{\uparrow}}\eta_k^{(a)} = \overset{j}{\underset{i}{\uparrow}}\overline{\eta}_k^{(a)} - \overset{j}{\underset{i}{\uparrow}}\underline{\eta}_k^{(a)} \qquad (5.2)$$

is established. Note

Formula 67

$$\overset{j}{\underset{i}{\uparrow}}\underline{\eta}_k^{(a)} = \int_{\left(t_{in}^{(a)},0\right)}^{(iL,ix)} \mathcal{L}_k\left(\overset{j}{\underset{i}{\uparrow}}l^{(a)}(t,x)\right)*f_k'(t,x)\cdot dr, \qquad (7.12)$$

$$\overset{j}{\underset{i}{\uparrow}}\overline{\eta}_k^{(a)} = \int_{\left(t_{in}^{(a)},0\right)}^{(j\tau,j\overline{x})} \mathcal{L}_k\left(\overset{j}{\underset{i}{\uparrow}}l^{(a)}(t,x)\right)*f_k'(t,x)\cdot dr, \qquad (7.13)$$

The material amount vector is rewritten as follows.

Formula 68

$$\overset{j}{\underset{i}{\uparrow}}l^{(a)}(t^*,x^*)*\overset{j}{\underset{i}{\uparrow}}l_{in}^{(a)} = \int_{\left(t_{in}^{(a)},0\right)}^{(t^*,x^*)} \overset{j}{\underset{i}{\uparrow}}G'^{(a)}(t,x;\theta^{(a)},\phi^{(a)})\cdot dr + \qquad (7.5)$$

-continued $$\int_{\left(t_{in}^{(a)},0\right)}^{(t^*,x^*)} \overset{j}{\underset{i}{\uparrow}}H'^{(a)}(t,x;\theta^{(a)},\phi^{(a)})\cdot dr.$$

Here, decomposition of the material amount vector allows the following deformation.

Formula 69

$$\overset{j}{\underset{i}{\uparrow}}l^{(a)}(t^*,x^*)*\overset{j}{\underset{i}{\uparrow}}l^{(a)}(t^*,x^*) = \overset{j}{\underset{i\,in}{\uparrow}}l^{(a)}*\overset{j}{\underset{i\,in}{\uparrow}}l^{(a)} -$$

$$\int_{\left(t_{in}^{(a)},0\right)}^{(t^*,x^*)} \overset{j}{\underset{i}{\uparrow}}G'^{(a)}(t,x)\cdot dr + \int_{\left(t_{in}^{(a)},0\right)}^{(t^*,x^*)} \overset{j}{\underset{i}{\uparrow}}H'^{(a)}(t,x)\cdot dr.$$

Next, the material amount ratio vector at the starting point introduction is set as the new parameter ψ.

Formula 70

$$\overset{j}{\underset{i}{\uparrow}}l^{(a)}(t^*,x^*)*\overset{j}{\underset{i}{\uparrow}}l^{(a)}(t^*,x^*) = \overset{j}{\underset{i\,in}{\uparrow}}l^{(a)}*\overset{j}{\underset{i}{\uparrow}}\psi^{(a)} - \qquad (7.14)$$

$$\int_{\left(t_{in}^{(a)},0\right)}^{(t^*,x^*)} \overset{j}{\underset{i}{\uparrow}}G'^{(a)}(t,x)\cdot dr + \int_{\left(t_{in}^{(a)},0\right)}^{(t^*,x^*)} \overset{j}{\underset{i}{\uparrow}}H'^{(a)}(t,x)\cdot dr.$$

That is, the material amount vector $$\overset{j}{\underset{i}{\uparrow}}l^{(a)}$$

is decomposed into the total material amount $$\overset{j}{\underset{i}{\uparrow}}l^{(a)}$$

and the material amount ratio vector $$\overset{j}{\underset{i}{\uparrow}}l^{(a)}.$$

The material amount ratio vector at the starting point introduction $$\overset{j}{\underset{i\,in}{\uparrow}}l$$

is set as the new parameter $$\uparrow_i^j \psi.$$

Based on them, $$\uparrow_i^j \eta_k^{(s)}$$

is defined as follows. With reference to Formulae (5.9)-(5.15), the following is established.

Formula 71

$$\uparrow_i^j \eta_k^{(s)} = \uparrow_i^j \overline{\eta}_k^{(s)} - \uparrow_i^j \underline{\eta}_k^{(s)}. \quad (5.9)$$

Note

Formula 72

$$\uparrow_i^j \overline{\eta}_k^{(s)} = \int_{\left(\uparrow_{o(s) in}^{\boxdot \to j} t^{(s)}, 0\right)}^{(i t, i x)} \mathcal{L}_k \uparrow_{o(s)}^{\boxdot \to j} l^{(s)}(t, x) * f_k'(t, x) \cdot dr, \quad (7.15)$$

$$\uparrow_{o(s)}^{\boxdot \to j} l^{(s)}(t^*, x^*) * \uparrow_{o(s)}^{\boxdot \to j} l^{(s)}(t^*, x^*) = \uparrow_{o(s) in}^{\boxdot \to j} l^{(s)} * \uparrow_{o(s)}^{\boxdot \to j} \psi^{(s)} - \quad (7.16)$$

$$\int_{\left(\uparrow_{o(s) in}^{\boxdot \to j} t^{(s)}, 0\right)}^{(t^*, x^*)} \uparrow_{o(s)}^{\boxdot \to j} G'^{(s)}(t, x) \cdot dr + \int_{\left(\uparrow_{o(s) in}^{\boxdot \to j} t^{(s)}, 0\right)}^{(t^*, x^*)} \uparrow_{o(s)}^{\boxdot \to j} H'^{(s)}(t, x) \cdot dr,$$

$$\uparrow_{o(s)}^{\boxdot \to j} l^{(s)}(i t, i x) = \uparrow_i^j l^{(a)}(i t, i x) = \uparrow_i^j l^{(a)}. \quad (7.17)$$

Although Formula (7.17) is apparently same as Formula (5.12), while Formula (5.12) means the material amount of one kind material model, Formula (7.17) means the total material amount.

$$\uparrow_{o(s) in}^{\boxdot \to j} l^{(s)}$$

Is obtained from Formula (7.16) and Formula (7.17) and using it, $$\uparrow_{o(s)}^{\boxdot \to j} l^{(s)}(t, x)$$

is obtained.

The procedure is specifically as follows.

1) For example, it is defined that $$\uparrow_{o(s) in}^{\boxdot \to j} l^{(s)} = a.$$

2) Since the right-hand side of Formula (7.16) is all known parameters except for a, the material amount vector (before decomposition) at the (t*, x*) coordinate $$\uparrow_{o(s)}^{\boxdot \to j} l^{(s)}(t^*, x^*)$$

is expressed using a, t*, and x*.

3) The material amount vector $$\uparrow_{o(s)}^{\boxdot \to j} l^{(s)}(i t, i x)$$

at the coordinate ($i t$, $i x$), can be expressed by a formula in which the unknown quantity is only a.

4)

$$\uparrow_{o(s)}^{\boxdot \to j} l^{(s)}(i t, i x)$$

is decomposed and $$\uparrow_{o(s)}^{\boxdot \to j} l^{(s)}(i t, i x) = \uparrow_{o(s)}^{\boxdot \to j} l^{(s)}(i t, i x) * \uparrow_{o(s)}^{\boxdot \to j} l^{(s)}(i t, i x)$$

is calculated. The unknown quantity is only a in $$\uparrow_{o(s)}^{\boxdot \to j} l^{(s)}(i t, i x) \text{ and } \uparrow_{o(s)}^{\boxdot \to j} l^{(s)}(i t, i x).$$

5) Since an equation only with a can be formed with Formula (7.17), a is obtained. After a is found, $$\uparrow_{o(s)}^{\boxed{i} \to j} l^{(s)}(i t, i x)$$

can be also obtained. Accordingly, $$\uparrow_{o(s)}^{\boxed{i} \to j} l^{(s)}(t^*, x^*)$$

is found.

Similarly to Formula (7.15) to Formula (7.17),

Formula 73

$$\uparrow_i^j \overline{\eta}_k^{(s)} = \int_{\left(\uparrow_{o(s)}^{i \to j} t_{in}^{(s),0}\right)path(s)}^{(j\overline{t},j\overline{x})} \mathcal{L}_k\left(\uparrow_{o(s)}^{i \to j} l^{(s)}(t,x)\right) * f_k'(t,x) \cdot dr, \quad (7.18)$$

$$\uparrow_{o(s)}^{i \to j} l^{(s)}(t^*,x^*) * \uparrow_{o(s)}^{i \to j} l^{(s)}(t,x) = \uparrow_{o(s)\,in}^{i \to j} l^{(s)} * \uparrow_{o(s)}^{i \to j} \psi^{(s)} - \quad (7.19)$$

$$\int_{\left(\uparrow_{o(s)\,in}^{i \to j} t^{(s),0}\right)path(s)}^{(t^*,x^*)} \uparrow_{o(s)}^{i \to j} G'^{(s)}(t,x) \cdot dr + \int_{\left(\uparrow_{o(s)\,in}^{i \to j} t^{(s),0}\right)path(s)}^{(t^*,x^*)} \uparrow_{o(s)}^{i \to j} H'^{(s)}(t,x) \cdot dr,$$

$$\uparrow_{o(s)}^{i \to j} l^{(s)}(j\overline{t},j\overline{x}) = \uparrow_i^j l^{(a)}(j\overline{t},j\overline{x}) = \uparrow_i^j l^{(a)}. \quad (7.20)$$

Next, ζ(a) is rewritten. Similarly to Formula (5.8), the following formula is established.

Formula 74

$$\uparrow_i^j \zeta_{total}^{(a)} = \quad (7.21)$$

$$\begin{cases} \uparrow_i^j \overline{\zeta}^{(a)} - \uparrow_i^j \underline{\zeta}^{(a)} & \text{(the beginning in-process product input node)}, \\ \uparrow_i^j \overline{\zeta}^{(a)} & \text{(the present term introduction input node)} \end{cases}$$

Note that, similarly to Formula (5.6) and Formula (5.7),

Formula 75

$$\uparrow_i^j \underline{\zeta}^{(a)} = \uparrow_{i\,in}^j \zeta^{(a)} + \int_{\left(_i t_{(in)}^{(a),0}\right)path(a)}^{(_i L,_i x)} \uparrow_i^j H'^{(a)}(t,x) \cdot dr, \quad (7.22)$$

$$\uparrow_i^j \overline{\zeta}^{(a)} = \uparrow_{i\,in}^j \zeta^{(a)} + \int_{\left(_i t_{(in)}^{(a),0}\right)path(a)}^{(j\overline{t},j\overline{x})} \uparrow_i^j H'^{(a)}(t,x) \cdot dr. \quad (7.23)$$

are established.

Obviously, they also meet the relationships of Formulae (7.9)-(7.11) (Note that in the present term introduction input node, the i-th input node is also the starting point introduction node, so $$\uparrow_{i\,in}^j \zeta^{(a)} = \uparrow_{i\,in}^j \underline{\zeta}^{(a)} = \uparrow_{i\,in}^j \underline{l}^{(a)} \text{ and } \left(_i t_{(in)}^{(a)}, 0\right) = (_i L, _i x)$$

is established).

Next, with reference to Formula (5.16) and Formula (7.21), ζ(s) is defined.

Formula 76

$$\uparrow_i^j \zeta_{total}^{(s)} = \quad (7.24)$$

$$\begin{cases} \uparrow_i^j \overline{\zeta}^{(s)} - \uparrow_i^j \underline{\zeta}^{(s)} & \text{(the beginning in-process product input node)}, \\ \uparrow_i^j \overline{\zeta}^{(s)} & \text{(the present term introduction input node)} \end{cases}$$

Note that

Formula 77

$$\uparrow_i^j \underline{\zeta}^{(s)} = \uparrow_{o(s)\,in}^{i \to j} l(s) + \int_{\left(\uparrow_{o(s)\,in}^{i \to j} t^{(s),0}\right)path(s)}^{(_i L,_i x)} \uparrow_{o(s)}^{i \to j} H'^{(s)}(t,x) \cdot dr \quad (7.25)$$

(a plural – materials version of (5.17)) =

$$\boxed{i} \to j_l^{(s)} * \boxed{i} \to j_\psi^{(s)} + \int_{\left(\uparrow_{o(s)\,in}^{i \to j} t^{(s),0}\right)path(s)}^{(_i L,_i x)} \uparrow_{o(s)}^{i \to j} H'^{(s)}(t,x) \cdot dr,$$

$$\uparrow_i^j \overline{\zeta}^{(s)} = \uparrow_{o(s)\,in}^{i \to j} l(s) + \int_{\left(\uparrow_{o(s)\,in}^{i \to j} t^{(s),0}\right)path(s)}^{(j\overline{t},j\overline{x})} \uparrow_{o(s)}^{i \to j} H'^{(s)}(t,x) \cdot dr$$

(a plural – materials version of (5.18)) = (7.26)

$$\uparrow_{o(s)\,in}^{i \to j} l^{(s)} * \uparrow_{o(s)}^{i \to j} \psi^{(s)} + \int_{\left(\uparrow_{o(s)\,in}^{i \to j} t^{(s),0}\right)path(s)}^{(j\overline{t},j\overline{x})} \uparrow_{o(s)}^{i \to j} H'^{(s)}(t,x) \cdot dr,$$

are established. For calculations of Formula (7.25) and Formula (7.26), obtaining

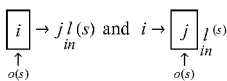

is required, but they have already been obtained in the process of calculating Formula (7.16) and Formula (7.19).

In the discussions so far, what amount of each material is specifically present has been always grasped in all states from the processing until the completion including the starting point introduction of the materials. However, depending on the products to be manufactured, there may be a case where, although amounts of the materials introduced are specifically grasped at the material introduction, only the total material amount is grasped at the subsequent processing and the completion. This occurs when the plurality of kinds of the introduced materials are mixed during the processing and examination of a breakdown of a specific material is difficult or impossible.

There are two calculation methods in such a case.

1) The abundance ratios (the material amount ratio vectors) of the material during processing and at completion are estimated by some appropriate method. An example of which is to use the material amount ratio vector parameter $$\uparrow_i^j \psi$$

at the starting point introduction. 2) While the total material amount and the material amount ratio vector are considered only at the starting point introduction of the material, after that, distinction of all materials is eliminated, and the total material amount (formed of a plurality of kinds of materials) is calculated as if the total material amount were the material amount of a single kind of a material. In this method, the input node at the starting point introduction is decomposed into the total material amount $$\uparrow_i^j l$$

and the material amount ratio vector $$\uparrow_i^j l,$$

but only the total material amount is considered in the nodes other than that, and the matchings and the material amounts on the arrow paths are all calculated based on the total material amount.

Eighth Chapter: Numerical Example

In the factory, material A (kg) and material B (kg) are introduced at the process starting point, and they are processed to manufacture the products. A and B are introduced only at the process starting point, and A or B is not additionally introduced in the middle of the process. Regarding the introduction ratios of A and B, while a standard introduction ratio is defined, the product manufacturing is actually possible at ratios other than the standard introduction ratio.

Since both of A and B are volatile materials, in proportion to the elapse of time, the materials decrease by constant amounts. Note that A and B differ in the degree of volatileness, and therefore the decreased amounts per the elapsed time differ between A and B. Although standard decreased amounts are defined for the decreased amounts per the elapsed time, the decreased amounts actually varies depending on a quality of the process management.

While a standard price (per kg) is defined for each of A and B, the actual price actually varies depending on a quality of the purchasing activity.

A factory worker mainly directly performs the processing work. Various costs are generated in the processing work, in addition to wages for factory workers, and the costs are roughly divided into a variable processing cost that is a cost generated in proportion to a direct operation period of the factory worker and a fixed processing cost generated in proportion to the elapsed time. Note that, in the factory, using the direct operation period of the factory worker as a criterion for a resource consumption amount, both of the variable processing cost and the fixed processing cost are managed.

Here, it should be noted that the direct operation period and the elapsed time are different concepts. The direct operation period is calculated by the number of factory workers x the total time of the operation period and is a period during which the processing work is actually performed. The elapsed time is a time elapsed after the material is introduced to the process until the completion. That is, for example, in a case where the processing work is not performed at all and the material is left unprocessed for one hour, the direct operation period is 0 hours, and the elapsed time is one hour. In a case where a work is performed for one hour by 10 factory workers, the direct operation period is 10 hours and the elapsed time is one hour. Thus, the direct operation period shows the consumed resource amount and is the concept different from the elapsed time.

While a standard period is defined to the direct operation period required for product manufacturing of 1 kg (under a situation in which there is neither impairment of a material nor additional introduction), the direct operation period actually varies depending on a quality of the processing efficiency.

As the materials increase, the required direct operation period increases. Specifically, the direct operation period required for the product manufacturing increases proportionate to only the total weight of the materials, regardless of the ratio between A and B.

While a standard is also defined for the variable processing cost per hour of the direct operation period, the variable processing cost varies depending on a quality of the cost management. Regarding the fixed processing cost, while an allowable resource consumption amount (capacity) (that is, a maximum direct operation period allowed in the period) is defined, the actual resource consumption amount (the actual direct operation period) varies depending on a busyness of the factory.

(Standard Data)

1) Standard introduction ratio of the materials introduced at the process starting point (A:B)=(0.5:0.5)

2) Standard impairment amounts per hour of the elapsed time A:2 kg, B: 0 kg (Under appropriate management, the material B is not impaired.)

3) Standard elapsed time required from the material introduction until the completion 5 hours (this does not change by the amount of the material)

Note that a standard degree of processing work progress per the elapsed time is assumed to be constant.

4) Material standard unit prices (per kg) A: 2,000 yen/kg, B: 3,000 yen/kg

5) Standard direct operation period required for product manufacturing of 1 kg (under a situation in which there is neither the impairment of the material nor the additional introduction) 3 hours/kg 6) Standard variable processing cost per hour of direct work 2,000 yen/direct operation period 7) Standard fixed processing cost per elapse of one hour 60,000 yen/elapsed time Note that the allowable direct operation period per elapse of one hour is 60 hours.

(Production Data)

Today, the materials were introduced at the starting point, 10:00, and the product was completed at 20:00. The cost accounting is performed with the 10 hours (10:00 to 20:00) as the present term. The materials processed in the present term are only these, and there are no beginning in-process product and ending in-process product.

(Actual Data)

1) Breakdown of 200 kg of actual material starting point introduction amount (A:B)=(120 kg:80 kg)

2) Breakdown of 140 kg of actual product completed amount (A:B)=(70 kg:70 kg)

3) Actual elapsed time 10 hours (This is written in the production data as well).

Note that the degree of processing work progress per the elapsed time was constant.

4) Actual material cost A: 200,000 yen, B: 180,000 yen

5) Actual direct operation period 550 hours

6) Actual variable processing cost 1,000,000 yen

7) Actual fixed processing cost 700,000 yen

Figure 19:
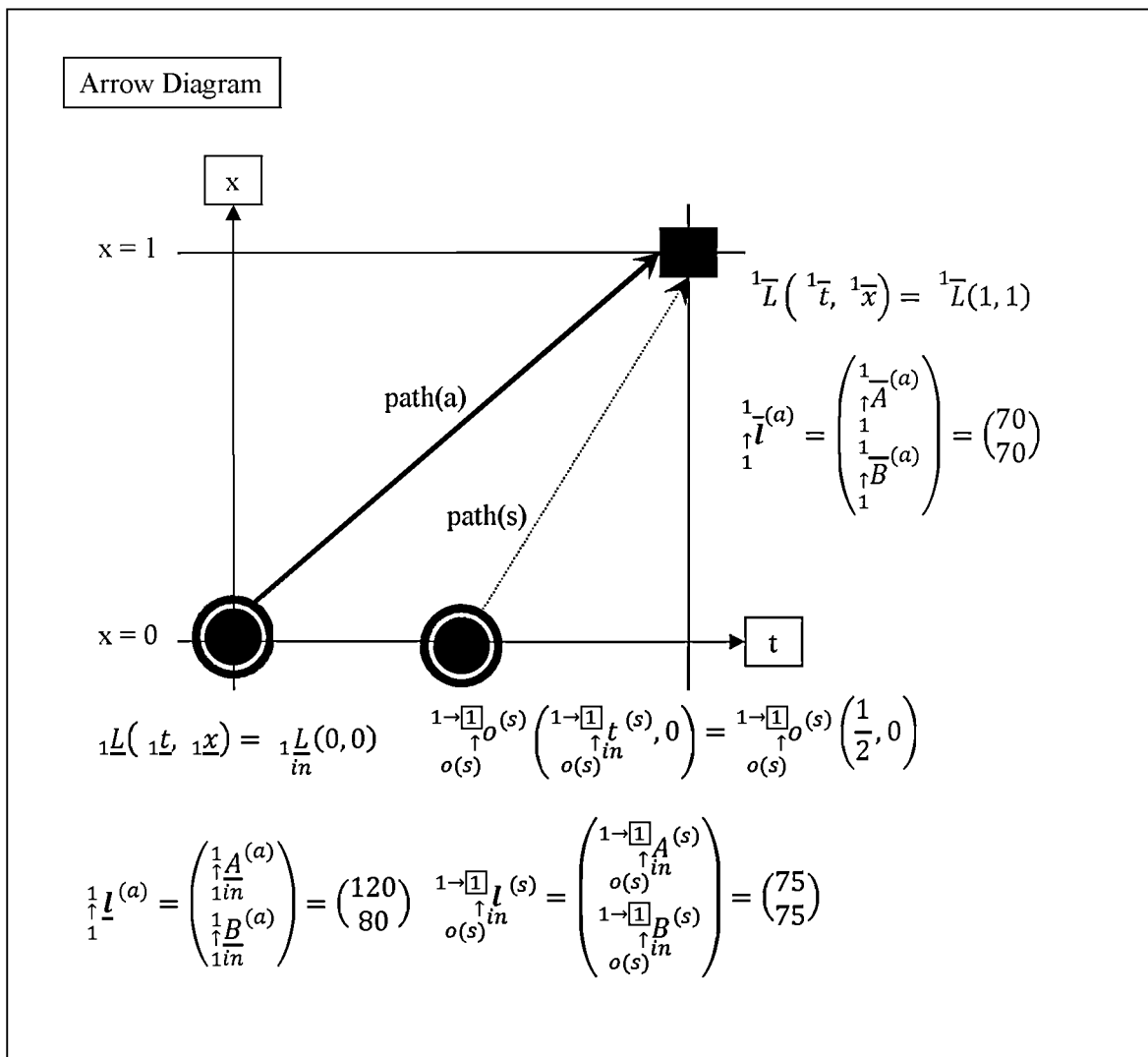
FIG. 19 is a drawing illustrating an example of a solution using the arrow diagram.

First, as illustrated in FIG. 19, required data is inputted to the arrow diagram. A coordinate at a first input node point is defined as $$1 \frac{L}{in}(0, 0)$$

and a coordinate at a first output node point is defined as $1\overline{L}(1, 1)$. Since there is only one 1→1 arrow this time, the 1→1 notation may be omitted. Since the actual degree of processing work progress per the elapsed time is constant, the path(a) of the arrow has a straight line.

The standard elapsed time is five hours, which is the half of the actual elapsed time, and therefore a coordinate at point o(s) of an o(s)→out arrow is $$1 \rightarrow \boxed{1} \underset{o(s)}{\uparrow} o^{(s)}\left(\frac{1}{2}, 0\right).$$

Since the standard processing work progress degree per the elapsed time is constant, the path (s) of this arrow also has a straight line.

From the actual data, the material amount of the input node is $$\underset{1}{\overset{j}{\uparrow}} \underline{L}^{(a)} = \begin{pmatrix} \overset{j}{\underset{1}{\uparrow}} \underline{A}^{(a)}_{in} \\ \overset{j}{\underset{1}{\uparrow}} \underline{B}^{(a)}_{in} \end{pmatrix} = \begin{pmatrix} 120 \\ 80 \end{pmatrix}$$

and from the actual data, the material amount of the output node is $$\underset{1}{\overset{1}{\uparrow}} \overline{T}^{(a)} = \begin{pmatrix} \overset{1}{\underset{1}{\uparrow}} \overline{A}^{(a)} \\ \overset{1}{\underset{1}{\uparrow}} \overline{B}^{(a)} \end{pmatrix} = \begin{pmatrix} 70 \\ 70 \end{pmatrix}.$$

Note that while data of (7575)

$$1 \rightarrow \boxed{1} \underset{o(s)}{\uparrow} I^{(s)} = \begin{pmatrix} 1 \rightarrow \boxed{1} \\ \underset{o(s)}{\uparrow} A^{(s)}_{in} \\ 1 \rightarrow \boxed{1} \\ \underset{o(s)}{\uparrow} B^{(s)}_{in} \end{pmatrix} = \begin{pmatrix} 75 \\ 75 \end{pmatrix}$$

is also written in FIG. 19, since the value is not known at this point, it is left for a while.

Next, the (actual) material amount ratio vector parameter at the starting point introduction $$\underset{1}{\overset{1}{\uparrow}} \psi^{(a)}$$

is obtained.

Formula 78

(8.1)

Since $$\underset{1}{\overset{1}{\uparrow}} \underline{L}^{(a)} = \begin{pmatrix} \overset{1}{\underset{1}{\uparrow}} \underline{A}^{(a)}_{in} \\ \overset{1}{\underset{1}{\uparrow}} \underline{B}^{(a)}_{in} \end{pmatrix} = \begin{pmatrix} 120 \\ 80 \end{pmatrix} = 200 * \begin{pmatrix} 0.6 \\ 0.4 \end{pmatrix}$$

is found, $$\underset{1}{\overset{1}{\uparrow}} \psi^{(a)} = \begin{pmatrix} 0.6 \\ 0.4 \end{pmatrix}.$$

From the standard data, $$1 \rightarrow \boxed{1} \underset{o(s)}{\uparrow} \psi^{(s)} = \begin{pmatrix} 0.5 \\ 0.5 \end{pmatrix}.$$

Next, the (actual) impairment parameter $\theta^{(a)}$ is calculated. From Formula (7.5), Formula 79

$$\stackrel{1}{\uparrow}_1 I^{(a)}(t^*, x^*) = \stackrel{1}{\uparrow}_1 I^{(a)}_{in} - \int_{\left(t^{(a)}_{in},0\right)}^{(t^*,x^*)} \stackrel{1}{\uparrow}_1 G'^{(a)}(t,x)\cdot dr + \quad (8.2)$$
$$\text{path}(a)$$

$$\int_{\left(t^{(a)}_{in},0\right)}^{(t^*,x^*)} \stackrel{1}{\uparrow}_1 H'^{(a)}(t,x)\cdot dr$$
$$\text{path}(a)$$

$$= \binom{120}{80} - \int_{(0,0)}^{(t^*,x^*)} \binom{\theta_A^{(a)}*i + 0*j}{\theta_B^{(a)}*i + 0*j}\cdot dr +$$
$$\text{path}(a)$$

$$\int_{(0,0)}^{(t^*,x^*)} O\cdot dr$$
$$\text{path}(a)$$

$$= \binom{120 - \theta_A^{(a)}*t^*}{80 - \theta_B^{(a)}*t^*}$$

is established. Note that in the above-described formula manipulation, since the material is not additionally introduced, $$\stackrel{1}{\uparrow}_1 H'(t,x) = 0$$

is met.

Here, considering $$\stackrel{1}{\uparrow}_1 I^{(a)} = \stackrel{1}{\uparrow}_1 I^{(a)}(1,1) = \binom{70}{70},$$

from Formula (8.2),

Formula 80

$$\stackrel{1}{\uparrow}_1 I^{(a)}(1,1) = \binom{120 - \theta_A^{(a)}*1}{80 - \theta_B^{(a)}*1} = \binom{70}{70} \quad (8.3)$$

is found, so $\theta_A^{(a)}=50$ and $\theta_B^{(a)}=10$. They are denoted as $$\theta^{(a)} = \binom{\theta_A^{(a)}}{\theta_B^{(a)}} = \binom{50}{10}.$$

Note that, from the standard data, $$\theta^{(s)} = \binom{\theta_A^{(s)}}{\theta_B^{(s)}} = \binom{20}{0}$$

is found. The impairment parameter represents the impairment amount in one cost accounting period, and therefore it means the impairment amount per the elapsed time of 10 hours.

Since $\theta^{(a)}$ is obtained, Formula (8.2) is obtained as follows.

Formula 81

$$\stackrel{1}{\uparrow}_1 I^{(a)}(t^*, x^*) = \binom{120 - 50*t^*}{80 - 10*t^*}. \quad (8.3)$$

Next, $$\stackrel{1}{\uparrow}_1 \eta^{(a)}$$

is calculated. From Formula (7.6),

Formula 82

$$\stackrel{1}{\uparrow}_1 \eta^{(a)} = \int_{(0,0)}^{(1,1)} \mathcal{L}\left(\stackrel{1}{\uparrow}_1 I^{(a)}(t,x)\right) * f'(t,x)\cdot dr \quad (8.4)$$
$$\text{path}(a)$$

$$= \int_{(0,0)}^{(1,1)} \stackrel{1}{\uparrow}_1 I^{(a)}(t,x) * (0*i + 1*j)\cdot dr$$

$$= \int_{(0,0)}^{(1,1)} \{(120 - 50*t) + (80 - 10*t)\} * (0*i + 1*j)\cdot dr$$

$$= 170$$

is found.

In the above-described Formula manipulation, in the processing work (the direct work by the factory workers), since the required direct operation period is proportionate to only the total weight of the materials, $$\mathcal{L}\left(\stackrel{1}{\uparrow}_1 I^{(a)}(t,x)\right) = \stackrel{1}{\uparrow}_1 I^{(a)}(t,x)$$

is defined. Additionally, since performing the direct work advances the degree of processing progress, $f'(t,x)=(0*i+1*j)$ is defined.

Next, $$\stackrel{1}{\uparrow}_1 \zeta^{(a)}_{total}$$

is calculated. Considering that the 1→1 arrow is a present term introduction input node, from Formula (7.21), Formula 83

$$\stackrel{1}{\uparrow}_1 \zeta^{(a)}_{total} = \stackrel{1}{\uparrow}_1 \overline{\zeta}^{(a)} \quad (8.5)$$

$$= \stackrel{1}{\uparrow}_1 \zeta^{(a)}_{in} + \int_{(0,0)}^{(1,1)} \stackrel{1}{\uparrow}_1 H'^{(a)}(t,x)\cdot dr$$
$$\text{path}(a)$$

$$= \stackrel{1}{\uparrow}_1 \zeta^{(a)}_{in} + \int_{(0,0)}^{(1,1)} O\cdot dr$$
$$\text{path}(a)$$

$$= \binom{120}{80}$$

is found.

Next, the standard (s) is considered. Usually, there are two standard arrows (paths (s)) which are an o(s)→input arrow and an o(s)→output arrow. In the example of this time, since the input node is the present term introduction node, the standard arrow of the o(s)→input node degenerates and disappears (the point $$\underset{o(s)}{\overset{1\to 1}{\uparrow}} o^{(s)}$$

overlaps with the input node). Therefore, only the o(s)→output node is considered.

First, the material amount vector $$\underset{o(s)}{\overset{1\to 1}{\uparrow}} l^{(s)}(t^*, x^*)$$

on the path of the standard arrow is calculated. With reference to Formula (7.19), Formula 84

$$\underset{o(s)}{\overset{1\to 1}{\uparrow}} l^{(s)}(t^*, x^*) = \underset{o(s)}{\overset{1\to 1}{\uparrow}} l^{(s)} * \underset{o(s)}{\overset{1\to 1}{\uparrow}} \psi^{(s)} - \int_{\left(\underset{o(s)\,in}{\overset{1\to 1}{\uparrow}} t^{(s)}, 0\right)}^{(t^*, x^*)} \underset{o(s)}{\overset{1\to 1}{\uparrow}} G'^{(s)}(t, x) \cdot dr + \quad (8.6)$$

$$\int_{\left(\underset{o(s)\,in}{\overset{1\to 1}{\uparrow}} t^{(s)}, 0\right)}^{(t^*, x^*)} \underset{o(s)}{\overset{1\to 1}{\uparrow}} H'^{(s)}(t, x) \cdot dr = \underset{o(s)\,in}{\overset{1\to 1}{\uparrow}} l^{(s)} * \begin{pmatrix} 0.5 \\ 0.5 \end{pmatrix} -$$

$$\int_{\left(\frac{1}{2}, 0\right) \, path(s)}^{(t^*, x^*)} \begin{pmatrix} \theta_A^{(s)} * i + 0 * j \\ \theta_B^{(s)} * i + 0 * j \end{pmatrix} \cdot dr +$$

$$\int_{\left(\frac{1}{2}, 0\right) \, path(s)}^{(t^*, x^*)} O \cdot dr = \underset{o(s)\,in}{\overset{1\to 1}{\uparrow}} l^{(s)} * \begin{pmatrix} 0.5 \\ 0.5 \end{pmatrix} - \int_{\left(\frac{1}{2}, 0\right) \, path(s)}^{(t^*, x^*)} \begin{pmatrix} 20 * i + 0 * j \\ 0 * i + 0 * j \end{pmatrix} \cdot dr +$$

$$\int_{\left(\frac{1}{2}, 0\right) \, path(s)}^{(t^*, x^*)} O \cdot dr = \begin{pmatrix} 0.5 * \underset{o(s)\,in}{\overset{1\to 1}{\uparrow}} l^{(s)} - 20 * t^* + 10 \\ 0.5 * \underset{o(s)\,in}{\overset{1\to 1}{\uparrow}} l^{(s)} \end{pmatrix}$$

is established. Here, with Formula (7.20), that is, with the condition under which the total material amount is matched at the output node, Formula 85

$$\underset{o(s)}{\overset{1\to 1}{\uparrow}} l^{(s)}(1, 1) = \underset{1}{\overset{1}{\uparrow}} l^{(a)} \quad (8.7)$$

$$\left(0.5 * \underset{o(s)\,in}{\overset{1\to 1}{\uparrow}} l^{(s)} - 20 * 1 + 10\right) + \left(0.5 * \underset{o(s)\,in}{\overset{1\to 1}{\uparrow}} l^{(s)}\right) = 70 + 70$$

$$\therefore \underset{o(s)\,in}{\overset{1\to 1}{\uparrow}} l^{(s)} = 150$$

is found. Thus, Formula (8.6) finally becomes the following formula.

Formula 86

$$\underset{o(s)}{\overset{1\to 1}{\uparrow}} l^{(s)}(t^*, x^*) = \begin{pmatrix} 85 - 20 * t^* \\ 75 \end{pmatrix}. \quad (8.8)$$

With Formula (8.8), the standard material amount vector at the coordinate on the standard arrow path can be calculated. For example, Formula 87

$$\underset{o(s)}{\overset{1\to 1}{\uparrow}} l^{(s)}\left(\frac{1}{2}, 0\right) = \begin{pmatrix} 85 - 20 * 0.5 \\ 75 \end{pmatrix} \quad (8.9)$$

$$= \begin{pmatrix} 75 \\ 75 \end{pmatrix},$$

$$\underset{o(s)}{\overset{1\to 1}{\uparrow}} l^{(s)}(1, 1) = \begin{pmatrix} 85 - 20 * 1 \\ 75 \end{pmatrix} \quad (8.10)$$

$$= \begin{pmatrix} 65 \\ 75 \end{pmatrix}.$$

is found. FIG. 19 illustrates the result of Formula (8.9).

A summary of the result regarding the standard is as follows. To manufacture 140 kg of the output node of the production data under the standard condition, 150 kg (the breakdown is (A:B)=(75 kg:75 kg)) of the material is introduced at the time 15:00, and 140 kg (the breakdown is (A:B)=(65 kg:75 kg)) of the product is completed at the time 20:00, which the time after the elapse of 5 hours.

Next, $$\underset{1}{\overset{1}{\uparrow}} \eta^{(s)}$$

is calculated. Since the input node is the present term introduction node, it is clearly $$\underset{1}{\overset{1}{\uparrow}} \eta^{(s)} = 0.$$

Therefore, with Formula (5.9) and Formula (7.18),

Formula 88

$$\begin{aligned}
\overset{1}{\underset{1}{\uparrow}} \eta^{(s)} &= \overset{1}{\underset{1}{\uparrow}} \overline{\eta}^{(s)} - \overset{1}{\underset{1}{\uparrow}} \underline{\eta}^{(s)} \quad (8.11)\\
&= \int_{\substack{(\frac{1}{2},0) \\ path(s)}}^{(1,1)} \mathcal{L}\left(\overset{1\to\boxed{1}}{\underset{o(s)}{\uparrow}} l^{(s)}(t,x)\right) * f'(t,x) \cdot dr \\
&= \int_{\substack{(\frac{1}{2},0) \\ path(s)}}^{(1,1)} \overset{1\to\boxed{1}}{\underset{o(s)}{\uparrow}} l^{(s)}(t,x) * (0*i + 1*j) \cdot dr \\
&= \int_{\substack{(\frac{1}{2},0) \\ path(s)}}^{(1,1)} \{(85 - 20*t) + (75)\} * (0*i + 1*j) \cdot dr \\
&= 145
\end{aligned}$$

is found.
Next, $$\overset{1}{\underset{1}{\uparrow}} \zeta^{(s)}_{total}$$

is calculated. Since the input node is the present term introduction node, with Formula (7.24), Formula 89

$$\begin{aligned}
\overset{1}{\underset{1}{\uparrow}} \zeta^{(s)}_{total} &= \overset{1}{\underset{1}{\uparrow}} \overline{\zeta}^{(s)} \quad (8.12)\\
&= \overset{1\to\boxed{1}}{\underset{o(s)\ in}{\uparrow}} l^{(s)} + \int_{\substack{(\frac{1}{2},0) \\ path(s)}}^{(1,1)} \overset{1\to\boxed{1}}{\underset{o(s)}{\uparrow}} H'^{(s)}(t,x) \cdot dr \\
&= \overset{1\to\boxed{1}}{\underset{o(s)\ in}{\uparrow}} l^{(s)} * \overset{1\to\boxed{1}}{\underset{o(s)}{\uparrow}} \psi^{(s)} + \int_{\substack{(\frac{1}{2},0) \\ path(s)}}^{(1,1)} O \cdot dr \\
&= 150 * \begin{pmatrix} 0.5 \\ 0.5 \end{pmatrix} \\
&= \begin{pmatrix} 75 \\ 75 \end{pmatrix}
\end{aligned}$$

Formula 90

$$\begin{aligned}
\overset{1\to\boxed{1}}{\underset{o(s)}{\uparrow}} l^{(\%)}(t^*, x^*) &= \overset{1\to\boxed{1}}{\underset{o(s)\ in}{\uparrow}} l^{(\%)} * \overset{1\to\boxed{1}}{\underset{o(s)}{\uparrow}} \psi^{(s)} - \int_{\substack{(\frac{1}{2},0) \\ path(s)}}^{(t^*,x^*)} \begin{pmatrix} \theta_A^{(a)} * i + 0 * j \\ \theta_B^{(a)} * i + 0 * j \end{pmatrix} \cdot dr + \int_{\substack{(\frac{1}{2},0) \\ path(s)}}^{(t^*,x^*)} O \cdot dr \quad (8.6\%) \\
&= \begin{pmatrix} 0.5 * \overset{1\to\boxed{1}}{\underset{o(s)\ in}{\uparrow}} l^{(\%)} - 50 * t^* + 25 \\ 0.5 * \overset{1\to\boxed{1}}{\underset{o(s)\ in}{\uparrow}} l^{(\%)} - 10 * t^* + 5 \end{pmatrix},
\end{aligned}$$

-continued $$\uparrow_{o(s)}^{1\to\boxed{1}} l^{(\%)}(1,1) = \uparrow_1^1 \bar{l}^{(a)} \tag{8.7\%}$$

$$\therefore \uparrow_{o(s)}^{1\to\boxed{1}} l^{(\%)} = 170,$$

$$\uparrow_{o(s)}^{1\to\boxed{1}} l^{(\%)}(t^*, x^*) = \begin{pmatrix} 110 - 50*t^* \\ 90 - 10*t^* \end{pmatrix}, \tag{8.8\%}$$

$$\uparrow_{o(s)}^{1\to\boxed{1}} l^{(\%)}\left(\frac{1}{2}, 0\right) = \begin{pmatrix} 110 - 50*0.5 \\ 90 - 10*0.5 \end{pmatrix} \tag{8.9\%}$$

$$= \begin{pmatrix} 85 \\ 85 \end{pmatrix},$$

$$\uparrow_{o(s)}^{1\to\boxed{1}} l^{(\%)}(1,1) = \begin{pmatrix} 110 - 50*1 \\ 90 - 10*1 \end{pmatrix} \tag{8.10\%}$$

$$= \begin{pmatrix} 60 \\ 80 \end{pmatrix},$$

$$\uparrow_1^1 \eta^{(\%)} = \int_{\substack{(\frac{1}{2},0) \\ path(s)}}^{(1,1)} \uparrow_{o(s)}^{1\to\boxed{1}} l^{(\%)}(t,x) * (0*i + 1*j) \cdot dr \tag{8.11\%}$$

$$= 155,$$

$$\uparrow_{1\,total}^{1} \zeta^{(\%)} = \uparrow_{o(s)\,in}^{1\to\boxed{1}} l^{(\%)} * \uparrow_{o(s)}^{1\to\boxed{1}} \psi^{(s)} + \int_{\substack{(\frac{1}{2},0) \\ path(s)}}^{(1,1)} O \cdot dr \tag{8.12\%}$$

$$= \begin{pmatrix} 85 \\ 85 \end{pmatrix}.$$

is found. Since no material is additionally introduced, Formula (8.12) matches Formula (8.9).

Next, for variance analysis, a substitution $$\begin{pmatrix} \theta(a) \\ \psi(s) \\ path(s) \end{pmatrix} = (\%)$$

is done and η (%) and ζ (%) are considered. Basically, in Formulae (8.6)-(8.12), only the combinations of (a) and (s) of the related parameters are changed. Here, only the formulae are shown.

Next, a substitution $$\begin{pmatrix} \theta(a) \\ \psi(a) \\ path(s) \end{pmatrix} = (\#)$$

is done and similar operations are done.

Formula 91

$$\uparrow_{o(s)}^{1\to\boxed{1}} l^{(\#)}(t^*, x^*) = \uparrow_{o(s)\,in}^{1\to\boxed{1}} l^{(\#)} * \uparrow_{o(s)}^{1\to\boxed{1}} \psi^{(a)} - \int_{\substack{(\frac{1}{2},0) \\ path(s)}}^{(t^*,x^*)} \begin{pmatrix} \theta_A^{(a)} * i + 0*j \\ \theta_B^{(a)} * i + 0*j \end{pmatrix} \cdot dr + \tag{8.6\#}$$

$$\int_{\substack{(\frac{1}{2},0) \\ path(s)}}^{(t^*,x^*)} O \cdot dr = \begin{pmatrix} 0.6 * \uparrow_{o(s)\,in}^{1\to\boxed{1}} l^{(\#)} - 50*t^* + 25 \\ 0.4 * \uparrow_{o(s)\,in}^{1\to\boxed{1}} l^{(\#)} - 10*t^* + 5 \end{pmatrix},$$

$$\uparrow_{o(s)}^{1\to\boxed{1}} l^{(\#)}(1,1) = \uparrow_1^1 \bar{l}^{(a)} \tag{8.7\#}$$

$$\therefore \uparrow_{o(s)\,in}^{1\to\boxed{1}} l^{(\#)} = 170,$$

$$\uparrow_{o(s)}^{1\to\boxed{1}} l^{(\#)}(t^*, x^*) = \begin{pmatrix} 127 - 50*t^* \\ 73 - 10*t^* \end{pmatrix}, \tag{8.8\#}$$

$$\uparrow_{o(s)}^{1\to\boxed{1}} l^{(\#)}\left(\frac{1}{2}, 0\right) = \begin{pmatrix} 127 - 50*0.5 \\ 73 - 10*0.5 \end{pmatrix} = \begin{pmatrix} 102 \\ 68 \end{pmatrix}, \tag{8.9\#}$$

$$\uparrow_{o(s)}^{1\to\boxed{1}} l^{(\#)}(1,1) = \begin{pmatrix} 127 - 50*1 \\ 73 - 10*1 \end{pmatrix} = \begin{pmatrix} 77 \\ 63 \end{pmatrix}, \tag{8.10\#}$$

$$\uparrow_1^1 \eta^{(\#)} = \int_{\substack{(\frac{1}{2},0) \\ path(s)}}^{(1,1)} \uparrow_{o(s)}^{1\to\boxed{1}} l^{(\#)}(t,x) * (0*i + 1*j) \cdot dr = 155, \tag{8.11\#}$$

-continued $$\underset{1\ total}{\overset{1}{\uparrow}} \zeta^{(\#)} = \underset{o(s)\ in}{\overset{1-\boxed{1}}{\uparrow}} l^{(\#)} * \underset{o(s)}{\overset{1-\boxed{1}}{\uparrow}} \psi^{(a)} + \int_{\left(\frac{1}{2},0\right)\ path(s)}^{(1,1)} O \cdot dr = \begin{pmatrix} 102 \\ 68 \end{pmatrix}. \quad (8.12\#)$$

Next, q(s) and p(s) are defined. First, regarding the material, since $\zeta$ (kg)=q (kg), p(s) ($\zeta$) is directly considered. If Formula 92

$$\zeta_{total} = \begin{pmatrix} \zeta_{total}^A \\ \zeta_{total}^B \end{pmatrix}$$

is defined, with the standard data,

Formula 92

$$p_A^{(s)}\left(\zeta_{total}^A\right) = 2{,}000 * \zeta_{total}^A, \quad (8.13)$$

$$p_B^{(s)}\left(\zeta_{total}^B\right) = 3{,}000 * \zeta_{total}^B \quad (8.14)$$

are found.

Regarding the processing cost, since there is the direct operation period q, q(s)(η) is first defined. The following formula is established with the standard data.

Formula 93

$$q^{(s)}(\eta) = 3*\eta. \quad (8.15)$$

Next, p(s)(q) is defined. The variable processing cost is denoted as $p_V$ and the fixed processing cost is denoted as $p_F$. With the standard data, the following formula is established.

Formula 94

$$p_V^{(s)}(q) = 2{,}000 * q, \quad (8.16)$$

$$p_F^{(s)}(q) = \frac{60{,}000}{60} * q \quad (8.17)$$
$$= 1{,}000 * q.$$

Related to Formula (8.17), q(cap) is as follows.

Formula 95

$$q^{(cap)} = 60\ h * 10\ \text{Elapsed time} \quad (8.18)$$
$$= 600\ h.$$

Based on above-described results, the variance analysis is performed (see from FIG. 20 to FIG. 22B).
1) The variance analysis allows evaluating a degree of efficiency for each of the parameters. Note that the order of the variance analysis is merely an example. Different orders are also possible.
2) Regarding a material amount ratio ψ variance at the starting point introduction of the materials, since it is a ratio parameter, the increasing the material A reduces the material B by that amount. That is, if unfavorable variance occurs in A, favorable variance always occurs in B. Therefore, A and B may be summed, and the ψ variance of the material may be evaluated as A 34,000 (unfavorable)+B 51,000 (favorable)=17,000 (favorable).

3) While two kinds of materials are introduced, except that, this numerical example is considerably simple, and only one arrow (moreover, the present term introduction input node) is present. Additionally, no material is additionally introduced. Although this is a setting wherein even the line integration can be calculated easily, such an amount of calculation is necessary.

Even only with one arrow, in a case where it is the beginning in-process product input node, since the path (s) needs to be considered also on the input node side, the calculation amount is simply approximately doubled.

Moreover, in a situation where a plurality of input nodes and a plurality of output nodes need to be considered from the matching, multiple arrows appear, and therefore the calculation amount becomes further enormous.

4) In this example, the actual impairment amount is larger than the standard impairment amount, and the possible two causes are: 1) the impairment amount per the elapsed time (the impairment parameter θ) is larger than the standard impairment amount or 2) since the time is too much taken interminably for the processing work, the elapsed time (path) is longer than the standard elapsed time.

In this time, since both of θ and the path are worse than those of the standard, both of them are the causes. However, seeing the amount of money in the variance analysis, the path variance has the large unfavorable variance in every cost, and therefore it can be found that the influence of the path is greater.

However, the conclusion possibly changes depending on the order of the variance analysis. It is important to continue analysis in all terms in the same order.

(Reference: What Happens when Variance Analysis is Performed by a Conventional Method)

Here, a result in a case where the numerical example is calculated by the conventional method is shown. The conventional method first starts from generating standard production data.

In the case of the numerical example in this time, the standard production data is as follows.

TABLE 6-1

| Standard Production Data | |
|---|---|
| Introduction A | 75 kg |
| B | 75 kg |
| Total Introduction | 150 kg |
| Standard Impairment | 10 kg |
| Completion | 140 kg |

However, the description already has a problem. It appears that the standard impairment occurs in proportion to the introduction amount (the introduction amount: the impairment amount=150:10), but the situation at this time is that the constant amount is actually impaired regardless of the introduction amount.

The standard production data as described above shows correct data only in a situation where the impairment amount is proportionate to the introduction amount and the impairment occurs in association with the degree of progress x.

FIG. 23 to FIG. 27 summarize the variance analysis results by the conventional method. FIG. 23 is a drawing illustrating an example of the variance analysis regarding the material A, and FIG. 24 is a drawing illustrating an example of the variance analysis regarding the material B.

A price variance means a price p variance. Since the calculation method is the same, the same result is obtained by the conventional method.

Since no material is additionally introduced in this time, a combination variance corresponds to the material amount ratio $\psi$ variance at the starting point introduction. Since it is better to consider by the sum of the material A and the material B, doing so finds 20,000 yen (favorable).

A yield variance corresponds to an impairment $\theta$ variance and an arrow path ("path") variance. Obviously, the $\theta$ variance and the path variance cannot be distinguished by the conventional method.

In the numerical example of this time, regarding the material A and the material B, the arrow cost accounting does not make a big difference from the conventional method mostly.

FIG. 25 is a drawing illustrating an example of the variance analysis regarding the variable processing cost.

Usually, FIG. 25 is a variance analysis drawing for a direct labor cost, but in the example of this time, since the direct labor cost and the variable processing cost are correctively treated, the variance analysis of the variable processing cost is performed in FIG. 25.

A budget variance means a price p variance. Since the calculation method is the same, the amount of money is matched.

The efficiency variance is determined to be a favorable variance, that is, "the efficiency of the processing work in the present term was good." However, even when (a) and (s) of each of the parameters are compared, the parameter better than the standard parameter exists nowhere, and there is no basis of determining that "the efficiency was good." Rather, as it is apparent by seeing the variance analysis result by arrow cost accounting, since all parameters have poor results in the present term, it needs to be determined that "the efficiency was poor" (regardless of viewpoints).

The reason why such a result occurs is that while the efficiency is defined to be an "operation period/introduction amount" in the conventional method, this contains an influence from the impairment. That is, the reason why it is determined that "the efficiency in the present term was good" is that since the introduced material is impaired by a large amount, as a result, the material that needs to be processed is substantially reduced.

It might be considered that, since the influence from the impairment is reflected to the yield variance, the influence is not included in the efficiency variance. However, actually, the calculation method itself of the yield variance does not handle the real impairment generation mechanism, and therefore the influence from the impairment is included in the efficiency variance.

To avoid the inclusion of the influence from the impairment in the efficiency variance, it is only necessary not to define the efficiency by "the operation period/introduction amount" but to define it by the "operation period/processing conversion amount $\eta$." FIG. 26 illustrates the variance analysis based on this definition. With this alternative approach, the efficiency variance matches the resource consumption amount q variance.

At this time, a $\eta$/introduction variance is separated from the original efficiency variance. However, this is difficult to be interpreted because then the variance gets favorable as the impairment amount increases. Accordingly, the $\eta$/introduction variance is preferably added to the yield variance for evaluation. The $\eta$/introduction variance+yield variance becomes 150,000 yen (unfavorable variance), and this matches the sum of the impairment $\theta$ variance and the arrow path "path" variance in our method. Obviously, the conventional method cannot identify whether the cause of the impairment is $\theta$ or path.

Figure 27:
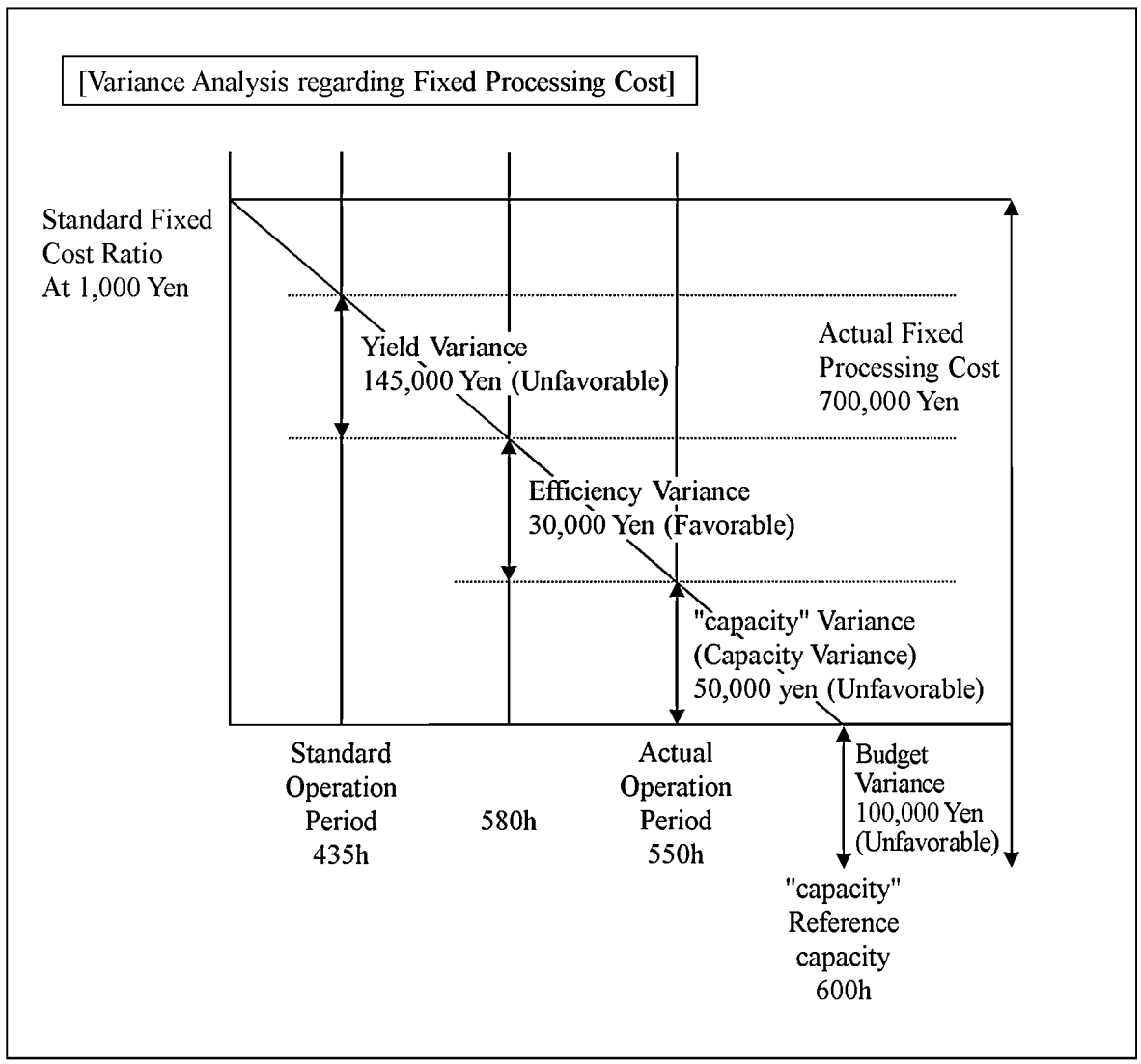
FIG. 27 is a drawing illustrating an example of the variance analysis regarding the fixed processing cost.

As illustrated in FIG. 27, regarding the fixed processing cost as well, since the variance analysis is performed based on the operation period in a manner similar to the variable processing cost, the efficiency variance is found to be favorable similarly to the case of the variable processing cost.

Ninth Chapter: Summary of Comparison with Conventional Method

In the conventional method (the process costing), the nodes are apparently recognized, but actually the nodes are not recognized but only items regarding in-process product account of accounting are recognized. For example, if there are a plurality of beginning in-process product nodes, present term introduction nodes, present term completion nodes, and ending in-process product nodes, they are collectively treated and amount of information for the nodes is reduced. Additionally, the nodes are recognized for each of the cost elements.

Further, the arrows are not recognized. Since the arrows are not recognized, the cost distribution merely distributes the costs of the nodes at the ratios in accordance with the matchings of the nodes recognized for each of the cost elements. However, the method cannot calculate the cost accurately except for considerably simple situations.

Further, the process costing treats the impairment (not including spoilage) as if the impairment were an output node. This is to indicate an impairment cost on the right side of the in-process product account in terms of accounting (actually, a normal impairment cost is indicated by being added to the completed product and the ending in-process product).

However, according to the theory of the arrow cost accounting, the impairment should not be treated as an output node but should be defined as a decreased amount of the material amount proceeding on the arrow path. The arrow cost accounting basically treats the spoilage similarly to the impairment, but there may be a case where the spoilage is treated differently depending on the situation. For example, total spoilage is recognized as the output node in some cases.

In details, in a case where the beginning in-process product is purchased from outside and the ratio between the material cost and the processing cost is unknown, in the conventional method, the cost accounting cannot be calculated by the average method. The arrow cost accounting does not cause such a failure.

Although the conventional method (the job costing) does not use terms such as node or arrow, it can be actually considered as one type of the arrow cost accounting. First, the matching is limited only to actually measured one-to-one matching (the reality level 1). The resource consumption amount q is actually measured in each of the arrows (the reality level 1). Since q is actually measured, $\eta$ is not recognized. $\zeta$ is recognized to be $\zeta=q$, and q is always actually measured.

Note that, the job costing calculates (a) and (s) of $\eta$ and $\zeta$ when the standard cost management is performed, but does not define $\eta$ or $\zeta$ on the cost accounting space, and therefore under a complicated production situation, accurate variance analysis is difficult. Especially, when the elapsed time t is included, an accurate variance analysis can hardly be expected.

The job costing actually measures the one-to-one matching and needs to actually measure q for each arrow, so it calculates the cost accurately, whereas a required data amount is too large, and is not a method that can be performed by all companies. Even so, reducing the data to be collected leaves no other choice but to perform the process costing, but then it only results in an inaccurate cost calculation.

That is, the conventional methods can be evaluated as the job costing in which the calculation is accurate but the required data amount is large and the process costing in which the required data amount is small but the calculation is inaccurate.

Compared with them, the arrow cost accounting can be evaluated as a method of performing the calculation as accurate as possible within a range found from the collected data. When the large amount of good quality data is collected, the calculation result is more accurate by that amount, whereas when only the small amount of poor quality data is collected, the accuracy of the calculation is to that degree. However, the inaccuracy merely depends on the quality and the amount of the collected data and it does not mean that the calculation method is inaccurate (compared with this, in the conventional process costing, the calculation method itself is originally inaccurate).

Novel Points

1) "Proposal of Concepts of Cost Accounting Space, Node, Arrow, and Arrow Diagram Required for Cost Accounting Accurately Corresponding to Procedure of Physical Processing Work"

Within the range found from the collected data, the cost accounting is performed as accurately as possible (up to the present, there has been only either of the job costing that is accurate but requires too much data and the process costing that requires the small amount of data but the calculation is inaccurate).

Thus, the node and the arrow are recognized on the cost accounting space and required calculation is performed. For ensuring visual understanding, the arrow diagram has been designed. The ideas of the cost accounting space, the node, the arrow, and the arrow diagram are novel points.

2) "Extension Toward Time t-Axis in Cost Accounting Space"

As the cost accounting space, the tx cost accounting space to which the time t is introduced has been designed. The conventional cost accounting has recognized the degree of processing progress x as important information for cost accounting, although it is not on the cost accounting space. However, the method that calculates the cost with an accurate consideration for the time t has not been considered up to the present.

Although some models considering the time t have been proposed, they do not calculate η or ζ on the cost accounting space. Accordingly, under complicated production situations, the accurate calculation cannot be performed after all.

The cost accounting space is not a one-dimensional model only with the x-axis but is expanded to the two-dimensional model with the t-axis and the x-axis, and thus definitions of required various variables, such as η and ζ, are rewritten in association with it.

Introduction of the time t to the cost accounting in a precise form is a novel point.

3) "Proposal of Standard Cost Accounting Method on Cost Accounting Space"

The method of the standard cost accounting with the model has been proposed. In particular, the lead time (the elapsed time) is also added to the tx model as a target for efficiency, and thus further accurate and further detailed variance analysis is possible. The proposed method accurately analyzes the material amount ratio variance at the starting point introduction even in a case where a plurality of kinds of materials are introduced at the process starting point.

While the idea itself of the standard cost accounting, which is to compare the standard and the actual and calculate the variance, exists since early times, a novel point is that a method that performs it in a precise form has been proposed.

For example, consider a situation in which the impairment during the processing work occurs more than that in the standard. In the arrow cost accounting, the following three can be considered as the cause:

1) Errors during the processing work are more than standard;
2) The impairment amount per the elapsed time is more than standard; and
3) The elapsed time is excessively longer than standard.

Since they are respectively different causes, their countermeasures would naturally be supposed to be different. However, since the time t is not recognized in the conventional cost accounting, only 1) can be recognized. Therefore, in a case where the cause is 2) or 3), a misdirected countermeasure might be employed. The arrow cost accounting is free from such a risk.

(Interpretation Section 2)

Interpretation Section 2 describes differences between the conventional cost accounting methods (the job costing and the process costing) and the arrow cost accounting according to the present invention based on some numerical examples.

Example 1

Based on the following conditions (data), the completed product cost and the ending in-process product cost are calculated.

(Conditions)

A factory processes one material for four hours to manufacture one product. A material takes a material cost and the material cost was 200 yen per piece until the previous term but it was 300 yen in the present term. The processing takes a processing cost and the processing cost was 10 yen per hour until the previous term but it was 20 yen in the present term.

The production data in the present term was as follows. Note that the degree of processing progress represents how the processing is progressing and increases by 25% per one hour of processing.

TABLE 7

(Production Data)

| Production Order No. | Instructed Production Amount | Remarks |
|---|---|---|
| No. 100 | 3 Pieces | Degree of Processing Progress at the Beginning of the Term: 50%. Completed in the Present Term. |

TABLE 7-continued (Production Data)

| Production Order No. | Instructed Production Amount | Remarks |
|---|---|---|
| No. 200 | 3 Pieces | Degree of Processing Progress at the Beginning of the Term: 50%. Degree of Processing Progress at the End of the Term: 50%. |
| No. 300 | 3 Pieces | Present Term Introduction. Degree of Processing Progress at the End of the Term: 50%. |

(Other Conditions)
The production situation is completely stable, and the products are always completed by processing for four hours per material. The material is all introduced at the process starting point (a starting point introduction material).

Example 1 Solution/Interpretation

Figure 28:
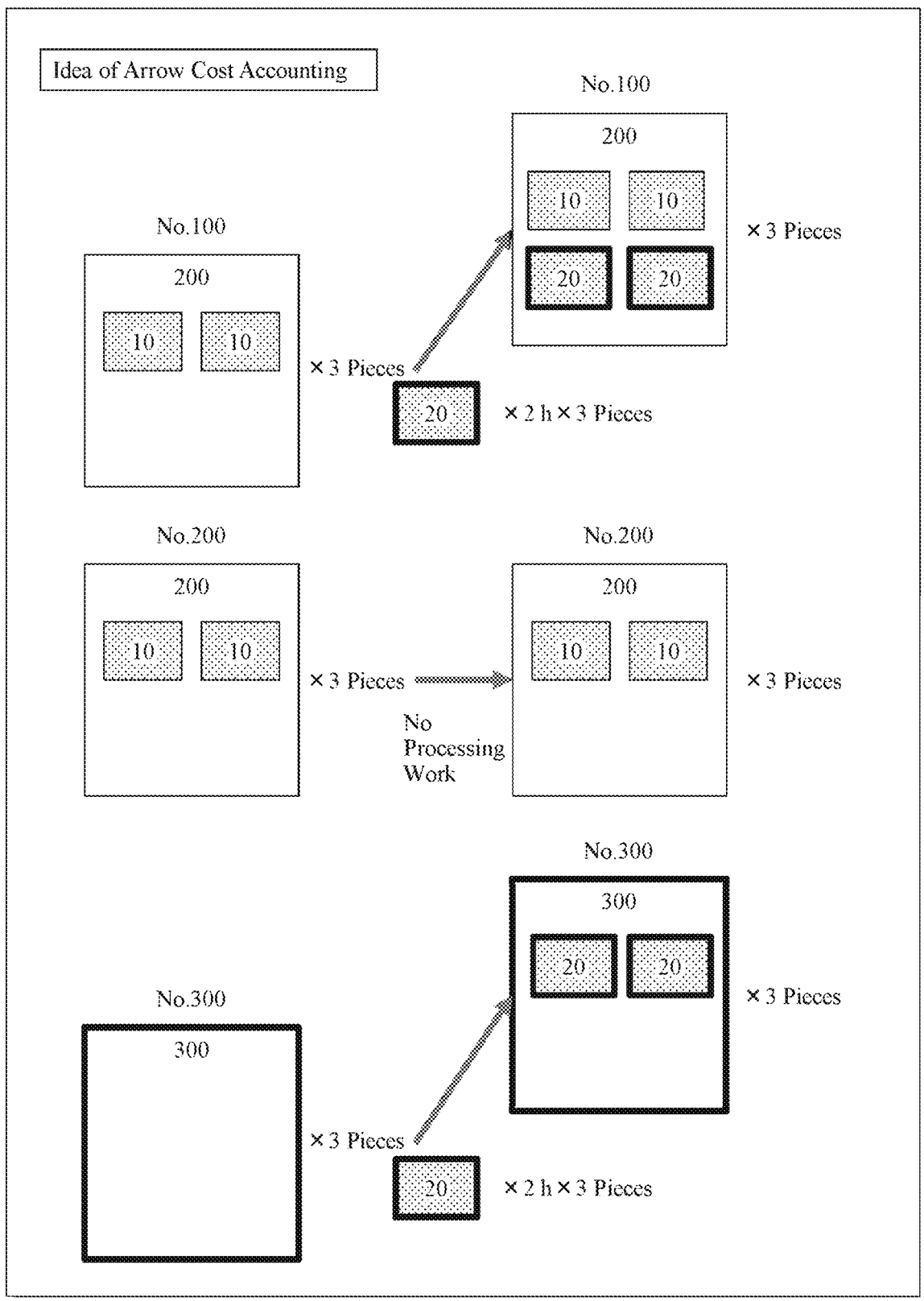
FIG. 28 is a principle diagram illustrating an idea of arrow cost accounting.

To consider the subject of Example 1, the schematic diagram illustrated in FIG. 28 can be considered for easy understanding. In the schematic FIG. 28, the large squares represent materials (the values indicate material costs), and the small squares in the large squares indicate processing costs (the values indicate processing costs) for one hour. Since the products are completed by processing for four hours, the presence of the four small squares represents the completion.

In FIG. 28, the left side represents the time point of the beginning of the term and the time point of the material introduction, and the right side represents the time point of completion and the time point of the end of term. They show the production situation of the production order in the present term. In a case where the arrow symbol connecting the same production order Nos. is diagonally right up, this represents that the processing proceeds in the term. For example, at Nos. 200, the processing does not proceed at all in the present term, and therefore the arrow symbol goes sideways.

With reference to FIG. 28, the respective costs can be calculated as shown in the following Table 7. Note that the beginning in-process product refers to a product which is in process (a product in the middle of manufacturing) at the beginning of the term.

TABLE 8

| Production Order No. | Beginning In-process product Cost | Present Term Material Cost | Present Term Processing Cost | Total |
|---|---|---|---|---|
| No. 100 | (200 + 10 × 2) × 3 Pieces = 660 Yen | — | (20 × 2) × 3 Pieces = 120 Yen | 780 Yen |
| No. 200 | (200 + 10 × 2) × 3 Pieces = 660 Yen | — | — | 660 Yen |
| No. 300 | — | 300 × 3 Pieces = 900 Yen | (20 × 2) × 3 Pieces = 120 Yen | 1,020 Yen |

As shown in Table 8, the completed product cost is 780 yen (No. 100), and the ending in-process product cost is 1,680 yen (No. 200 and No. 300).

The calculation method thus totalizing the product cost for each production order is referred to as the job costing, and in Example 1, the arrow cost accounting performs the same calculation. The reason is because the situation of Example 1 is too simple and practically no other rational calculation method can be considered (obviously, in a more complicated situation, the job costing and the arrow cost accounting show different calculation results).

The following describes some points to note.

First, at the beginning of the term of No. 100 and No. 200, both are at the same degree of processing progress (50%), and the costs are also the same (the material costs and the processing costs are the same). However, at the end of term of No. 200 and No. 300, in spite of the same degree of processing progress (50%), the costs are different. This is because the processing was performed in earlier terms in which the material cost and the processing cost were lower in No. 200, whereas the processing is performed in the present term in which the material cost and the processing cost are high in No. 300.

Example 2

Based on the following conditions (data), the completed product cost and the ending in-process product cost are calculated.

A factory processes one material for four hours to manufacture one product. A material takes a material cost and the material cost was 200 yen per piece until the previous term but it was 300 yen in the present term. The processing takes a processing cost and the processing cost was 10 yen per hour until the previous term but it was 20 yen in the present term.

The production data in the present term was as follows (see Table 9). Note that the degree of processing progress shows how the processing is progressing and increases by 25% per one hour of processing.

TABLE 9

| (Production Data) | | (Degree of Processing Progress) |
|---|---|---|
| Beginning In-process product | 6 Pieces | (50%) |
| Present Term Introduction | 3 Pieces | |
| Sum | 9 Pieces | |
| Ending in-process Product | 6 Pieces | (50%) |
| Present Term Completed Product | 3 Pieces | |

(Other Conditions)
1) The production situation is completely stable, and the products are always completed by processing for four hours per material.
2) The material is all introduced at the process starting point (the starting point introduction material).
3) At the factory, the material introduced earlier is processed in priority. In view of this, the products are completed in the order of the material introduction (the first-in first-out method).

Example 2 Solution/Interpretation

Figure 29:
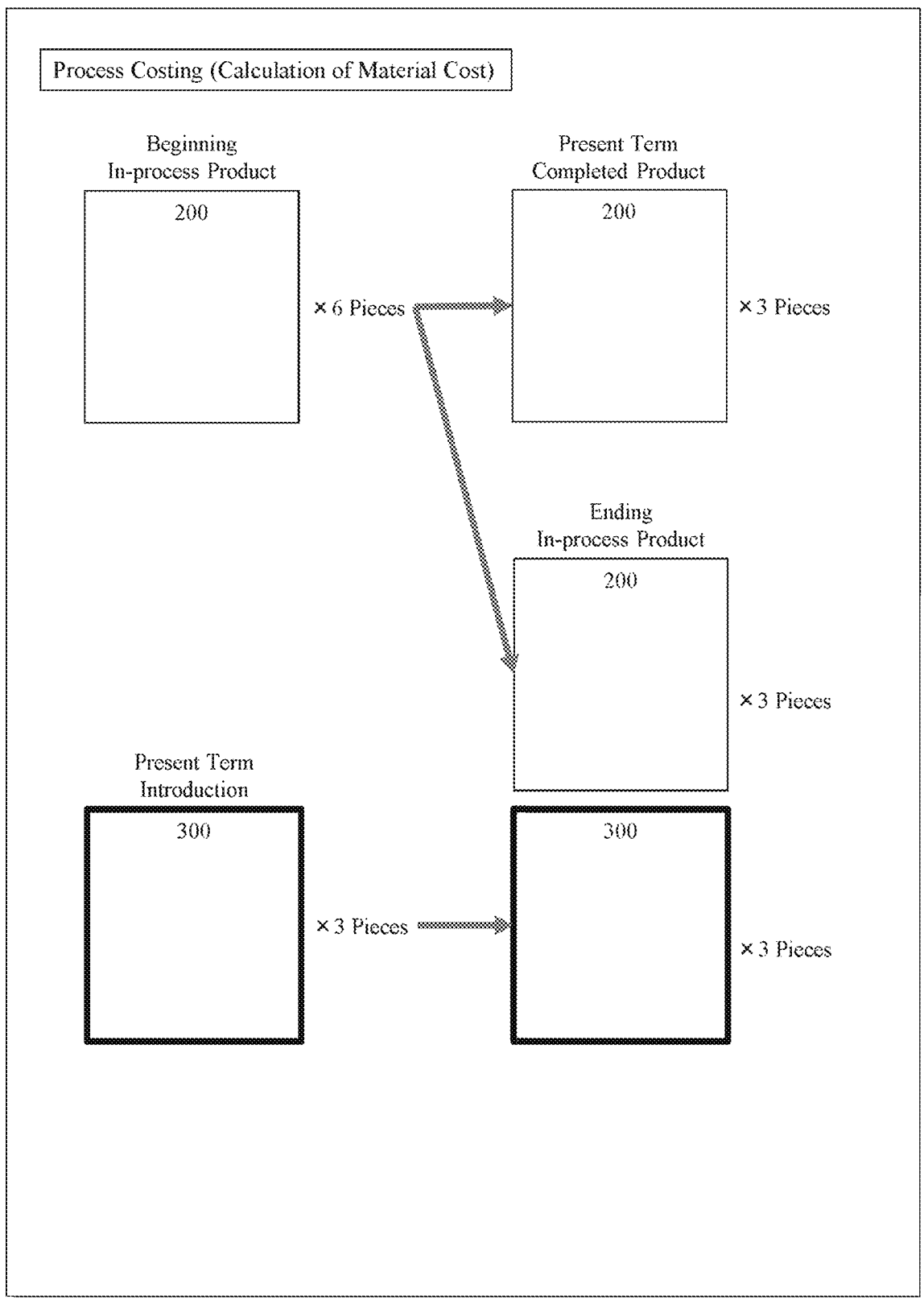
FIG. 29 is a drawing illustrating an idea of process costing (calculation of a material cost).
Figure 30:
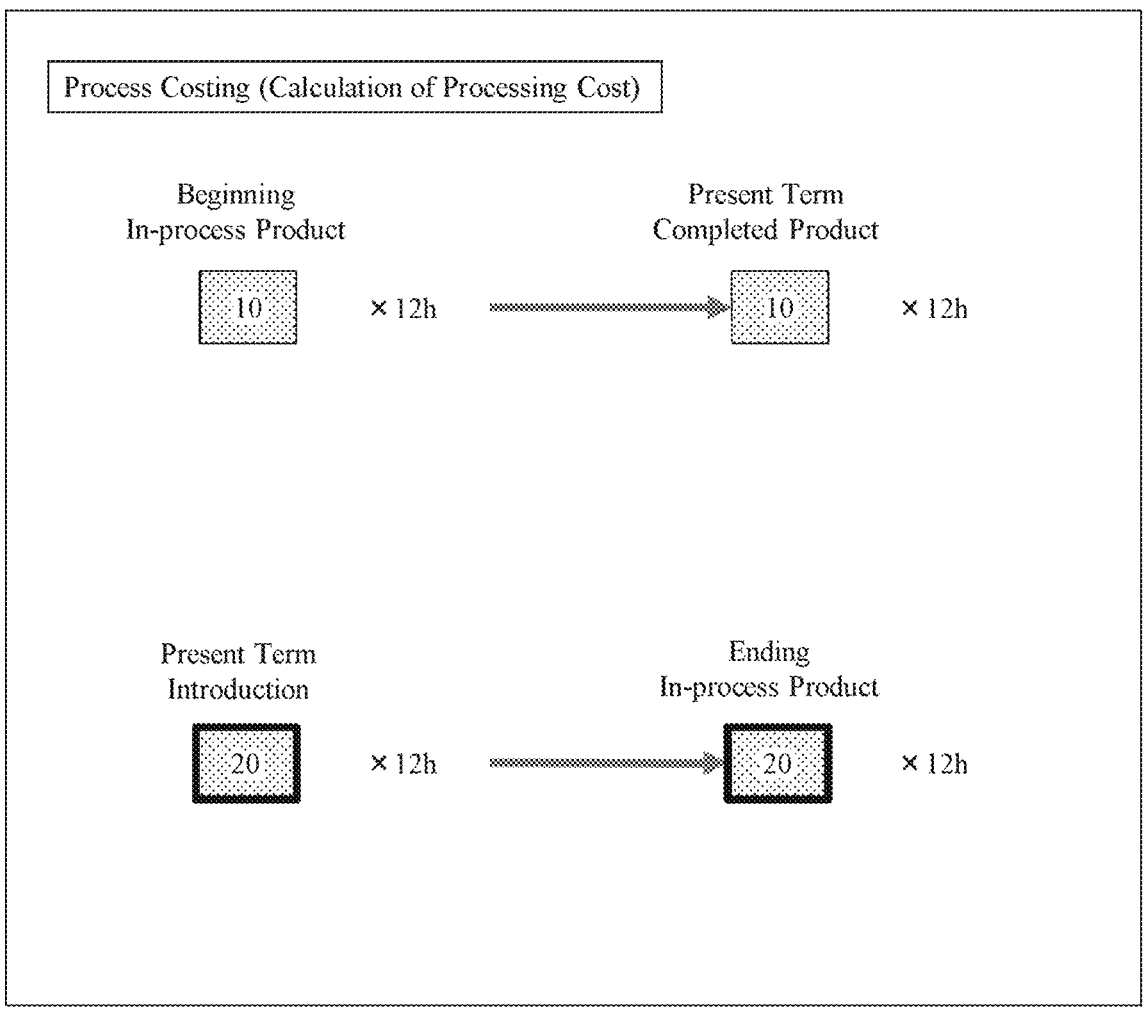
FIG. 30 is a drawing illustrating an idea of the process costing (calculation of a processing cost).

To perform the job costing as one of the conventional cost accounting methods, the production data needs to be grasped for each production order. Accordingly, in the case of the production data of Example 2, the job costing cannot be performed. In this case, the conventional cost accounting uses the process costing. Considering that the material introduced earlier is processed in priority, since the present term completed product is produced from among the beginning in-process products, the calculation method of the process costing is as indicated in the following FIG. 29 and FIG. 30.

Accordingly, a calculation result by the process costing is as in the following Table 10.

TABLE 10

|  | Material Cost | Processing Cost | Total |
|---|---|---|---|
| Completed Product Cost | 200 × 3 Pieces = 600 Yen | 10 × 12 h = 120 Yen | 720 Yen |
| Ending in-process Product Cost | 200 × 3 Pieces + 300 × 3 Pieces = 1,500 Yen | 20 × 12 h = 240 Yen | 1,740 Yen |

Figure 31:
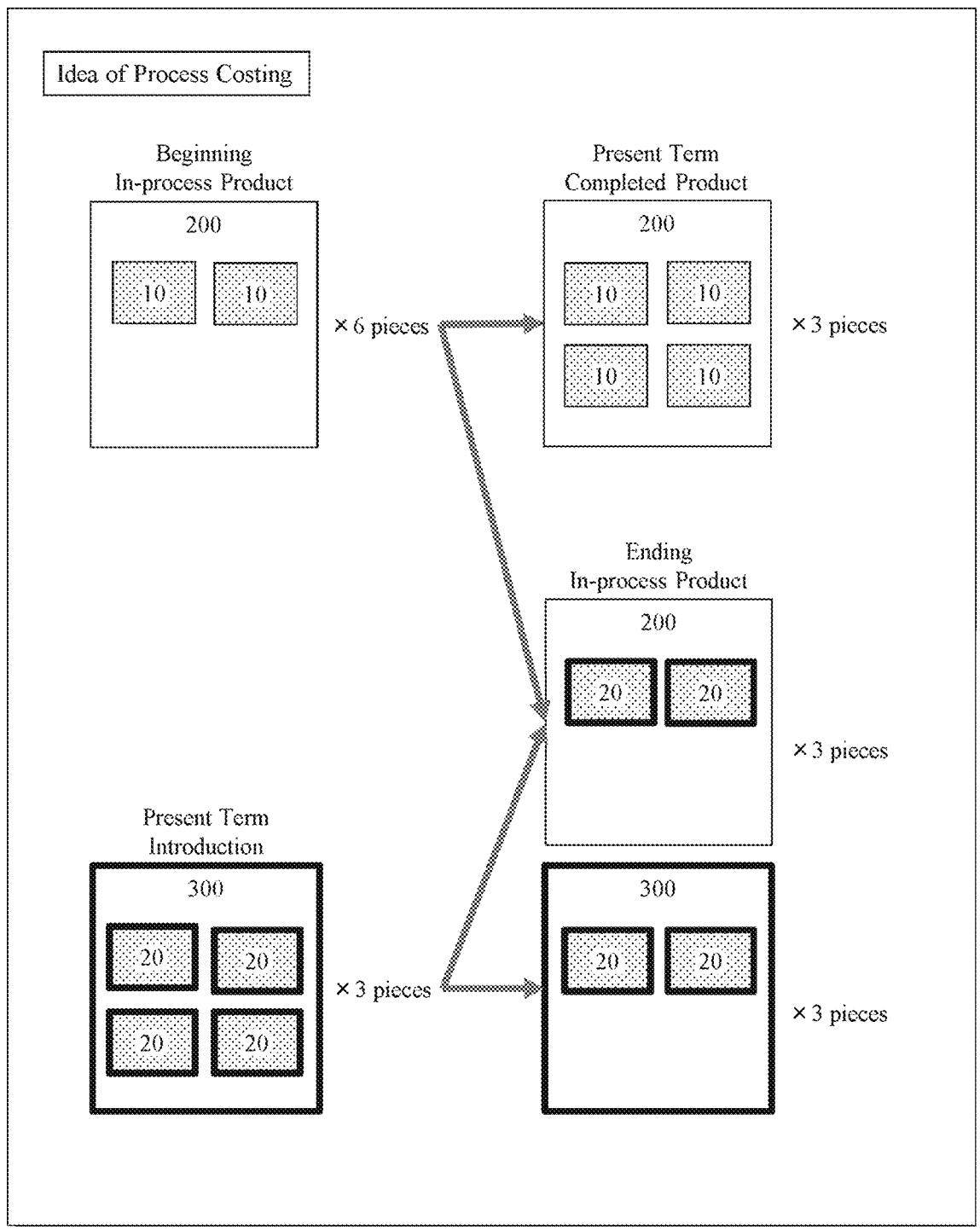
FIG. 31 is a drawing illustrating an example of an idea of the process costing.

Thus, the process costing cuts the relationship between the material and the processing work so that the material cost is distributed to the present term completed product and the ending in-process product only with the material cost, and similarly, the processing cost is distributed only with the processing cost. However, such a calculation method has an idea as in FIG. 31, it is apparent that this does not reflect the procedure of the real product processing.

Figure 32:
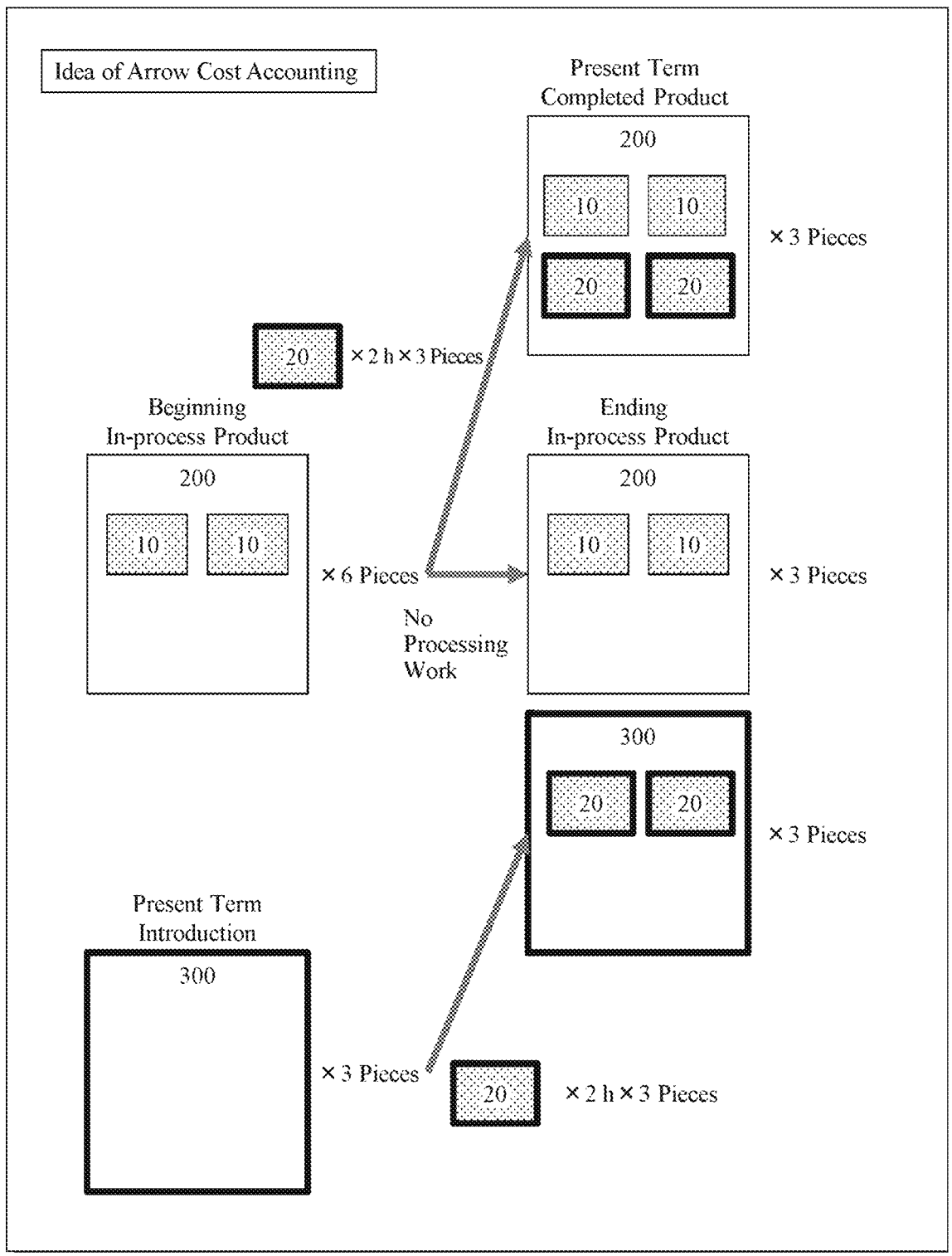
FIG. 32 is a drawing illustrating an example of an idea of the arrow cost accounting.

Therefore, the arrow cost accounting technique of the present invention is devised so as to consider as indicated in FIG. 32 in order to reflect the procedure of the real product processing precisely.

Accordingly, a calculation result by the arrow cost accounting is as indicated in the following Table 11.

TABLE 11

|  | Beginning In-process product Cost | Present Term Material Cost | Present Term Processing Cost | Total |
|---|---|---|---|---|
| Beginning In-process product → Present Term Completed Product | (200 + 10 × 2) × 3 Pieces = 660 Yen | — | (20 × 2) × 3 Pieces = 120 Yen | 780 Yen |
| Beginning In-process product → Ending in-process Product | (200 + 10 × 2) × 3 Pieces = 660 Yen | — | — | 660 Yen |
| Present Term Introduction → Ending in-process Product | — | 300 × 3 Pieces = 900 Yen | (20 × 2) × 3 Pieces = 120 Yen | 1,020 Yen |

From Table 11, the completed product cost is 780 yen (the beginning in-process product→the present term completed product), and the ending in-process product cost is 1,680 yen (the beginning in-process product→ending in-process product and the present term introduction→the ending in-process product).

As illustrated in FIG. 32, in the arrow cost accounting, the processing situations of the material and the in-process product are reproduced from the production data and the costs are calculated. As a result of the reproduction, it has been found that the procedures of the material and the in-process product are three ("beginning in-process product→the present term completed product," "beginning in-process product→the ending in-process product" and "present term introduction→the ending in-process product"), the arrow symbols having the directions are referred to as arrows.

The arrow cost accounting first needs to obtain the arrows. With the simple production data to the extent of the above-described Example 2, estimation of the arrows is easy. However, the estimation is considerably complicated in cases where there is impairment of the material or additional introduction. Therefore, for mathematical derivation of the arrows, the present invention introduces the coordinate system using the degree of processing progress as an axis (this is referred to as the cost accounting space).

Figure 33:
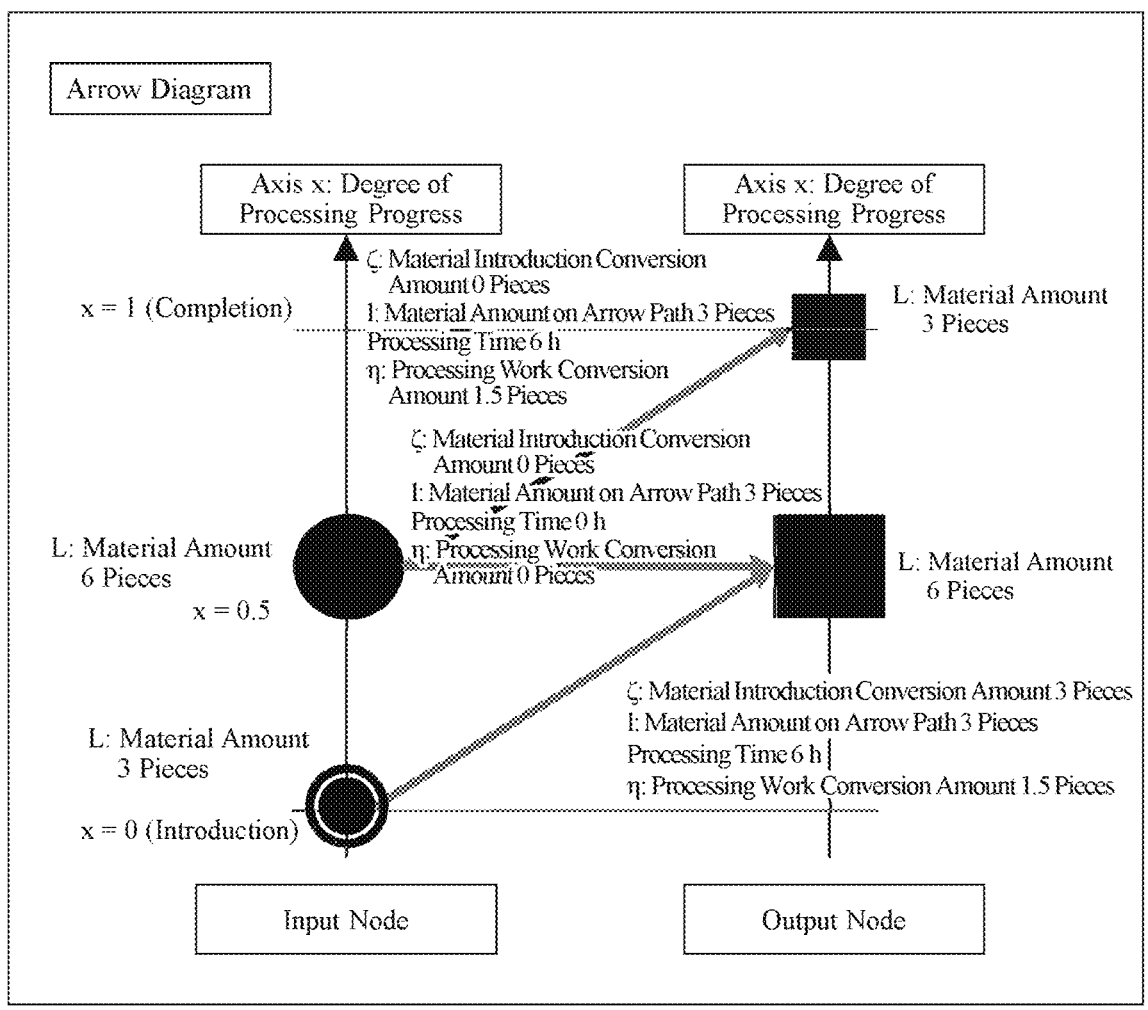
FIG. 33 is an arrow diagram of Example 2.

Since drawing a schematic diagram considerably takes labor, instead of the schematic diagram, the arrow diagram is drawn. FIG. 33 is an expression of Example 2 with the arrow diagram.

In the arrow diagram illustrated in FIG. 33, the input nodes (●) represent the beginning in-process product and the present term introduction, and the output nodes (■) represent the present term completed product and the ending in-process product. The nodes are indicated by points at coordinates corresponding to the respective nodes. L denotes the material amount at the coordinate point.

Note that the present term introduction input node is indicated by a double circle in some cases.

Arrow symbols indicate which input node corresponds to which output node. They are referred to as "arrows". The material amount on the arrow path is indicated by an alphabet "l".

In each of the arrows illustrated in FIG. 33, an amount of material introduced in the present term is calculated (this is referred to as a material introduction (conversion) amount and indicated by $\zeta$). In the two arrows of the "beginning in-process product→present term completed product" and the "beginning in-process product→ending in-process product", the material has been introduced in earlier terms, and no material is introduced in the present term (all the material is the starting point introduction material), and therefore $\zeta=0$. In the "present term introduction→ending in-process product" arrow, three materials have been introduced, and therefore $\zeta=3$.

In each of the arrows, an amount of processing work performed in the present term is calculated (this is referred to as the processing work conversion amount and indicated by $\eta$). In the processing work in this time, four hours of processing work is required to complete one product, and in the case of six hours of processing time, the processing work conversion amount is 1.5 pieces (=6 h/4 h pieces).

Note that, usually, the processing work conversion amount is calculated as follows.

For example, in the beginning in-process product→present term completed product arrow, the degree of processing progress has proceeded by 50% (=the output node 100%−the input node 50%), and the material amount of the arrow is three, and therefore the processing work conversion amount $\eta=3\times(100\%-50\%)=1.5$ pieces. In this case, data of the processing time is unnecessary.

In the arrow diagram in this time, the axis is only the x-axis (the degree of processing progress axis). Therefore, in principle, only one coordinate axis is used and all nodes should be indicated on the line. However, this makes the diagram considerably difficult to understand, and therefore the x-axes are separately set for the input node and the output node.

Example 3

Based on the following data, the completed product cost and the ending in-process product cost are calculated.

TABLE 12

| (Production Data) | | (Degree of Processing Progress) | (Cost Data) | |
|---|---|---|---|---|
| Beginning In-process product | 200 Pieces | (40%) | Beginning In-process product Cost | 125,600 Yen |
| Present Term Introduction | 100 Pieces | | | |
| Total | 300 Pieces | | Present Term Manufacturing Cost | |
| Normal Impairment | 30 Pieces | | Direct Material Cost | 70,000 Yen |
| Ending in-process Product | 150 Pieces | (60%) | Processing Cost | 15,400 Yen |
| Present Term Completed Product | 120 Pieces | | | |

(Other Conditions)
1) At the 80% point of the degree of processing progress, the remaining amount is impaired by the constant proportion.
2) The material is all introduced at the process starting point (the starting point introduction material).
3) At the factory, the material introduced earlier is processed in priority. In view of this, the product is completed in the order of the material introduction (the first-in first-out method).

Example 3 Solution/Interpretation

Example 3 considers a case of generating the impairment as described in (Other Conditions). For example, this corresponds to a case in which all in-process products are inspected at the 80% point of the degree of processing progress, disqualified products are scrapped, and the processing work is continued only on qualified products. To be exact, the reduction in the material amount as a result of removing the rejected products by the inspection is referred to as spoilage, not impairment. However, they do not basically generate a calculational difference, and therefore the notation is unified as the impairment here.

Figure 34:
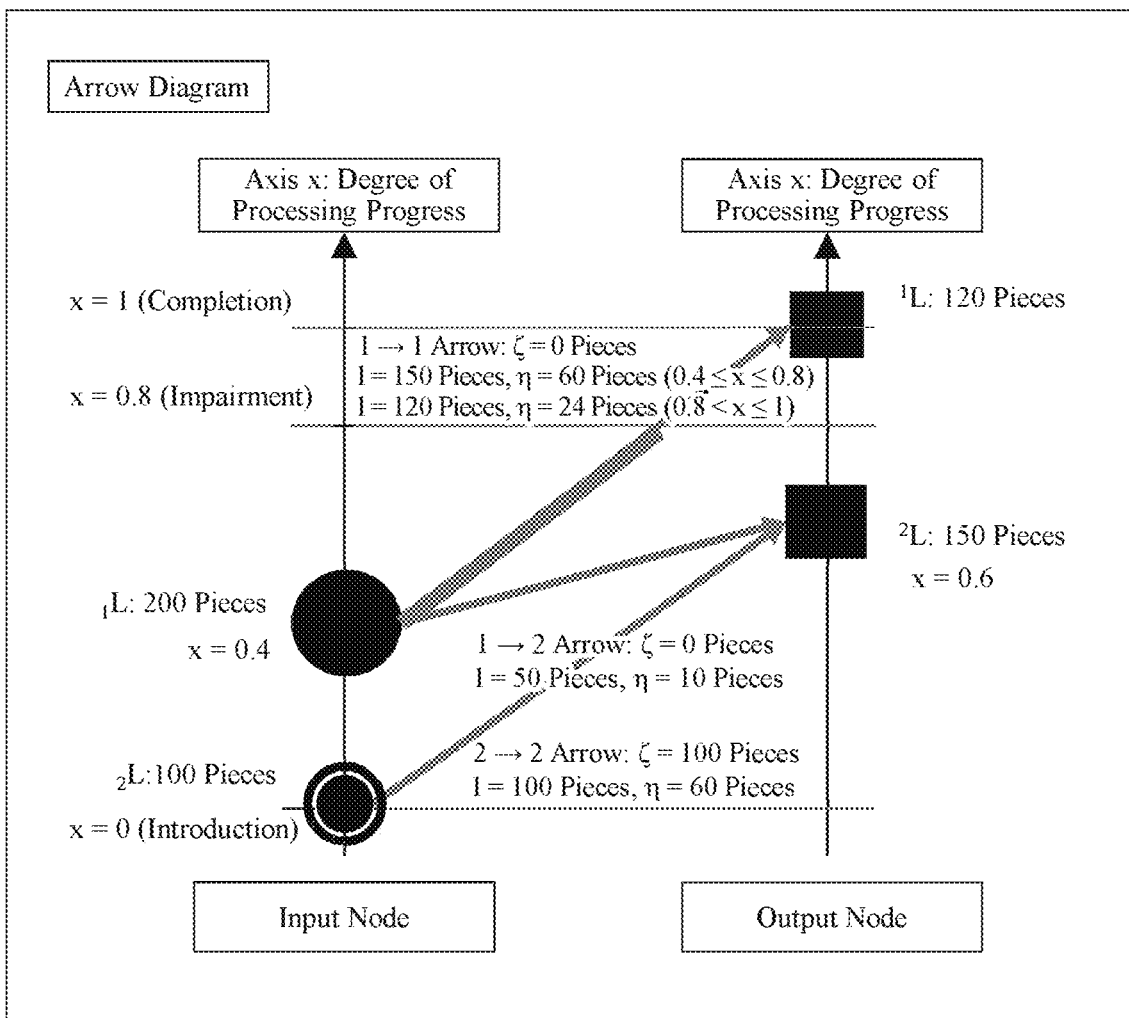
FIG. 34 is an arrow diagram illustrating a solution matching for Example 3.

FIG. 34 is a drawing of the arrow diagram based on the production data of Example 3.

Attaching numbers to the respective nodes facilitates understanding of the nodes. Therefore, in FIG. 34, the numbers are attached to the lower left of the nodes for the input nodes and to the upper left of the nodes for the output nodes. The arrows are described with the numbers of the corresponding nodes, for example, 1→1 arrow.

With the production data in this time, obtaining a material amount in the order from the material amount of the 2→2 arrow is easy to understand. It is easily seen that 100 pieces of the material amounts flow in the 2→2 arrow and 50 pieces of the material amounts flow in the 1→2 arrow, therefore it has been found that 150 pieces flow from the input node in the 1→1 arrow and the material amount becomes 120 pieces at the impairment point.

Since the 1→1 arrow changes the material amount at the 80% (0.8) point of the degree of processing progress, the material amount is expressed by the width of the arrow. Note that, 150 pieces are inspected, 30 pieces are disqualified and impaired, and 120 pieces are qualified, and therefore an impairment proportion is 20%.

As in the arrow diagram illustrated in FIG. 34, the solution matching is obtained first. When the combinations of the arrows and the material amounts on the paths of the arrows match the production data, it is referred to as the solution matching. That is, the solution matching means a specific processing situation reproduced from the given production data.

Figure 35:
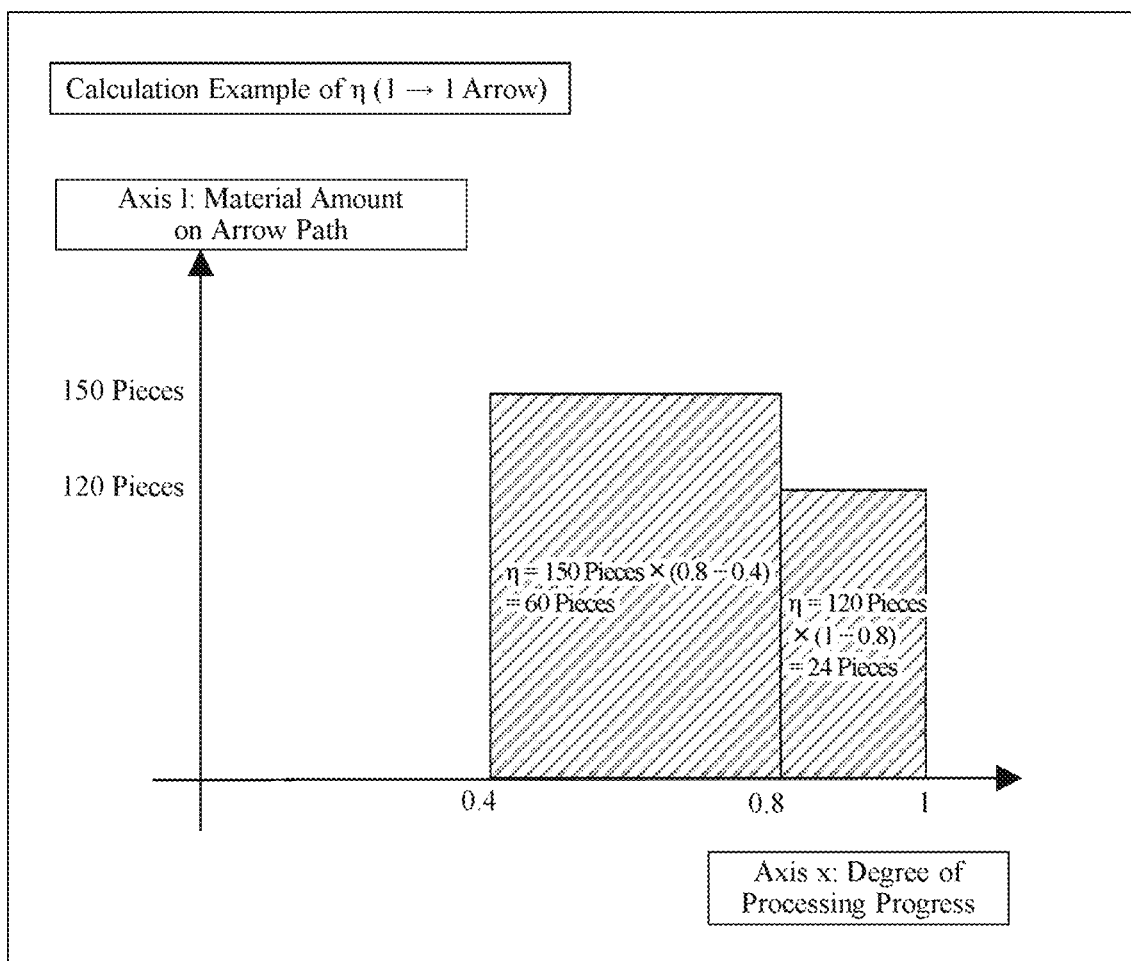
FIG. 35 is a drawing illustrating a calculation example of the processing work conversion amount $\eta$ in Example 3.

After obtaining the solution matching, next, the material introduction conversion amount $\zeta$ and the processing work conversion amount $\eta$ are calculated for each of the arrows. Specifically,
1) 1→1 arrow: $\zeta=0$ pieces
2) $\eta=150$ pieces×(0.8−0.4)+120 pieces×(1−0.8)=60 pieces+24 pieces=84 pieces (see FIG. 35)
3) 1→2 arrow: $\zeta=0$ pieces $\eta=50$ pieces×(0.6−0.4)=10 pieces
4) 2→2 arrow: $\zeta=100$ pieces $\eta=100$ pieces×(0.6−0)=60 pieces are found.

After the calculations, the costs are distributed as follows.
(Distribution of Beginning In-Process Product Cost)

As illustrated in FIG. 34, the beginning in-process product node is only the first input node. Among 200 pieces at the first input node, 150 pieces flow the 1→1 arrow and 50 pieces flow the 1→2 arrow. Therefore, the cost of 125,600 yen at the first input node is distributed at the ratio of (1→1 arrow):(1→2 arrow)=150:50.
(Distribution of Present Term Material Cost)

As illustrated in FIG. 34, the starting point introduction material cost introduced in the present term is distributed to the arrows based on the material introduction amount That is, 70,000 yen of the material cost in the present term is distributed at the ratio of (1→1 arrow):(1→2 arrow):(2→2 arrow)=0:0:100.
(Distribution of Present Term Processing Cost)

As illustrated in FIG. 34, the present term processing cost is distributed to the arrows based on the processing work conversion amounts $\eta$. That is, 15,400 yen of the processing cost in the present term is distributed at the ratio of (1→1 arrow):(1→2 arrow):(2→2 arrow)=84:10:60.

A summary of the above description is as in Table 13.

TABLE 13

| Arrow | Beginning In-process Product Cost 125,600 Yen | Present Term Material Cost 70,000 Yen | Present Term Processing Cost 15,400 Yen | Total |
|---|---|---|---|---|
| 1 → 1 | 125,600 × (150/200) = 94,200 Yen | — | 15,400 × (84/154) = 8,400 Yen | 102,600 Yen |
| 1 → 2 | 125,600 × (50/200) = 31,400 Yen | — | 15,400 × (10/154) = 1,000 Yen | 32,400 Yen |
| 2 → 2 | — | 70,000 Yen | 15,400 × (60/154) = 6,000 Yen | 76,000 Yen |

As illustrated in Table 13, the completed product cost is 102,600 yen (the 1→1 arrow corresponding to the first output node: 102,600 yen), and the ending in-process product cost is 108,400 yen (the 1→2 arrow:32, 400 yen and the 2→2 arrow:76,000 yen corresponding to the second output node).

Example 4

Based on the following data, the completed product cost and the ending in-process product cost are calculated.

TABLE 14

| (Production Data) | | (Degree of Processing Progress) | (Cost Data) | |
|---|---|---|---|---|
| First Term Beginning In-process product | 100 Pieces | (0.8) | First Term Beginning In-process product Cost | 440,000 Yen |
| Second Term Beginning In-process product | 300 Pieces | (0.5) | Second Term Beginning In-process product Cost | 600,000 Yen |
| Present Term Introduction | 400 Pieces | | | |
| Present Term Completed Product | 200 Pieces | | Present Term Manufacturing Cost | |
| First Term Ending In-process Product | 200 Pieces | (0.5) | Direct Material Cost | 400,000 Yen |
| Second Term Ending In-process | 200 Pieces | (0.2) | Processing Cost | 21,000 Yen |

(Other Conditions)

1) The in-process product is inspected at the two points of the 30% point and the 70% point of the degree of processing progress. At the inspection points, the remaining amount is impaired by the constant proportion.

2) As the results of the in-process product inspection in the present term, the qualified proportion was the same at the 30% point and at the 70% point.

3) The material is all introduced at the process starting point (the starting point introduction material).

4) At the factory, the material introduced earlier is processed in priority. In view of this, the product is completed in the order of the material introduction (the first-in first-out method).

Example 4 Solution/Interpretation

The arrow cost accounting allows accurate calculation even under a further complicated condition. Example 4 gives a case where the beginning in-process product and the ending in-process product exist at a plurality of portions in the process.

First, the impairment proportion (=1−qualified proportion) is obtained. In the impairment generation pattern as in this time, there is a solution as follows.

Since the qualified proportions are equal at the two inspection points, the qualified proportion is represented by $\theta$ ($0 \le \theta \le 1$). The material amounts of all nodes are evaluated at the point of x=1. For example, 400 pieces introduced in the present term have passed the two inspection points at the point of the completed product (x=1), the material amount is $400\theta^2$.

Then, a formula that connects the total material amount of the input nodes and the total material amount of the output nodes evaluated at the point of x=1 with an equitation is solved.

$$100+300\theta+400\theta^2=200+200\theta+200\theta^2 \qquad \text{Formula 96}$$

is solved. Solving the formula finds $\theta=-1$, ½, and from the condition of $0 \le \theta \le 1$, $\theta=½$ is determined. That is, every time that the inspection point is passed, 50% of the material is qualified, and 50% of the material is disqualified and is impaired.

After that, by matching the respective nodes in accordance with the rule of the first-in first-out method, the solution matching is obtained.

Figure 36:
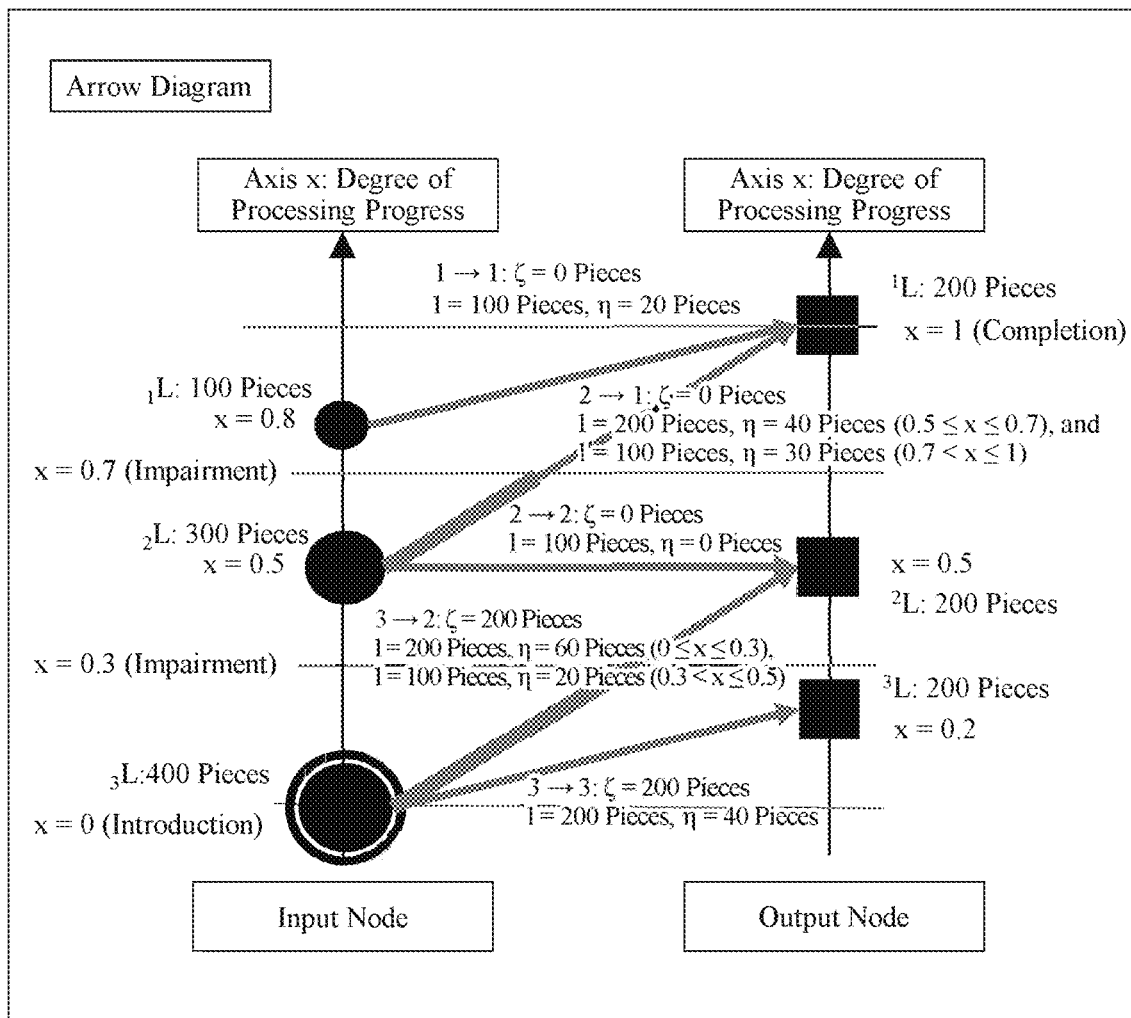
FIG. 36 is an arrow diagram illustrating a solution matching for Example 4.

FIG. 36 is an arrow diagram illustrating the solution matching.

In FIG. 36, $\zeta$ is obvious.

In FIG. 36, $\eta$ is calculated as follows.

1→1 arrow: $\eta$=100 pieces×(1−0.8)=20 pieces
2→1 arrow: $\eta$=200 pieces×(0.7−0.5)+100 pieces×(1−0.7) =40 pieces+30 pieces=70 pieces
2→2 arrow: $\eta$=100 pieces×(0.5−0.5)=0 pieces
3→2 arrow: $\eta$=200 pieces×(0.3-0)+100 pieces×(0.5−0.3) =60 pieces+20 pieces=80 pieces
3→3 arrow: $\eta$=200 pieces×(0.2−0)=40 pieces
$\eta$ in total: 210 pieces Accordingly, the cost distribution as in the following Table 15. The beginning in-process product cost is distributed at the ratio of the material amounts of the arrows branching from the beginning in-process product input node, the present term material cost is distributed at the ratio of $\zeta$, and the present term processing cost is distributed at the ratio of $\eta$.

TABLE 15

| Arrow | Beginning In-process product Cost 440,000 Yen 600,000 Yen | Present Term Material Cost 400,000 Yen | Present Term Processing Cost 21,000 Yen | Total |
|---|---|---|---|---|
| 1 → 1 | 440,000 Yen | | 21,000 × (20/210) = 2,000 Yen | 442,000 Yen |
| 2 → 1 | 600,000 × (200/300) = 400,000 Yen | | 21,000 × (70/210) = 7,000 Yen | 407,000 Yen |
| 2 → 2 | 600,000 × (100/300) = 200,000 Yen | | 21,000 × (0/210) = 0 Yen | 200,000 Yen |
| 3 → 2 | | 400,000 × (200/400) = 200,000 Yen | 21,000 × (80/210) = 8,000 Yen | 208,000 Yen |
| 3 → 3 | | 400,000 × (200/400) = 200,000 Yen | 21,000 × (40/210) = 4,000 Yen | 204,000 Yen |

Accordingly, the completed product cost is 442,000 yen+407,000 yen=849,000. The first term ending in-process product cost is 200,000 yen+208,000 yen=408,000 yen, the second term ending in-process product cost is 204,000 yen, and the ending in-process product cost (total amount of money) is 408,000 yen+204,000 yen=612,000 yen.

Example 5

Based on the following data, the completed product cost and the ending in-process product cost are calculated.

TABLE 16

(Production Data) *All pieces of the data are the total weight of the material A and the material B.

| Production Order No. | #100 | (Degree of Processing Progress) | #200 | (Degree of Processing Progress) |
|---|---|---|---|---|
| Beginning In-process product | — | | — | |
| Present Term Introduction | 300 kg | | 540 kg | |
| Present Term Completed Product | 240 kg | | — | |
| Ending in-process Product | — | | 480 kg | (2/3) |

(Cost Data)
Present Term
Manufacturing Cost

| Material A Cost | 900,000 Yen | (Present Term Introduction Amount: 450 kg) |
|---|---|---|
| Material B Cost | 390,000 Yen | (Present Term Introduction Amount: 390 kg) |
| X Processing Cost | 61,000 Yen | |
| Y Processing Cost | 75,000 Yen | |

(Other Conditions)
1) At the factory, the material A and the material B are mixed and introduced at the process starting point. The introduction ratio is not constant and varies depending on each production order.
2) As the processing proceeds, the introduction amount of the material A is impaired by the constant proportion. That is, impairment occurs in proportion to the degree of processing progress x.
3) The material B is not impaired.
4) A processing work X means a usual processing work and does not distinguish between the material A and the material. Therefore, regarding the processing work X, in proportion to the progress of the degree of processing progress with respect to the total weight (A+B), the processing work is introduced, and the cost is generated.
5) A processing work Y is a special processing work, and is a work performed on the material A at the 50% point of the degree of processing progress. Therefore, regarding the processing work Y, the processing work is introduced in proportion to the material amount of the material A at the 50% point of the degree of processing progress, and the cost is generated.

Example 5 Solution/Interpretation

The arrow cost accounting allows accurate calculation even in a case of introducing a plurality of kinds of materials and a case where impairment generation patterns differ for different materials. As shown in Table 16, in Example 5, since the production data for each of the production orders is given, the matching that which input node corresponds to which output node has already been found. However, since only the total material amount of the material A and the material B is known, specific material amounts of the material A and the material B in each of the arrows need to be calculated in order to obtain the solution matching.

First, among 300 kg of the starting point introduction material in #100, when the starting point introduction amount of the material A is denoted as a, materials of #100 and #200 at the starting point introduction are as in Table 17.

TABLE 17

| (Input Node) | #100 | #200 | Total |
|---|---|---|---|
| Material A | a | 450 − a | 450 kg |
| Material B | 300 − a | 90 + a | 390 kg |
| Total | 300 kg | 540 kg | |

Since the impairment occurs only in the material A and the constant proportion of the introduction amount is impaired in proportion to x, if the impairment proportion at the completion is denoted as $\theta$, the material A is impaired by $a\theta$ at the completion of #100. Since the processing work proceeds only up to $x=2/3$ in #200, the impairment also occurs 2/3 of the impairment occurring at the completion. Accordingly, at the ending in-process product, the material A is impaired by $(450-a)\theta \times (2/3)$.

The impairment amount of the material A in #100 is (the starting point introduction amount)−(completed product amount)=300 kg−240 kg=60 kg, and, similarly, the impairment amount of the material A in #200 is 540 kg−480 kg=60 kg (It should be noted that the impairment does not occur in the material B).

Accordingly, by solving the simultaneous equations,

Formula 97

$$\begin{cases} a\theta = 60 \\ (450-a)\theta \times (2/3) = 60 \end{cases}$$

$a=180$ and $\theta=1/3$ are found.

Figure 37:
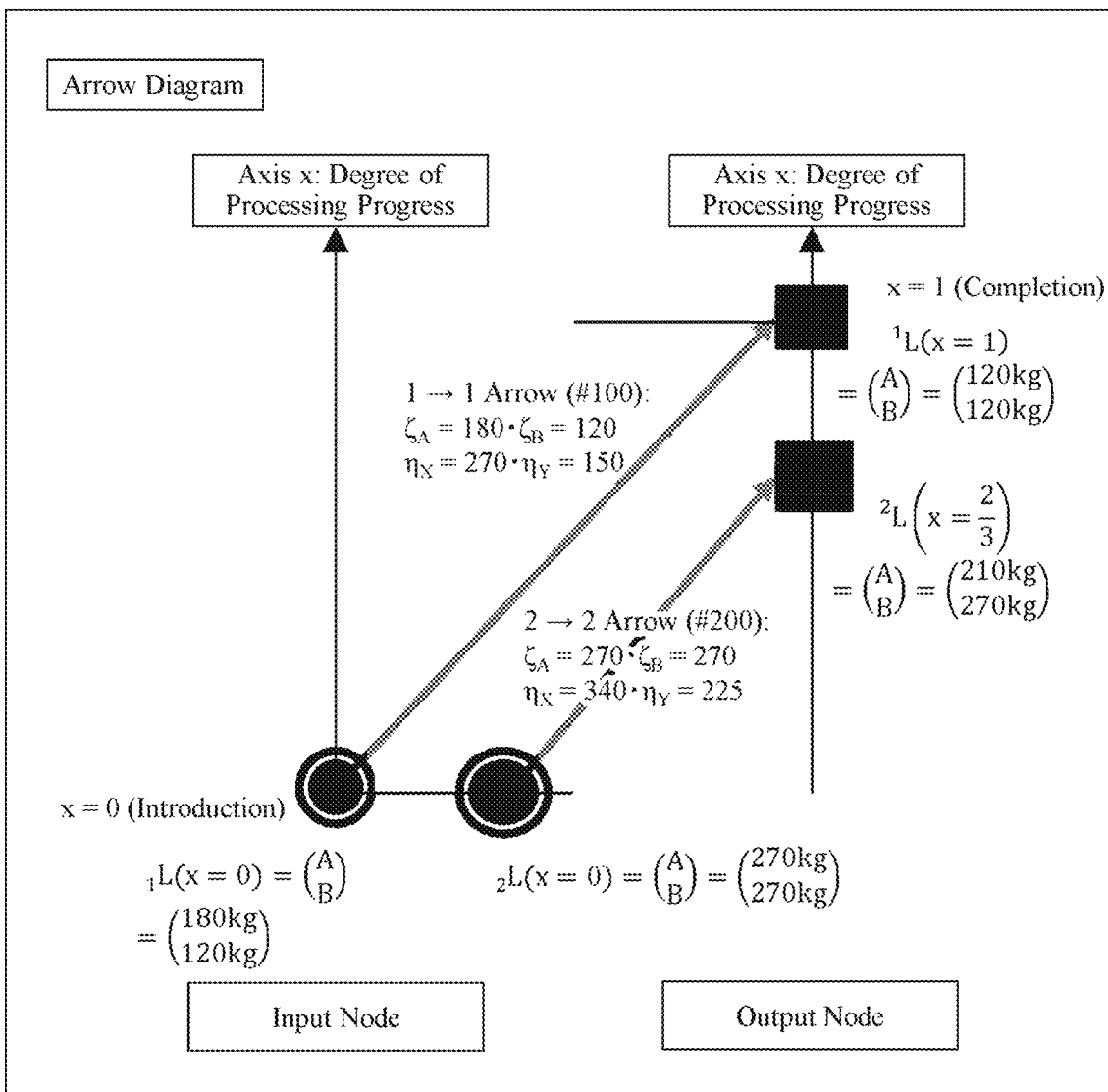
FIG. 37 is an arrow diagram illustrating a solution matching for Example 5.

Accordingly, FIG. 37 is the illustration of the solution matching with the arrow diagram.

The first input node and the second input node as the present term introduction nodes should in principle be positioned at the same coordinate (x=0), but it is considerably difficult to see. Therefore, FIG. 37 indicates the second input node shifted to the right. Note that, if necessary, the present term completed product output node can be indicated to be shifted to the left.

Based on the solution matching, introduction amounts $\zeta_A$ and $\zeta_B$ of the material A and the material B and processing work conversion amounts $\eta_X$ and $\eta_Y$ of the processing work X and the processing work Y are calculated for each of the arrows.

With reference to FIG. 37, the calculation can be performed as follows.

Figure 38:
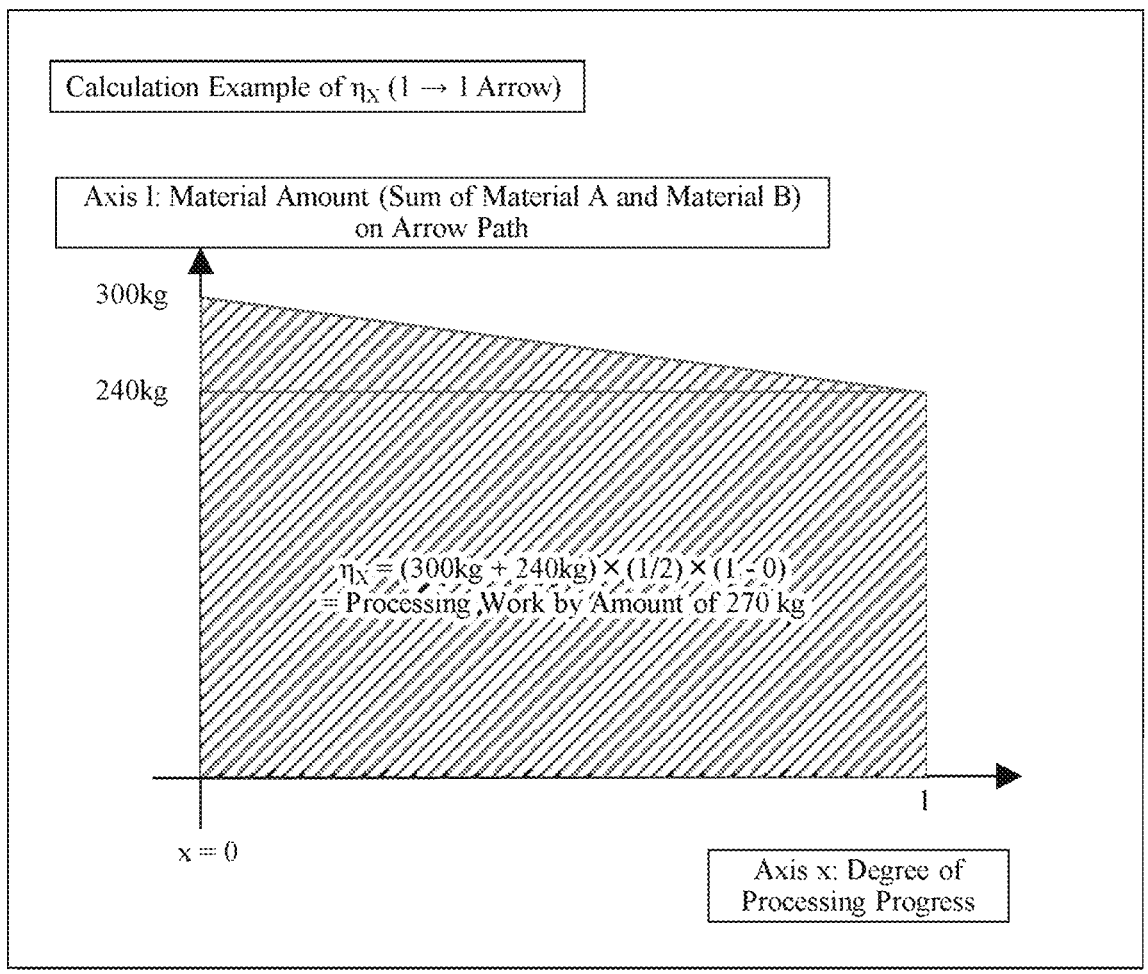
FIG. 38 is a drawing illustrating a calculation example of a processing work conversion amount $\eta_X$ for Example 5.

($\zeta_A$ and $\zeta_B$)
1) 1→1 arrow: $\zeta_A$=180 kg, $\zeta_B$=120 kg
2) 2→2 arrow: $\zeta_A$=270 kg, $\zeta_B$=270 kg
(Calculation of $\eta_X$)
1) 1→1 arrow: $\eta_X$=(300 kg+240 kg)×(1/2)×(1−0)=work amount by the amount of 270 kg (see also FIG. 38)
2) 2→2 arrow: $\eta_X$=(540 kg+480 kg)×(1/2)×(2/3−0)=work amount by the amount of 340 kg
(Calculation of $\eta_Y$)
For $\eta_Y$, the material amount of the material A at the point of x=1/2 is calculated. Considering that $\theta$=1/3, the impairment amount of the material A at the point of x=1/2 is (1/3)×(1/2)=1/6 at the ratio at the starting point introduction.
1) 1→1 arrow: The impairment amount of the material A is 180 kg×(1/6)=30 kg, and therefore the work is $\eta_Y$=180 kg−30 kg=150 kg.

2) 2→2 arrow: The impairment amount of the material A is 270 kg×(⅙)=45 kg, and therefore the work amount is $\eta_Y$=270 kg−45 kg=225 kg.

Accordingly, the cost distribution is as in the following Table 18.

TABLE 18

| Arrow | Material A 900,000 Yen | Material B 390,000 Yen | Processing Work X 61,000 Yen | Processing Work Y 75,000 Yen | Total |
|---|---|---|---|---|---|
| 1 → 1 (#100) | 900,000 × (180/450) = 360,000 Yen | 390,000 × (120/390) = 120,000 Yen | 61,000 × (270/610) = 27,000 Yen | 75,000 × (150/375) = 120,000 Yen | 627,000 Yen |
| 2 → 2 (#200) | 900,000 × (270/450) = 540,000 Yen | 390,000 × (270/390) = 270,000 Yen | 61,000 × (340/610) = 34,000 Yen | 75,000 × (225/375) = 45,000 Yen | 889,000 Yen |

Accordingly, the completed product (#100) cost is 627,000 yen, and the ending in-process product (#200) cost is 889,000 yen.

Example 6a

At this factory, the material (units: number of boxes) is introduced to the manufacturing process to manufacture the products (unit: kg). Since the material is all squashed and introduced at the material introduction, the production data is measured in the unit of kg.

Based on the following data, the standard cost accounting is performed.

TABLE 19

| (Production Data) | | (Degree of Processing Progress) |
|---|---|---|
| Beginning In-process product | — | |
| Present Term Introduction | 320 kg | |
| Present Term Completed Product | 192 kg | |
| Ending in-process Product | — | |

| (Actual Cost Data) Present Term Manufacturing Cost | | |
|---|---|---|
| Material Cost | 58,500 Yen | (Present Term Introduction Amount: 650 Boxes) |
| Processing Cost | 880,000 Yen | (Present Term Direct Operation Period: 800 Hours) |

(Other Conditions)
1) The material is all the starting point introduction material.
2) As the processing proceeds, the introduction amount of the in-process product is impaired by the constant proportion (θ). That is, the in-process product is impaired in proportion to the degree of processing progress x. Note that the standard is $\theta^{(s)}$=20%. The (s) on the upper right of the θ sign represents a "standard" value.
3) Although the weights of the materials (in units of the number of boxes) vary depending on the box, in terms of a purchase subscription of the material, the material cost is calculated by unit price × the number of boxes. Therefore, if it is possible to purchase only the boxes having heavy weights, the material cost per weight (kg) becomes lower. Note that a standard weight of the material is two boxes of the material per kg of the material introduction, that is, 0.5 kg/box of the material. Additionally, the standard unit price is 100 yen/box.

4) Since the processing work is mainly performed by a direct work by a factory worker, calculation is performed based on the direct operation period. The standard direct operation period required for manufacturing 1 kg of product (under a situation free from impairment) is 3 hours/kg. Also, the standard processing cost per hour of the direct work is 1,000 yen/hour.

Example 6a Solution/Interpretation

The standard cost accounting is a calculation method that compares a standard manufacturing cost determined in advance with an actual manufacturing cost to analyze where and how much ineffectiveness is present. The conventional orthodox standard cost accounting method allows accurate calculation only under limited conditions, whereas the arrow cost accounting of the present invention allows accurate calculation even under more complicated conditions.

In the following argument, the "actual" and the "standard" need to be compared. For ease of understanding of this, in the case of "actual", (a: actual) is added, and in the case of "standard", (s: standard) is added.

The standard cost accounting in the arrow cost accounting is basically performed for each of arrow. Therefore, Example 6a considers only one arrow. If a plurality of arrows exist, it is only necessary to sum the results calculated for each individual arrow. Therefore, for simplification of the discussion, only one arrow is considered.

Depending on whether the input node of the arrow is a beginning in-process product node or a present term introduction node, the calculation method of the standard cost accounting differs. Example 6a is an example in which the input node is the present term introduction node.

Figure 39:
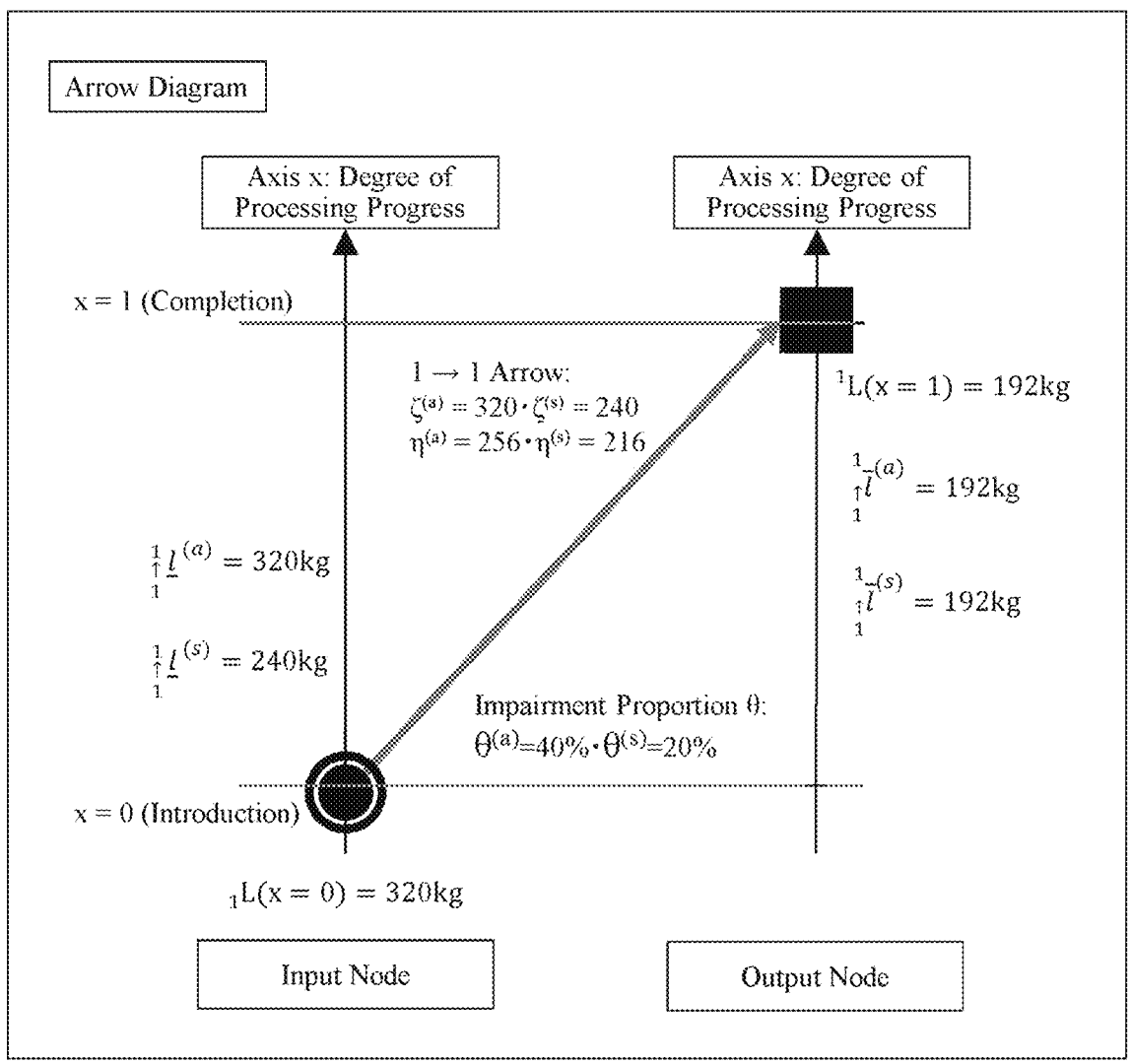

Apparently, illustration of the solution matching with the arrow diagram is as shown in FIG. 39.

The actual impairment parameter is obtained below. Since only the 1→1 arrow exists in the present term, 320 kg of the material is introduced at the starting point, and 320 kg−192 kg=128 kg is impaired at the completion, the impairment proportion is 128/320=40%. That is, the material introduced at the starting point is gradually impaired in proportion to the progress of the processing, and at the product completion, 40% of the introduction amount has been impaired. Accordingly, $\theta^{(a)}$=40%.

In the arrow diagram illustrated in FIG. 39, $$\underset{1}{\overset{1}{\uparrow}} \overline{l}^{(a)}$$

represents an "actual material amount of the 1→1 arrow at the output node." Similarly, $${}_{1}^{1}\underline{l}^{(a)}$$

represents an "actual material amount of the 1→1 arrow at the input node." Each of $${}_{1}^{1}\overline{l}^{(s)} \text{ and } {}_{1}^{1}\underline{l}^{(s)}$$

means the standard material amount of the corresponding node.

The overscore ($\overline{l}$) represents an output node, and the underscore ($\underline{l}$) represents an input node.

In the standard cost accounting by the arrow cost accounting, first, $${}_{1}^{1}\overline{l}^{(s)} = {}_{1}^{1}\overline{l}^{(a)}$$

is supposed, and $${}_{1}^{1}\underline{l}^{(s)}$$

is obtained based on $${}_{1}^{1}\overline{l}^{(s)}.$$

The meaning of this is that "If the output node (the completed product: 192 kg) was produced under a standard production situation, how many kg of material introduction was supposed to be sufficient" is considered. With the material amount represented as α kg, 20% of the material amount disappears due to impairment under the standard impairment situation, and therefore the material amount is supposed to be 0.8α kg at the completion. Accordingly, from 0.8α=192, α=240 kg is found.

$${}_{1}^{1}\underline{l}^{(s)} = 240 \text{ kg}$$

means this.

Accordingly, the material introduction amount ζ of the 1→1 arrow is actually $\zeta^{(a)}$=320 kg, and the standard is $\zeta^{(s)}$=240 kg. The meaning of this is that "In order to create the output node (the completed product: 192 kg) of the 1→1 arrow, 240 kg of the material introduction would have been sufficient in standard, but actually the material was introduced by as much as 320 kg. That is, since the actual impairment parameter was 40%, which was worse than that of the standard (20%), and the waste of the material occurred by 320 kg−240 kg=80 kg." Accordingly, the impairment θ variance is an unfavorable variance by the amount of 80 kg.

Evaluation of the impairment θ variance in terms of the amount of money is as follows.

The standard consumption amount per kg of the material introduction is 2 boxes, and the standard unit price of one box of the material is 100 yen/box. This results in the unfavorable variance of 80 kg×2 boxes/kg×100 yen/box=16,000 yen, that is, due to the poor management of the impairment proportion, the waste of the material cost occurred by 16,000 yen.

Next, a consumed amount q variance of the material is calculated. Since the material was introduced by 320 kg in the present term, the material consumption of 320 kg×2 boxes/kg=640 boxes was supposed to be sufficient in standard. However, actually, the material of 650 boxes was consumed, and therefore it is found that the material was wasted by the amount of 10 boxes. Accordingly, the material consumed amount q variance is an unfavorable variance by the amount of 10 boxes. This is possibly caused by purchasing only the boxes having light weights in the setting of this Example. Evaluation of the material consumed amount q variance in terms of the amount of money finds the unfavorable variance by 10 boxes×100 yen/box=1,000 yen.

Next, a price p variance of the material is calculated. Since the material of 650 boxes was consumed in the present term, the material cost by 650 boxes×100 yen/box=65,000 yen was supposed to be the cost in standard. However, it actually costed only 58,500 yen, it is seen that the material cost was lower by 6,500 yen. Accordingly, the material price p variance is a favorable variance by 6,500 yen. This is possibly caused because the material unit price was lower than that of the standard.

Note that the q variance may be referred to as a resource consumption amount q variance and the p variance may be referred to as a price p variance. This is because the q variance and the p variance are calculated for each of the cost elements, and therefore consistent notations are easier to understand.

Table 20 summarizes this.

TABLE 20

(Variance Analysis regarding Material Cost)

Figure 40:
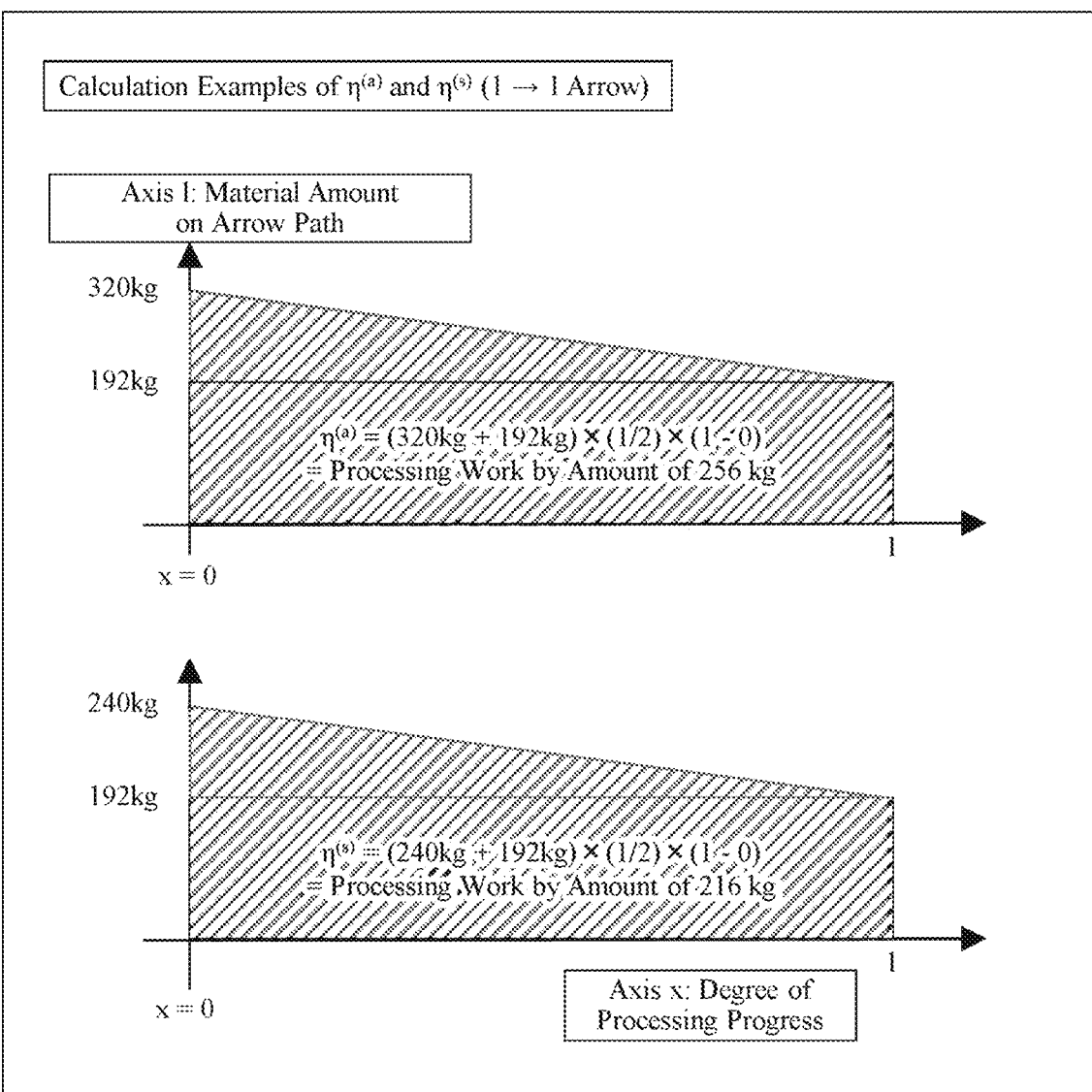

$p^{(s)} \mid q^{(s)} \mid \zeta^{(\theta(s))} =$
100 Yen * 2 Boxes * 240 kg = 48,000 Yen
↑
↓ Impairment θ Variance
  16,000 Yen (Unfavorable)
$p^{(s)} \mid q^{(s)} \mid \zeta^{(\theta(a))} =$
100 Yen * 2 Boxes * 320 kg = 64,000 Yen
↑
↓ Resource Consumption
  Amount q Variance
  1,000 Yen (Unfavorable)
$p^{(s)} \mid q^{(a)} \mid \zeta^{(\theta(a))} =$
100 Yen * 650 Boxes = 65,000 Yen
↑
↓ Price p Variance
  6,500 Yen (Favorable)
$p^{(s)} \mid q^{(a)} \mid \zeta^{(\theta(a))} =$
58,500 Yen Next, with reference to FIG. 40, $\eta^{(a)}$ and $\eta^{(s)}$ are calculated.

1) $\eta^{(a)}$=(320 kg+192 kg)×(½)×(1−0)=processing work amount by the amount of 256 kg 2) $\eta^{(s)}$=(240 kg+192 kg)×(½)×(1−0)=processing work amount by the amount of 216 kg The meaning of this is that "In order to create the output node (the completed product: 192 kg) of the 1→1 arrow, the processing work by the amount of 216 kg would have been sufficient in standard, but actually the processing work was performed by the amount of 256 kg. That is, since the actual impairment parameter was 40%, which was worse than that of the standard (20%), the waste of the processing work occurred by the amount of 256 kg−216 kg=40 kg." Accordingly, the impairment θ variance is the unfavorable variance by the amount of 40 kg. Thus, the influence from the impairment θ variance generates a waste, not only in the material introduction amount ζ, but also the processing work amount η.

Evaluation of the impairment θ variance in terms of the amount of money is as follows. The standard direct operation period for manufacturing 1 kg of product is 3 hours, and the standard processing cost per hour of the direct operation period is 1,000 yen/hour. This results in the unfavorable variance of 40 kg×3 hours/kg×1,000 yen/hour=120,000 yen, that is, due to poor management of the impairment proportion, the waste of the processing cost occurred by 120,000.

Next, the direct operation period q variance is calculated.

Since the processing work was performed by the amount of 256 kg in the present term, the direct operation period by 256 kg×3 hours/kg=768 hours would have been sufficient in standard. However, actually, the direct operation period of 800 hours was consumed, and therefore it is seen that the direct operation period is wasted by the amount of 32 hours. Accordingly, the direct operation period q variance is an unfavorable variance by the amount of 32 hours. Evaluation of the direct operation period q variance in terms of the amount of money is as follows.

The unfavorable variance of 32 hours×1,000 yen/hour=32,000 yen

Next, a processing cost p variance per hour of the direct work is calculated. Since the processing work was performed for 800 hours in the present term, the processing cost by 800 hours×1,000 yen/hour=800,000 yen would have been sufficient in standard. However, actually, 880,000 yen was the cost, and therefore it is seen that the processing cost was increased by 80,000 yen. Accordingly, the processing cost p variance per hour is the unfavorable variance of 80,000 yen.

TABLE 21

(Variance Analysis regarding Processing Cost)

$p^{(s)} \mid q^{(s)} \mid \eta^{(\theta(s))} =$
1,000 Yen * 3 Hours *
216 kg = 648,000 Yen
↑
↓      Impairment θ Variance
     120,000 Yen
     (Unfavorable)

$p^{(s)} \mid q^{(s)} \mid \eta^{(\theta(a))} =$
1,000 Yen * 3 Hours *
256 kg = 768,000 Yen
↑
↓      Resource Consumption
     Amount q Variance
     32,000 Yen (Unfavorable)

$p^{(s)} \mid q^{(a)} \mid \eta^{(\theta(a))} =$
1,000 Yen * 800 Hours = 800,000 Yen
↑
↓      Price p Variance
     80,000 Yen (Unfavorable)

$p^{(a)} \mid q^{(a)} \mid \eta^{(\theta(a))} =$
880,000 Yen

In Example 6a, while the factor causing the difference between $\zeta^{(a)}$ and $\zeta^{(s)}$ and the difference between $\eta^{(a)}$ and $\eta^{(s)}$ is only the impairment parameter θ. However, depending on the situation, various other factors, such as the additional material introduction parameter, the arrow path ("path") parameter indicative of the product processing rate, and the material amount ratio vector parameter at the starting point introduction, may give a complicated influence. In that case, it is necessary to analyze as to which factor gives how much influence.

Example 6b

Analysis for the variance between $\zeta^{(a)}$ and $\zeta^{(s)}$ and the variance between $\eta^{(a)}$ and $\eta^{(s)}$ is performed in the case where the production data is as follows in Example 6a.

TABLE 21-1

| (Production Data) | | (Degree of Processing Progress) |
|---|---|---|
| Beginning In-process product | 288 kg | (1/2) |
| Present Term Introduction | — | |
| Present Term Completed Product | 216 kg | |
| Ending in-process Product | — | |

Example 6b Solution/Interpretation

In Example 6b, a calculation method of the standard cost accounting is interpreted for a case wherein the input node of the arrow is a beginning in-process product node. Note that, in principle, after the variance between $\zeta^{(a)}$ and $\zeta^{(s)}$ and the variance between $\eta^{(a)}$ and $\eta^{(s)}$ are obtained, calculation is performed on the q variance and the p variance, but the calculation methods of the q variance and the p variance are same as those in Example 6a, and therefore are omitted in Example 6b.

Figure 41:
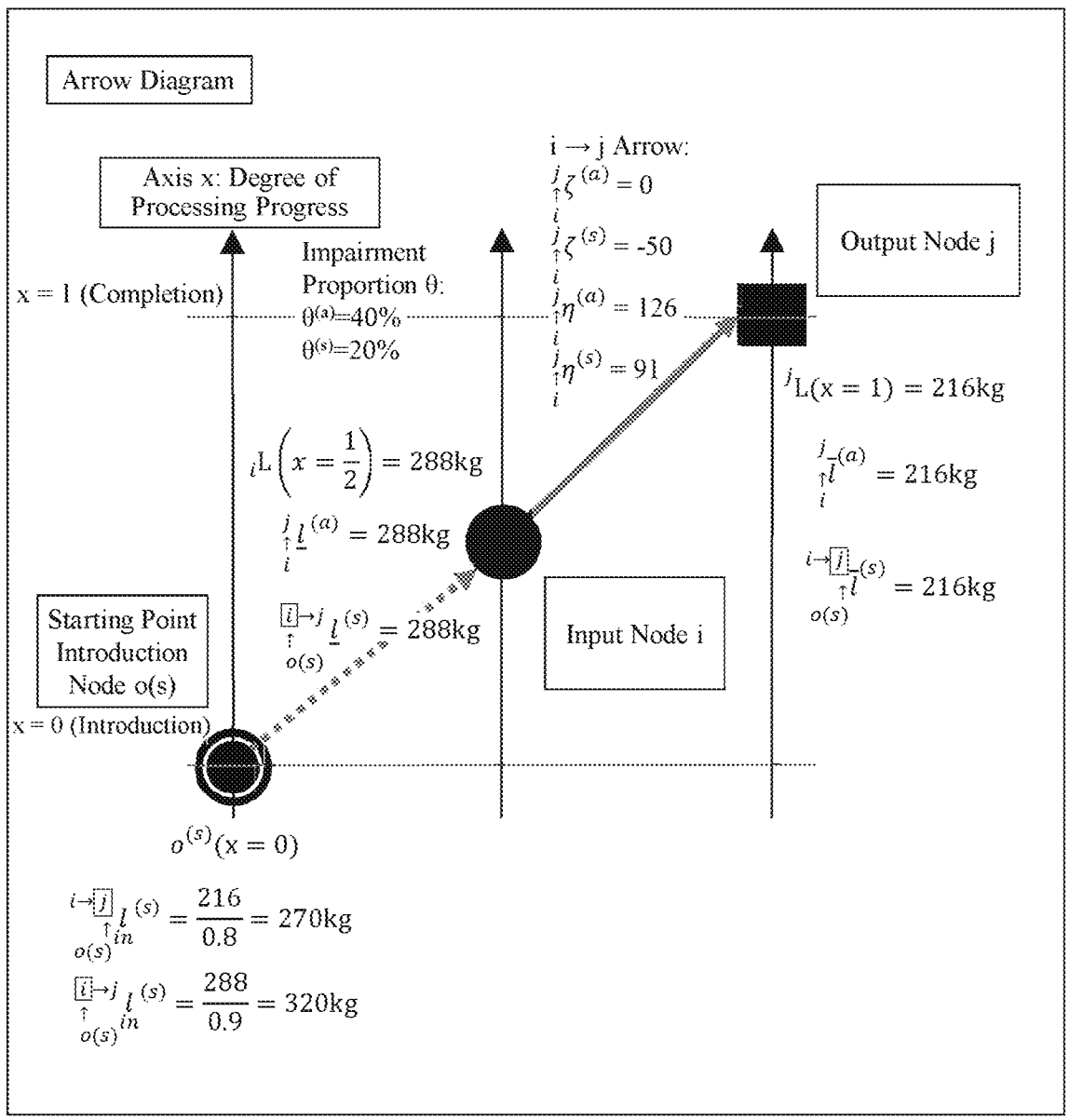
FIG. 41 is an arrow diagram illustrating solution matching for Example 6b.

The solution matching is obvious in this Example as well, and FIG. 41 is an arrow diagram illustrating the solution matching (for convenience of explanation, the arrow is assumed to be the i→j arrow).

With reference to FIG. 41, the actual impairment parameter $\theta^{(a)}$ is obtained. In the arrow, the material amount of $$\overset{1}{\underset{1}{\uparrow}} l^{(a)} = 288 \text{ kg}$$

at the point of x=½ becomes $$\overset{1}{\underset{1}{\uparrow}} \overline{l}^{(a)} = 216 \text{ kg}$$

at the point of x=1, and is thus impaired by 72 kg. Considering the impairment in proportion to x, it is considered that, at the point of x=½, 72 kg has already been impaired from the material amount at the starting point introduction, and therefore the material amount at the starting point introduction is considered to be 288 kg+72 kg=360 kg.

Then, the impairment amount generated from the introduction until the completion is 72 kg+72 kg=144 kg, and the impairment proportion is 144/360=40%. Accordingly, $\theta^{(a)}$=40%. Similarly to Example 6a, the standard impairment parameter is $\theta^{(s)}$=20%.

Since no starting point introduction material is introduced in the present term, obviously $$\overset{j}{\underset{i}{\uparrow}} \zeta^{(a)} = 0 \text{ kg.}$$

Additionally, $${}_i^j\eta^{(a)} = (288 \text{ kg} + 216 \text{ kg}) \times (1/2) \times (1 - 1/2) = 126.$$

Next, $${}_i^j\zeta^{(s)} \text{ and } {}_i^j\eta^{(s)}$$

are calculated. If the input node of the arrow is a beginning in-process product node, the calculation is performed as follows:

((1) $\zeta$ and $\eta$ in a case where the output node is produced under the standard situation)−((2) $\zeta$ and $\eta$ in a case where the input node is produced under the standard situation).

Here, the required introduction amounts are the respective required introduction amounts "from the starting point introduction to the output node" and "from the starting point introduction to the input node."

Thus, the calculation of $\zeta^{(s)}$ and $\eta^{(s)}$ in the case of the beginning in-process product input node needs to consider the starting point introduction, and therefore, in the arrow diagram, the starting point introduction node is indicated as a point $o^{(s)}$. The reason for the (s) notation is that it is a coordinate point basically required when $\zeta$ and $\eta$ of the standard (s) are calculated.

Calculation of ((1) $\zeta$ and $\eta$ in a case where Output Node is Produced under Standard Situation)

Consider an arrow of the starting point introduction node $o^{(s)} \rightarrow$ the output node j. The arrow is denoted as $$\underset{o(s)}{\overset{i \rightarrow \overline{j}}{\uparrow}} \cdot \underset{o(s)}{\overset{i \rightarrow \overline{j}}{\uparrow}} l^{(s)} = {}_i^j l^{(a)} = 216 \text{ kg}$$

is supposed, and based on $$\underset{o(s)}{\overset{i \rightarrow \overline{j}}{\uparrow}} l^{(s)}, \underset{o(s) \, in}{\overset{i \rightarrow \overline{j}}{\uparrow}} l^{(s)}$$

is obtained.

The index "in" which is a subscript to "l" indicates that it is the starting point introduction node. Using it, since the present term introduction node is an input node and a starting point introduction node, it can be denoted as $$\left(\underline{l}\right)_{in}.$$

Note that the indexes, such as the overscore ($\overline{l}$) indicative of the output node, the underscore ($\underline{l}$) indicative of the input node, and $$\left(\underline{l}\right)_{in}$$

indicative of the starting point introduction node, often result in the complex notation, and therefore are omitted when obvious in some cases.

"If the output node (completed product: 216 kg) was produced under the standard production situation, how many kg of the material introduction was supposed to be sufficient" is considered. With the material amount represented by $\alpha$ kg, since 20% disappears due to impairment under the standard impairment situation, it is supposed to be $0.8\alpha$ kg at the completion. Accordingly, from $0.8\alpha=216$, it is found that $\alpha=270$ kg. Accordingly, $$\underset{o(s) \, in}{\overset{i \rightarrow \overline{j}}{\uparrow}} l^{(s)} = \frac{216}{0.8} = 270 \text{ kg}.$$

With the notation of $\zeta$ in the arrow as $${}_i^j\overline{\zeta}^{(s)},$$

it is found that $${}_i^j\overline{\zeta}^{(s)} = 270 \text{ kg}.$$

With the notation of $\eta$ of the arrow as $${}_i^j\overline{\eta}^{(s)}, {}_i^j\overline{\eta}^{(s)} = (270 \text{ kg} + 216 \text{ kg}) \times (1/2) \times (1 - 0) = 243 \text{ kg}.$$

Calculations of ((2) $\zeta$ and $\eta$ in a case where Input Node is Produced under Standard Situation)

The arrow of the starting point introduction node $o^{(s)} \rightarrow$ the input node i is considered. The arrow is denoted as $$\underset{o(s)}{\overset{\underline{i} \rightarrow j}{\uparrow}} \cdot \underset{o(s)}{\overset{\underline{i} \rightarrow j}{\uparrow}} l^{(s)} = {}_i^j l^{(a)} = 288 \text{ kg}$$

is supposed, and based on $$\underset{o(s)}{\overset{\underline{i} \rightarrow j}{\uparrow}} l^{(s)}, \underset{o(s) \, in}{\overset{\underline{i} \rightarrow j}{\uparrow}} l^{(s)}$$

is obtained.

"If the input node (the beginning in-process product at the degree of processing progress of ½: 288 kg) is produced under the standard production situation, how many kg of the material introduction was supposed to be sufficient" is considered. With the material amount represented by $\beta$ kg, since the standard impairment proportion 20%×(½)=10% disappears due to impairment under the standard impairment situation at the degree of processing progress of ½, it is supposed to be $0.9\beta$ kg at the degree of processing progress of ½. Accordingly, from $0.9\beta=288$, it follows that $\beta=320$ kg. Accordingly, $$\underset{o(s) \, in}{\overset{\underline{i} \rightarrow j}{\uparrow}} l^{(s)} = \frac{288}{0.9} = 320 \text{ kg}$$

is found. With the notation of $\zeta$ in the arrow as $$\substack{j \\ \uparrow \\ i} \zeta^{(s)},$$

it is found that $$\substack{j \\ \uparrow \\ i} \zeta^{(s)} = 320 \text{ kg}.$$

With $\eta$ of the arrow denoted as $$\substack{j \\ \uparrow \\ i} \underline{\eta}^{(s)}, \substack{j \\ \uparrow \\ i} \underline{\eta}^{(s)} = (320 \text{ kg} + 288 \text{ kg}) \times (1/2) \times (1/2 - 0) = 152 \text{ kg}.$$

From the above-described discussion, the following formula is found.

Formula 98

$$\substack{j \\ \uparrow \\ i} \zeta^{(s)} = \substack{j \\ \uparrow \\ i} \overline{\zeta}^{(s)} - \substack{j \\ \uparrow \\ i} \zeta^{(s)} = 270 - 320 = -50$$

$$\substack{j \\ \uparrow \\ i} \eta^{(s)} = \substack{j \\ \uparrow \\ i} \overline{\eta}^{(s)} - \substack{j \\ \uparrow \\ i} \underline{\eta}^{(s)} = 243 - 152 = 91$$

Then, (the impairment $\theta$ variance of $$\zeta) = \substack{j \\ \uparrow \\ i} \zeta^{(s)} - \substack{j \\ \uparrow \\ i} \zeta^{(s)} = (-50) - 0 = -50$$

is found, and thus the impairment $\theta$ variance of $\eta$ is the unfavorable variance of 50 kg. Additionally, (the impairment $\theta$ variance of $$\eta) = \substack{j \\ \uparrow \\ i} \eta^{(s)} - \substack{j \\ \uparrow \\ i} \eta^{(a)} = 91 - 126 = -35$$

is found, the impairment $\theta$ variance of $\eta$ is the unfavorable variance of 35 kg.

Example 7

Based on the following data, the standard cost accounting is performed.

TABLE 22

| (Production Data) | | (Degree of Processing Progress) |
|---|---|---|
| Beginning In-process Product | — | |
| Present Term Starting Point Introduction (Material A) | 120 kg | |
| Present Term Starting Point Introduction (Material B) | 240 kg | |
| Present Term Additional Introduction (Material A) | 240 kg | |
| Present Term Completed Product | — | |
| Ending in-process Product (Total of Material A and Material B) | 600 kg | (5/6) |

TABLE 22-continued

| (Actual Cost Data) Present Term Manufacturing Cost | | |
|---|---|---|
| Material A Cost | 37,800 Yen | (Present Term Actual Introduction Amount: 360 kg) |
| Material B Cost | 43,200 Yen | (Present Term Actual Introduction Amount: 240 kg) |
| Variable Processing Cost | 800,000 Yen | (Present Term Actual Direct Operation Period: 780 Hours) |
| Fixed Processing Cost | 1,700,000 Yen | (Present Term Allowable Direct Operation Period: 900 Hours) |

(Other Conditions)

1) At the factory, the material A and the material B are mixed and introduced at the process starting point. The introduction ratio is not constant and varies depending on each production order. Note that the standard material amount ratio ($\psi$) at the starting point introduction is (A:B)=(1:1).

2) At the point of the degree of processing progress x=½, the material A is additionally introduced. The standard additional introduction proportion ($\varphi$) is the same amount as the remaining amount at the point of x=½ of the material A (100% of the remaining amount of the material A).

3) Standard unit price of the material A cost: 100 yen/kg

4) Standard unit price of the material B cost: 200 yen/kg

5) In the calculation of the processing work conversion amount 11, the material A and the material B are not distinguished.

6) (If no material is additionally introduced), the standard direct operation period required for manufacturing 1 kg of product is 2 hours/kg.

7) The variable processing cost is calculated based on the direct operation period. Additionally, the standard variable processing cost per hour of the direct work is 1,000 yen/hour.

8) The fixed processing cost is also calculated based on the direct operation period. The standard fixed processing cost in the present term is 1,800,000 yen, and the present term allowable direct operation period (the direct operation period that is possible at the maximum in the present term) is 900 hours. Therefore, the standard fixed processing cost of the direct work per hour is 1,800,000 yen/900 hours=2,000 yen/hour.

Example 7 Solution/Interpretation

In the arrow cost accounting in FIG. 41, an accurate variance analysis is possible even under a more complicated condition. Here, as factors causing the difference between $\zeta^{(a)}$ and $\eta^{(s)}$ and the difference between $\eta^{(a)}$ and $\eta^{(s)}$, two causes, that is, the material amount ratio ($\psi$) of the material A and the material B at the starting point introduction and the additional introduction proportion ($\varphi$) of the material A are considered (since the material amount ratio at the starting point introduction is given as a vector value, it is denoted with a bold face as $\boldsymbol{\psi}$).

In the explanation of the variable processing cost, the description "(If no material is additionally introduced), the standard direct operation period required for manufacturing 1 kg of product is 2 hours/kg." might appear a little odd. This is probably because, in the example, since the material A is inevitably additionally introduced, the data based on the condition without the additional introduction is considered to be meaningless. This is due to the following reason.

In principle, in order to complete 1 kg of product under the standard condition, (A ⅓ kg, B ⅓ kg) are introduced at the process starting point, and A ⅓ kg is additionally introduced at the point of x=½. At this time, calculation of the processing work amount η finds η=⅔ kg×(½−0)+1 kg×(1−½)=⅚ kg. That is, the processing work is performed by the amount of ⅚ kg, but the way of defining the condition "the standard direct operation period for . . . hours with respect to η ⅚ kg" only makes the story complicated. Obviously, depending on the situation, such a way of defining the condition might make the discussion easier. How the condition should be defined is determined according to the individual situation.

The description "(If no material is additionally introduced), the standard direct operation period required for manufacturing 1 kg of product is 2 hours/kg." states in short that "the standard direct operation period is 2 hours for η 1 kg."

Obtaining the standard direct operation period for η ⅚ kg finds ⅚×2 hours=5/3 hours. This is the standard direct operation period for 1 kg of completed product in consideration of the additional introduction.

In Example 7, the variable processing cost is distinguished from the fixed processing cost.

The variable processing cost is the processing cost generated in accordance with the direct operation period q (q is in accordance with η, and therefore the variable processing cost is also in accordance with η). This corresponds to, for example, metered charge parts of electricity, gas, and water system, a wage of a part-time factory worker (who makes a contract only when a work is available), etc.

The fixed processing cost is a processing cost generated by a constant amount in a constant period, regardless of the direct operation period q and η. This corresponds to, for example, depreciation of manufacturing equipment, fixed charge parts of gas, electricity, and a water system, and a wage (a fixed monthly salary part) of a factory worker of regular employment (to whom the determined amount of money is paid every month regardless of the amount of work).

Figure 42:
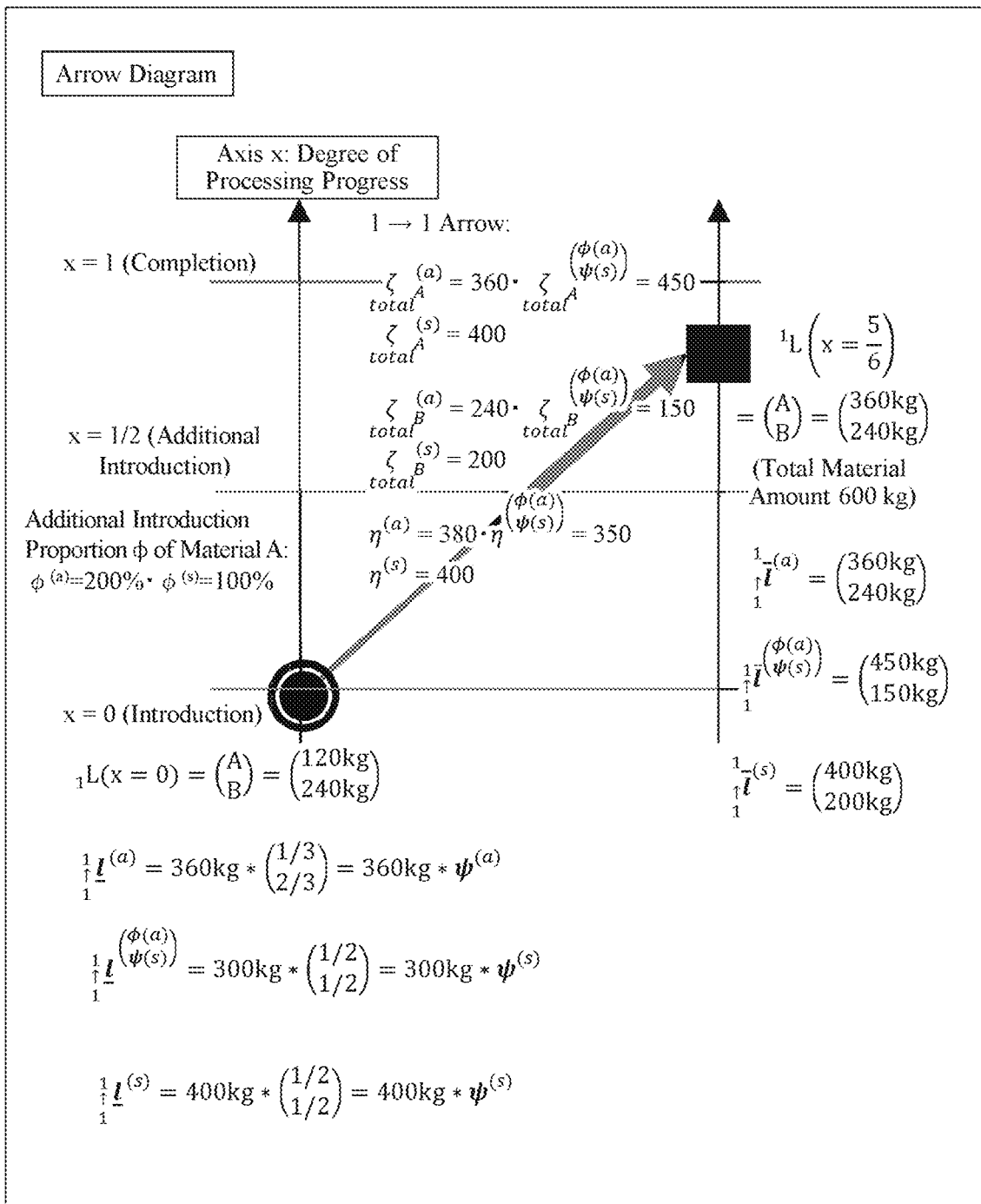
FIG. 42 is an arrow diagram illustrating solution matching for Example 7.

The solution matching is obvious, and the arrow diagram is as shown in FIG. 42.

The actual additional material introduction parameter $\varphi^{(a)}$ is obtained with reference to FIG. 42. In this arrow, since 240 kg is additionally introduced for the material A, which was 120 kg at the point of x=½, it is found that $\varphi^{(a)}$=240 kg/120 kg=200%. Note that $\varphi^{(s)}$ is $\varphi^{(s)}$=100% as in the example's statement.

An actual material amount ratio parameter $\psi^{(a)}$ at the starting point introduction is obtained. While the introduction ratio is (A:B)=(120:240)=(1:2), since the sum of all elements in the vector of the parameter ψ needs to be 1, $$\psi^{(a)} = \begin{pmatrix} 1/3 \\ 2/3 \end{pmatrix}$$

is established. Note that from the condition (A:B)=(1:1), $\psi^{(s)}$ becomes $$\psi^{(s)} = \begin{pmatrix} 1/2 \\ 1/2 \end{pmatrix}$$

Next, $\zeta^{(a)}$ is obtained. As in Example 7, if the material is introduced not only at the starting point but also is additionally introduced, the amount of starting point introduction needs to be distinguished from the amount of additional introduction. Accordingly, $$\zeta_{in}$$

denotes the amount of starting point introduction, $$\zeta_{arrow}$$

denotes the amount of additional introduction, and $$\zeta_{total}$$

denotes the total introduction amount $$\left( \zeta_{total} = \zeta_{in} + \zeta_{arrow} \right).$$

Note that the node in the arrow is the present term introduction input node, and therefore $$\zeta_{in}$$

is denoted as $$\zeta_{in}$$

in some cases.

$$\uparrow_1^1 \zeta_{total}^{(a)} = \uparrow_1^1 \zeta_{total}^{(\phi(a))}$$

is as follows. There are materials A and B, so they are distinguished by the indexes at the lower rights.

Formula 99

$$\uparrow_1^1 \zeta_{total_A}^{(a)} = \zeta_{in_A}^{(a)} + \uparrow_1^1 \zeta_{arrow_A}^{(a)} = 120 + 240 = 360 \text{ kg}$$

$$\uparrow_1^1 \zeta_{total_B}^{(a)} = \zeta_{in_B}^{(a)} + \uparrow_1^1 \zeta_{arrow_B}^{(a)} = 240 + 0 = 240 \text{ kg}$$

Next, $$\uparrow_1^1 \eta^{(a)} = \uparrow_1^1 \eta^{(\phi(a))}_{(\psi(a))}$$

is obtained. Noting that the material amount is increased in the middle, $$\uparrow_1^1 \eta^{(a)} = 360 \text{ kg} \times \left(\frac{1}{2} - 0\right) + 600 \text{ kg} \times \left(\frac{5}{6} - \frac{1}{2}\right) = 180 + 200 = 380 \text{ kg}$$

is found.

Next, $$\uparrow_{1\,total}^{1} \varsigma^{(s)} = \uparrow_{1\,total}^{1} \varsigma^{\left(\phi(s)\atop\psi(s)\right)}$$

is obtained. "If the total material amount of the output node (the ending in-process product at x=⅚: 600 kg) is produced under the standard production situation, how many kg of the material introduction was supposed to be sufficient by the total material amount at the starting point introduction" is considered. Representing the total material amount at the starting point introduction placed by α kg, from $$\psi^{(s)} = \begin{pmatrix} 1/2 \\ 1/2 \end{pmatrix},$$

the introduction amount of A and B at the starting point introduction is $$\begin{pmatrix} A \\ B \end{pmatrix} = \alpha * \psi^{(s)} = \begin{pmatrix} \alpha/2 \\ \alpha/2 \end{pmatrix}.$$

Since the material A is additionally introduced ($\varphi^{(s)}$=100%) to this by α/2 at the point of x=½, the material amount when reaching the output node is $$\begin{pmatrix} A \\ B \end{pmatrix} = \begin{pmatrix} \alpha \\ \alpha/2 \end{pmatrix}.$$

Since the total material amount (A+B=α+α/2=3α/2) is 600 kg, α=400 kg from $$3\alpha/2 = 600. \quad \uparrow_1^1 \underline{l}^{(s)} = 400 \text{ kg} * \begin{pmatrix} 1/2 \\ 1/2 \end{pmatrix} \text{ and } \uparrow_1^1 \eta^{(s)} = \begin{pmatrix} 400 \text{ KG} \\ 200 \text{ KG} \end{pmatrix}$$

in the arrow diagram indicate the breakdowns for the material A and the material B at the starting point introduction point and at the output node point, respectively.

Accordingly, the following is found.

Formula 100

$$\uparrow_{1\,total}^{1} \varsigma_A^{(s)} = \uparrow_{o(s)\,in}^{1\to\boxed{1}} \varsigma_A^{(s)} + \uparrow_{o(s)\,arrow}^{1\to\boxed{1}} \varsigma_A^{(s)} = 200 + 200 = 400 \text{ kg}$$

$$\uparrow_{1\,total}^{1} \varsigma_B^{(s)} = \uparrow_{o(s)\,in}^{1\to\boxed{1}} \varsigma_B^{(s)} + \uparrow_{o(s)\,arrow}^{1\to\boxed{1}} \varsigma_B^{(s)} = 200 + 0 = 200 \text{ kg}$$

$$\uparrow_1^1 \eta^{(s)} = 400 \text{ kg} \times \left(\frac{1}{2} - 0\right) + 600 \text{ kg} \times \left(\frac{5}{6} - \frac{1}{2}\right) = 200 + 200 = 400 \text{ kg}$$

That is, to create the total material amount (the ending in-process product at x=⅚: 600 kg) of the output nodes, the material A would have been required by the total of 400 kg, which was 200 kg at the starting point introduction and 200 kg at the additional introduction, the material B would have been required by 200 kg at the starting point introduction, and the processing work conversion amount would have been required by 400 kg in standard. However, actually, the material A was the total of 360 kg, which was 120 kg of the starting point introduction and 240 kg of the additional introduction, the material B was 240 kg for the starting point introduction, and the processing work conversion amount was 380 kg. The variance is caused by the differences of the material amount ratio (ψ) at the starting point introduction and the additional introduction proportion (φ).

If there are two or more factors of the variance, it has to be examined as to which specific factor gives how much influence. To do so, calculation as follows is performed.

First, either one of the two parameters $$\begin{pmatrix} \phi(s) \\ \psi(s) \end{pmatrix}$$

is replaced from (s) to (a). Any of them may be replaced first, but generally, replacing a parameter related to a later part of the process first would make the result easier to understand. Therefore, since (ψ) is the parameter at the point of the starting point introduction (x=0) and (φ) is the parameter at the point of x=½, (φ) is replaced first here, and $$\begin{pmatrix} \phi(a) \\ \psi(s) \end{pmatrix}$$

is considered.

Accordingly, first, $$\uparrow_{1\,total}^{1} \varsigma^{\left(\phi(a)\atop\psi(s)\right)}$$

is obtained. "If the total material amount of the output nodes (the ending in-process product at x=⅚: 600 kg) is produced under a production situation of the standard material amount ratio (ψ) at the starting point introduction and the actual additional introduction proportion (φ), how many kg of the material introduction by the total material amount was supposed to be sufficient at the starting point introduction" is considered. Representing the total material amount at the starting point introduction by β kg, from $$\psi^{(s)} = \begin{pmatrix} 1/2 \\ 1/2 \end{pmatrix},$$

the introduction amount of A and B at the starting point introduction becomes $$\begin{pmatrix} A \\ B \end{pmatrix} = \beta * \psi^{(s)} = \begin{pmatrix} \beta/2 \\ \beta/2 \end{pmatrix}.$$

At the point of x=½, since the material A is additionally introduced ($\varphi^{(a)}$=200%) by β to this, the material amount when reaching the output node is $$\binom{A}{B} = \binom{3\beta/2}{\beta/2}.$$

Since the total material amount (A+B=3β/2+β/2=2β) equals to 600 kg, β=300 kg from 2β=600.

$$\uparrow_1^1 \zeta A^{(\phi(a))}_{(\psi(s))} = 300 \text{ kg} * \binom{1/2}{1/2} \text{ and } \uparrow_1^1 \overline{I}^{(\phi(a))}_{(\psi(s))} = \binom{450 \text{ kg}}{150 \text{ kg}}$$

in the arrow diagram indicate the breakdowns for the material A and the material B at the starting point introduction point and the output node point, respectively.

Accordingly, the following are found.

Formula 101

$$\uparrow_1^1 \zeta A^{(\phi(a))}_{(\psi(s))}\bigg|_{total} = \overset{1\to\boxed{1}}{\overset{\uparrow}{\underset{in}{o(s)}}} \zeta A^{(\phi(a))}_{(\psi(s))} + \overset{1\to\boxed{1}}{\overset{\uparrow}{\underset{arrow}{o(s)}}} \zeta A^{(\phi(a))}_{(\psi(s))}$$
$$= 150 + 300 = 450 \text{ kg}$$

$$\uparrow_1^1 \zeta B^{(\phi(a))}_{(\psi(s))}\bigg|_{total} = \overset{1\to\boxed{1}}{\overset{\uparrow}{\underset{in}{o(s)}}} \zeta B^{(\phi(a))}_{(\psi(s))} + \overset{1\to\boxed{1}}{\overset{\uparrow}{\underset{arrow}{o(s)}}} \zeta B^{(\phi(a))}_{(\psi(s))} = 150 + 0 = 150 \text{ kg}$$

$$\uparrow_1^1 \eta^{(\phi(a))}_{(\psi(s))} =$$

$$300 \text{ kg} \times \left(\frac{1}{2} - 0\right) + 600 \text{ kg} \times \left(\frac{5}{6} - \frac{1}{2}\right) = 150 + 200 = 350 \text{ kg}$$

Note that, regarding the material A and the material B, since the introduction amount ζ becomes the resource consumption amount q (that is, ζ=q), there is no q variance.

The variance analysis results are summarized as follows.

(Variance Analysis Regarding Material A)

TABLE 23

| $p_A^{(s)}\bigg|\zeta^{(\phi(s))}_{(\psi(s))}\bigg|_{total^A} = 100 \text{ Yen} * 400 \text{ kg}$ | |
|---|---|
| $= 40,000 \text{ Yen}$ | |
| ↑ ↓ | Additional Introduction (φ) Variance 5,000 Yen (Unfavorable) |
| $p_A^{(s)}\bigg|\zeta^{(\phi(a))}_{(\psi(s))}\bigg|_{total^A} = 100 \text{ Yen} * 450 \text{ kg}$ | |
| $= 45,000 \text{ Yen}$ | |
| ↑ ↓ | Material Amount Ratio ψ Variance at Starting Point Introduction 9,000 Yen (Favorable) |
| $p_A^{(s)}\bigg|\zeta^{(\phi(a))}_{(\psi(a))}\bigg|_{total^A} = 100 \text{ Yen} * 360 \text{ kg}$ | |
| $= 36,000 \text{ Yen}$ | |
| ↑ ↓ | Price p Variance 1,800 Yen (Unfavorable) |
| $p_A^{(a)}\bigg|\zeta^{(\phi(a))}_{(\psi(a))}\bigg|_{total^A} = 37,800 \text{ Yen}$ | |

(Variance Analysis Regarding Material B)

TABLE 24

| $p_B^{(s)}\bigg|\zeta^{(\phi(s))}_{(\psi(s))}\bigg|_{total^B} = 200 \text{ Yen} * 200 \text{ kg}$ | |
|---|---|
| $= 40,000 \text{ Yen}$ | |
| ↑ ↓ | Additional Introduction (φ) Variance 10,000 Yen (Favorable) |
| $p_B^{(s)}\bigg|\zeta^{(\phi(a))}_{(\psi(s))}\bigg|_{total^B} = 200 \text{ Yen} * 150 \text{ kg}$ | |
| $= 30,000 \text{ Yen}$ | |
| ↑ ↓ | Material Amount Ratio ψ Variance at Starting Point Introduction 18,000 Yen (Unfavorable) |
| $p_B^{(s)}\bigg|\zeta^{(\phi(a))}_{(\psi(a))}\bigg|_{total^B} = 200 \text{ Yen} * 240 \text{ kg}$ | |
| $= 48,000 \text{ Yen}$ | |
| ↑ ↓ | Price p Variance 4,800 Yen (Favorable) |
| $p_B^{(a)}\bigg|\zeta^{(\phi(a))}_{(\psi(a))}\bigg|_{total^B} = 43,200 \text{ Yen}$ | |

(Variance Analysis Regarding Variable Processing Cost)
(Variable Processing Cost Per Hour is Denoted as $p_V$)

TABLE 25

| $p_V^{(s)}\bigg|q^{(s)}\bigg|\eta^{(\phi(s))}_{(\psi(s))} = 1,000 \text{ Yen} * 2 \text{ h} * 400 \text{ kg}$ | |
|---|---|
| $= 800,000 \text{ Yen}$ | |
| ↑ ↓ | Additional Introduction φ Variance 100,000 Yen (Favorable) |
| $p_V^{(s)}\bigg|q^{(s)}\bigg|\eta^{(\phi(a))}_{(\psi(s))} = 1,000 \text{ Yen} * 2 \text{ h} * 350 \text{ kg}$ | |
| $= 700,000 \text{ Yen}$ | |
| ↑ ↓ | Material Amount Ratio ψ Variance at Starting Point Introduction 60,000 Yen (Unfavorable) |
| $p_V^{(s)}\bigg|q^{(s)}\bigg|\eta^{(\phi(a))}_{(\psi(a))} = 1,000 \text{ Yen} * 2 \text{ h} * 380 \text{ kg}$ | |
| $= 760,000 \text{ Yen}$ | |
| ↑ ↓ | Resource Consumption Amount q Variance 20,000 Yen (Unfavorable) |

TABLE 25-continued $$p_V^{(s)} \Big| q^{(a)} \Big| \eta^{(\phi(a))}_{(\psi(a))} = 1,000 \text{ Yen} * 780 \text{ h}$$

$$= 780,000 \text{ Yen}$$

↑  
↓  Price p Variance  
   20,000 Yen (Unfavorable)

$$p_V^{(a)} \Big| q^{(a)} \Big| \eta^{(\phi(a))}_{(\psi(a))} = 8,000 \text{ Yen}$$

(Variance Analysis Regarding Fixed Processing Cost) (Fixed Processing Cost Per Hour is Denoted as $p_F$)

TABLE 26

$$p_F^{(s)} \Big| q^{(s)} \Big| \eta^{(\phi(s))}_{(\psi(s))} = 2,000 \text{ Yen} * 2 \text{ h} * 400 \text{ kg}$$

$$= 1,600,000 \text{ Yen}$$

↑  
↓  Additional Introduction (φ)  
   Variance  
   200,000 Yen (Favorable)

$$p_F^{(s)} \Big| q^{(s)} \Big| \eta^{(\phi(a))}_{(\psi(s))} = 2,000 \text{ Yen} * 2 \text{ h} * 350 \text{ kg}$$

$$= 1,400,000 \text{ Yen}$$

↑  
↓  Material Amount Ratio ψ  
   Variance at Starting Point  
   Introduction  
   120,000 Yen  
   (Unfavorable)

$$p_F^{(s)} \Big| q^{(s)} \Big| \eta^{(\phi(a))}_{(\psi(a))} = 2,000 \text{ Yen} * 2 \text{ h} * 380 \text{ kg}$$

$$= 1,520,000 \text{ Yen}$$

↑  
↓  Resource Consumption  
   Amount q Variance  
   40,000 Yen (Unfavorable)

$$p_F^{(s)} \Big| q^{(a)} \Big| \eta^{(\phi(a))}_{(\psi(a))} = 2,000 \text{ Yen} * 780 \text{ h}$$

$$= 1,560,000 \text{ Yen}$$

↑  
↓  Capacity Variance  
   240,000 Yen  
   (Unfavorable)

$p_F^{(s)} | q^{(cap)} = 2,000$ Yen * 900 h = 1,800,000 Yen

↑  
↓  Price p Variance  
   100,000 Yen (Favorable)

$p_F^{(a)} | q^{(cap)} = 1,700,000$ Yen

Meaning of the capacity variance appearing in the variance analysis for the fixed processing cost is described. Similar to the depreciation cost of the manufacturing equipment, the fixed processing cost is a processing cost in which a constant amount is generated regardless of the direct operation period. In this case, regardless of whether the manufacturing equipment is idle or operating, the generated fixed processing cost is constant, and therefore operating the manufacturing equipment as much as possible is managerially preferable. 900 hours of the present term allowable direct operation period means an amount of hours that is achievable if the manufacturing equipment is fully operated.

In this Example 7, the actual direct operation period in the present term is 780 hours and the allowable direct operation period is 900 hours. This means that operating capacity by the amount of 120 hours is idled. Evaluation of this in terms of the amount of money is 2,000 yen×120 hours=240,000 yen, and it is seen that a waste exists by the amount of money.

An influence of the additional introduction parameter φ variance spreads to various cost elements. In Example 7, $\varphi^{(s)}=100\%$ and $\varphi^{(a)}=200\%$, and thus the material A more than that of the standard is additionally introduced. As a result, considering by adding the amount of starting point introduction and the amount of additional introduction, the material A larger than that of the standard was introduced, and therefore a φ variance is 5,000 yen (the unfavorable variance) in the material A, which is intuitively apparent.

φ is the additional introduction parameter regarding the material A. Although the additional introduction is not performed on the material B, the influence of the φ variance brings a decrease in the introduction amount of the material B through an influence of the increase in the introduction amount of the material A. This is the reason why the φ variance of 10,000 yen (the favorable variance) occurs in the material B.

The processing work is introduced to the material that has been introduced at the starting point within a range of the degree of processing progress $0 \le x \le \frac{5}{6}$. In contrast, the processing work is introduced only within a range of $\frac{1}{2} \le x \le \frac{5}{6}$ to the material additionally introduced at the point of $x=\frac{1}{2}$. Therefore, as the additional introduction amount increases, the required processing work amount decreases. This is the reason why the φ variance becomes the favorable variance in the variable processing cost and the fixed processing cost.

A total of the φ variances for all cost elements finds 305,000 yen (the favorable variance).

Similarly, a material amount ratio parameter ψ variance at the starting point introduction spreads to various cost elements. The standard is (A:B)=(1:1) and the actual is (A:B)=(1:2), and thus the extra material B is introduced at the starting point. Since the material A is reduced by the amount, a material A ψ variance is 9,000 yen (the favorable variance). Obviously, the material B is consumed more than in the standard, and therefore a material B ψ variance is 18,000 yen (the unfavorable variance).

The ψ variances (the unfavorable variances) are recorded in the variable processing cost and the fixed processing cost. Since the processing work is equally introduced to the material A and the material B (for example, this is not such a case that the material B takes more labor for processing than the material A so that the processing work amount for 1 kg of material B is twice the processing work amount for 1 kg of material A), it might appear a little strange that the processing work conversion amount η is affected by the introduction ratio.

This is because that, as a result of introducing the extra material B and smaller amount of the material A at the process starting point, the additional introduction amount of the material A also decreases (it should be noted that the additional introduction amount is in proportion to the starting point introduction amount). The additional material introduction, which is favorable in the processing work decreases, so the unfavorable variance occurs also in the processing cost.

A total of the ψ variances for all cost elements finds 189,000 yen (the unfavorable variance).

Note that, usually, the q variance and the p variance are often independent in each of the cost elements, they do not have influences to various cost elements so much (like the φ variance and the ψ variance). For example, in Example 7, only calculation criteria for both of the variable processing cost and the fixed processing cost use the direct operation period as q, and the direct operation period q variance does not give an influence to, for example, the material cost.

In the variance analysis by the arrow cost accounting, like the φ variance and the ψ variance in this Example, even when the variance complicatedly gives influences to the various cost elements, the variance analysis can be accurately performed.

The variance analysis by the conventional orthodox standard cost accounting does not have a mathematical idea of analyzing an arrow on the cost accounting space. Accordingly, performing the accurate variance analysis under such a complicated situation is considerably difficult.

A result of consideration for $$\begin{pmatrix} \phi(s) \\ \psi(a) \end{pmatrix}$$

is shown below, which are $$\substack{1 \\ 1} \int_1^{\phi(a)}_{\psi(s)} = 450 \text{ kg} \times \begin{pmatrix} 1/3 \\ 2/3 \end{pmatrix} \text{ and}$$

$$\substack{1 \\ 1} \int_1^{\phi(a)}_{\psi(s)} = \begin{pmatrix} 300 \text{ kg} \\ 300 \text{ kg} \end{pmatrix}.$$

The calculation can be performed similarly to the above-described example, so the calculation process is omitted.

Example 8

Based on the following data, the costs for the first present term completed product and the second present term completed product are calculated.

TABLE 27

| (Production Data) | (Degree of Processing Progress x) | (Date and Time t) |
| --- | --- | --- |
| Beginning In-process Product | — | |
| Present Term Introduction | 300 kg | November 1 00:00 |
| First Present Term Completed Product | 80 kg | November 15 24:00 |
| Second Present Term Completed Product | 160 kg | November 30 24:00 |
| Ending in-process Product | — | |

| (Cost Data) Present Term Manufacturing Cost | |
| --- | --- |
| Material Cost | 300,000 Yen |
| X Processing Cost | 26,600 Yen |
| T Processing Cost | 45,000 Yen |

(Other Conditions)
1) As the time passes, the material amount is impaired by the constant amount (regardless of the introduction amount and the remaining amount, the constant amount is always impaired).
2) The material is all introduced at the process starting point (the starting point introduction material).
3) The X processing cost is calculated based on the degree of processing progress x.
4) The T processing cost is calculated based on a lead time t.
5) The cost accounting period is one month from November 1, 00:00 to November 30, 24:00. Moreover, the factory has operated 24 hours every day in the period.
6) In the first present term completed product manufacturing, the processing pace per hour was always constant.
7) Processing pace per hour in the second present term completed product manufacturing
7-1) For 15 days from November 1, 00:00 (date and time of introduction) until November 15, 24:00, the pace that the degree of processing progress proceeds per day was 2%, and the processing pace per hour was always constant. As a result, the degree of processing progress at November 15, 24:00 was 30%.
7-2) For 15 days from November 16, 00:00 until November 30, 24:00 (date and time of completion), it was always constant.

Example 8 Solution/Interpretation

Generally, at a site of product manufacturing, reducing the lead time (the elapsed time) from the material introduction to the completion is also an important problem. However, the conventional cost accounting does not include an element of the lead time in the calculation system and therefore cannot handle this problem.

The arrow cost accounting introduces, not only the conventional degree of processing progress axis, but also the time axis in the cost accounting space, thus enabling handling the problem of the lead time appropriately.

The Example 8 in this time divides the processing cost into two. The X processing cost is a processing cost preferable to be calculated based on the degree of processing progress, and, for example, corresponds to a processing cost generated when the processing work is performed. The T processing cost is a processing cost preferable to be calculated based on the lead time, and, for example, corresponds to a processing cost generated on an elapse of the time. In both cases (further, even a cost generated in a more complicated manner), the arrow cost accounting allows performing the appropriate calculation.

Figure 43:
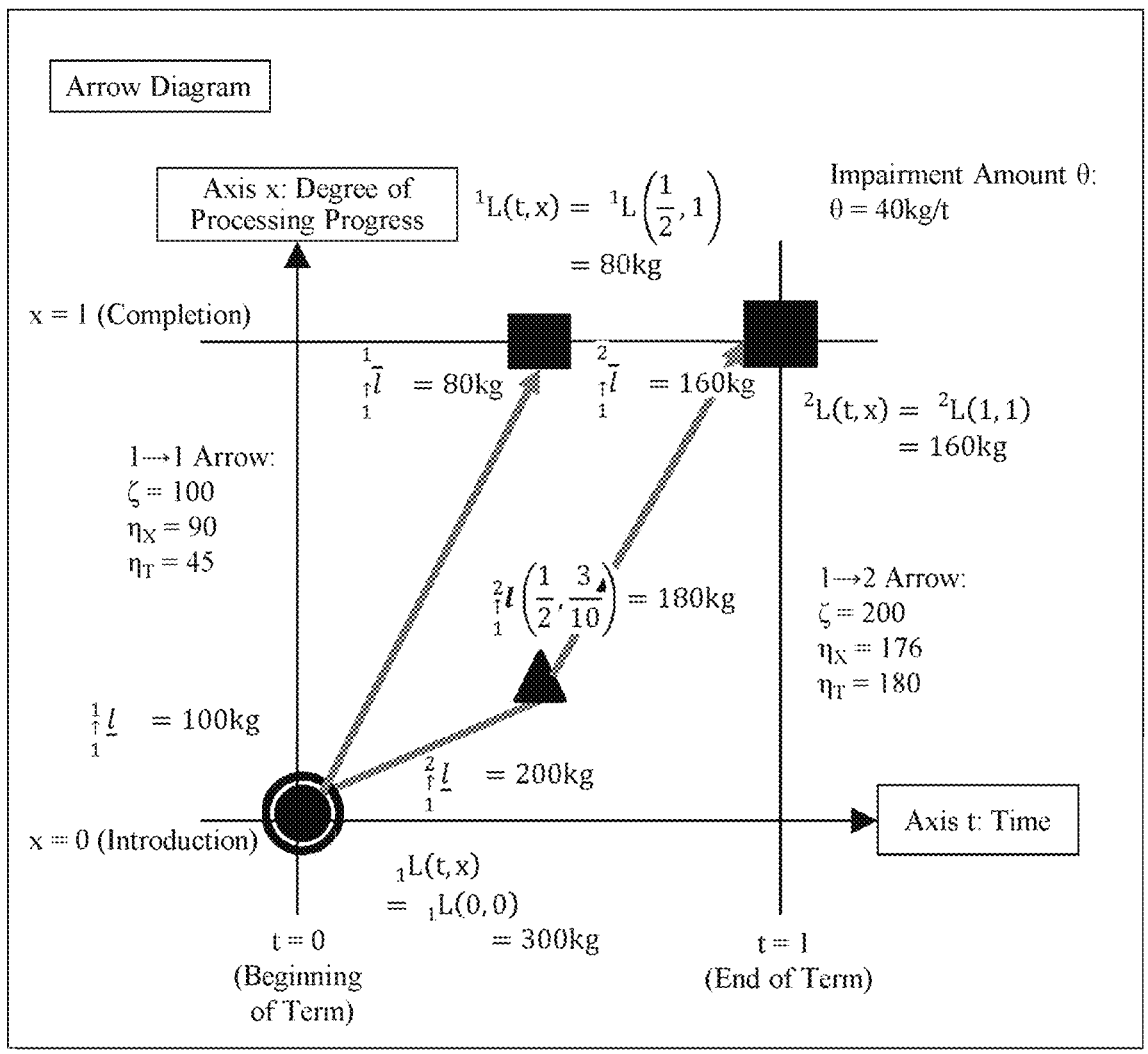
FIG. 43 is an arrow diagram illustrating solution matching for Example 8.

FIG. 43 illustrates the solution matching with the arrow diagram.

The present term is defined to be the range of $0 \leq t \leq 1$. Since the present term is the period from November 1, 00:00 (t=0) until November 30, 24:00 (t=1), November 15, 24:00 is $t = \frac{1}{2}$.

The ▲ mark in the middle of the path of the 1→2 arrow indicates a coordinate of an intermediate point. ● means the input node and ■ means the output node and therefore are unusable, so the ▲ mark is used as another sign.

Although an arrow symbol (→) of the arrow in the arrow diagram having only the degree of processing progress axis so far merely indicates which input node corresponds to which output node, an arrow symbol in the arrow diagram including the time axis as in FIG. 43 also indicates the processing pace. That is, the information "at certain month, certain day, and certain time, the degree of processing progress was . . . " is included. Therefore, the arrow symbol may have a shape such as a line graph or a curved line (if the processing pace per hour is fast, the arrow is close to be vertical, and when it is slow, the arrow is close to be horizontal).

In Example 8, in the period ($0 \leq t \leq \frac{1}{2}$) from the introduction until the completion, the 1→1 arrow has a condition "the processing pace per hour was always constant," and therefore it is seen that the arrow is a straight line. Since the processing paces differ between ($0 \leq t \leq \frac{1}{2}$) and ($\frac{1}{2} \leq t \leq 1$), the 1→2 arrow is a line graph.

The impairment parameter θ is calculated as follows. First, it is considered that "when t passes by one term, the impairment occurs by θ kg." Then, since t proceeds by ½ in the 1→1 arrow, the impairment occurs by θ/2, and since t proceed by 1 in the 1→2 arrow, the impairment occurs by θ. In total, the impairment occurs by 3θ/2. From the production data, the present term introduction amount is 300 kg and the completed product is 80 kg+160 kg=240 kg in total, and therefore 300 kg−240 kg=60 kg is impaired in total. Accordingly, from 3θ/2=60, θ=40 kg is found. That is, when one period passes, the material of 40 kg is impaired.

Then, since θ/2=20 kg is impaired in the 1→1 arrow to reach the first output node, $$\substack{1\\1}l = 100 \text{ kg}.$$

Similarly, $$\substack{2\\1}l = 200 \text{ kg}.$$

Regarding ζ, $$\text{obviously } \substack{1\\1}\zeta = 100 \text{ kg and } \substack{2\\1}\zeta = 200 \text{ kg}.$$

Figure 44:
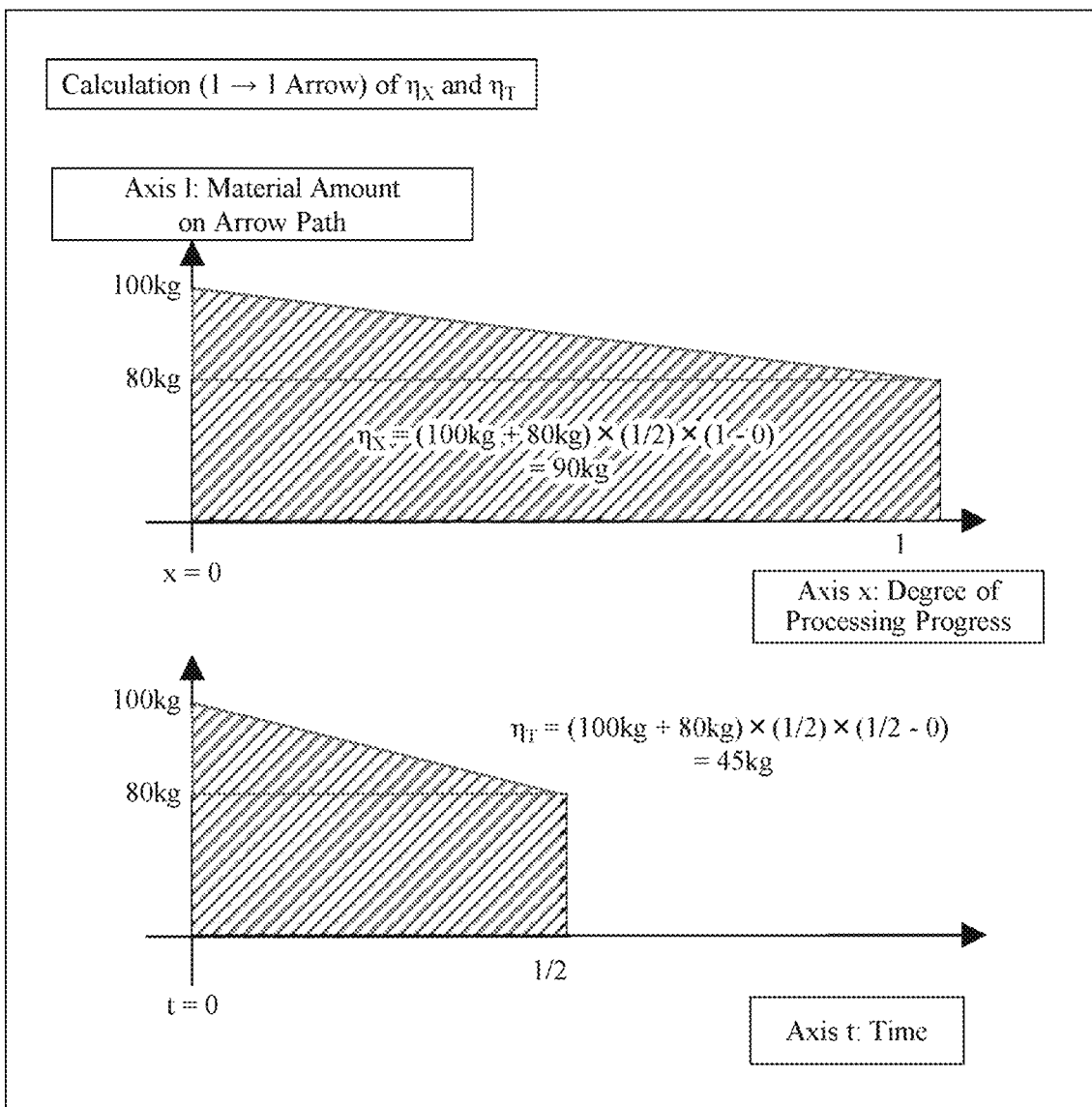
FIG. 44 is a drawing illustrating calculation examples (a 1→1 arrow) of $\eta_X$ and $\eta_T$ in Example 8.

FIG. 44 is a drawing illustrating calculation examples (the 1→1 arrow) of ηX and ηT in Example 8.

Figure 45:
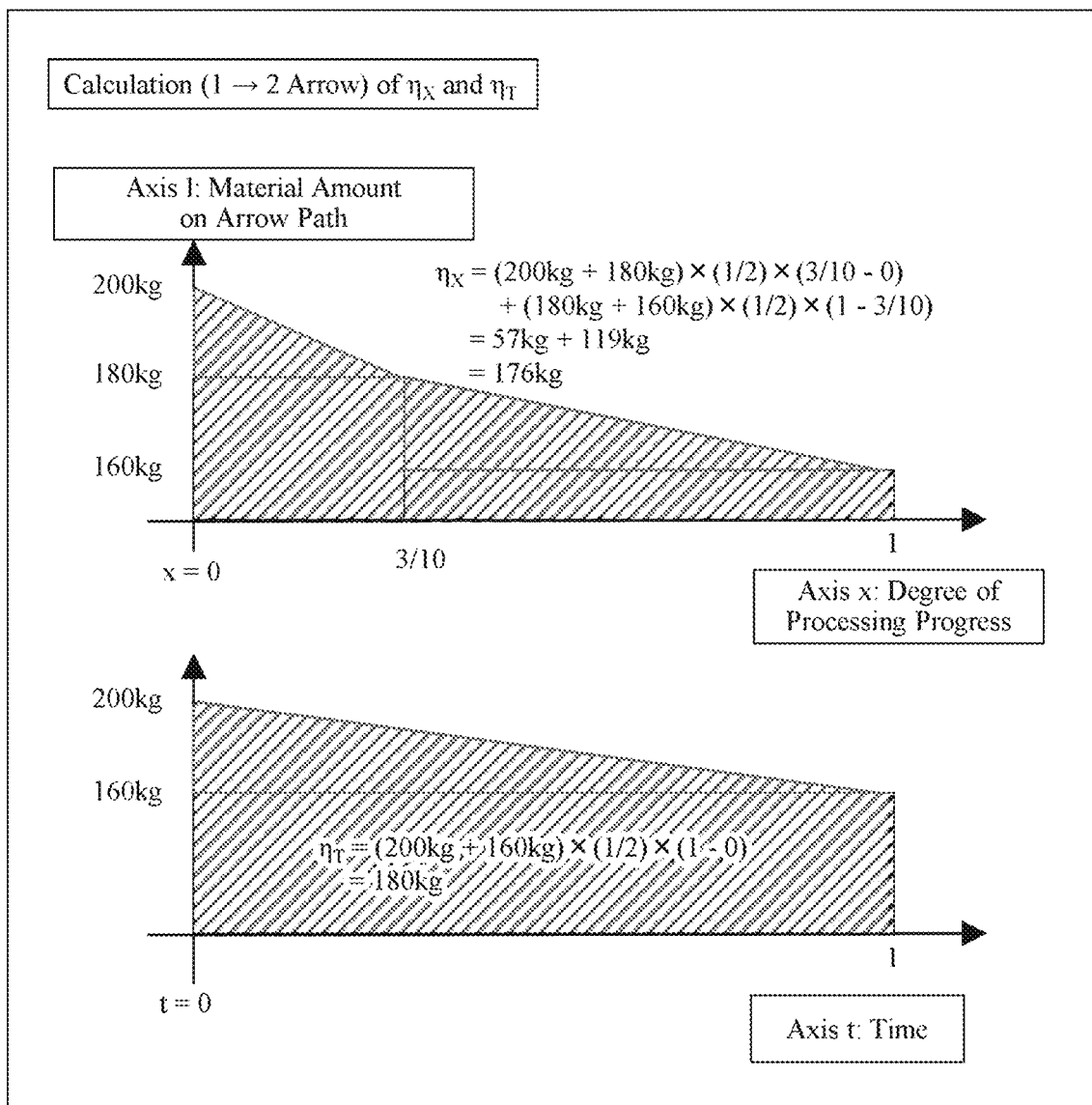
FIG. 45 is a drawing illustrating calculation examples (a 1→2 arrow) of $\eta_X$ and $\eta_T$ in Example 8.

FIG. 45 is a drawing illustrating calculation examples (the 1→2 arrow) of ηX and ηT in Example 8.

η is

Formula 102

$$\substack{1\\1}\eta_X = (100 \text{ kg} + 80 \text{ kg}) \times \frac{1}{2} \times (1 - 0) = 90 \text{ kg}$$

$$\substack{1\\1}\eta_T = (100 \text{ kg} + 80 \text{ kg}) \times \frac{1}{2} \times \left(\frac{1}{2} - 0\right) = 45 \text{ kg}$$

$$\substack{2\\1}\eta_X = (200 \text{ kg} + 180 \text{ kg}) \times \frac{1}{2} \times \left(\frac{3}{10} - 0\right) +$$

$$(180 \text{ kg} + 160 \text{ kg}) \times \frac{1}{2} \times \left(1 - \frac{3}{10}\right)$$

$$= 57 \text{ kg} + 119 \text{ kg}$$

$$= 176 \text{ kg}$$

$$\substack{2\\1}\eta_T = (200 \text{ kg} + 160 \text{ kg}) \times \frac{1}{2} \times (1 - 0) = 180 \text{ kg}$$

Accordingly, the costs are distributed as follows.

TABLE 28

| Arrow | Material Cost 300,000 Yen | X Processing Cost 26,600 Yen | T Processing Cost 45,000 Yen | Total |
|---|---|---|---|---|
| 1 → 1 | 300,000 × (100/300) = 100,000 Yen | 26,600 × (90/266) = 9,000 Yen | 45,000 × (45/225) = 9,000 Yen | 118,000 Yen |
| 2 → 1 | 300,000 × (200/300) = 200,000 Yen | 26,600 × (176/266) = 17,600 Yen | 45,000 × (180/225) = 36,000 Yen | 253,600 Yen |

Example 9a

Based on the following data, the variance between $\zeta^{(a)}$ and $\zeta^{(s)}$ and the variance between $\eta^{(a)}$ and $\eta^{(s)}$ are analyzed.

TABLE 29

| (Production Data) | (Degree of Processing Progress x) | (Date and Time t) |
|---|---|---|
| Beginning In-process Product | — | |
| Present Term Introduction | 152 kg | t = 0 |
| Present Term Completed Product | 104 kg | t = 1 |
| Ending in-process Product | — | |

(Other Conditions)

1) As the time passes, the material amount is impaired by a constant amount (regardless of the introduction amount and the remaining amount, the constant amount is always impaired). The standard impairment amount is 32 kg per term.

2) The material is all introduced at the process starting point (the starting point introduction material).

3) The X processing cost is calculated based on the degree of processing progress x.

4) The T processing cost is calculated based on the lead time t.

5) The processing rate per hour was always constant. The standard lead time is the half term (½) and the standard processing rate is always constant.

Example 9a Solution/Interpretation

In Example 9a, a method for the standard cost accounting in a model considering the time axis and the degree of processing progress axis is described. Note that, in principle, after obtaining the variance between $\zeta^{(a)}$ and $\zeta^{(s)}$ and the variance between $\eta^{(a)}$ and $\eta^{(s)}$, the q variance and the p variance are calculated. However, the q variance and the p variance are the same as those in the discussions so far and therefore are omitted in Example 9a.

Figure 46:
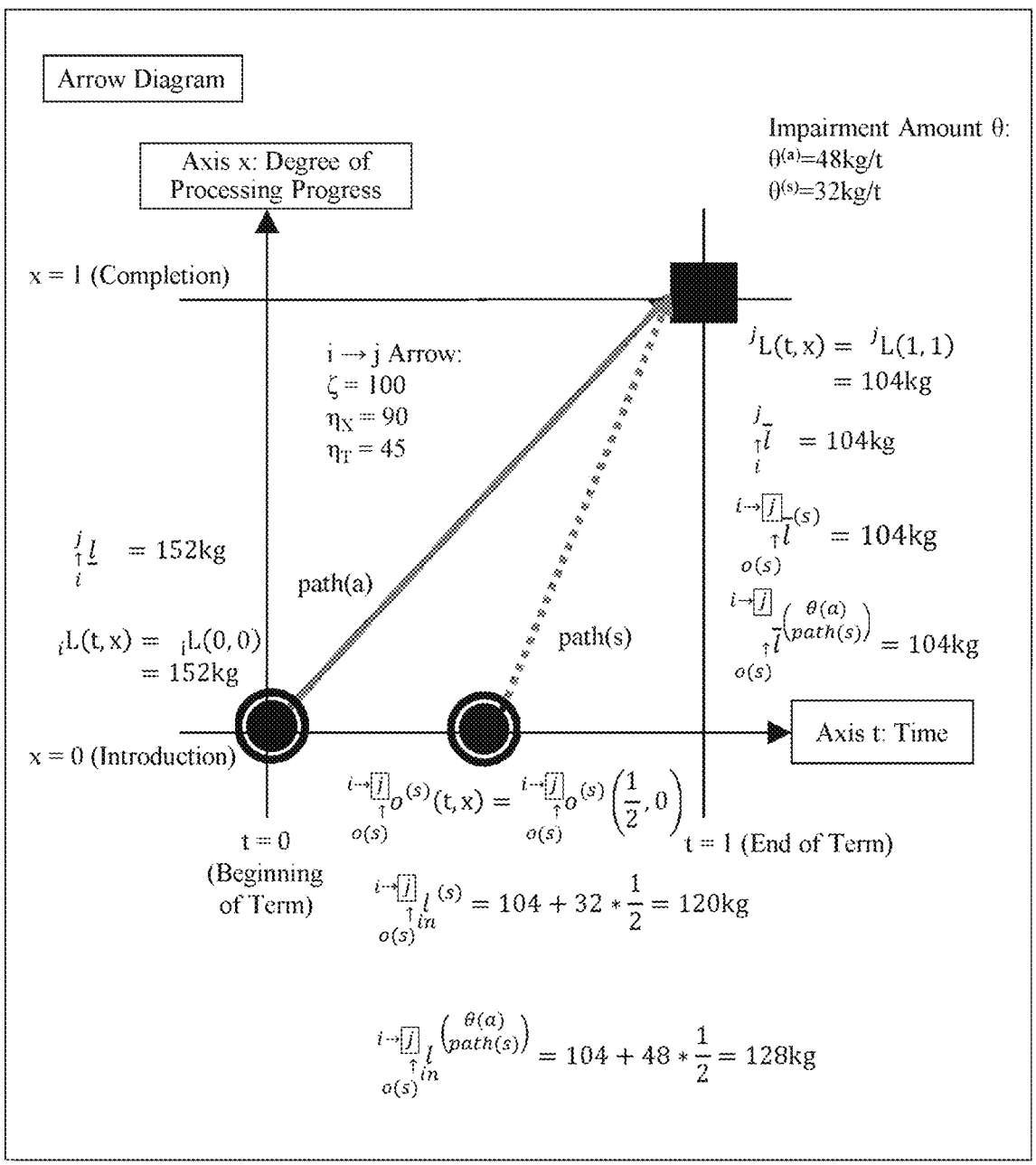

The solution matching of this Example is obvious, and the arrow diagram as illustrated in FIG. 46 (for convenience of explanation, the arrow is assumed to be the i→j arrow).

Regarding the impairment parameter $\theta^{(a)}$, 152 kg of the material introduced at t=0 decreases to 104 kg at t=1, so the impairment amount is 152−104=48 kg. Accordingly $\theta^{(a)}$=48. Also, from the statements in the example, $\theta^{(s)}$=32.

The arrow path is referred to as "path". It should be noted that, in a model of the degree of processing progress axis and time axis, the paths differ between the standard and the actual. In the above-described arrow diagram, path(a) means an actual path up to the output node, whereas path(s) is a standard path up to the output node. In standard, the lead time is ½ and the date and time of completion of the output node is t=1. Accordingly, it is seen that, standardly, the material is introduced at t=1−½=½. Additionally, since the standard processing rate is always constant, the arrow path (s) is a straight line. As a result, regarding the coordinate at the starting point introduction point, the actual starting point introduction point is (t, x)=(0, 0), but the standard point is (½, 0), thus being different coordinates.

Formula 103

The actuals (a), that is, $\zeta$, $\eta x$, and $\eta_T$ regarding $\begin{pmatrix} \theta(a) \\ \text{path}(a) \end{pmatrix}$ are $_i^j \zeta^{(a)} = 152$ kg $_i^j \eta_X^{(a)} = (152 \text{ kg} + 104 \text{ kg}) \times \frac{1}{2} \times (1-0) = 128$ kg $_i^j \eta_T^{(a)} = (152 \text{ kg} + 104 \text{ kg}) \times \frac{1}{2} \times (1-0) = 128$ kg In standard, a kg of the material is introduced at t=½, and while the standard lead time passes by ½, $\theta^{(s)} \times ½ = 32 \times ½ = 16$ kg is impaired, and the material amount becomes 104 kg at the output node, and therefore, from α−16=104, it is found that α=120 kg. Accordingly, $\underset{o(s)}{\overset{i \to \boxed{j}}{\underset{in}{\uparrow}}} l^{(s)} = 120$ kg.

Formula 104

The standards (s), that is, $\zeta$, $\eta x$, and $\eta_T$ regarding $\begin{pmatrix} \theta(s) \\ \text{path}(s) \end{pmatrix}$ are $_i^j \zeta^{(s)} = 120$ kg $_i^j \eta_X^{(s)} = (120 \text{ kg} + 104 \text{ kg}) \times \frac{1}{2} \times (1-0) = 112$ kg $_i^j \eta_T^{(s)} = (120 \text{ kg} + 104 \text{ kg}) \times \frac{1}{2} \times \left(1 - \frac{1}{2}\right) = 56$ kg (It should be noted that the calculation is performed along with the path of "path(s)".)

Next, as the cause of the deviation between (s) and (a), this Example evaluates which of the two factors gives a greater influence: the impairment parameter θ; or the arrow path "path". From $\begin{pmatrix} \theta(s) \\ \text{path}(s) \end{pmatrix}$, one of the parameters is replaced by (s). As to which of them should be replaced first, the path of (s) is likely to give a result easier to be interpreted, so $\begin{pmatrix} \theta(a) \\ \text{path}(s) \end{pmatrix}$ is used.

In standard, β kg of the material is introduced at t=½. $\theta^{(a)} \times ½ = 48 \times ½ = 24$ kg is impaired while the standard lead time ½ elapses, and the material amount becomes 104 kg at the output node. From β−24=104, it is found that β=128 kg. Accordingly, $\underset{o(s)}{\overset{i \to \boxed{j}}{\underset{in}{\uparrow}}} l \begin{pmatrix} \theta(a) \\ \text{path}(s) \end{pmatrix} = 128$ kg.

Formula 105

$\zeta$, $\eta x$, and $\eta_T$ regarding $\begin{pmatrix} \theta(a) \\ \text{path}(s) \end{pmatrix}$ are $_i^j \zeta \begin{pmatrix} \theta(a) \\ \text{path}(s) \end{pmatrix} = 128$ kg $_i^j \eta_X \begin{pmatrix} \theta(a) \\ \text{path}(s) \end{pmatrix} = (128 \text{ kg} + 104 \text{ kg}) \times \frac{1}{2} \times (1-0) = 116$ kg $_i^j \eta_T \begin{pmatrix} \theta(a) \\ \text{path}(s) \end{pmatrix} = (128 \text{ kg} + 104 \text{ kg}) \times \frac{1}{2} \times \left(1 - \frac{1}{2}\right) = 58$ kg (It should be noted that the calculation is performed in accordance with the path of (path(s).)

A summary is as follows (since the q variance and the p variance are the same as those in the discussions so far, they are omitted).

TABLE 30

(Variance Analysis regarding Material)

| | |
|---|---|
| $_i^j \zeta \begin{pmatrix} \theta(s) \\ \text{path}(s) \end{pmatrix} = 120$ kg | |
| ↑↓ | Impairment θ Variance 8 kg (Unfavorable) |
| $_i^j \zeta \begin{pmatrix} \theta(a) \\ \text{path}(s) \end{pmatrix} = 128$ kg | |
| ↑↓ | Arrow Path "path" Variance 24 kg (Unfavorable) |
| $_i^j \zeta \begin{pmatrix} \theta(a) \\ \text{path}(a) \end{pmatrix} = 152$ kg | |

TABLE 31

(Variance Analysis regarding X Processing Cost)

| | |
|---|---|
| $_i^j \eta_X \begin{pmatrix} \theta(a) \\ \text{path}(a) \end{pmatrix} = 112$ kg | |
| ↑↓ | Impairment θ Variance 4 kg (Unfavorable) |

TABLE 31-continued (Variance Analysis regarding X Processing Cost)

$${}_{i}^{j}\eta_{X}^{\left(\substack{\theta(a) \\ path(s)}\right)} = 116 \text{ kg}$$

↑↓        Arrow Path "path" Variance
               12 kg (Unfavorable)

$${}_{i}^{j}\eta_{X}^{\left(\substack{\theta(a) \\ path(a)}\right)} = 128 \text{ kg}$$

TABLE 32

(Variance Analysis regarding T Processing Cost)

$${}_{i}^{j}\eta_{T}^{\left(\substack{\theta(s) \\ path(s)}\right)} = 56 \text{ kg}$$

↑↓        Impairment θ Variance
               2 kg (Unfavorable)

$${}_{i}^{j}\eta_{T}^{\left(\substack{\theta(a) \\ path(s)}\right)} = 58 \text{ kg}$$

↑↓        Arrow Path "path" Variance
               70 kg (Unfavorable)

$${}_{i}^{j}\eta_{T}^{\left(\substack{\theta(a) \\ path(a)}\right)} = 128 \text{ kg}$$

According to this, it is seen that, while both of θ and path of the actual parameters are worse than those of the standard parameters, the negative effect is greater in path, and in particular it is very serious in the T processing cost. Accordingly, to review the manufacturing process, first, the path should be improved, that is, the lead time should be improved.

Even in a trade-off situation in which improvement in the lead time deteriorates the impairment parameter θ, as long as the deterioration in the impairment parameter is not so serious, the improvement in the lead time might be preferred as a whole.

In the arrow cost accounting, to improve such a product manufacturing process, even in a complicated situation involving trade-off, all of the related factors can be integrally evaluated, and therefore it can provide information required for decision making optimal for the entire factory.

Example 9b

Based on the following data, the variance between $\zeta^{(a)}$ and $\zeta^{(s)}$ and the variance between $\eta^{(a)}$ and $\eta^{(s)}$ are analyzed.

TABLE 33

| (Production Data) | | (Degree of Processing Progress x) | (Date and Time t) |
|---|---|---|---|
| Beginning In-process Product | 128 kg | x = 1/2 | t = 0 |
| Present Term Introduction | — | | |
| Present Term Completed Product | 104 kg | x = 1 | t = 1/2 |
| Ending In-process Product | — | | |

(Other Conditions)

1) As the time passes, the material amount is impaired by a constant amount (regardless of the introduction amount and the remaining amount, the constant amount is always impaired). The standard impairment amount is 32 kg per term.

2) The material is all introduced at the process starting point (the starting point introduction material).

3) The X processing cost is calculated based on the degree of processing progress x.

4) The T processing cost is calculated based on the lead time t.

5) The processing rate per hour was always constant. The standard lead time is the half term (½) and the standard processing rate is always constant.

Example 9b Solution/Interpretation

Figure 47:
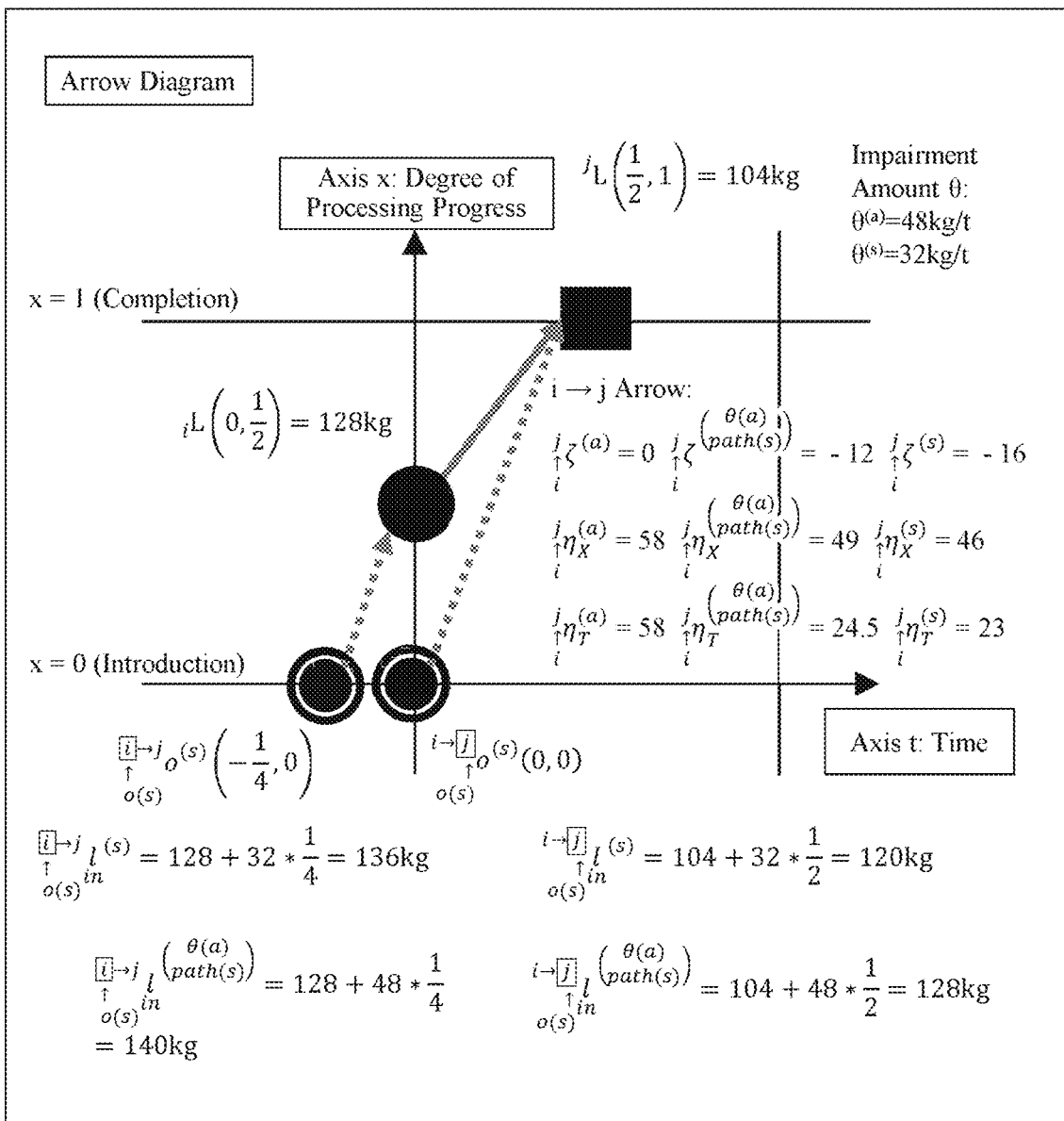
FIG. 47 is an arrow diagram illustrating solution matching for Example 9b.

Example 9b interprets a calculation method of the standard cost accounting in a model considering the time axis and the degree of processing progress axis where the input node of the arrow is a beginning in-process product node. The solution matching is obvious, and the arrow diagram as illustrated in FIG. 47 (for convenience of explanation, the arrow is assumed to be the i→j arrow).

Regarding the impairment parameter $\theta^{(a)}$, 128 kg of the material amount at t=0 decreases to 104 kg at t=½, so the impairment amount is 128−104=24 kg. The impairment occurs by 24 kg in the ½ period, and therefore the impairment occurs by 48 kg in one period. Accordingly, $\theta^{(a)}$=48. From the statements in the example, $\theta^{(s)}$=32.

In this Example, there are two paths(s), that is, the path(s) to the output node and the path(s) to the input node.

Formula 106

The actuals (a), that is, $\zeta$, $\eta x$, and $\eta_T$ regarding $\left(\substack{\theta(a) \\ path(a)}\right)$ are $${}_{i}^{j}\zeta^{(a)} = 0 \text{ kg}$$

$${}_{i}^{j}\eta_{X}^{(a)} = (128 \text{ kg} + 104 \text{ kg}) \times \frac{1}{2} \times \left(1 - \frac{1}{2}\right) = 58 \text{ kg}$$

$${}_{i}^{j}\eta_{T}^{(s)} = (128 \text{ kg} + 104 \text{ kg}) \times \frac{1}{2} \times \left(\frac{1}{2} - 0\right) = 58 \text{ kg}$$

Formula 107

The standards (s), that is, $\zeta$, $\eta x$, and $\eta_T$ regarding $\left(\substack{\theta(s) \\ path(s)}\right)$ are $${}_{i}^{j}\zeta^{(s)} = {}_{i}^{j}\overline{\zeta}^{(s)} - {}_{i}^{j}\underline{\zeta}^{(s)}$$

$$= 120 - 136$$

$$= -16 \text{ kg}$$

$${}_{i}^{j}\eta_{X}^{(s)} = {}_{i}^{j}\overline{\eta}_{X}^{(s)} - {}_{i}^{j}\underline{\eta}_{X}^{(s)}$$

$$= (120 \text{ kg} + 104 \text{ kg}) \times \frac{1}{2} \times (1 - 0) -$$

$$\quad (136 \text{ kg} + 128 \text{ kg}) \times \frac{1}{2} \times \left(\frac{1}{2} - 0\right)$$

$$= 112 - 66$$

$$= 46 \text{ kg}$$

-continued $$\substack{j\\\uparrow\\i}\eta_T^{(s)} = \substack{j\\\uparrow\\i}\overline{\eta}_T^{(s)} - \substack{j\\\uparrow\\i}\underline{\eta}_T^{(s)}$$

$$= (120 \text{ kg} + 104 \text{ kg}) \times \frac{1}{2} \times \left(\frac{1}{2} - 0\right) -$$

$$(136 \text{ kg} + 128 \text{ kg}) \times \frac{1}{2} \times \left(0 - \left(-\frac{1}{4}\right)\right)$$

$$= 56 - 33$$

$$= 23 \text{ kg}$$

Formula 108

$\zeta$, $\eta x$, and $\eta_T$ regarding $\binom{\theta(a)}{\text{path}(s)}$ are $$\substack{j\\\uparrow\\i}\zeta\binom{\theta(a)}{\text{path}(s)} = \substack{j\\\uparrow\\i}\overline{\zeta}\binom{\theta(a)}{\text{path}(s)} - \substack{j\\\uparrow\\i}\underline{\zeta}\binom{\theta(a)}{\text{path}(s)}$$

$$= 128 - 140$$

$$= -12 \text{ kg}$$

$$\substack{j\\\uparrow\\i}\eta_X\binom{\theta(a)}{\text{path}(s)} = \substack{j\\\uparrow\\i}\overline{\eta}_X\binom{\theta(a)}{\text{path}(s)} - \substack{j\\\uparrow\\i}\underline{\eta}_X\binom{\theta(a)}{\text{path}(s)}$$

$$= (128 \text{ kg} + 104 \text{ kg}) \times \frac{1}{2} \times (1 - 0) -$$

$$(140 \text{ kg} + 128 \text{ kg}) \times \frac{1}{2} \times \left(\frac{1}{2} - 0\right)$$

$$= 116 - 67$$

$$= 49 \text{ kg}$$

$$\substack{j\\\uparrow\\i}\eta_T\binom{\theta(a)}{\text{path}(s)} = \substack{j\\\uparrow\\i}\overline{\eta}_T\binom{\theta(a)}{\text{path}(s)} - \substack{j\\\uparrow\\i}\underline{\eta}_T\binom{\theta(a)}{\text{path}(s)}$$

$$= (128 \text{ kg} + 104 \text{ kg}) \times \frac{1}{2} \times \left(\frac{1}{2} - 0\right) -$$

$$(140 \text{ kg} + 128 \text{ kg}) \times \frac{1}{2} \times \left(0 - \left(-\frac{1}{4}\right)\right)$$

$$= 58 - 33.5$$

$$= 24.5 \text{ kg}$$

A summary is as follows (since the q variance and the p variance are the same as those in the discussions so far, they are omitted).

TABLE 34

(Variance Analysis regarding Material)

$\substack{j\\\uparrow\\i}\zeta\binom{\theta(s)}{\text{path}(s)} = -16 \text{ kg}$ ↑↓ Impairment θ Variance
4 kg (Unfavorable)

$\substack{j\\\uparrow\\i}\zeta\binom{\theta(a)}{\text{path}(s)} = -12 \text{ kg}$ ↑↓ Arrow Path "path" Variance
12 kg (Unfavorable)

$\substack{j\\\uparrow\\i}\zeta\binom{\theta(a)}{\text{path}(a)} = 0 \text{ kg}$

TABLE 35

(Variance Analysis regarding X Processing Cost)

$\substack{j\\\uparrow\\i}\eta_X\binom{\theta(s)}{\text{path}(s)} = 46 \text{ kg}$ ↑↓ Impairment θ Variance
3 kg (Unfavorable)

$\substack{j\\\uparrow\\i}\eta_X\binom{\theta(a)}{\text{path}(s)} = 49 \text{ kg}$ ↑↓ Arrow Path "path" Variance
9 kg (Unfavorable)

$\substack{j\\\uparrow\\i}\eta_X\binom{\theta(a)}{\text{path}(a)} = 58 \text{ kg}$

TABLE 36

(Variance Analysis regarding T Processing Cost)

$\substack{j\\\uparrow\\i}\eta_T\binom{\theta(s)}{\text{path}(s)} = 23 \text{ kg}$ ↑↓ Impairment θ Variance
1.5 kg (Unfavorable)

$\substack{j\\\uparrow\\i}\eta_T\binom{\theta(a)}{\text{path}(s)} = 24.5 \text{ kg}$ ↑↓ Arrow Path "path" Variance
33.5 kg (Unfavorable)

$\substack{j\\\uparrow\\i}\eta_T\binom{\theta(a)}{\text{path}(a)} = 58 \text{ kg}$ From now, other points of contention in the arrow cost accounting will be described.

Example 10

Obtain the solution matching based on the following production data.

TABLE 37

| (Production Data) | | (Degree of Processing Progress) |
|---|---|---|
| Beginning In-process product | 100 kg | (40%) |
| Present Term Introduction | 100 kg | |
| Total | 200 kg | |
| Normal Impairment | 60 kg | |
| Ending In-process Product | 50 kg | (60%) |
| Present Term Completed Product | 90 kg | |

(Other Conditions)

1) At the 80% point of the degree of processing progress (regardless of the material amount of the arrow), a constant amount is impaired.

2) The material is all introduced at the process starting point (the starting point introduction material).

3) At the factory, the material introduced earlier is processed in priority. In view of this, the product is completed in the order of the material that has been previously introduced (the first-in first-out method).

Example 10 Solution/Interpretation

This Example describes a calculation method of solution matching when the impairment parameter θ does not meet the separation condition from the solution matching. Since the gist of Example is to obtain the solution matching, the cost data and the like are omitted.

First, the impairment amount is represented by θ kg. When the 80% point of the degree of processing progress is passed, the material amount is impaired by θ kg. At this time, θ≤0.

Figure 48:
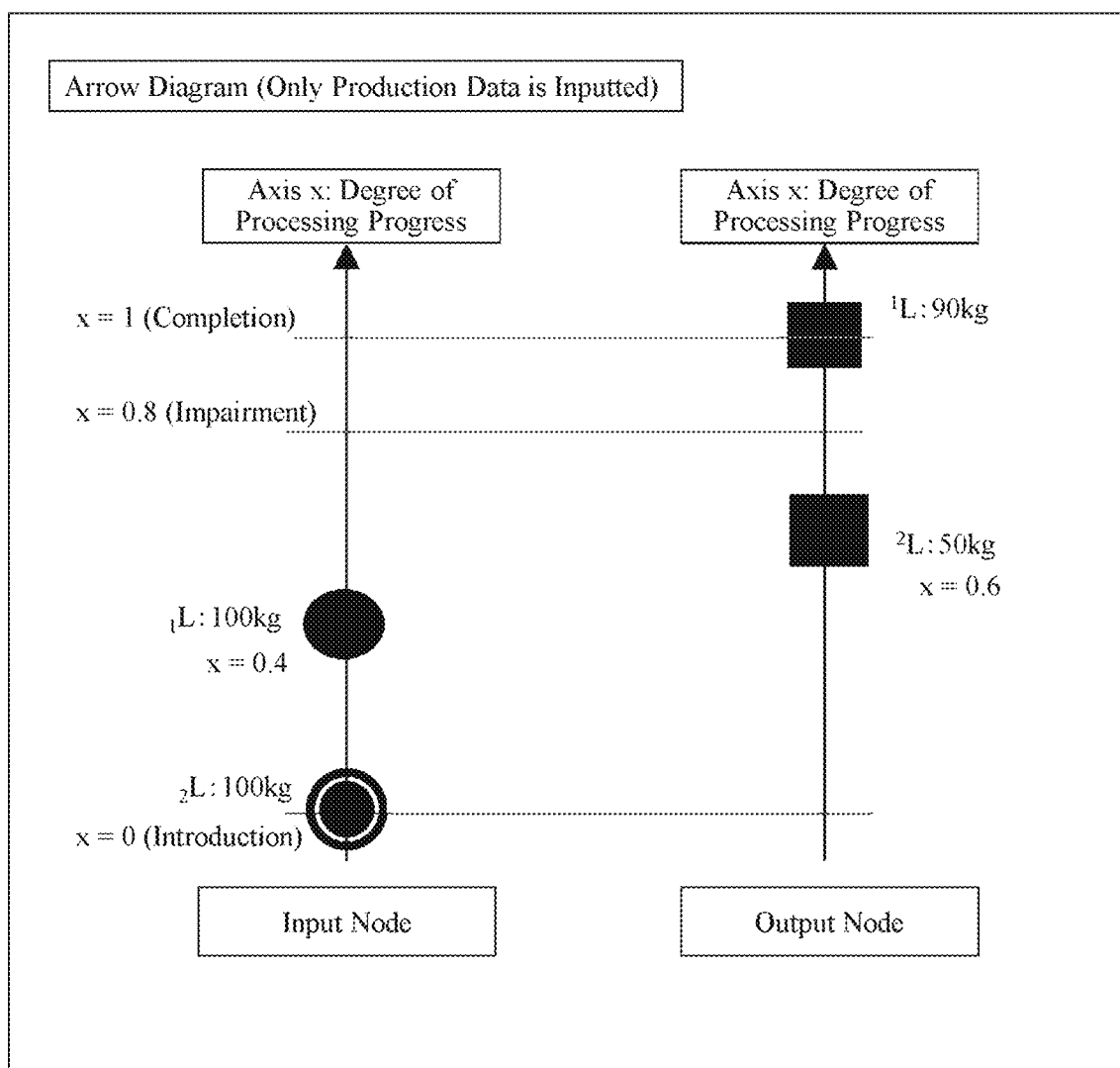
FIG. 48 is an arrow diagram to which only production data in Example 10 is inputted.

A display of the nodes of the production data on the arrow diagram is as illustrated in FIG. 48.

In order to obtain the solution matching, various values are substituted for θ, and it is determined one by one whether all pieces of the data result in consistent data. For example, first, θ=0 kg is considered.

Based on the rule of the first-in first-out method, the consideration is made in the order from the 1→1 arrow. As soon as the input node becomes empty, or the output node becomes full, the process transitions to the next node. If the data is consistent after the material amounts have been flowed up to the last arrow (the 2→2 arrow in this Example), it is found out to be the solution matching.

Figure 49:
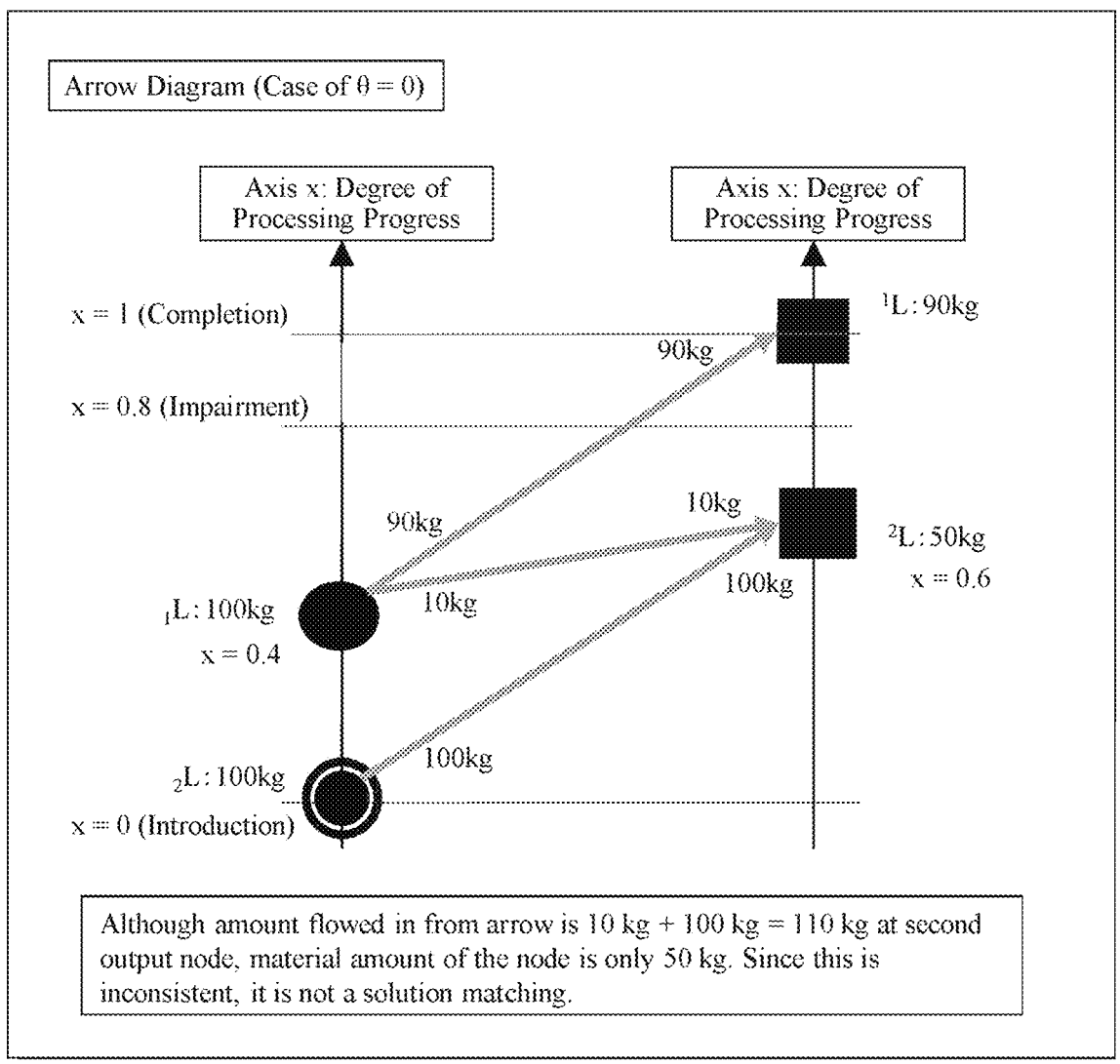
FIG. 49 is an arrow diagram ($\theta=0$) in Example 10.

FIG. 49 is the arrow diagram (the case of θ=0).

Similarly, while various values of θ are tried, the solution matching is searched.

Figure 50:
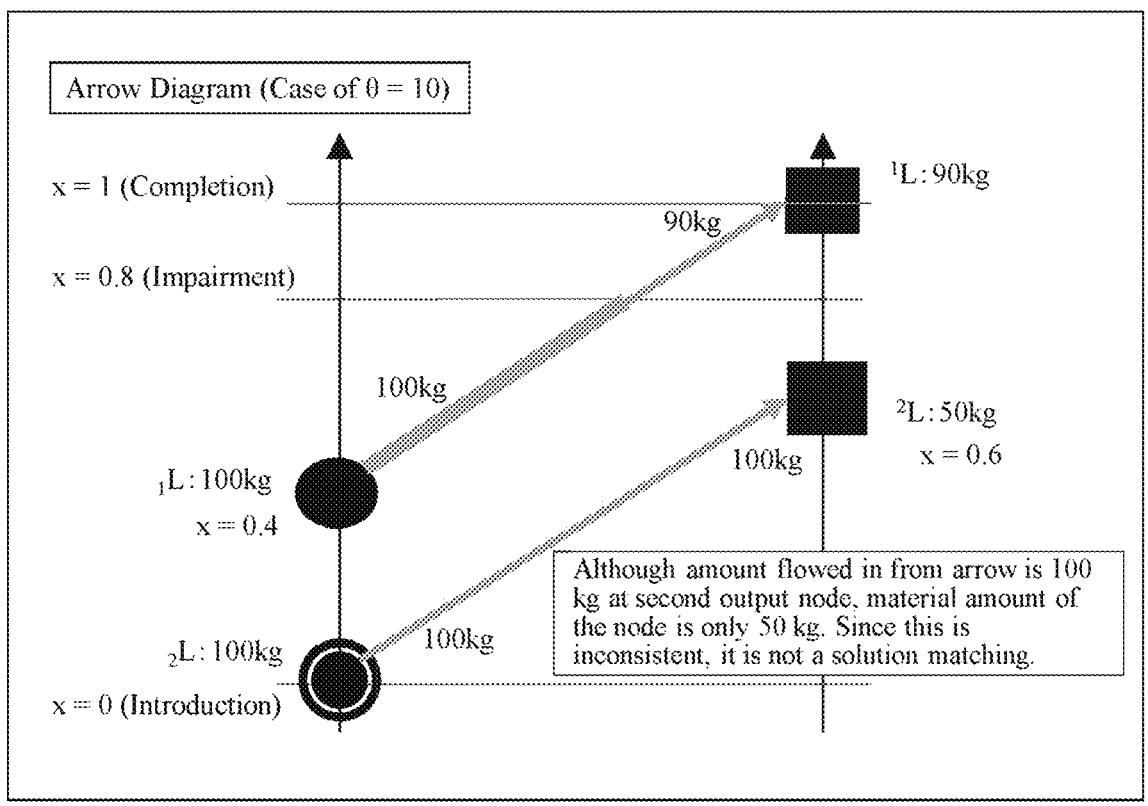
FIG. 50 is an arrow diagram ($\theta=10$) in Example 10.
Figure 51:
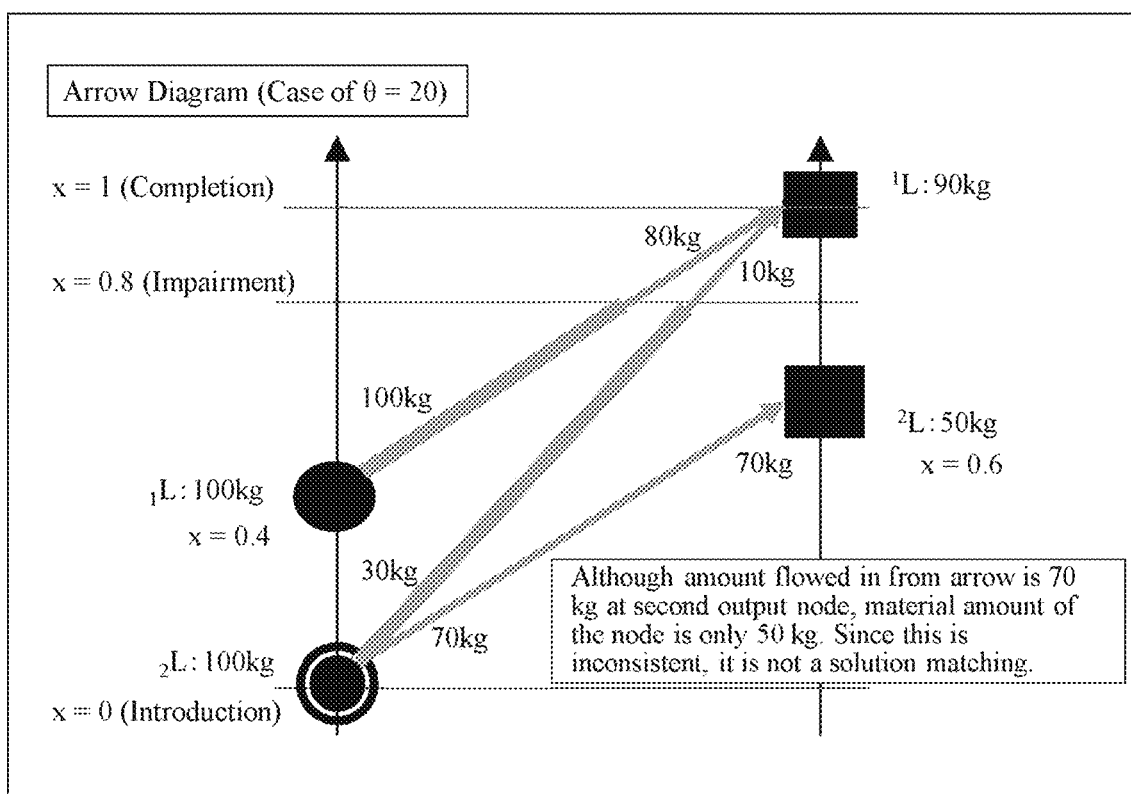
FIG. 51 is an arrow diagram ($\theta=20$) in Example 10.
Figure 52:
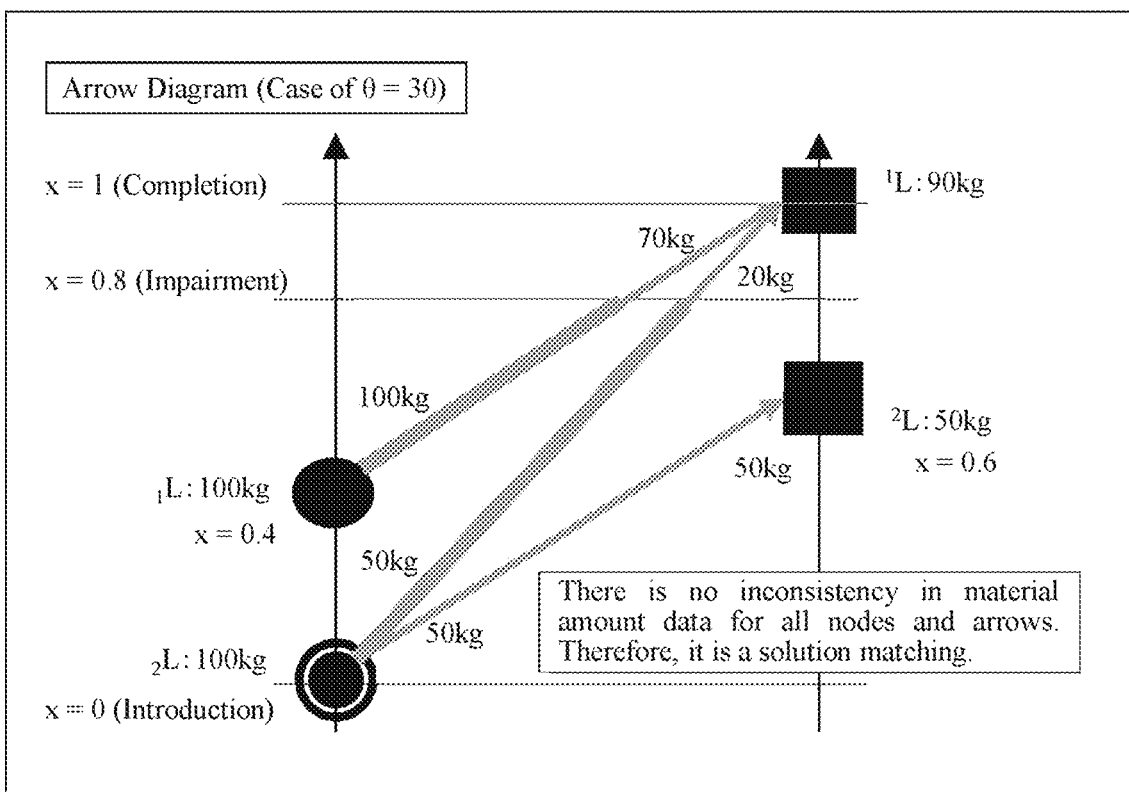
FIG. 52 is an arrow diagram (θ=30) illustrating solution matching for Example 10.
Figure 53:
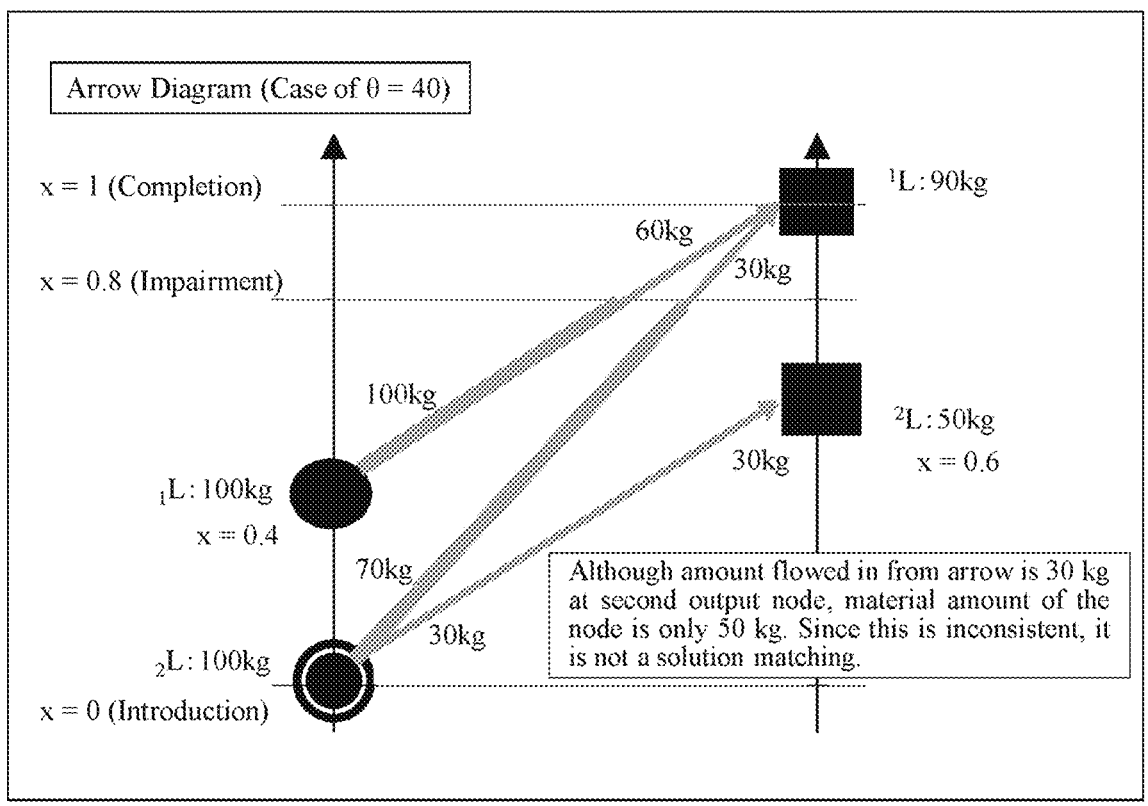
FIG. 53 is an arrow diagram (θ=40) in Example 10.

FIG. 50 is an arrow diagram (the case of θ=10). FIG. 51 is an arrow diagram (the case of θ=20). FIG. 52 is an arrow diagram (the case of θ=30). FIG. 53 is an arrow diagram (the case of θ=40).

It is intuitively apparent that no solution matching can be obtained if θ exceeds 40, so the calculation is stopped here. Accordingly, only the case of θ=30 gives the solution matching.

Thus, in the case where the impairment parameter θ does not meet the separation condition, the value of θ is sequentially changed to search for the value of θ consistent with the data.

Actually, although no solution matching is possible in this example, depending on the situation, a plurality of solution matchings may be possible. In that case, it is only necessary to select a relatively practical one as the solution matching.

For example, if the additional material introduction amount and the impairment amount are known, a solution matching consistent with them should be selected.

Besides, regarding a solution matching in which the material amount is negative in a part of the section in the arrow path, although the condition for the solution matching is met, it might not be practical very much. The reality levels in this document is criteria for evaluation for the practicality.

Example 11

Figure 54:
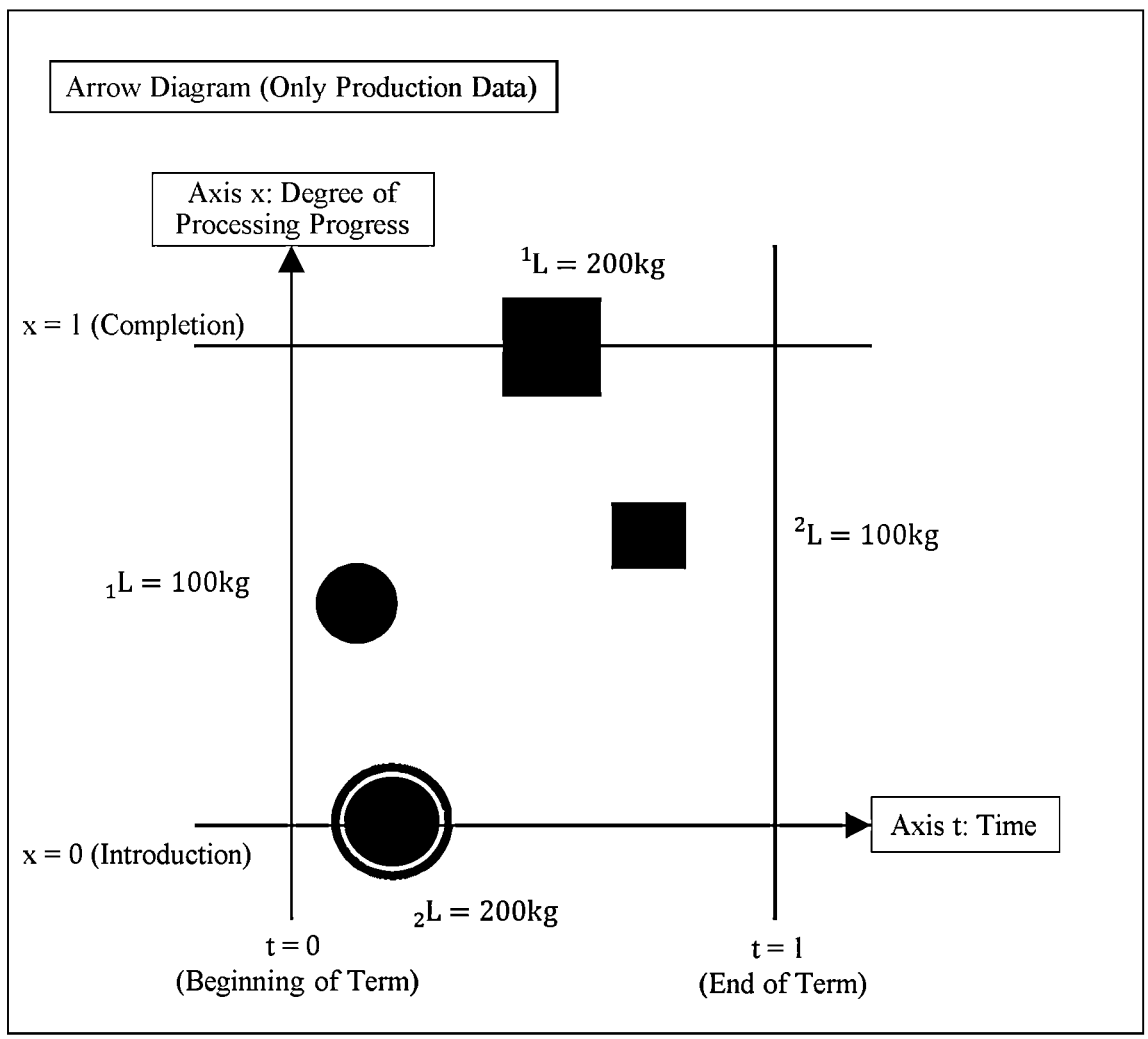
FIG. 54 is an arrow diagram (only the production data) in Example 11.

Based on the production data illustrated in the next arrow diagram (FIG. 54), the solution matching by first-in first-out method is obtained. Note that there is neither impairment of a material nor additional introduction. FIG. 54 is the arrow diagram (only the production data).

Example 11 Solution/Interpretation

There may be a case where an in-process product whose processing work has proceeded to some extent is purchased from outside and is introduced in the middle of the process. This is referred to as a midstream introduction input node, and the input node appears inside (not on the boundary) of the cost accounting space. This corresponds to the first input node in this example.

Additionally, the in-process products in the middle of the processing work are sold outside in some cases. This is referred to as a half-product output node, and the output node appears inside the cost accounting space (not on the boundary line). This corresponds to the second output node in this example.

Figure 55:
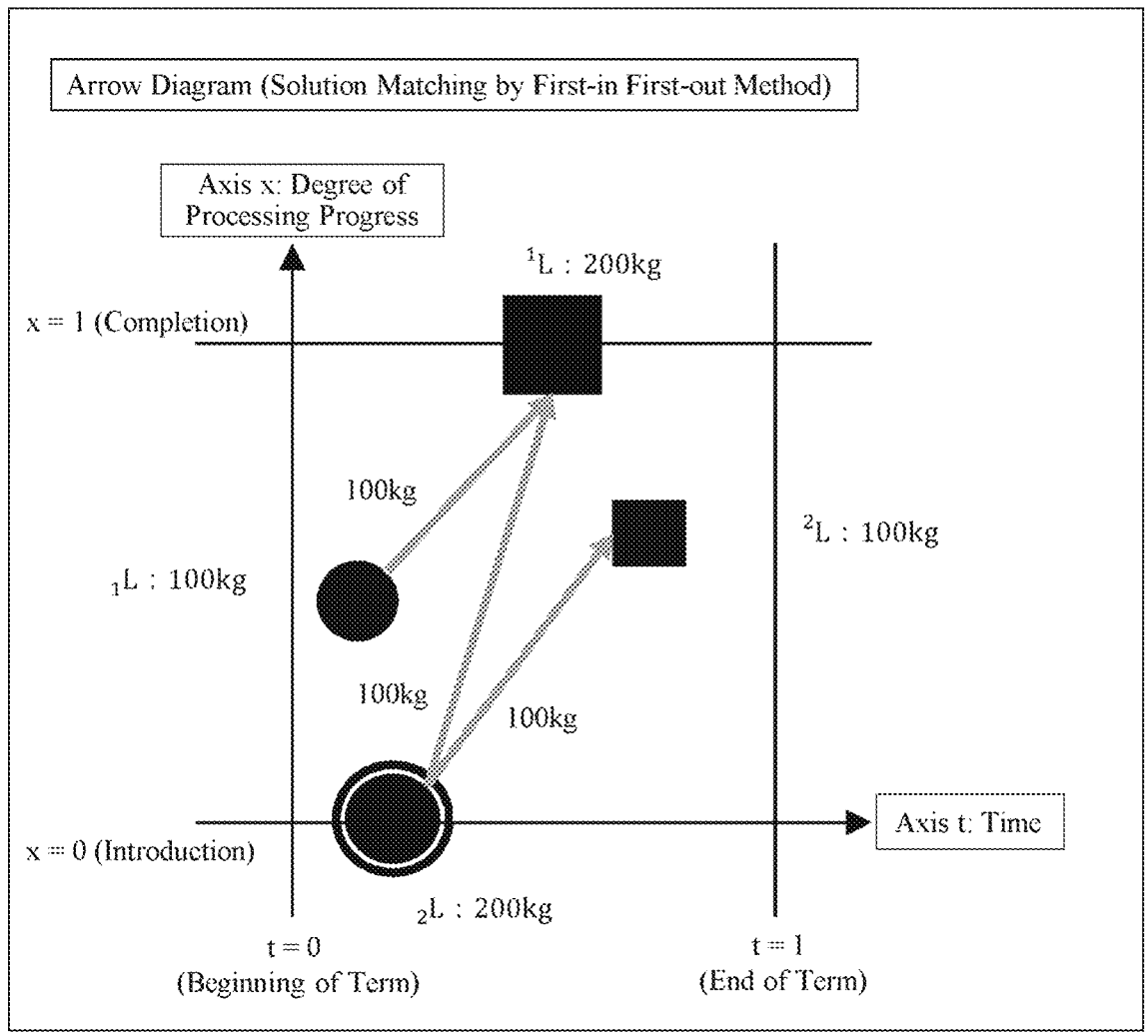
FIG. 55 is an arrow diagram (solution matching by first-in first-out method) in Example 11.

The definition of the first-in first-out method is that the arrows do not intersect with one another, and the arrow diagram of a solution matching is as illustrated in FIG. 55. FIG. 55 is an arrow diagram (the solution matching by the first-in first-out method).

While an output node is shared between the 1→1 arrow and the 2→1 arrow, this is not the intersection. Similarly, while an input node is shared between the 2→1 arrow and the 2→2 arrow, this is not the intersection as well.

A situation wherein arrows intersect with one another corresponds, for example, to a state as follows.

Figure 56:
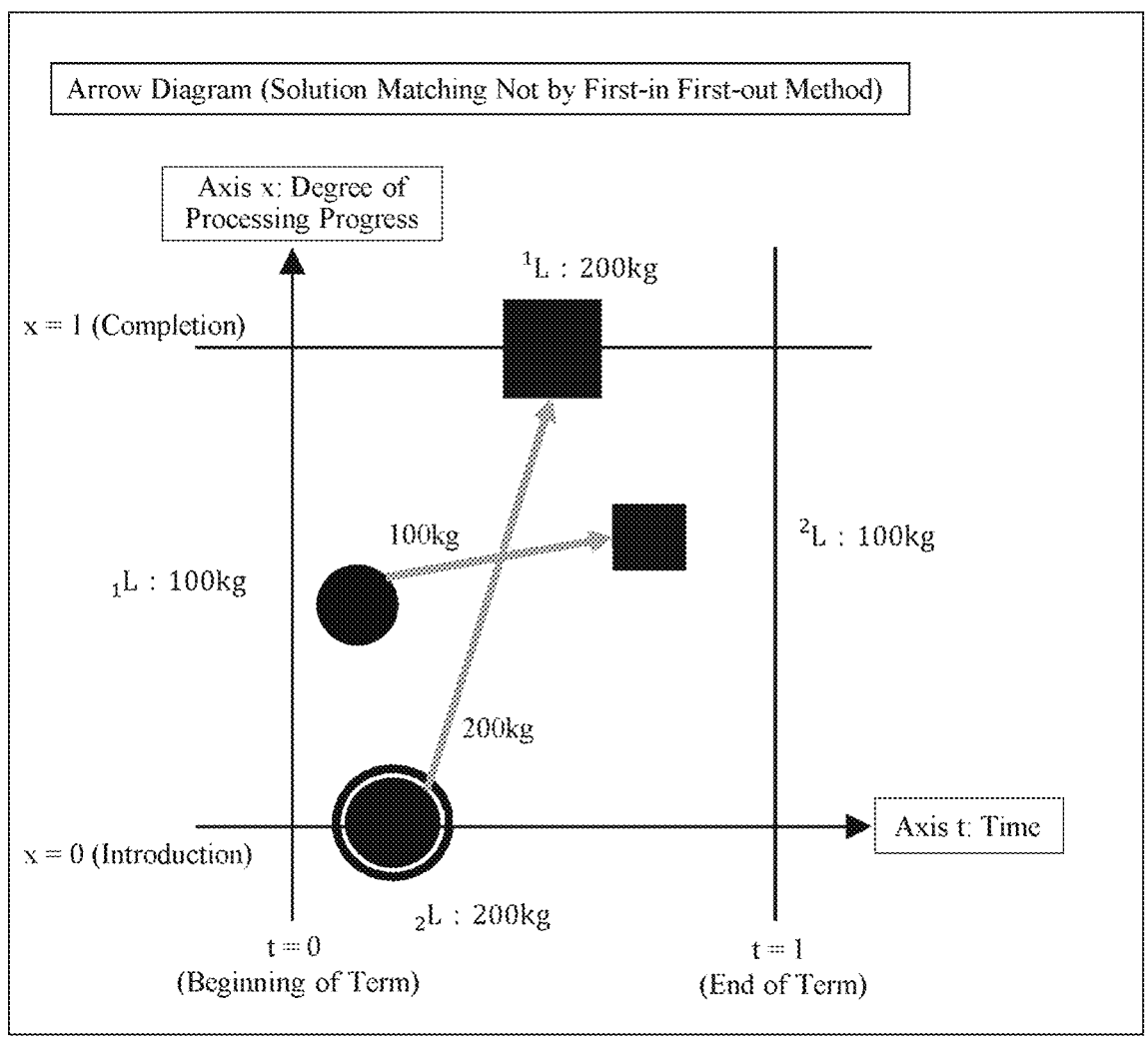
FIG. 56 is an arrow diagram (solution matching not by first-in first-out method) in Example 11.

FIG. 56 is an arrow diagram (a solution matching not the first-in first-out method).

In FIG. 56, the 1→2 arrow intersects with the 2→1 arrow. The first-in first-out method means a matching rule in which such an intersection of the arrows do not exist at all. Accordingly, the matching illustrated in FIG. 56 is a solution matching but not of the first-in first-out method.

In a case where a midstream introduction input node or a half-product output node are present in the model considering the time axis and the degree of processing progress axis, another solution matching by the first-in first-out method may be found other than the solution matching illustrated in FIG. 55. This is for example as follows.

Figure 57:
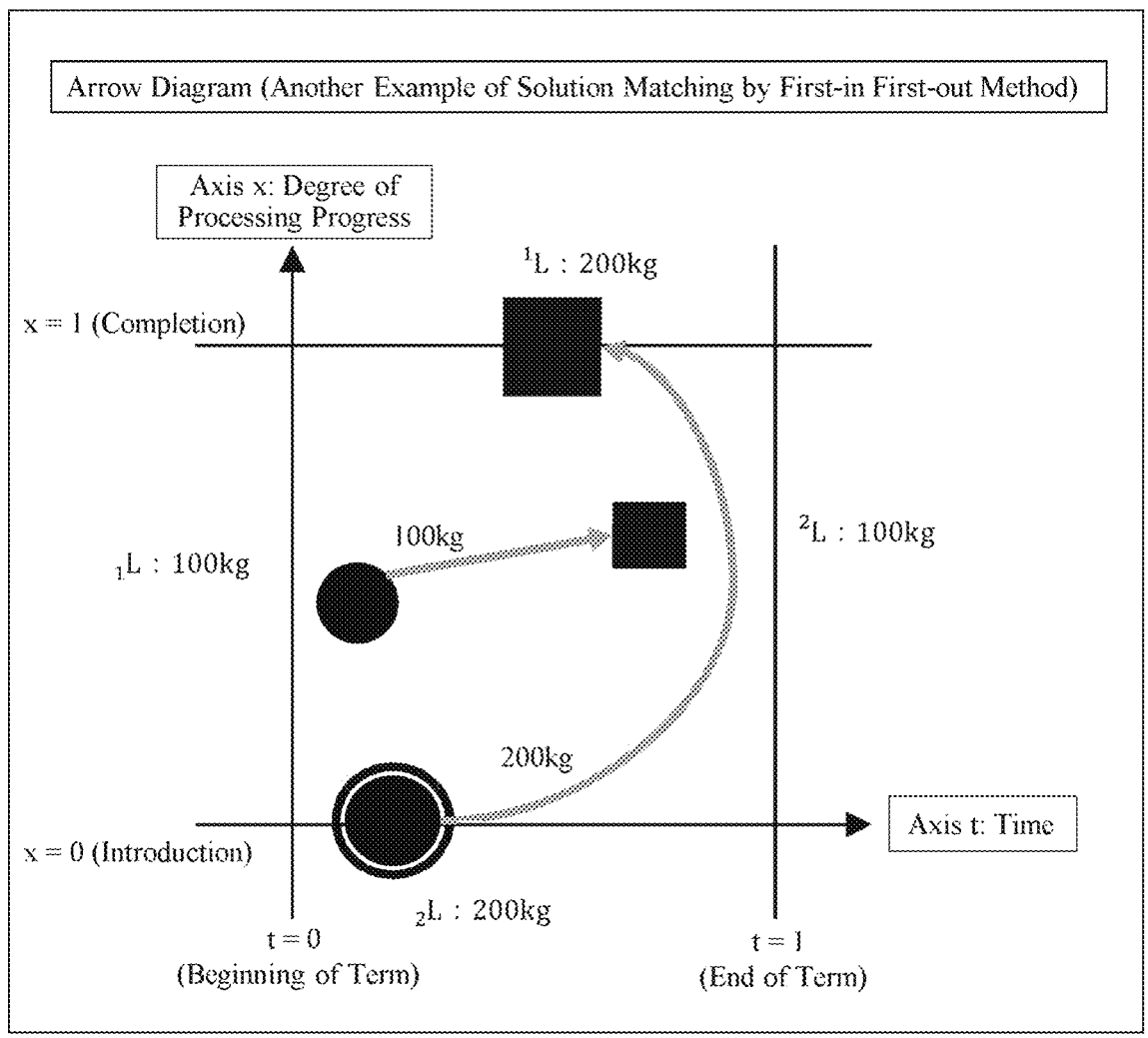
FIG. 57 is an arrow diagram (another example of the solution matching by first-in first-out method) in Example 11.

FIG. 57 is an arrow diagram (another example of the solution matching by the first-in first-out method).

Since the arrows do not intersect with one another in the solution matching illustrated in FIG. 57, the condition for the first-in first-out method is met.

Thus, in the case where the plurality of solution matchings are still present even after the matching rule (for example, the first-in first-out method) is specified, it is necessary to select the solution matching considered to be more fitted to the real production situation.

In this example, the matching of FIG. 57 has an obvious problem. That is, in a part of a section of the 2→1 arrow, the arrow proceeds the t-axis (the time axis) in the opposite direction (the reality level 3 of the arrow path), but this never occurs in reality. Accordingly, in this example, it would be appropriate to dismiss the solution matching in FIG. 57 and adopt the solution matching in FIG. 55.

Example 12

A work amount of a certain work K is measured by the consumption amount of the resource k. Moreover, the consumption amount is measured for each arrow.

The processing work introduction amount function of the work K is estimated based on the following production data.

TABLE 38

| Production Data | Material Amount (kg) and Coordinate (t, x) of Input Node | | Material Amount (kg) and Coordinate (t, x) of Output Node |
|---|---|---|---|
| #100 | 60 kg (0, 1/3) | → | 60 kg (2/3, 1) |
| #200 | 90 kg (0, 0) | → | 90 kg (1, 1/3) |

(Other Conditions)
1) The range of the present term is defined to be $0 \le t \le 1$.
2) There is neither the impairment nor the additional introduction.
3) The processing pace per hour was always constant both in #100 and #200.
4) The work K is a work required to advance the processing work and also required as the time passes.
5) Work amount required for the work K increases in proportion to the magnitude of the material amount.
6) The work amount of the work K was the same in #100 and #200.

Example 12 Solution/Interpretation

In the arrow cost accounting, the processing work introduction amount function $f'_k$ is known and should not include any unknown parameter. However, actually there is processing work where precise content of $f'_k$ is unknown. In the case, an analyst determines $f'_k$, but as long as required data is prepared, $f'_k$ can be estimated from the production data or the like.

Figure 58:
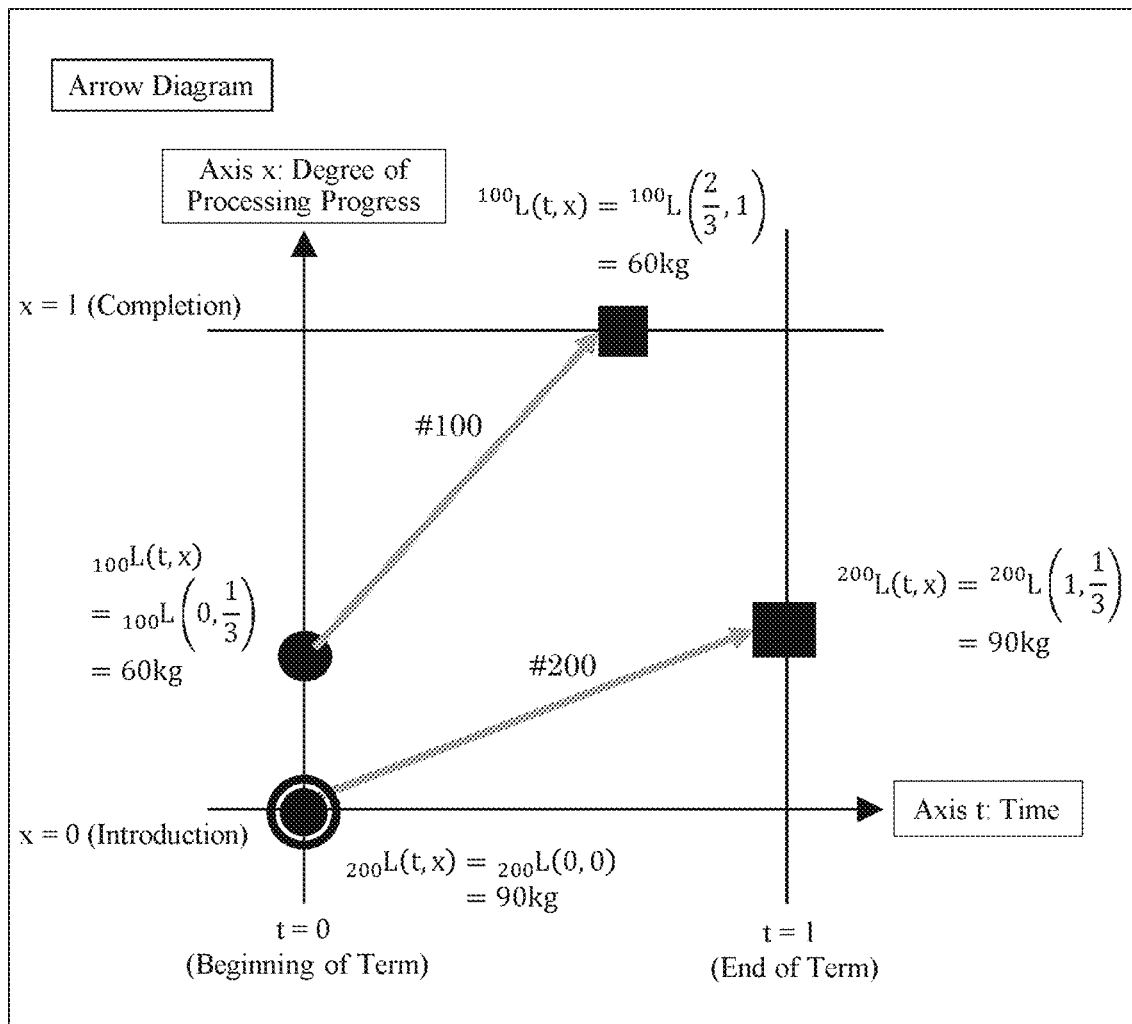
FIG. 58 is an arrow diagram of Example 12.

The solution matching is apparent, and the illustration with the arrow diagram is as in FIG. 58.

Next, the function form of the processing work introduction amount function $f'_k$ is considered. From the condition described in a statement of this example, "The work K is a work required to advance the processing work and also required as the time passes", it is appropriate to consider $$f'_k = a*i + b*j \quad \text{Formula 109}$$

Since a and b are the unknown parameters, they are estimated from the data.

Note that, usually in most cases, including this example, only the relative difference between the parameters a and b of $f'_k$ is of concern. Therefore, without losing generality, $$a+b=1 \quad \text{Formula 110}$$

can be defined.

Next, the function form of the processing work conversion amount $\eta_k$ is considered. From the condition described in a statement of this example "Work amount required for the work K increases in proportion to the magnitude of the material amount", it is appropriate to consider $${}^{j}_{i}\eta_k(a,b) = \int_{(i^t, i^x)}^{(j_T, j_x)} {}^{j}_{i}l(t,x) * f'_k(t,x) \cdot dr$$

Note that $\eta$ varies depending on the values of the parameters a and b, so it is written as $\eta_k(a, b)$.

In the example of this time, the calculation can be done for each arrow, and therefore the index i→j is attached to the left side of $\eta$. Depending on given conditions of the situation, only the total $\eta$ value of the plurality of arrows is known in some cases. In that case, adjustment is performed appropriately.

From the arrow of #100,

Formula 112

$$\substack{100 \\ \uparrow \\ 100} \eta_k = \int_{(0, \frac{1}{3})}^{(\frac{2}{3}, 1)} 60 * (a*i + b*j) \cdot dr$$
$$= 60\left[\frac{2}{3}a + \frac{2}{3}b\right]$$
$$= 40a + 40b$$

is established.

Similarly, from the arrow in #200,

Formula 113

$$\substack{200 \\ \uparrow \\ 200} \eta_k = \int_{(0,0)}^{(1, \frac{1}{3})} 90 * (a*i + b*j) \cdot dr$$
$$= 90\left[a + \frac{1}{3}b\right]$$
$$= 90a + 30b$$

is established.

From the condition described in a statement of the example, "The work amount of the work K was the same in #100 and #200", Formula 114

$$\substack{100 \\ \uparrow \\ 100} \eta_k = \substack{200 \\ \uparrow \\ 200} \eta_k$$

$$40a + 40b = 90a + 30b$$

$$b = 5a$$

is established. From the condition and the condition of a+b=1, $$a = 1/6, b = 5/6, \quad \text{Formula 115}$$

is found.

Accordingly, an estimated value of the processing work introduction amount function $f'_k$ is:

$$\hat{f}'_k = 1/6 * i + 5/6 * j \quad \text{Formula 116}$$

(Since it is an estimated value, the hat is attached).

Thus, estimation of the processing work introduction amount function $f'_k$ from the production data is possible.

Example 13

A work amount of work K is measured with the consumption amount of the resource k. The consumption amount is measured for each arrow.

Based on the following production data and resource k consumption amount data, estimate the processing work introduction amount function of the work K and the resource consumption amount function.

TABLE 39

| Production Data | Material Amount (kg) and Coordinate (t, x) of Input Node | | Material Amount (kg) and Coordinate (t, x) of Output Node | Resource k Consumption Amount |
|---|---|---|---|---|
| #100 | 100 kg (0, 0) | → | 100 kg (1/2, 1) | 240 Units |
| #200 | 100 kg (1/2, 0) | → | 100 kg (1, 1/2) | 140 Units |

(Other Conditions)
1) The range of the present term is defined to be $0 \leq t \leq 1$.
2) There is neither the impairment nor the additional introduction.
3) The processing pace per hour was always constant both in #100 and #200.
4) The work K is a work required to advance the processing work and also required as the time passes.
5) The work amount required for the work K increases in proportion to the magnitude of the material amount.
6) The work amount of the work K is proportionate to the consumption amount of the resource k.

Example 13 Solution/Interpretation

Upon estimating the processing work introduction amount function $f'_k$, another function may be simultaneously estimated. For example, in this Example, a resource consumption amount function $q_k$ is simultaneously estimated.

Figure 59:
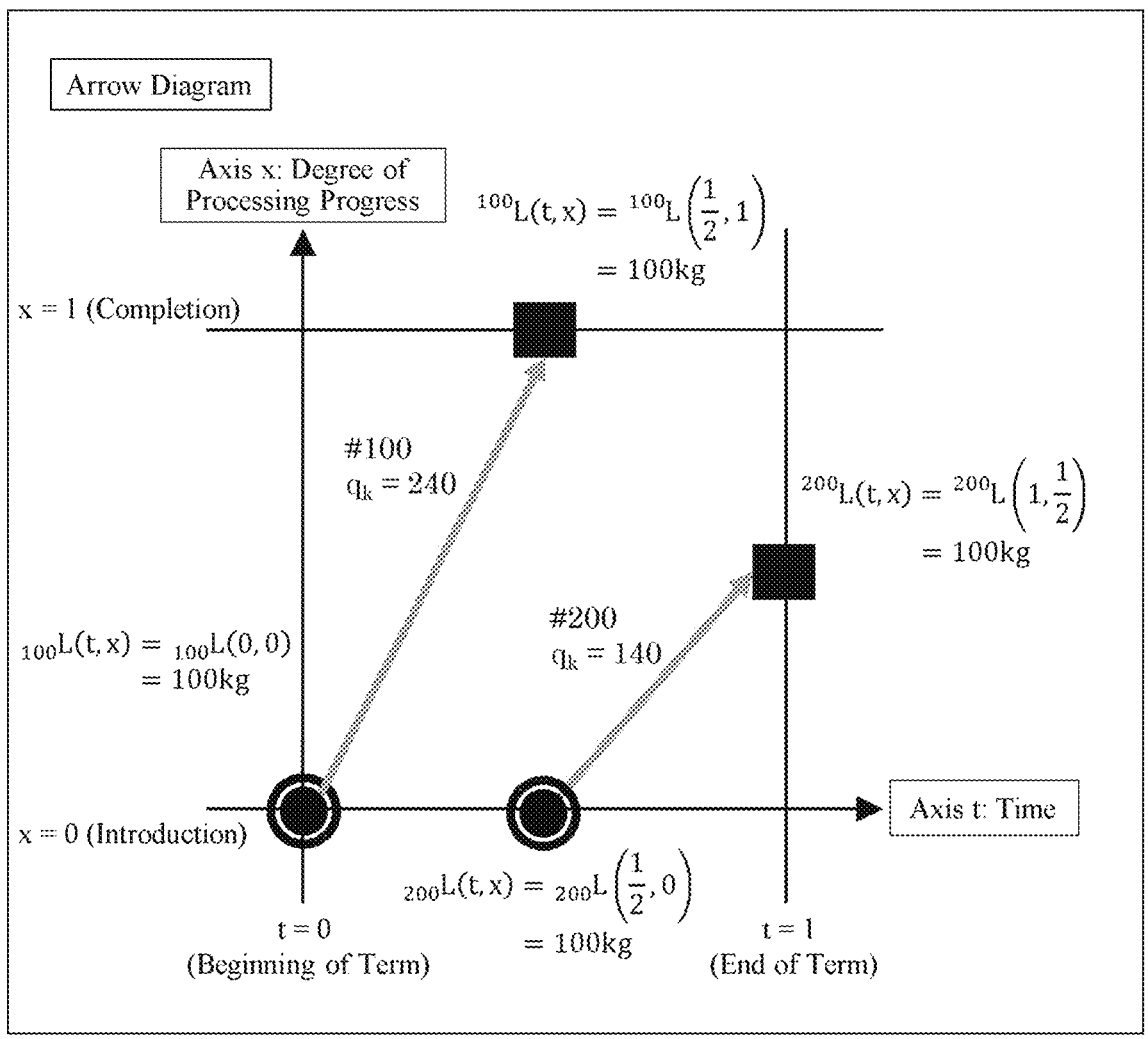
FIG. 59 is an arrow diagram of Example 13.

The solution matching is obvious and the illustration with the arrow diagram is as in FIG. 59.

Next, the function form of the processing work introduction amount function $f'_k$ is considered. From the condition described in a statement of the example, "The work K is a work required to advance the processing work and also required as the time passes", it is appropriate to consider $$f'_k = a*i + b*j$$

The a and b are unknown parameters, and they are estimated from the data. Note that this time as well, a+b=1 is supposed.

Next, a function form of the processing work conversion amount $\eta_k$ is considered. From the condition described in a statement of the example, "The required work amount for the work K increases in proportion to the magnitude of the material amount", Formula 117

$$_i^j \uparrow \eta_k(a, b) = \int_{(i,\tilde{x})}^{(j_T, j_{\tilde{x}})} {}_i^j \uparrow l(t, x) * f'_k(t, x) \cdot dr$$

is considered.

Next, a function form of the resource consumption amount function $q_k$ is considered. Here, most simply, considering a linear function form, Formula 118

$$_i^j \uparrow q_k = c * {}_i^j \uparrow \eta_k(a, b) + d + {}_i^j \uparrow \varepsilon_k$$

is defined.

The actual resource consumption amount usually varies depending on the arrow, and therefore an error term $$_i^j \uparrow \varepsilon_k$$

is added.

Here, a method for estimating the parameters (in the example of this time, a, b, c, and d) is considered. One method is a method in which the sum of squares of the error term $$_i^j \uparrow \varepsilon_k$$

is minimized (in this way c and d are estimated). Then, a and b are determined so that $R^2$ is maximized with respect to the solution of the least square method.

That is,

Formula 119

$$\max_{a,b}[R^2 \text{ for the solution of the least square method}]$$

Thus, all of the parameters (a, b, c, d) can be estimated.

However, in this example, some parameters have limitations by the conditions and there are only two pieces of data and the error term can be perfectly zeroed, so the parameters can be determined very easily.

First, a+b=1 is supposed.

Next, from the condition described in a statement of the example, "The work amount of the work K is proportionate to the consumption amount of the resource k", since a constant consumption part d of the resource can be estimated as zero (d=0), Formula 120

$$_i^j \uparrow q_k = c * {}_i^j \uparrow \eta_k + {}_i^j \uparrow \varepsilon_k$$

is established.

From the arrow in #100,

Formula 121

$$_{100}^{100} \uparrow \eta_k = \int_{(0,0)}^{(\frac{1}{2},1)} 100*(a*i + b*j) \cdot dr$$

$$= 100\left[\frac{1}{2}a + b\right]$$

$$= 50a + 100b$$

$$_{100}^{100} \uparrow q_k = c * {}_{100}^{100} \uparrow \eta_k + {}_{100}^{100} \uparrow \varepsilon_k$$

$$240 = c * (50a + 100b) + {}_{100}^{100} \uparrow \varepsilon_k$$

is established.

Similarly, from the arrow in #200,

Formula 122

$$^{200}_{200}\uparrow \eta_k = \int_{(\frac{1}{2},0)}^{(1,\frac{1}{2})} 100*(a*i+b*j)\cdot dr$$

$$= 100\left[\frac{1}{2}a + \frac{1}{2}b\right]$$

$$= 50a + 50b$$

$$^{200}_{200}\uparrow q_k = c * ^{200}_{200}\uparrow \eta_k + ^{200}_{200}\uparrow \varepsilon_k$$

$$140 = c*(50a+100b) + ^{200}_{200}\uparrow \varepsilon_k$$

is established. From these conditions and the condition of a+b=1, $$a=2/7, b=5/7, c=14/5$$

are found. At this time, the error term is $$^{100}_{100}\uparrow \varepsilon_k = ^{200}_{200}\uparrow \varepsilon_k = 0$$

and the sum of squares of error terms is 0, which is minimum.

Formula 123

Accordingly, the estimated values of the processing work introduction amount function $f'_k$ and the resource consumption amount function $q_k$ are $$\hat{f}'_k = \frac{2}{7}*i + \frac{5}{7}*j$$

$$^{j}_{i}\uparrow \hat{q_k} = \frac{14}{5} * ^{j}_{i}\uparrow \eta_k$$

(since they are the estimated values, the hats are attached).

Thus, estimation of the processing work introduction amount function $f'_k$ and the resource consumption amount function $q_k$ from the production data or the like is possible.

While the processing work introduction amount function $f'_k$ and the resource consumption amount function $q_k$ are estimated in this example, depending on the given data, the processing work introduction amount function $f'_k$ and a cost function $p_k$ may be estimated. Further, all of the processing work introduction amount function $f'_k$, the resource consumption amount function $q_k$, and the cost function $p_k$ may be simultaneously estimated.

Processing and the controlling can be achieved by software processing by a Central Processing Unit (CPU) or a Graphics Processing Unit (GPU) and hardware processing by an Application Specific Integrated Circuit (ASIC) or a Field Programmable Gate Array (FPGA).

In the embodiments described above, the illustrated configurations or the like should not be construed as a limiting sense, and can be appropriately changed within a scope within which effects of the present invention are provided. Besides, changes can be appropriately made as long as they do not depart from the scope of the purpose of the present invention.

The components of the present invention can be selected at will, and inventions including the configurations selected are also included in the present invention.

A program for achieving the functions described in the embodiments may be recorded in a computer-readable recording medium. Processing of each of the units may be performed by causing a computer system to read and execute the program recorded in this recording medium. The "computer system" here includes an OS and hardware such as peripherals.

If a WWW system is used, the "computer system" includes a home page providing environment (or a display environment).

A "computer-readable recording medium" means a portable medium, such as a flexible disk, a magneto-optical disk, a ROM, and a CD-ROM, and a storage device, such as a hard disk incorporated into a computer system. Further, the "computer-readable recording medium" includes one that dynamically holds a program for a short period of time, such as a communication line in a case where the program is transmitted via a network such as the Internet or a communication line, such as a telephone line, and one that holds a program for a certain period of time, such as a volatile memory inside a computer system serving as a server and a client in the case. The program may achieve a part of the above-described functions, and further may be one that can achieve the above-described functions by a combination with a program already recorded in the computer system. At least a part of the functions may be achieved by hardware, such as an integrated circuit. The configuration of the software includes, in addition to being embodied as a packaged product, for example, a configuration of a cloud system (a person in charge of cost accounting in a factory transmits production data and cost data to a system of a cost accounting company via a web site, and after the calculation is performed by the system of the cost accounting company, the calculation result is sent back to the factory).

INDUSTRIAL APPLICABILITY

The present invention is usable as a product manufacturing cost accounting device.

REFERENCE SIGNS LIST

A Cost arithmetic system
1 Storage device
1-1 Cost accounting space data storage unit
1-2 Impairment function data storage unit
1-3 Additional introduction function data storage unit
1-4 Processing work introduction amount function data storage unit
1-5 Present term production data storage unit
1-6 Present term actual cost data storage unit
11 Arithmetic (calculation) device
11-1 Material amount arithmetic unit (including vector) on arrow path
11-2 Solution matching determination unit
11-3 Processing work conversion amount/material introduction conversion amount arithmetic unit
11-4 Arrow distribution cost arithmetic unit
11-5 Variance analysis arithmetic unit
21 Output unit All the publications, patents, and patent applications cited in this specification are directly incorporated herein by reference.

The invention claimed is:

1. A product manufacturing cost accounting program for causing a computer to perform product manufacturing cost accounting, upon execution of the cost accounting program, one or more processors of the computer are caused to:
- read, from a memory, cost accounting space data and present term production data and define an arrow that connects an input node and an output node based on inputted matching as including all of the following elements in a cost accounting space:
  - a) the input node as a starting point of the arrow;
  - b) the output node as an ending point of the arrow;
  - c) an arrow path as a path of the arrow; and
  - d) a material amount on the arrow path;
- calculate the material amount on the arrow path on a condition that the material amount at any particular point on any coordinate on the arrow path is same as the material amount on the arrow path at a coordinate of the input node, the calculating the material amount on the arrow path includes:
  - generating an arrow diagram on which the input node and the output node are displayed; and
  - displaying the arrow on the arrow diagram;
- reproduce a specific product processing situation based on particular production data with the arrow, read processing work introduction amount function data and material amount data on the arrow path from the reproduced specific product processing situation to calculate a processing work conversion amount and a material introduction conversion amount as each material amount of all input nodes and all output nodes matches a total of the material amounts on the arrow paths of all arrows related to the node at the coordinate of the node, and as a solution matching defined as a combination of the arrows is found; and
- read, from the arrow diagram, present term actual cost data, the processing work conversion amount, and the material introduction conversion amount, proportionally distributing costs to the arrows at ratios of the processing work conversion amount and the material introduction conversion amount, and outputting the costs distributed to the arrows, wherein
  - the cost accounting space data is defined by a coordinate space comprising a degree of processing progress axis,
  - the processing work introduction amount function data is an introduction condition for a processing work,
  - the present term production data is a production situation within a cost accounting target period, and
  - the present term actual cost data is a cost generation situation within the cost accounting target period.

2. The product manufacturing cost accounting program according to claim 1,
wherein the memory further stores impairment function data, which is an impairment condition of a material, and
wherein the material amount of all input nodes and all output nodes is calculated at any particular point on the arrow path by subtracting an impairment amount from the input node to the point from the material amount on the arrow path at a coordinate of the input node.

3. The product manufacturing cost accounting program according to claim 1,
wherein additional introduction function data, which is an additional introduction condition of a material, is stored in the memory, and
wherein the material amount of all input nodes and all output nodes is calculated at any particular point on the arrow path by adding an additional introduction amount from the input node to the point to the material amount on the arrow path at a coordinate of the input node.

4. The product manufacturing cost accounting program according to claim 1,
wherein the material amount is calculated on the arrow path at any particular point on the arrow path based on the material amount on the arrow path at a coordinate of the input node by:
subtracting an impairment amount from the input node to the particular point on the arrow; and
adding an additional introduction amount from the input node to the particular point on the arrow,
wherein the memory further stores:
impairment function data which is an impairment condition of a material, and
additional introduction function data which is an additional introduction condition of the material.

5. A product manufacturing cost accounting program to further perform standard cost accounting in addition to the cost accounting program according to claim 1, wherein the memory stores:
standard parameter value data as a standard parameter value regarding the processing work conversion amount and the material introduction conversion amount; and
variance analysis sequence data in which an order of variance analysis is recorded, and
wherein the computer is caused to further:
read the standard parameter value data and the variance analysis sequence data from the memory;
decompose a variance between a standard cost and an actual cost into at least any one of the following (1) to (6) to perform the variance analysis that clarifies efficiency of each of elements of the costs; and
output a variance analysis result,
  (1) a price p variance
  (2) a capacity variance
  (3) a resource consumption amount q variance
  (4) an impairment $\theta$ variance
  (5) an additional introduction $\varphi$ variance
  (6) a material amount ratio $\psi$ variance at starting point introduction, as a plurality of materials are introduced.

6. The product manufacturing cost accounting program according to claim 5, wherein the memory further stores:
standard resource consumption amount function data as a standard resource consumption amount condition;
standard cost function data in which a standard cost generation condition is recorded; and
actual resource consumption amount data in which an actual resource consumption amount situation within a cost accounting target period is recorded stored in the memory are further referred to, and
wherein the variance analysis further includes reading the standard resource consumption amount function data, the standard cost function data, and the actual resource consumption amount data.

7. The product manufacturing cost accounting program according to claim 1, wherein vector values are used as the material amounts of a first through an N-th material to perform product manufacturing cost accounting for when a plurality of N materials are introduced.

8. The product manufacturing cost accounting program according to claim 1, wherein a product manufacturing cost accounting is performed by estimating the processing work introduction amount function data from the present term production data.

9. A product manufacturing cost accounting program for causing a computer to perform product manufacturing cost accounting, upon execution of the cost accounting program, one or more processors of the computer are caused to:
  read, from a memory, cost accounting space data and present term production data and define an arrow that connects an input node and an output node based on an inputted matching as including all of the following elements in a cost accounting space:
    a) the input node as a starting point of the arrow;
    b) the output node as an ending point of the arrow;
    c) an arrow path as a path of the arrow; and
    d) a material amount on the arrow path as a material amount on the path of the arrow,
    wherein
      the cost accounting space data is defined by a coordinate space comprising a degree of processing progress axis, and
      the present term production data is a production situation within a cost accounting target period;
  calculate the material amount on the arrow path that calculates the material amount at any particular point on the arrow path based on the material amount on the arrow path at a coordinate of the input node by:
    subtracting an impairment amount from the input node to the point; and
    adding an additional introduction amount from the input node to the point, the calculating the material amount on the arrow path includes:
      generating an arrow diagram on which the input node and the output node are displayed; and
      displaying the arrow on the arrow diagram; and
  display an arrow diagram that includes:
    i) a coordinate axis to arrange the input node;
    ii) a coordinate axis to arrange the output node;
    iii) a point indicative of the input node;
    iv) a point indicative of the output node; and
    as necessary, v) a line indicating an arrow or an arrow symbol,
    wherein the memory further stores:
      impairment function data which is an impairment condition of a material, and
      additional introduction function data which is an additional introduction condition of the material.

10. A product manufacturing cost accounting device for causing product manufacturing cost accounting to be performed, the product manufacturing cost accounting device:
  reads, from a memory, cost accounting space data and present term production data and defines an arrow that connects an input node and an output node based on an inputted matching as including all of the following elements in a cost accounting space:
    a) the input node as a starting point of the arrow;
    b) the output node as an ending point of the arrow;
    c) an arrow path as a path of the arrow; and
    d) a material amount on the arrow path; wherein
  the product manufacturing cost accounting device comprises:
    a first arithmetic unit that calculates a material amount at any particular point on the arrow path based on a material amount on the arrow path at a coordinate of the input node by:
      subtracting an impairment amount from the input node to the point if there is impairment; and
      adding an additional introduction amount from the input node to the point if there is additional introduction, the calculating the material amount on the arrow path includes:
        generating an arrow diagram on which the input node and the output node are displayed; and
        displaying the arrow on the arrow diagram;
    a second arithmetic unit that reproduces a specific product processing situation based on particular production data with the arrow and reads processing work introduction amount function data and material amount data on the arrow path to calculate a processing work conversion amount and a material introduction conversion amount as each material amount of all input nodes and all output nodes match a total of the material amounts on the arrow paths of all arrows related to the node at the coordinate of the node, and as a solution matching defined as a combination of the arrows is found;
    a third arithmetic unit that reads present term actual cost data, the processing work conversion amount, and the material introduction conversion amount and proportionally distributes costs to the arrows at ratios of the processing work conversion amount and the material introduction conversion amount; and
    a fourth arithmetic unit that outputs the costs distributed to the arrows, wherein
      the cost accounting space data is defined by a coordinate space comprising a degree of processing progress axis,
      the processing work introduction amount function data is an introduction condition for the processing work,
      the present term production data is a production situation within a cost accounting target period, and
      the present term actual cost data is a cost generation situation within the cost accounting target period.

11. The product manufacturing cost accounting device according to claim 10, wherein the first arithmetic unit further reads, from the memory, the cost accounting space data and the present term production data to generate an arrow diagram in which the input node and the output node are displayed.

12. A product manufacturing cost accounting method for causing a computer to perform product manufacturing cost accounting, upon execution of the cost accounting method, one or more processors of the computer are caused to:
  read the cost accounting space data and the present term production data and define an arrow that connects an input node and an output node based on an inputted matching as including all of the following elements in a cost accounting space:
    a) the input node as a starting point of the arrow;
    b) the output node as an ending point of the arrow;
    c) an arrow path as a path of the arrow; and
    d) a material amount on the arrow path as a material amount on the path of the arrow;
  calculate the material amount at any particular point on the arrow path based on the material amount on the arrow path at a coordinate of the input node by:
    subtracting an impairment amount from the input node to the point if there is impairment; and
    adding an additional introduction amount from the input node to the point if there is additional introduction, the calculating the material amount on the arrow path includes:

generating an arrow diagram on which the input node and the output node are displayed; and displaying the arrow on the arrow diagram;

reproduce a specific product processing situation based on particular production data with the arrow, and read processing work introduction amount function data and material amount data on the arrow path to calculate a processing work conversion amount and a material introduction conversion amount as each material amount of all input nodes and all output nodes matches a total of the material amounts on the arrow paths of all arrows related to the node at the coordinate of the node, and as a solution matching defined as a combination of the arrows is found; and read the present term actual cost data, the processing work conversion amount, and the material introduction conversion amount, proportionally distribute costs to the arrows at ratios of the processing work conversion amount and the material introduction conversion amount, and output the costs distributed to the arrows, wherein the cost accounting space data is defined by a coordinate space comprising a degree of processing progress axis, the processing work introduction amount function data is an introduction condition for the processing work, the present term production data is a production situation within a cost accounting target period, and the present term actual cost data is a cost generation situation within the cost accounting target period.

13. The product manufacturing cost accounting method according to claim 12, further comprising:

reading the cost accounting space data and the present term production data to generate an arrow diagram in which the input node and the output node are displayed.

14. A product manufacturing cost accounting program for causing a computer to perform product manufacturing cost accounting, upon execution of the cost accounting program, one or more processors of the computer are caused to:

read the cost accounting space data and the present term production data and define an arrow that connects an input node and an output node based on an inputted matching as including all of the following elements in a cost accounting space:

a) the input node as a starting point of the arrow;

b) the output node as an ending point of the arrow;

c) an arrow path as a path of the arrow; and d) a material amount on the arrow path, calculate the material amount on the arrow path on condition that the material amount at any particular point on any coordinates on the arrow path is same as the material amount on the arrow path at a coordinate of the input node, the calculating the material amount on the arrow path includes:

generating an arrow diagram on which the input node and the output node are displayed; and displaying the arrow on the arrow diagram;

reproduce a specific product processing situation based on particular production data with the arrow, read processing work introduction amount function data and material amount data on the arrow path to calculate a processing work conversion amount and a material introduction conversion amount as each material amount of all input nodes and all output nodes matches a total of the material amounts on the arrow paths of all arrows related to the node at the coordinate of the node, and as a solution matching defined as a combination of the arrows is found; and read the present term actual cost data, the processing work conversion amount, and the material introduction conversion amount, proportionally distribute costs to the arrows at ratios of the processing work conversion amount and the material introduction conversion amount, and output the costs distributed to the arrows, wherein the cost accounting space data is defined by a coordinate space comprising a degree of processing progress axis, the processing work introduction amount function data is an introduction condition for the processing work, the present term production data is a production situation within a cost accounting target period, and the present term actual cost data is a cost generation situation within the cost accounting target period.

15. The product manufacturing cost accounting program according to claim 14, wherein the memory further stores impairment function data which is an impairment condition of a material, and wherein the material amount of all input nodes and all output nodes is calculated at any particular point on the arrow path by subtracting an impairment amount from the input node to the point from the material amount on the arrow path at a coordinate of the input node.

16. The product manufacturing cost accounting program according to claim 14, wherein the memory further stores additional introduction function data which is an additional introduction condition of a material, and wherein the material amount of all input nodes and all output nodes is calculated at any particular point on the arrow path by adding an additional introduction amount from the input node to the point to the material amount on the arrow path at a coordinate of the input node.

17. The product manufacturing cost accounting program according to claim 14, wherein the memory further stores impairment function data which is an impairment condition of a material, and additional introduction function data which is an additional introduction condition of the material, and wherein the material amount of all input nodes and all output nodes is calculated at any particular point on the arrow path based on the material amount on the arrow path at a coordinate of the input node by:

subtracting an impairment amount from the input node to the point; and adding an additional introduction amount from the input node to the point.

18. A product manufacturing cost accounting program to further perform standard cost accounting in addition to the product manufacturing cost accounting program according to claim 14, wherein the memory further stores:

standard parameter value data as a standard parameter value regarding the processing work conversion amount and the material introduction conversion amount; and variance analysis sequence data in which an order of variance analysis is recorded, and wherein the one or more processors of the computer are further caused to:

read the standard parameter value data and the variance analysis sequence data from the memory;
decompose a variance between a standard cost and an actual cost into at least any one of the following (1) to (7) to perform the variance analysis that clarifies efficiency of each of elements of the costs; and
output a variance analysis result,
(1) a price p variance
(2) a capacity variance
(3) a resource consumption amount q variance
(4) an impairment θ variance
(5) an additional introduction φ variance
(6) a material amount ratio ψ variance at starting point introduction (if a plurality of materials are introduced)
(7) an arrow path "path" variance.

19. The product manufacturing cost accounting program according to claim 18, wherein the memory further stores:
standard resource consumption amount function data which is a standard resource consumption amount condition,
standard cost function data in which a standard cost generation condition is recorded, and
actual resource consumption amount data in which an actual resource consumption amount situation within a cost accounting target period is recorded, and
wherein the variance analysis further reads the standard resource consumption amount function data, the standard cost function data, and the actual resource consumption amount data to perform the variance analysis.

20. The product manufacturing cost accounting program according to claim 14, wherein vector values are used as the material amounts of a first through an N-th material to perform product manufacturing cost accounting for when a plurality of N materials are introduced.

21. The product manufacturing cost accounting program according to claim 14, wherein a product manufacturing cost accounting is performed by estimating the processing work introduction amount function data from the present term production data.

22. A product manufacturing cost accounting program for causing a computer to perform product manufacturing cost accounting, upon execution of the cost accounting program, one or more processors of the computer are caused to:
read, from a memory cost accounting space data and present term production data and define an arrow that connects an input node and an output node based on an inputted matching as including all of the following elements in a cost accounting space:
a) the input node as a starting point of the arrow;
b) the output node as an ending point of the arrow;
c) an arrow path as a path of the arrow; and
d) a material amount on the arrow path,
wherein
the cost accounting space data is defined by a coordinate space comprising a degree of processing progress axis, and
the present term production data is a production situation within a cost accounting target period;
calculate the material amount on the arrow path at any particular point on the arrow path based on the material amount on the arrow path at a coordinate of the input node by:
subtracting an impairment amount from the input node to the point if there is the impairment; and
adding an additional introduction amount from the input node to the point if there is the additional introduction, the calculating the material amount on the arrow path includes:
generating an arrow diagram on which the input node and the output node are displayed; and
displaying the arrow on the arrow diagram; and
display an arrow diagram that includes:
i) a time axis;
ii) a degree of processing progress axis;
iii) a point indicative of the input node;
iv) a point indicative of the output node; and
as necessary, v) a line indicating an arrow or an arrow symbol,
wherein the memory further stores:
impairment function data which is an impairment condition of a material, and
additional introduction function data which is an additional introduction condition of the material.

23. The product manufacturing cost accounting program according to claim 1,
wherein, if no arrows intersect, the solution matching is determined as a first-in first-out method in which the material introduced earlier is processed in priority.

24. A product manufacturing cost accounting device for causing product manufacturing cost accounting to be performed, the product manufacturing cost accounting device:
reads, from a memory, cost accounting space data and present term production data and defines an arrow that connects an input node and an output node based on an inputted matching as including all of the following elements in a cost accounting space:
a) the input node as a starting point of the arrow;
b) the output node as an ending point of the arrow;
c) an arrow path as a path of the arrow; and
d) a material amount on the arrow path as a material amount on the path of the arrow; and
wherein the product manufacturing cost accounting device comprises:
a first arithmetic unit that calculates a material amount at any particular point on the arrow path based on the material amount on the arrow path at a coordinate of the input node by:
subtracting an impairment amount from the input node to the point if there is impairment; and
adding an additional introduction amount from the input node to the point if there is additional introduction, the calculating the material amount on the arrow path includes:
generating an arrow diagram on which the input node and the output node are displayed; and
displaying the arrow on the arrow diagram;
a second arithmetic unit that reproduces a specific product processing situation based on particular production data with the arrow, the second arithmetic unit reading processing work introduction amount function data and material amount data on the arrow path to calculate a processing work conversion amount and a material introduction conversion amount as each material amount of all input nodes and all output nodes matches a total of the material amounts on the arrow paths of all arrows related to the node at the coordinate of the node, and as a solution matching defined as a combination of the arrows is found;
a third arithmetic unit that reads present term actual cost data, the processing work conversion amount, and the material introduction conversion amount and proportionally distributes costs to the arrows at ratios of the processing work conversion amount and the material introduction conversion amount; and a fourth arithmetic unit that outputs the costs distributed to the arrows, wherein the cost accounting space data is defined by a coordinate space comprising a degree of processing progress axis, the processing work introduction amount function data is an introduction condition for the processing work, the present term production data is a production situation within a cost accounting target period, and the present term actual cost data is a cost generation situation within the cost accounting target period.

25. The manufacturing cost accounting device according to claim 24, wherein the first arithmetic unit further reads, from the memory, the cost accounting space data and the present term production data to generate an arrow diagram in which the input node and the output node are displayed.

26. A product manufacturing cost accounting method for causing a computer to perform product manufacturing cost accounting, upon execution of the cost accounting program, one or more processors of the computer are caused to:

read, from a memory, cost accounting space data and present term production data, and define an arrow that connects an input node and an output node based on an inputted matching as including all of the following elements in a cost accounting space:

a) the input node as a starting point of the arrow;
b) the output node as an ending point of the arrow;
c) an arrow path as a path of the arrow; and
d) a material amount on the arrow path;

calculate the material amount at any particular point on the arrow path based on the material amount on the arrow path at a coordinate of the input node by:

subtracting an impairment amount from the input node to the point; and adding an additional introduction amount from the input node to the point, the calculating the material amount on the arrow path includes:

generating an arrow diagram on which the input node and the output node are displayed, and displaying the arrow on the arrow diagram;

reproduce a specific product processing situation based on particular production data with the arrow, and read processing work introduction amount function data and material amount data on the arrow path to calculate a processing work conversion amount and a material introduction conversion amount as each material amount of all input nodes and all output nodes matches a total of the material amounts on the arrow paths of all arrows related to the node at the coordinate of the node, and as a solution matching defined as a combination of the arrows is found; and read the present term actual cost data, the processing work conversion amount, and the material introduction conversion amount, proportionally distribute costs to the arrows at ratios of the processing work conversion amount and the material introduction conversion amount, and output the costs distributed to the arrows, wherein the cost accounting space data is defined by a coordinate space comprising a degree of processing progress axis, the processing work introduction amount function data is an introduction condition for the processing work, the present term production data is a production situation within a cost accounting target period, and the present term actual cost data is a cost generation situation within the cost accounting target period.

* * * * *